(12) United States Patent
Wallance

(10) Patent No.: US 9,115,504 B2
(45) Date of Patent: Aug. 25, 2015

(54) SYSTEM FOR MODULAR BUILDING CONSTRUCTION

(71) Applicant: GLOBAL BUILDING MODULES, INC., Larchmont, NY (US)

(72) Inventor: David Wallance, Croton-on-Hudson, NY (US)

(73) Assignee: Global Building Modules, Inc., Larchmont, NY (US)

( * ) Notice: Subject to any disclaimer, the term of this patent is extended or adjusted under 35 U.S.C. 154(b) by 0 days.

(21) Appl. No.: 14/339,590

(22) Filed: Jul. 24, 2014

(65) Prior Publication Data

US 2015/0007506 A1 Jan. 8, 2015

Related U.S. Application Data

(63) Continuation of application No. 13/770,278, filed on Feb. 19, 2013, now Pat. No. 8,826,600, and a continuation of application No. 13/171,534, filed on Jun. 29, 2011, now Pat. No. 8,397,441, and a (Continued)

(51) Int. Cl.
*E04H 1/00* (2006.01)
*E04H 14/00* (2006.01)
(Continued)

(52) U.S. Cl.
CPC ............... *E04H 1/005* (2013.01); *E04B 1/003* (2013.01); *E04B 1/348* (2013.01); *E04B 1/3483* (2013.01);
(Continued)

(58) Field of Classification Search
CPC .......... E04H 1/005; E04H 1/04; F24D 3/145; E04B 1/34336; E04B 1/348; E04B 1/34331; E04B 1/34384; E04B 1/003; E04B 1/3483; E04B 2001/34892
USPC ......................................................... 52/79.1
See application file for complete search history.

(56) References Cited

U.S. PATENT DOCUMENTS 3,118,187 A 1/1964 Alimanestiano
3,540,173 A 11/1970 Johnides
(Continued)

FOREIGN PATENT DOCUMENTS

WO 2005/038155 A1 4/2005
WO 2008/107693 A1 9/2008

OTHER PUBLICATIONS

International Standard ISO 668:1995/Amd.1:2005(E), entitled "Series 1 freight containers—Classification, dimensions and ratings, Amendment 1", dated Dec. 15, 1995, as found in ISO Standards Handbook, Freight Containers, Fourth Edition, 2006, Geneva, Switzerland.

(Continued)

*Primary Examiner* — Mark Wendell
(74) *Attorney, Agent, or Firm* — Gottlieb, Rackman & Reisman, PC

(57) ABSTRACT

Construction systems for erecting building structures comprise a plurality of prefabricated interconnectable modular building units, each unit comprising framing members and a plurality of nodes, each node situated for selective interconnection with other units, the nodes and the exterior dimensions of the frame conforming to ISO shipping standards such that each unit is transportable using the ISO intermodal transportation system, and such that when the units are interconnected, a building structure is formed. The modular units are assembled at a remote location, and are there constructed to a semi-finished state, following which the semi-finished modular units are transported from the remote location to the job site, where they are secured to form the structure being erected, and the semi-finished modular units are thereafter constructed to a finished state.

13 Claims, 77 Drawing Sheets

Related U.S. Application Data continuation of application No. 12/900,041, filed on Oct. 7, 2010, now Pat. No. 8,001,730, and a continuation of application No. 11/893,639, filed on Aug. 17, 2007, now Pat. No. 7,827,738.

(60) Provisional application No. 60/840,419, filed on Aug. 26, 2006, provisional application No. 60/843,247, filed on Sep. 8, 2006, provisional application No. 60/861,407, filed on Nov. 28, 2006, provisional application No. 60/900,311, filed on Feb. 8, 2007, provisional application No. 60/902,081, filed on Feb. 15, 2007.

(51) Int. Cl.

| | | |
|---|---|---|
| *E04H 3/00* | (2006.01) | |
| *E04H 5/00* | (2006.01) | |
| *E04H 6/00* | (2006.01) | |
| *E04H 9/00* | (2006.01) | |
| *E04B 1/00* | (2006.01) | |
| *E04B 1/348* | (2006.01) | |
| *E04H 1/04* | (2006.01) | |
| *F24D 3/14* | (2006.01) | |
| *E04B 1/343* | (2006.01) | |

(52) U.S. Cl.
CPC ......... *E04B 1/34331* (2013.01); *E04B 1/34336* (2013.01); *E04B 1/34384* (2013.01); *E04H 1/04* (2013.01); *F24D 3/145* (2013.01); *E04B 2001/34892* (2013.01); *Y02B 30/22* (2013.01)

(56) References Cited

U.S. PATENT DOCUMENTS

| | | |
|---|---|---|
| 3,925,679 A | 12/1975 | Berman et al. |
| 3,984,948 A | 10/1976 | Bussard |
| 4,075,814 A | 2/1978 | Theurer et al. |
| 4,599,829 A | 7/1986 | DiMartino, Sr. |
| 4,644,708 A | 2/1987 | Baudot et al. |
| 4,854,094 A | 8/1989 | Clark |
| 4,891,919 A | 1/1990 | Polibroda |
| 5,193,325 A | 3/1993 | Allison |
| 5,317,857 A | 6/1994 | Allison |
| 5,596,844 A | 1/1997 | Kalinowski |
| 5,706,614 A | 1/1998 | Wiley, Jr. et al. |
| 5,727,353 A | 3/1998 | Getz et al. |
| 5,735,639 A | 4/1998 | Payne et al. |
| 5,761,854 A | 6/1998 | Johnson et al. |
| 5,847,537 A | 12/1998 | Parmley, Sr. |
| 5,916,096 A | 6/1999 | Wiesmann et al. |
| 5,950,373 A | 9/1999 | Von Hoff et al. |
| 6,016,634 A | 1/2000 | Sayer |
| 6,393,775 B1 | 5/2002 | Staschik |
| 6,463,705 B1 | 10/2002 | Davis et al. |
| 6,651,392 B2 | 11/2003 | Ritzal |
| 6,688,048 B2 | 2/2004 | Staschik |
| 6,862,847 B2 | 3/2005 | Bigelow |
| 6,973,758 B2 | 12/2005 | Zeik et al. |
| 2002/0129566 A1 | 9/2002 | Piccolo et al. |
| 2003/0009954 A1 | 1/2003 | Bradley |
| 2003/0188507 A1 | 10/2003 | Cote, Jr. |
| 2003/0213188 A1 | 11/2003 | Bigelow |
| 2004/0083671 A1 | 5/2004 | Johnson et al. |
| 2005/0193643 A1 | 9/2005 | Pettus |
| 2005/0279035 A1 | 12/2005 | Donovan |

OTHER PUBLICATIONS

International Standard ISO 830:1999 entitled "Freight containers—Vocabulary", Sep. 15, 1999, as found in ISO Standards Handbook, Freight Containers, Fourth Edition, 2006, Geneva, Switzerland.
International Standard ISO 830:1999/Cor.1;2001(E) entitled "Freight containers—Vocabulary, Technical Corrigendum 1", dated Jul. 15, 2001, as found in ISO Standards Handbook, Freight Containers, Fourth Edition, 2006, Geneva, Switzerland.
International Standard ISO 1161:1984(E) entitled "Series 1 freight containers—Corner fittings-Specifiction", dated Dec. 15, 1984, as found in ISO Standards Handbook, Freight Containers, Fourth Edition, 2006, Geneva, Switzerland.
International Standard ISO 1161:1984/Cor 1:1990(E) entitled "Series 1 freight containers—Corner fittings-Specification Technical Corrigendum 1", (month unknown), 1990, as found in ISO Standards Handbook, Freight Containers, Fourth Edition, 2006, Geneva, Switzerland.
International Standard ISO 1496-1:1990(E) entitled "Series 1 freight containers—Specification and testing-Part 1", General cargo containers for general purposes, dated Aug. 15, 1990, as found in ISO Standards Handbook, Freight Containers, Fourth Edition, 2006, Geneva, Switzerland.
International Standard ISO 1496-1:1990/Amd. 1:1993(E) entitled "Series 1 freight containers—Specification and testing-Part 1": General cargo containers for general purposes, Amendment 1:1AAA and 1BBB container, dated Mar. 1, 1993, as found in ISO Standards Handbook, Freight Containers, Fourth Edition, 2006, Geneva, Switzerland.
International Standard ISO 1496-1:1990/Amd. 2:1998(E) entitled "Series 1 freight containers—Specification and testing-Part 1": General cargo containers for general purposes, Amendment 2, dated Jul. 1, 1998, as found in ISO Standards Handbook, Freight Containers, Fourth Edition, 2006, Geneva, Switzerland.
International Standard ISO 1496-1:1990/Amd. 3:2005(E) entitled "Series 1 freight containers—Specification and testing-Part 1": General cargo containers for general purposes, Amendment 3, dated Jun. 15, 2005, as found in ISO Standards Handbook, Freight Containers, Fourth Edition, 2006, Geneva, Switzerland.
International Standard ISO 1496-1:1990/Amd. 4:2006(E) entitled "Series 1 freight containers—Specification and testing-Part 1": General cargo containers for general purposes, Amendment 4, dated Nov. 1, 2006, as found in ISO Standards Handbook, Freight Containers, Fourth Edition, 2006, Geneva, Switzerland.
International Standard ISO 1496-1:1990/Amd. 5:2006(E) entitled "Series 1 freight containers—Specification and testing-Part 1": General cargo containers for general purposes, Amendment 5: Door and security, dated May 15, 2006, as found in ISO Standards Handbook, Freight Containers, Fourth Edition, 2006, Geneva, Switzerland.
International Standard ISO 3874:1997(E) entitled "Series 1 freight containers—Handling and securing," dated Dec. 15, 1997 (corrected and reprinted Jul. 15, 1999), as found in ISO Standards Handbook, Freight Containers, Fourth Edition, 2006, Geneva, Switzerland.
International Standard ISO 3874:1997/Amd. 5:2000(E) entitled "Series 1 freight containers—Handling and securing, Amendment 1: Twistlocks, latchlocks, stacking fittings and lasing rod systems for securing containers," dated Nov. 15, 2002 (corrected and reprinted Sep. 1, 2001), as found in ISO Standards Handbook, Freight Containers, Fourth Edition, 2006, Geneva, Switzerland.
International Standard ISO 3874:1997/Amd. 2:2002(E) entitled "Series 1 freight containers—Handling and securing, Amendment 2: Vertical Tandem Lifting," dated Jul. 1, 2002, as found in ISO Standards Handbook, Freight Containers, Fourth Edition, 2006, Geneva, Switzerland.
International Standard ISO 3874:1997/Amd. 3:2005(E) entitled "Series 1 freight containers—Handling and securing, Amendment 3: Double stack rail car operations," dated Jul. 1, 2005, as found in ISO Standards Handbook, Freight Containers, Fourth Edition, 2006, Geneva, Switzerland.
International Standard ISO 6346:1995(E) entitled "Series 1 freight containers—Coding, identification and marking," dated Dec. 1, 1995, as found in ISO Standards Handbook, Freight Containers, Fourth Edition, 2006, Geneva, Switzerland.
International Standard ISO/TR 15069:1997(E) entitled "Series 1 freight containers—Handling and securing—Rationale For ISO 3874 Annex A," dated Dec. 15, 1997, as found in ISO Standards Handbook, Freight Containers, Fourth Edition, 2006, Geneva, Switzerland.

(56) References Cited

OTHER PUBLICATIONS

International Standard ISO/TR 15070:1996(E) entitled "Series 1 freight containers—Rationale for structural test criteria," dated Aug. 15, 1996, as found in ISO Standards Handbook, Freight Containers, Fourth Edition, 2006, Geneva, Switzerland.

International Standard ISO/TR 15070:1996/Amd. 1:2005(E) entitled "Series 1 freight containers—Rationale for structural test criteria, Amendment 1: Guidance on structural integrity," dated May 1, 2005, as found in ISO Standards Handbook, Freight Containers, Fourth Edition, 2006, Geneva, Switzerland.

International Standard ISO/PAS 17712:2006(E), entitled "Freight containers—Mechanical Seals," dated Jul. 1, 2006, as found in ISO Standards Handbook, Freight Containers, Fourth Edition, 2006, Geneva, Switzerland.

International Standard ISO 668:1995/Amd.1:2005(E), entitled "Series 1 freight containers—Classification, dimensions and ratings", dated Dec. 15, 1995, as found in ISO Standards Handbook, Freight Containers, Fourth Edition, 2006, Geneva, Switzerland.

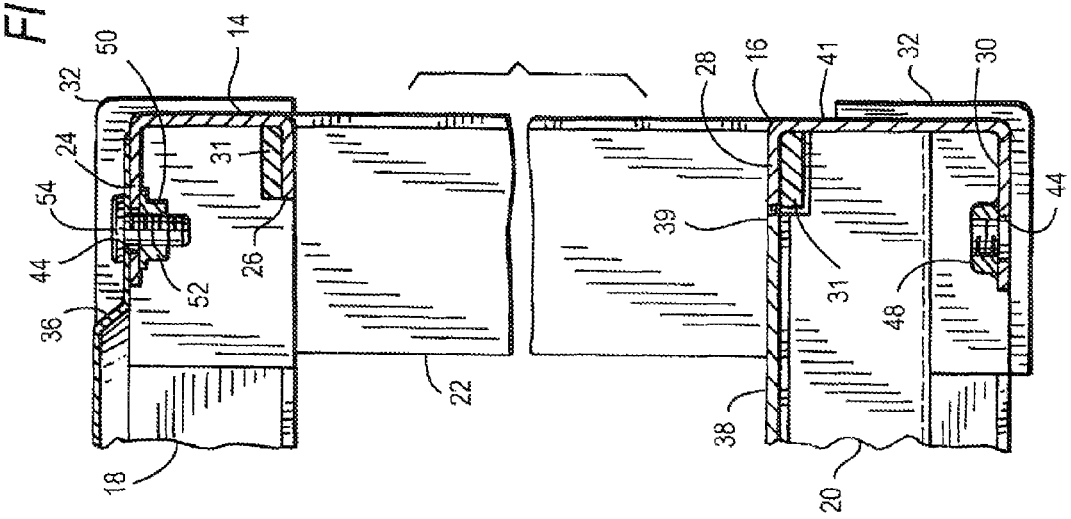
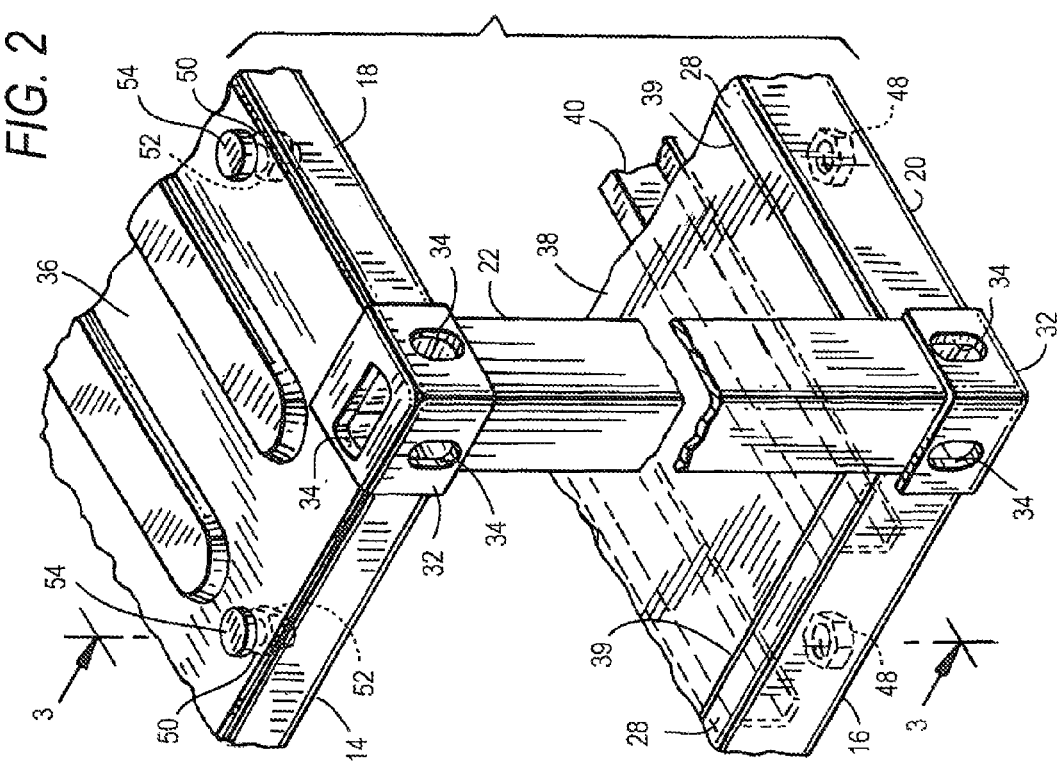

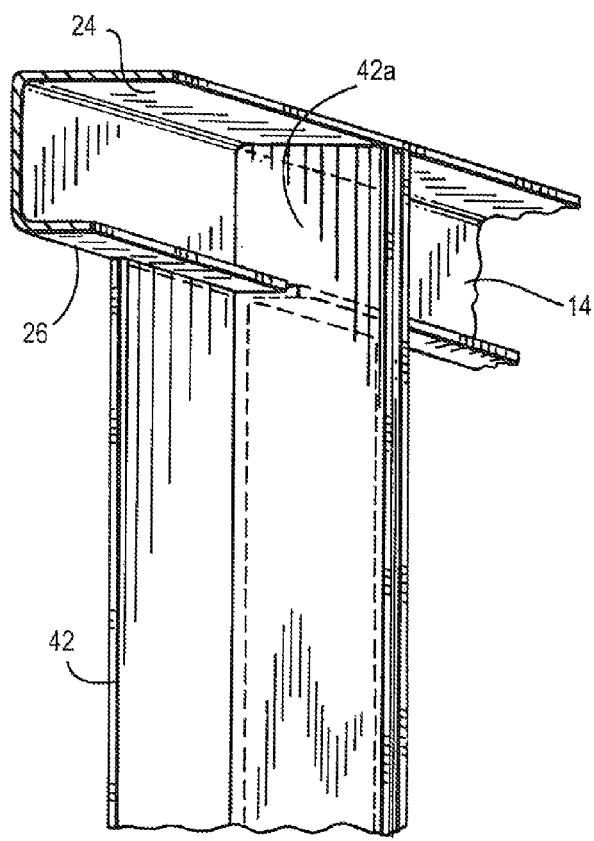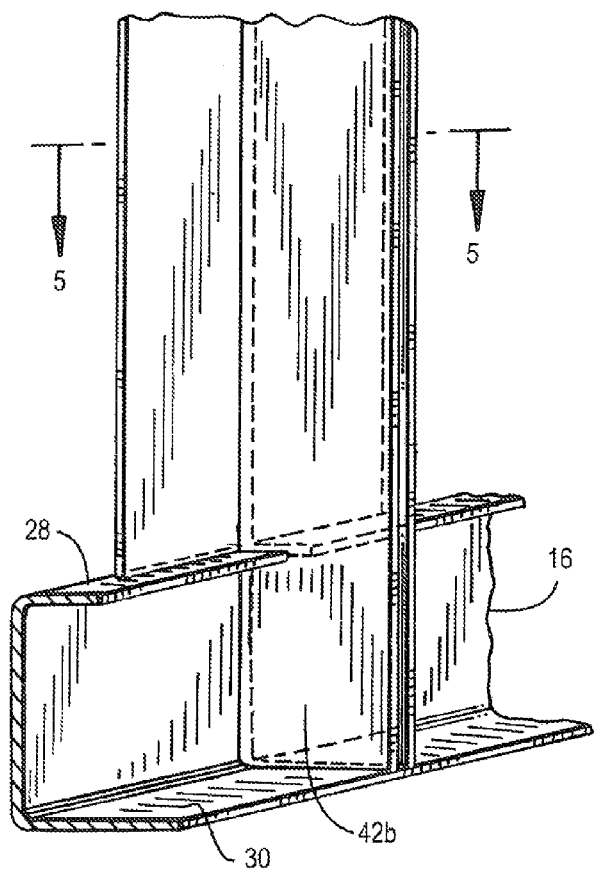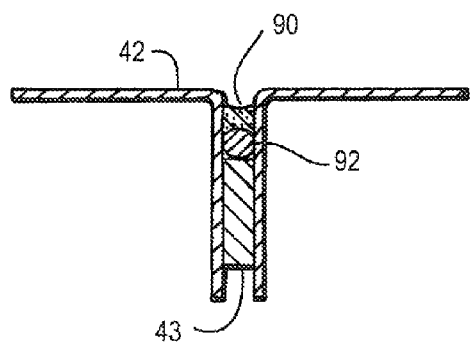
FIG. 4
FIG. 5

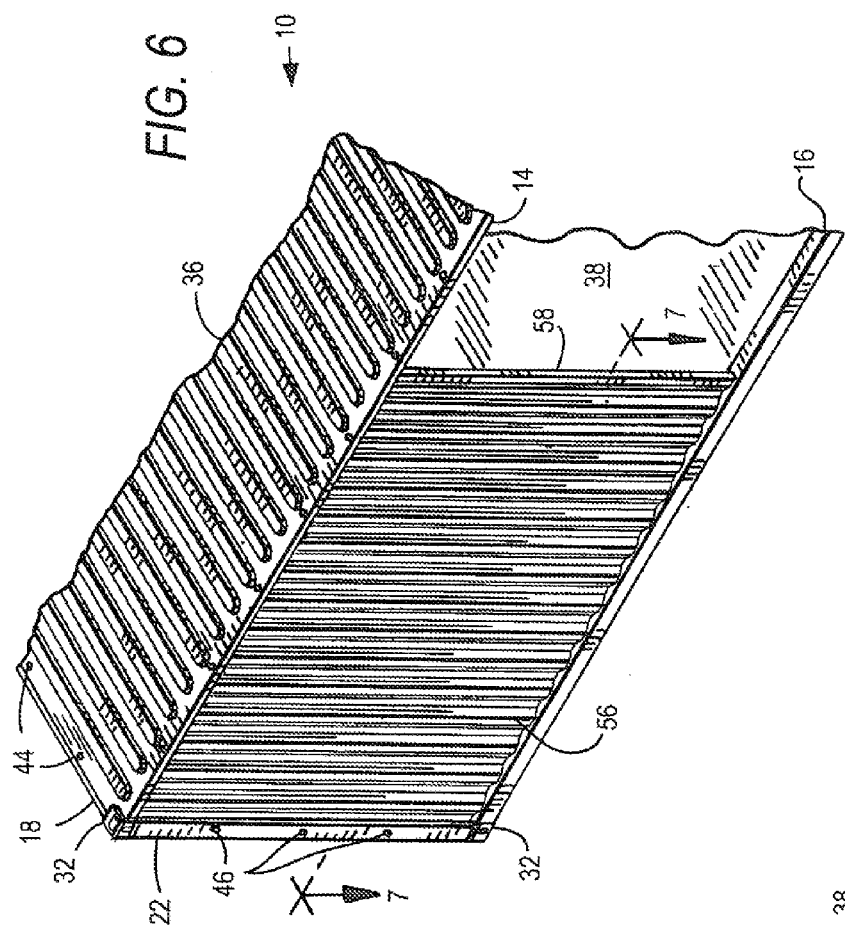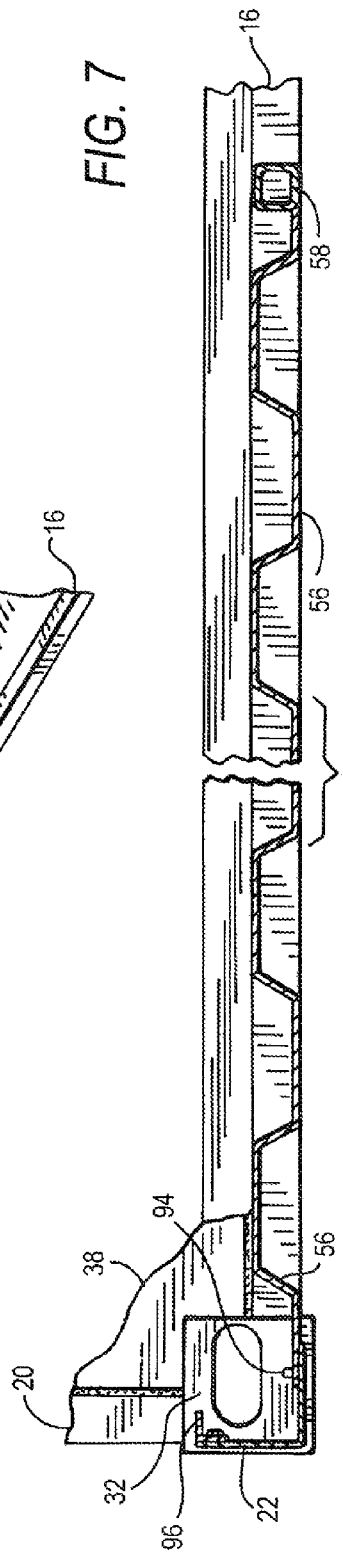

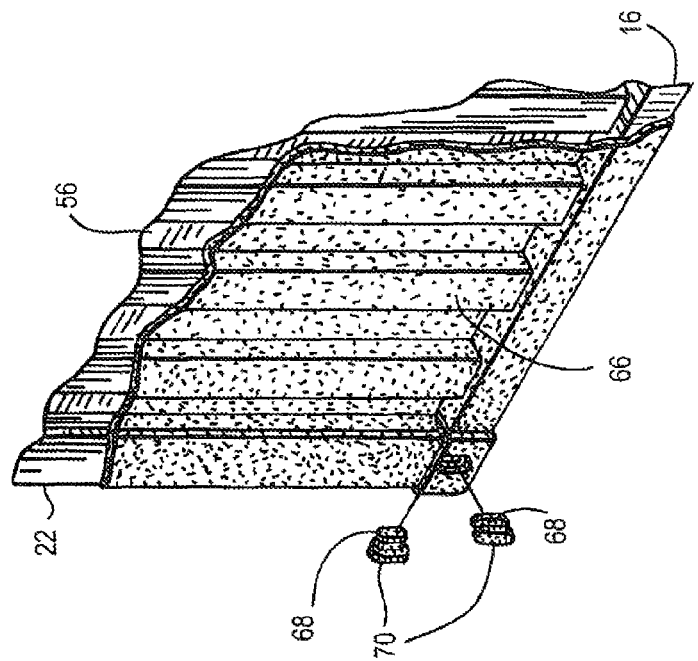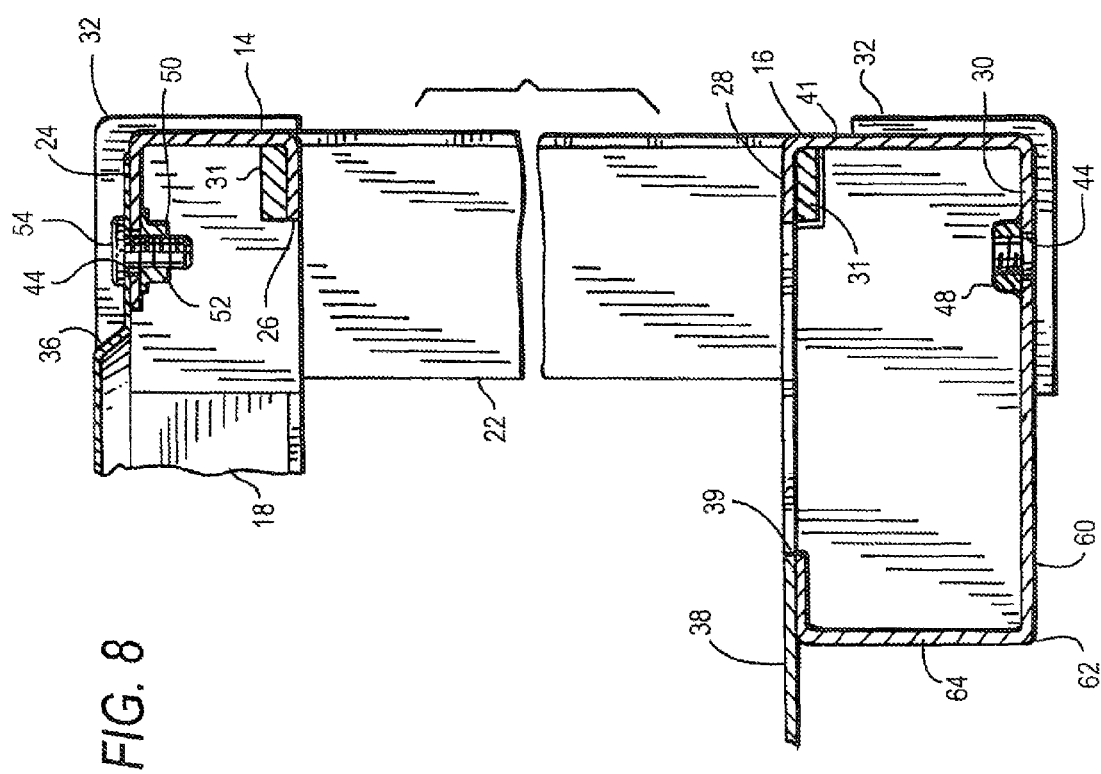

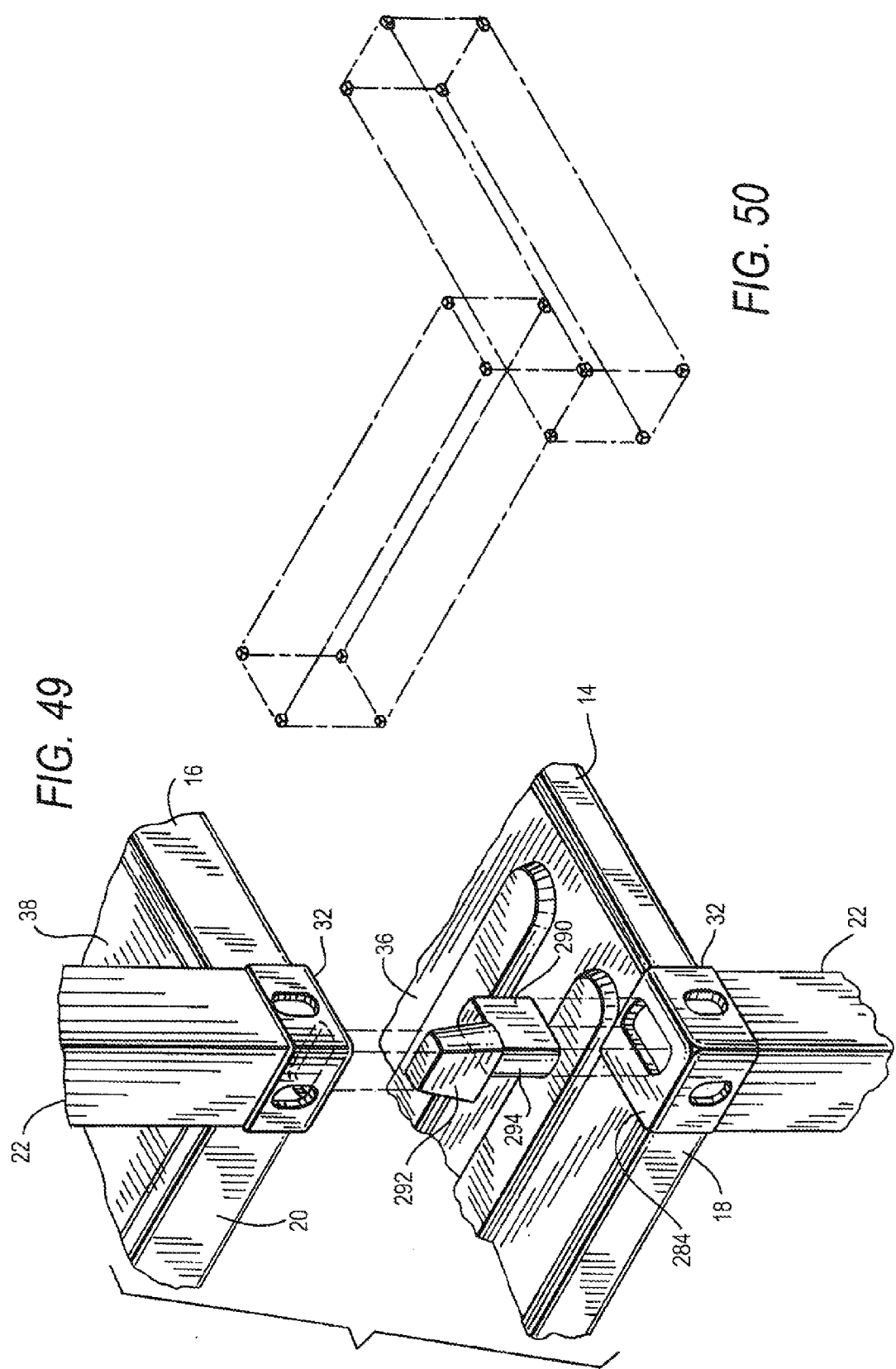

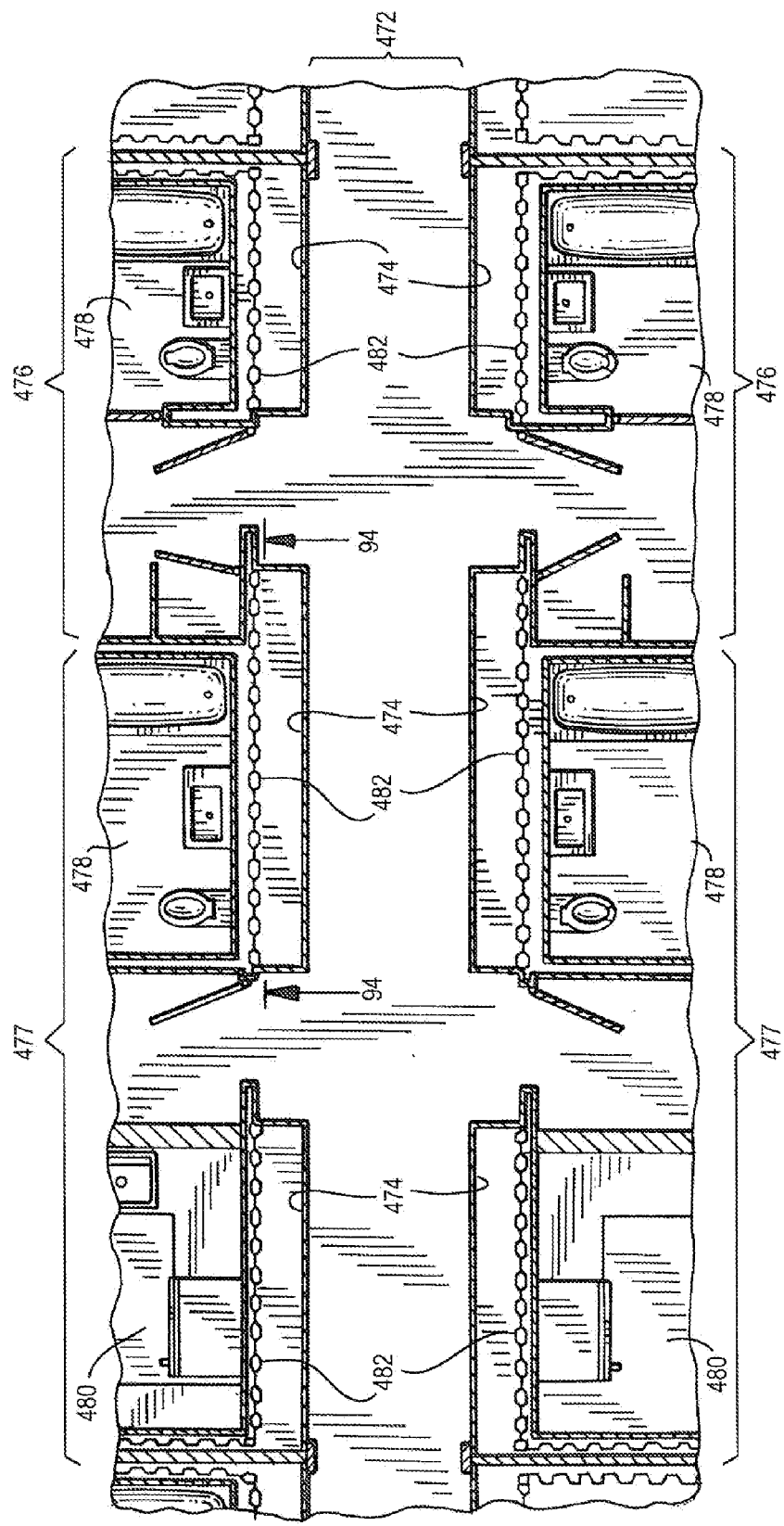

ated the way in which buildings are put together, except that relatively small buildings can be constructed under a factory roof in controlled conditions. Otherwise, a modular building is built in essentially the same sequence as it is in the field, that is, one whole building is put together at a time, and is then broken down into modules and shipped. The conventional "modular" industry operates under the premise that the largest possible load and therefore the fewest total number of trips is the most economical transportation solution. However, generally speaking the high cost of transporting oversize loads has limited the distribution range of conventional modular factories to a five hundred mile radius.

SYSTEM FOR MODULAR BUILDING CONSTRUCTION

REFERENCE TO RELATED APPLICATIONS

This application is a continuation of prior application Ser. No. 13/770,278, filed Feb. 19, 2013, which was a continuation of prior application Ser. No. 13/171,534, filed Jun. 29, 2011, now U.S. Pat. No. 8,397,441, which was a continuation of prior application Ser. No. 12/900,041, filed Oct. 7, 2010, now U.S. Pat. No. 8,001,730, which was a continuation of prior application Ser. No. 11/893,639, filed Aug. 17, 2007, now U.S. Pat. No. 7,827,738, which claimed the benefit under 35 U.S.C. §119(e) of the following prior U.S. Provisional Patent Application Ser. No. 60/840,419, filed Aug. 26, 2006; Ser. No. 60/843,247, filed Sep. 8, 2006; Ser. No. 60/861,407, filed Nov. 28, 2006; Ser. No. 60/900,311, filed Feb. 8, 2007; and Ser. No. 60/902,081, filed Feb. 15, 2007.

TECHNICAL FIELD

The present invention relates broadly to the field of building construction, and in particular, to a prefabricated, modular system for construction that is particularly well suited for assembly of multi-story buildings. More specifically, this invention relates to a system of modules for use in the assembly of multi-story residential and other structures, which utilize the dimensional restrictions and interconnection requirements specified by the International Organization for Standardization ("ISO") for the containers used by the freight transportation industry; these standards are designed to allow such freight/cargo containers to be moved quickly and easily between ships, trucks, trains and cargo aircraft.

BACKGROUND OF THE INVENTION

Buildings, defined as structures for human habitation or use, are among the largest man made structures (only civil engineering works such as dams and bridges are larger). From the earliest history of construction, building techniques have been constrained by the structural and physical properties of available materials, the technology for shaping, finishing and joining materials together, and the means at hand for transporting, lifting, and putting the pieces of a building together. For thousands of years the essential technical and physical characteristics of buildings (stylistic differences aside) remained the same.

About one hundred and fifty years ago, the Industrial Revolution introduced a radically new building technology—material choices that previously were limited to wood and masonry gave way to materials like steel and glass, hand craft yielded to machine manufacture, and transportation and lifting methods previously limited to wind and animal power were replaced with engines. These changes, among many others, led to a vastly more complex society that demanded larger and more elaborate structures to house new living, work, social, and cultural functions. Rising standards of living, and the growth of the middle class, led to the substitution of modern appliances and electro-mechanical building services for servant labor. The process of change has been so complete that buildings constructed in the last eighty years, not to mention the last forty, would be unrecognizable to an inhabitant of the mid-nineteenth century.

However, despite all of these changes, the construction of buildings today remains rooted at the building site, as it has been for thousands of years. That is, most buildings have been, and are still being built at a building site by building tradesmen who are classified by their trade unions and along the lines of the construction classification system of the Construction Specifications Institute ("CSI"). Typically, an architect along with engineering consultants initially design each building as a stand-alone object with a unique set of construction drawings and specifications which are the result of thousands of hours of work, and which describe in detail the design intention of the architect. Each of the trades involved in building the structure is required to evaluate the unique set of drawings and specifications, and to propose a bid and furnish, if necessary, shop drawings which further specify the method of construction.

Thus, the conventional method of contracting the construction of a large building can involve innumerable subcontractors, with added tiers of sub-subcontractors, most of whom are working together for the first time and who have competing needs for time and space to perform their work. Each subcontractor is responsible for hundreds if not thousands of bits and pieces of work, some of those pieces constructed in the field at the building site, like concrete formwork, and some factory manufactured and installed in the field, like curtain wall. Widely varying dimensional tolerances between factory and field methods lead to excessive allowances for fitting, which in turn encourages sloppy joinery. Three-dimensional coordination of components, such as ductwork and piping, with structural and spatial restrictions, is done in the field under intense schedule pressure, and there is only one opportunity to get it right; frequently a ceiling is lowered or boxed out to accommodate errors, and even less desirable accommodations that sacrifice the quality of design and function are not uncommon. Each design is "one-of-a-kind," with architects and engineers "re-inventing the wheel" on every new building. Even medium-size buildings can entail hundreds of thousands of man-hours of design and coordination among architects, engineers, consultants, code officials, and clients.

This typical method of building construction, although traditional, does not take full advantage of the principles of industrialization, including the mass production of interchangeable parts and assembly in a controlled factory setting. Historically, the primary reason for this failure has been that most buildings, especially multi-story buildings, are too large to be cost-effectively moved from a factory to the erection site, i.e., the logistics of transportation do not suggest an obvious way of making entire buildings in factories. Another reason is that members of the craft-based construction industry (including the design professions) have not realized anywhere near the full potential of industrial methods and advances in information technology. Finally, the perception that the quality and versatility of "pre-fabricated" buildings is lower than that of manufactured buildings has created a stigma associated with the term "modular" construction.

The conventional "modular" industry (which constitutes the prior art) has not significantly changed the way in which buildings are put together, except that relatively small buildings can be constructed under a factory roof in controlled conditions. Otherwise, a modular building is built in essentially the same sequence as it is in the field, that is, one whole building is put together at a time, and is then broken down into modules and shipped. The conventional "modular" industry operates under the premise that the largest possible load and therefore the fewest total number of trips is the most economical transportation solution. However, generally speaking the high cost of transporting oversize loads has limited the distribution range of conventional modular factories to a five hundred mile radius.

This limit of distribution range has stunted the growth of the conventional modular manufacturing industry and has prevented it from operating on a national, not to mention international, scale. Although a network of distributors arose to answer the need for nationwide distribution, those distributors, who determine the market, do a satisfactory business in temporary facilities such as classrooms and construction site offices, and therefore have no reason to change the status quo. Furthermore, innovation has not come, nor is it likely to come, from the manufacturers, since the roots of the "modular" industry are not in the world of heavy construction, but rather in trucking- and construction-related service businesses, which branched into manufacturing to take advantage of opportunities in the market for temporary facilities. Temporary facilities are the core business (over sixty percent) of the "modular" industry, and in the face of inertia this fact is not likely to lead to change in the way permanent buildings are constructed, especially since such temporary facilities are generally of inferior aesthetic and performance quality as compared to standard building construction.

Thus, the conventional modular manufacturing industry has not succeeded in penetrating the construction market to any significant degree because it has not solved the transportation problem, and because it has not made any fundamental changes in construction technology to adapt buildings to industrialized methods of manufacture. And while, in an alternative approach, the prior art has attempted to re-use conventional ISO cargo containers by converting them, perhaps with portions of their corrugated side walls removed, into habitable structures such as residential housing, these attempts have resulted in structures that rely upon the remaining corrugated walls of these cargo containers as the primary facade. This approach limits the aesthetic expression of a building to the image of a stack of cargo containers, and results in a building envelope that is deficient from the standpoint of weathering and thermal performance. Moreover, this prior art has been limited by its narrow understanding of the conventional ISO cargo container as a closed box that can be fitted out as habitable space merely by the addition of windows, doors, partitions, fixtures, etc., and that can, in some instances, be joined together with other such boxes to yield somewhat larger structures.

Therefore, and in summary, the rationalization of production that began in the late nineteenth century with Henry Ford, and which has advanced to the present day with robotics and "just in time inventory," has yet to change in a fundamental way the organization of the construction process for multistory buildings. Clearly, a need exists to extend the concept of industrialization to the construction of buildings, on a par with the automotive, aerospace, and shipbuilding industries, and a solution to the transportation problem is the essence of any successful industrialized building concept. The solution to the transportation problem provided by the present invention, combined with the changes in construction technology provided by the present invention, allow the construction industry to parallel the supply chain and production methods used by the automotive and aerospace industries, and ultimately lead to a re-thinking of the entire construction process, beginning with how buildings are designed. The increased efficiency of international transportation has led to the present invention, which essentially reduces a building to an assemblage of the largest building blocks which can be efficiently transported over great distances.

SUMMARY OF THE INVENTION

In accordance with the preferred embodiment of the invention, an architectural building system is provided which consists of interconnectable prefabricated modular volumetric units of building construction, each comprising a steel frame shaped as a rectangular parallelopiped that utilizes the ISO cargo container as the basis for its exterior dimensions, the frame comprised of framing members and a steel corner fitting or bracket (also referred to herein as a "node") at each of its eight corners, the nodes conforming to ISO standards as to node location and geometry, and the nodes also facilitating selective interconnection with other volumetric units of construction, at least some of the framing members also having at least one attachment point separate from the nodes for selective attachment to respective framing members in the frames of adjacent units.

In another aspect of the preferred embodiment of the invention, an architectural building system is provided which consists of interconnectable prefabricated modular volumetric units of building construction, each comprising a steel frame shaped as a rectangular parallelopiped that utilizes the ISO cargo container as the basis for its exterior dimensions, the frame comprised of framing members and a steel node at each of its eight corners, the nodes conforming to ISO standards as to node location and geometry, and the nodes also facilitating selective interconnection with other volumetric, units of construction, the framing members comprising eight edge rails, each of the edge rails comprising an inwardly projecting upper flange, and an inwardly projecting lower flange spaced apart from and disposed substantially parallel to the upper flange.

In still another aspect of the preferred embodiment of the invention, an architectural building system is provided which consists of interconnectable prefabricated modular volumetric units of building construction, each comprising a steel frame shaped as a rectangular parallelopiped that utilizes the ISO cargo container as the basis for its exterior dimensions, the frame comprised of framing members and a steel node at each of its eight corners, the nodes conforming to ISO standards as to node location and geometry, and the nodes also facilitating selective interconnection with other volumetric units of construction, each unit never having before been used as a container for transporting products unrelated to the building system.

In yet another aspect of the preferred embodiment of the invention, an architectural building system is provided which consists of interconnectable prefabricated modular volumetric units of building construction, each comprising a steel frame shaped as a rectangular parallelopiped that utilizes the ISO cargo container as the basis for its exterior dimensions, the frame comprised of framing members and a steel node at each of its eight corners, the nodes conforming to ISO standards as to node location and geometry, and the nodes also facilitating selective interconnection with other volumetric units of construction, at least a portion of at least one of the sides of the frame being closable with at least one removable transport protection panel, the at least one protection panel when installed being the only barrier enclosing the unit along the aforesaid portion of the aforesaid at least one side.

In a further aspect of the preferred embodiment of the invention, an architectural building system is provided which consists of interconnectable prefabricated modular volumetric units of building construction, each comprising a steel frame shaped as a rectangular parallelopiped that utilizes the ISO cargo container as the basis for its exterior dimensions, the frame comprised of framing members and a steel node at each of its eight corners, the nodes conforming to ISO standards as to node location and geometry, and the nodes also facilitating selective interconnection with other volumetric units of construction, each modular unit being transportable using the ISO intermodal transportation system but each modular unit not meeting at least one of the ISO certification criteria for transport of cargo.

In yet a further aspect of the preferred embodiment of the invention, an architectural building system is provided which consists of interconnectable pre-fabricated modular volumetric units of construction, each comprising a steel frame shaped as a rectangular parallelopiped that utilizes the ISO cargo container as the basis for its exterior dimensions, the frame comprised of framing members and a steel node at each of its eight corners, the nodes conforming to ISO standards as to node location and geometry, and the nodes also facilitating selective interconnection with other volumetric units of construction, the framing members comprising eight edge rails, at least one edge rail in one modular volumetric unit of construction being interconnected by beam stitching with a respective edge rail in at least one other modular volumetric unit of construction.

In still a further aspect of the preferred embodiment of the invention, an architectural building system is provided which consists of interconnectable pre-fabricated modular volumetric units of construction, each comprising a steel frame shaped as a rectangular parallelopiped that utilizes the ISO cargo container as the basis for its exterior dimensions, the frame comprised of framing members and a steel node at each of its eight corners, the nodes conforming to ISO standards as to node location and geometry, and the nodes also facilitating selective interconnection with other volumetric units of construction, the framing members comprising four corner posts, at least one corner post in one modular volumetric unit of construction being interconnected by column stitching with a respective corner post in at least one other modular volumetric unit of construction.

With respect to each of the aspects of the invention set forth in the five preceding paragraphs, an additional aspect of the invention includes individual modular volumetric units of construction, or in some cases two modular volumetric units of construction, having the characteristics set forth in each of those paragraphs. Moreover, with respect to each of the aspects of the invention set forth in the preceding sentence, an additional aspect of the invention includes building structures comprising a plurality of such modular volumetric units of construction.

Each volumetric unit of construction is structurally self-supporting, such that the modular units may be transported from factory to job site using the ISO intermodal transportation system, and the volumetric units of construction can be stacked one upon another and disposed one next to another in the field, so as to create a variety of single- and multi-story building and structure types.

The ISO dimensional grid standard provides that each block must be eight feet wide, but can come in varying lengths from ten feet to fifty-three feet, and in varying heights up to nine feet six inches (although even greater heights can be accommodated in the ISO intermodal transportation system, albeit at greater cost); this ISO grid is configured such that the corner fittings will attach not only to ISO cargo containers, but also to existing transportation vessels and vehicles, such as ships, railcars, and trucks, as well as to existing manipulation equipment such as cranes, gurneys, fork-lifts, and the like. However, unlike the prior art conventional ISO cargo containers which have been converted, perhaps with portions of their corrugated side walls removed, into habitable structures such as residential housing, but which have already been used at least once to transport unrelated cargo, the modular units of the present invention (also referred to herein as "volumetric units of construction") are neither built nor intended to function as conventional cargo containers, do not meet at least one of the ISO certification criteria for transport of cargo, and are units that were not previously used as cargo containers for transporting products unrelated to the modular system for building construction of which they form a part.

Moreover, the modular units of the present invention differ from conventional cargo containers in that they have been structurally reinforced, by "beam stitching," to create a "wire-frame" skeleton which does not depend for structural support upon, and which therefore may omit, the completely surrounding corrugated walls that characterize a conventional cargo container. Nevertheless, those portions of the sides of each modular unit from which corrugated walls have been omitted are closed temporarily, while the unit is in transit, by at least one removable transport protection panel, thus providing virtually the same shelter from adverse weather conditions that the completely encompassing corrugated side walls would otherwise provide. Furthermore, although the modular units of the present invention also generally comprise a steel roof like a conventional cargo container, they differ from a conventional cargo container in that they also comprise a steel floor, rather than a plywood floor as is typical of the prior art.

Despite the foregoing differences, the volumetric units of construction of the present invention can nevertheless be transported and manipulated, as stated above, utilizing the existing infrastructure for transportation and manipulation of ISO cargo containers, thus reducing transportation costs dramatically and solving the transportation problem that has heretofore been the primary obstacle to the industrialization of the building construction industry. This solution to the transportation problem also enhances economies of production for the construction industry by providing geographic flexibility which not only allows the volumetric units of construction to be procured from any distant location that provides a cost advantage, but which also allows one or more final assembly plants to be located in low labor cost markets. In addition, by making the efficient transportation of the component modules possible, the greater part of a building can be assembled in a controlled factory environment, which increases quality and lowers cost still further, due to protection from the elements and the ability to maintain strict quality control, as well as increased efficiency.

Although the present invention relies upon the eight-foot ISO standard for the width dimension of its modular building blocks, it does not rely upon that eight-foot standard for positioning interior partitions, unlike most prior art systems that have utilized actual conventional cargo containers as modular building units. Specifically, the present invention stiffens the frame of the module by "beam stitching," which provides a plurality of attachment points separate from the nodes that are adapted to allow each module to be fastened to one or more adjacent modules, essentially creating an open three-dimensional spatial framework defined by node points and frame members, inside which the available choices for positioning interior partitions (and other structures and functional elements) are virtually unlimited.

The volumetric units of construction of the present invention, each of which essentially constitutes a "wire frame" in three dimensions, may be arranged in virtually any configuration and for nearly any building type, yet they enable almost any complicated, multi-story building to be broken down into volumetric units along an eight-foot-wide grid, without regard to internal partitions, such that the blocks can be stacked, when sufficiently reinforced, to the height of skyscrapers. Thus, the volumetric units of construction of the present invention have structural capacity such that, when stacked on a foundation and assembled in various configurations to yield a competed building, they can form a unified structure that meets the dead load, live load, gravity load, and lateral load requirements as prescribed by the building codes of various municipalities and other governmental jurisdictions. At the same time, the present invention encompasses modular units that are of the largest practical volumetric size to allow a building to be manufactured in an off-site factory, and then transported inexpensively to the job site using the existing ISO intermodal transportation system, following which the volumetric units can be readily stacked for erection in a matter of days; consequently, site work is reduced to unique foundation conditions, utility hook-ups, landscaping, and the joinder of volumetric units in the field. Site-based coordination, trimming, fitting and waste is largely replaced by factory-based computer-controlled inventory and tracking, and modern methods of delivery, storage and assembly.

Furthermore, the volumetric units of construction of the present invention make possible a fully industrialized system for fabricating buildings that allows an unlimited number and variation of building products to be pre-engineered to fit. The inventive volumetric units may be constructed to a semi-finished state at the off-site factory by being fitted out with, e.g., environmental systems, interior fit-out systems including architectural finishes such as drywall (with various decorative treatments such as paint, vinyl wall covering, etc.), pre-assembled finished ceilings (fabricated, for example, of gypsum board, with soffits, coves and other features, and including light fixtures, air terminals, plumbing, sprinkler heads and other devices and trim), pre-assembled finished floors, modular partition systems (including wiring for power and for telephone/data), and exterior envelope systems such as opaque facades and transparent window wall facades (including window treatments that may later be integrated therewith), as well as other finishes and systems. Moreover, it is the precise dimensional tolerances of the inventive volumetric unit that allows the assembly of such building components and sub-components in completed, fully assembled form in a factory instead of at the job site.

The standardization of dimensions of the volumetric unit of construction based on the ISO standards for intermodal shipping opens the door to standardization of the design process, facilitated by computerized building information modeling ("BIM"). The prior art remains largely bound by the conventional methods of design (even when BIM is employed), in which every building is re-detailed and re-engineered as a unique design. To the extent that the prior art includes standardized designs, these designs are for specific building configurations. The use in the present invention of interchangeable and pre-engineered building components and sub-components allows variations in design of nearly unlimited extent to be executed rapidly at the shop drawing level with assurance of proper fit, coordination, and performance.

The present invention can deliver aesthetic and performance quality as good as, or better than, traditional building construction, and also unlike the prior art systems that utilize actual cargo containers as modular building units, this invention does not rely upon the corrugated walls of a cargo container as the primary opaque building facade. Rather, this invention uses a standardized rain-screen cladding system as the opaque facade, with which the insulation can be held outboard of the steel structure and waterproof skin; this approach permits vastly superior quality and variety of exterior building skin options, ranging from metal to ceramic to stone to wood to plastics and other artificial materials. Corrugated shear panels, which in any event do not completely encompass the modular units on all sides, serve as the waterproof backup walls for the rain-screen cladding system. The rain-screen system can incorporate a wide variety of window types and sizes, and where a fully glazed facade is called for, a window wall system is used.

In another aspect, the invention provides methods for constructing a habitable building space comprising fastening at least a floor system and a roof system to the frame of each modular unit, assembling a plurality of the modular units in at least two different dimensions, and securing them together; the modular units thus combining to provide a habitable building space. At least some of the modular units may then be provided with one or more systems selected from the group consisting of interior fit-out systems, exterior envelope systems, plumbing systems, electrical systems, environmental systems, and fire protection systems.

In still another aspect, the invention provides methods for constructing habitable building structures, the methods comprising constructing modular units, at a location remote from the job site, to a semi-finished state, transporting the semi-finished modular units, using the ISO intermodal transportation system, to a staging area at or near the job site, preparing a foundation at the job site, craning a first plurality of the semi-finished modular units onto the foundation and securing those semi-finished modular units to the foundation and to one another, connecting utilities to those modular units, and constructing those semi-finished modular units to a finished state. One or more modular units may be arranged and/or combined to form habitable building structures, in one or more residential and/or non-residential layouts. A second plurality of semi-finished modular units may also be craned onto the first plurality of semi-finished modular units to form a stack, and additional pluralities of semi-finished modular units may be repetitively craned onto the stack in order to form a multi-story building structure. In the course of constructing the modular units to a semi-finished state, each of the modular units is provided with at least a floor and a ceiling, and at least some of the modular units may also be provided with one or more systems selected from the group consisting of interior fit-out systems, exterior envelope systems, plumbing systems, electrical systems, environmental systems, and fire protection systems.

In still another aspect, the invention provides methods of constructing a modular building comprising producing modular units in a manufacturing facility, each modular unit being configured to provide at least a part of the interior layout of a finished habitable space, the modular units being adapted to be disposed with their sides and/or ends abutting so as to produce at least one interior layout for habitable spaces within the building, constructing the modular units in the manufacturing facility to a semi-finished state, preparing a foundation at the job site for one or more semi-finished modular units to serve as a ground floor, transporting the semi-finished modular units, using the ISO intermodal transportation system, to a staging area at or near the building site, craning a plurality of the semi-finished modular units onto the foundation and securing them to the foundation to form a ground floor, fastening abutting semi-finished modular units together, constructing the semi-finished modular units to a finished state, including connecting utilities to them, to form one or more complete habitable spaces within the building, craning another plurality of the semi-finished modular units onto the previously-craned plurality of semi-finished modular units to form a stack; and repeating the previous three steps to form additional levels of the stack, and to form one or more additional habitable spaces in each of those levels. In the course of constructing the modular units to a semi-finished state, each of the modular units is provided with at least a floor and a ceiling, and at least some of the modular units may also be provided with one or more systems selected from the group consisting of interior fit-out systems, exterior envelope systems, plumbing systems, electrical systems, environmental systems, and fire protection systems.

With respect to each of the aspects of the invention mentioned above, one or more of the following may be combined therewith, and therefore the following are to be construed, in conjunction with each of the aforesaid aspects, as additional statements of the invention:

a system for fireproofing a prefabricated modular volumetric unit of construction, the modular unit for use in constructing a building, the fireproofing system comprising, in combination, an intumescent fireproofing component, a cement-bonded particle board fireproofing component, and a mineral fiberboard fireproofing component;

an article for fireproofing the interior cavity of the nodes of a prefabricated modular volumetric unit of construction, the modular unit for use in constructing a building, the article comprising a fireproofing material and being shaped to match the dimensions of at least one of the access ports of the node, the article having a lip of larger dimensions than that of at least one of the access ports of the node;

an envelope system for attachment to the exterior of a prefabricated modular volumetric unit of construction, the modular unit for use in constructing a building, the exterior envelope system comprising, in combination, a facade face frame component and at least one system selected from the group consisting of a rain-screen facade system and a window wall facade system;

a rain-screen facade system for attachment to the exterior of a prefabricated modular volumetric unit of construction, the modular unit for use in constructing a building and having at least one shear panel disposed along its periphery, the rain-screen facade system comprising a plurality of prefabricated modular rain-screen cassettes, each modular cassette comprising a rain-screen facade material and being temporarily fastenable to the at least one shear panel as the unit is being constructed to a semi-finished state, the cassettes being removable prior to transport of the unit and being permanently fastenable to the at least one shear panel following such transport as the unit is being constructed to a finished state;

a method of providing a rain-screen facade for a prefabricated modular volumetric unit of construction, the modular unit for use in constructing a building and having at least one shear panel disposed along its periphery, the rain-screen facade comprising a plurality of prefabricated modular rain-screen cassettes, each modular cassette comprising a rain-screen facade material, the method comprising pre-fitting the unit with at least one modular cassette adapted to be secured to the at least one shear panel as the unit is being constructed to a semi-finished state, removing the at least one modular cassette prior to transport of the unit, and permanently fastening the at least one modular cassette to the at least one shear panel following transport of the unit and as the unit is being further constructed to a finished state;

a window wall facade system for attachment to the exterior of a prefabricated modular volumetric unit of construction, the modular unit for use in constructing a building, at least a portion of the periphery of the unit being open, the window wall system comprising an adaptor frame adapted to be secured within the open peripheral portion of the unit, and at least one prefabricated modular window wall frame, each modular window wall frame comprising glazing and being temporarily fastenable within the adaptor frame as the unit is being constructed to a semi-finished state, the window wall frames being removable prior to transport of the unit and being permanently fastenable within the adaptor frame following such transport as the unit is being further constructed to a finished state;

a method of providing at least one window wall facade for a prefabricated modular volumetric unit of construction, the modular unit for use in constructing a building, at least a portion of the periphery of the unit being open, the method comprising pre-fitting the unit with at least one adaptor frame adapted to be secured within an open peripheral portion of the unit, and pre-fitting within the adaptor frame at least one prefabricated modular pre-glazed window wall frame, all as the unit is being constructed to a semi-finished state, removing the at least one window wall frame prior to transport of the unit, and permanently fastening the at least one window wall frame within the at least one adaptor frame following transport of the unit and as the unit is being further constructed to a finished state;

a facade face frame for a prefabricated modular volumetric unit of construction, the modular unit for use in constructing a building, the facade face frame comprising at least two pairs of facade face frame members, the at least two pairs of facade face frame members being connectable to form a rectangle having dimensions which substantially match the dimensions of one side of the unit, the facade face frame being fastenable to the framing members on that side such that the edges of the facade face frame are centered on the edges of the unit, the facade face frame being adapted to receive, and to surround and form a border for, at least one facade selected from the group consisting of a rain-screen facade and a window wall facade;

a facade accessory for a prefabricated modular volumetric unit of construction, the modular unit for use in constructing a building, the facade accessory selected from the group that includes, but is not limited to, a balcony, a sun shading device, a fin wall and an architectural surround, the facade accessory being fastenable to at least one framing member of the unit, at least one framing member being provided with at least one attachment point for the facade accessory;

an apparatus comprising two prefabricated modular volumetric units of construction for use in constructing a building, each modular unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the framing members in a first of the units comprising four upper rails and two lower rails, the framing members in a second of the units comprising four lower rails and two upper rails, the first unit having a roof but no floor and the second unit having a floor but no roof, such that when the first unit is interconnected vertically with the second unit, the resulting apparatus comprises a prefabricated modular volumetric unit of construction having a double height interior for use in constructing a building;

a tension truss for use with a vertically interconnected pair of prefabricated modular volumetric units of construction, the modular units for use in constructing a building, each unit having a frame shaped as a rectangular parallelopiped and comprised of framing members and a plurality of nodes, each node situated at a corner of the frame for selective interconnection with other units, the nodes and the exterior dimensions of the frame conforming to ISO shipping standards and at least some of the framing members having a plurality of holes, the units being vertically interconnected at least by a nut-and-bolt fastener mounted in each of the holes to form at least one composite framing member, the tension truss comprising a member under tension, the tension member connected at each end to one of the nodes and held away from the composite framing member by at least one compression member, the compression member fastened to the composite framing member and adapted for engagement with the tension member, the at least one compression member being disposed in alignment with one of the at least one nut-and-bolt fasteners, the composite framing member further comprising at least one stiffening member disposed in alignment with the at least one supporting member;

a tension truss for use with a prefabricated modular volumetric unit of construction vertically interconnected with a roof module, the modular unit and the roof module both for use in constructing a building, the modular unit having a frame shaped as a rectangular parallelopiped and comprised of framing members and a plurality of nodes, each node situated at a corner of the frame for selective interconnection with other units, the nodes and the exterior dimensions of the frame conforming to ISO shipping standards and at least some of the framing members having a plurality of first holes, the roof module comprising a perimeter framework shaped as a rectangle that utilizes the ISO cargo container as the basis for its exterior dimensions, the perimeter framework comprised of framework members and a roof node at each of its four corners, the framework members having a plurality of second holes, each one of the second holes being aligned with one of the first holes to form a pair, the roof nodes conforming to ISO standards as to node location and geometry for selective interconnection with the modular unit, the modular unit and the roof module being vertically interconnected at least by a nut-and-bolt fastener mounted in each of pair of first and second holes to form at least one composite framing member, the tension truss comprising a member under tension, the tension member connected at each end to one of the nodes of the modular unit and held away from the composite framing member by at least one compression member, the compression member fastened to the composite framing member and adapted for engagement with the tension member, the at least one compression member being disposed in alignment with one of the at least one nut-and-bolt fasteners, the composite framing member further comprising at least one stiffening member disposed in alignment with the at least one supporting member;

a prefabricated modular volumetric unit of construction, the modular unit for use in constructing a building, the unit comprising a frame shaped as a rectangular parallelopiped and comprised of framing members and four upper nodes and four lower nodes, each node situated at a corner of the frame for selective interconnection with other units, the nodes and the exterior dimensions of the frame conforming to ISO shipping standards, the frame further comprising at least two members under tension, each of the at least two tension members being fastened to one of the upper nodes and to one of the lower nodes that is disposed in the same vertical plane as, and diagonally below, the upper node, to enable the unit to be incorporated into the building as a cantilever;

a prefabricated modular volumetric unit of construction, the modular unit for use in constructing a building, each unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, each unit further comprising a floor system comprised of a plurality of floor joists that are fastened to the frame, a sub-floor overlying the floor joists, and a finished floor overlying the sub-floor, the sub-floor being fabricated of a material selected from the group consisting steel plate and concrete;

a method of providing a floor for a prefabricated modular volumetric unit of construction, the modular unit for use in constructing a building, each unit comprising a steel frame shaped as a rectangular parallelopiped that utilizes the ISO cargo container as the basis for its exterior dimensions, the method comprising providing a plurality of floor joists that are fastened to the frame, providing a sub-floor that substantially overlies the floor joists, the sub-floor being fabricated of a material selected from the group consisting steel plate and concrete, providing one or more additional floor assembly layers that overlie the sub-floor, the preceding steps being carried out as the unit is being constructed to a semi-finished state prior to transport, and completing the finished floor following transport of the unit and as the unit is being further constructed to a finished state;

a method of forming a concrete sub-floor for a prefabricated modular volumetric unit of construction, the modular unit for use in constructing a building, each unit comprising a steel frame shaped as a rectangular parallelopiped that utilizes the ISO cargo container as the basis for its exterior dimensions, the method comprising providing a plurality of floor joists that are fastened to the frame, providing a sub-floor fabricated of plywood that substantially overlies the floor joists as the unit is being constructed to a semi-finished state prior to transport, providing a plurality of holes in the plywood sub-floor following transport of the unit and as the unit is being further constructed to a finished state, fastening a closure to the underside of the floor joists, the closure together with the plywood sub-floor and the floor joists forming a plurality of joist compartments, introducing concrete in its plastic state into each of the plurality of joist compartments, and allowing the concrete to cure;

a method of forming a concrete sub-floor for a prefabricated modular volumetric unit of construction, the modular unit for use in constructing a building, each unit comprising a steel frame shaped as a rectangular parallelopiped that utilizes the ISO cargo container as the basis for its exterior dimensions, the method comprising providing a floor deck fastened to the frame and set at a predetermined depth below a desired sub-floor elevation, fastening a plurality of runners to the upper surface of the floor deck, fastening to the runners a temporary covering that substantially overlies the runners, the runners being dimensioned such that the temporary covering is set at the desired sub-floor elevation, the preceding steps being carried out as the unit is being constructed to a semi-finished state prior to transport and the temporary covering being adapted to serve as the floor of the unit during transport, removing the temporary covering following transport of the unit and as the unit is being further constructed to a finished state, introducing concrete in its plastic state onto the floor deck and the plurality of runners up to the desired sub-floor elevation, and allowing the concrete to cure;

methods of constructing a modular building comprising modular units wherein the dimensions of the units along all three axes are selected such that each dimension may be evenly subdivided so as to form a grid on which a plurality of attachment points for interior components may be laid out, thereby allowing standardization of the design of such interior components;

a modular interior partition panel for use within a prefabricated modular volumetric unit of construction, the modular unit for use in constructing a building, the modular interior partition panel comprising a plurality of wall studs, at least one top track segment and at least one bottom track segment, each one of the plurality of wall studs being fastened at one end to the at least one top track segment and being fastened at the other end to the at least one bottom track segment to form a framework, the modular interior partition panel further comprising a pair of facing panels, one facing panel being affixed to one side of the framework and the other facing panel being affixed to the opposing side of the framework;

a modular interior partition panel for use within a prefabricated modular volumetric unit of construction, the modular unit for use in constructing a building, the modular interior partition panel comprising a core formed of a monolithic honeycomb material, and a pair of facing panels, one facing panel being affixed to one side of the core and the other facing panel being affixed to the opposing side of the core;

a method of assembling an interior wall within one or more prefabricated modular volumetric units of construction, the modular units for use in constructing a building, each unit having a floor and a roof, the methods comprising the steps of providing a plurality of modular partition panels, providing a bottom track fastened to the floor in a predetermined configuration corresponding to the desired layout of the interior walls, providing a top track fastened to the roof in the same predetermined configuration, providing a plurality of partition posts adapted to be fastened at one end to the bottom track and at the other end to the top track, each partition panel having peripheral recesses along its bottom edge and side edges, each side edge recess being adapted to engage one side of a partition post, and each bottom edge recess being adapted to engage a portion of the bottom track, pre-engaging a partition post with a first side edge recess of a partition panel, engaging the bottom edge recess of the pre-engaged partition panel with a portion of the bottom track, erecting the pre-engaged partition panel such that the top edge engages a portion of the top track, and repeating the preceding three steps so that the partition post with which each succeeding partition panel is pre-engaged also engages the second side edge recess of the preceding partition panel;

a method of attaching a prefabricated modular volumetric unit of construction to a foundation for a building, the modular unit for use in constructing the building, the unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the method comprising the steps of providing a plurality of foundational nodes, the foundational nodes conforming to ISO standards as to node geometry, locating the foundational nodes on the foundation in a rectangular array corresponding to the footprint of the unit, attaching the plurality of foundational nodes to the foundation, and interconnecting each of the foundational nodes with at least one of the lower nodes of the unit;

a foundational interface for a prefabricated modular volumetric unit of construction, the modular unit for use in constructing a building having a foundation, the unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the foundational interface comprising a plurality of foundational nodes attached to the foundation, each foundational node conforming to ISO standards as to node geometry and located in a rectangular array corresponding to the footprint of the unit for interconnection with at least one of the lower nodes of the unit;

a method of attaching a prefabricated modular volumetric unit of construction to a foundation for a building, the modular unit for use in constructing the building, the unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the method comprising the steps of providing the foundation with a plurality of anchor bolts in a rectangular array corresponding to the footprint of the unit, engaging at least one anchor bolt with at least one of the lower nodes of the unit, and securing each lower node of the unit to the foundation with the at least one anchor bolt;

a foundational interface for a prefabricated modular volumetric unit of construction, the modular unit for use in constructing a building having a foundation, the unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the foundational interface comprising a plurality of anchor bolts attached to the foundation in a rectangular array corresponding to the footprint of the unit, at least one anchor bolt located for engagement with at least one of the lower nodes of the unit;

a method of attaching a prefabricated modular volumetric unit of construction to a foundation for a building, the modular unit for use in constructing the building, the unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the method comprising the steps of providing a plurality of base plates, locating the base plates on the foundation in a rectangular array corresponding to the footprint of the unit, attaching to each base plate a cylindrical screw jack apparatus adapted for engagement with at least one of the lower nodes of the unit, engaging at least one screw jack apparatus with at least one of the lower nodes of the unit, and securing each at least one lower node of the unit to the at least one screw jack apparatus;

a foundational interface for a prefabricated modular volumetric unit of construction, the modular unit for use in constructing a building having a foundation, the unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the foundational interface comprising a plurality of base plates attached to the foundation in a rectangular array corresponding to the footprint of the unit, a cylindrical screw jack apparatus attached to each one of the plurality of base plates, each screw jack apparatus adapted for engagement with at least one of the lower nodes of the unit;

an apparatus comprising a prefabricated modular volumetric unit of construction for use in constructing a building, the modular unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the apparatus being adapted for use as at least a portion of the basement of the building and comprising at least one shear panel disposed along its periphery, the apparatus being positioned such that the at least one shear panel is juxtaposed adjacent surrounding earthwork, the at least one shear panel and the frame being provided with an outer layer comprised of a material selected from the group consisting of a corrosion resistant surface treatment and concrete;

an acoustical isolation assembly for a prefabricated modular volumetric unit of construction, the modular unit for use in constructing a building, the modular unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the acoustical isolation assembly comprising a top plate, a bottom plate adapted for attachment to the top plate, and an elastomeric isolation block disposed therebetween, the upper surface of the top plate being adapted for engagement with at least one of the lower nodes of the unit, and the lower surface of the bottom plate being adapted for mounting on a foundation for the unit, the foundation to be selected from the group consisting of a monolithic concrete slab, a concrete footing, and a load bearing substructure not fabricated of concrete;

a lateral load resistance system for a structure comprised of a plurality of prefabricated modular volumetric units of construction, each unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the lateral load resistance system comprising a plurality of shear panels disposed along the periphery of at least some of the units, and a post-tensioned tie-down system comprising a post-tensioned cable threaded through the vertically aligned nodes of at least one stack of vertically interconnected units that together form at least a portion of the periphery of the structure;

a system for building construction comprising a plurality of interconnectable pre-fabricated modular building units, each unit comprising a frame shaped as a rectangular parallelopiped and comprised of framing members and a plurality of nodes, each node situated at a corner of the frame for selective interconnection with other units, at least some of the units being selectively interconnected by at least one post-tensioned cable passing through two of the nodes in each unit;

a post-tensioned tie-down system for a structure comprised of a plurality of prefabricated modular volumetric units of construction, each unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the post-tensioned tie-down system comprising a post-tensioned cable threaded through the vertically aligned nodes of at least one stack of vertically interconnected units that together form at least a portion of the periphery of the structure;

a method of providing perimeter radiation for a structure comprised of a plurality of prefabricated modular volumetric units of construction, each unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the framing members comprising four upper rails and four lower rails, the method comprising providing in at least one unit destined to form at least a portion of the periphery of the structure at least one trough configured as an inward extension of at least one of the lower rails, the at least one trough being adapted to receive therein a partial run of a radiative element, pre-installing the partial run of the radiative element in the at least one trough as the at least one unit is being constructed to a semi-finished state, and following transport of the at least one unit and as the at least one unit is being further constructed to a finished state, integrating the partial run of the radiative element in the at least one unit with a building run of the radiative element;

a method of erecting a high-rise structure comprised of a plurality of prefabricated modular volumetric units of construction, each unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the method comprising providing a high-rise superframe comprised of a plurality of superframe members, the superframe members comprising vertical columns and transverse transfer levels disposed therebetween for selective interconnection of the columns, positioning and stacking the units within the superframe, and selectively connecting the nodes of at least some of the units to at least some of the transfer levels;

an apparatus comprising a prefabricated modular volumetric unit of construction for use in constructing a building, the modular unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, each unit having a floor and a roof, the floor and the roof each having at least one stairwell opening such that a plurality of such units when vertically interconnected are adapted to form a stairwell, the unit further comprising at least one stairway fastened to the frame within the stairwell opening;

an apparatus comprising a prefabricated modular volumetric unit of construction for use in constructing a building, the modular unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, each unit having a floor and a roof, the floor and the roof each having at least one hoistway opening such that a plurality of such units when vertically interconnected are adapted to form a hoistway for at least one elevator;

a roof system for a structure comprised of a plurality of prefabricated modular volumetric units of construction, the roof system comprising a plurality of prefabricated roof modules, each roof module comprising a perimeter framework and a roof member, the perimeter framework adapted to support the roof member therewithin and shaped as a rectangle that utilizes the ISO cargo container as the basis for its exterior dimensions, the perimeter framework comprised of framework members and a roof node at each of its four corners, the roof nodes conforming to ISO standards as to node location and geometry for selective interconnection with at least one volumetric unit of construction, each of the framework members comprising a support shelf for the roof member, the roof member comprising a plate and a waterproof membrane coated on the plate;

a roof system for a structure comprised of a plurality of prefabricated modular volumetric units of construction, each unit comprising a steel frame shaped as a rectangular parallelopiped that utilizes the ISO cargo container as the basis for its exterior length and width, the frame comprised of framing members and a node at each of its eight corners, the nodes conforming to ISO standards as to node location and geometry, and the nodes also facilitating selective interconnection with other units, the framing members comprising four upper framing members and four lower framing members, each unit further comprising four roof rails and a roof member, each roof rail extending upwardly from one of the upper framing members and comprising a support shelf adapted to receive the roof member, the roof member comprising a plate and a waterproof membrane coated on the plate;

a system for building construction comprising a plurality of interconnectable pre-fabricated modular building units situated on at least two levels, each unit comprising a frame shaped as a rectangular parallelopiped and comprised of framing members, four lower nodes and four upper nodes, each node situated at a corner of the frame for selective interconnection with other units, the framing members comprising at least two upper rails, at least one unit situated in the upper level being displaced with respect to at least one unit situated in the lower level such that the lower nodes of the unit situated in the upper level do not abut the upper nodes of the unit situated in the lower level, the frame of the at least one unit situated in the lower level further comprising at least one diagonal member extending from a lower node to a point in an upper rail that is situated immediately beneath a lower node of the unit situated in the upper level;

an apparatus comprising a prefabricated modular volumetric unit of construction for use in constructing a building, the modular unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the apparatus being adapted for use as at least a portion of a multiple-user rest room facility, the apparatus further comprising at least one item selected from the group consisting of a plurality of toilets, a plurality of urinals and a plurality of sinks, and at least one pre-installed plumbing system in fluid communication with the at least one item so as to selectively provide fresh water to the at least one item and to selectively withdraw waste water from the at least one item upon integration of the pre-installed plumbing system with the corresponding macro-scale building plumbing systems;

an apparatus comprising a prefabricated modular volumetric unit of construction for use in constructing a building, the modular unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the apparatus being adapted for use as at least a portion of a circulation corridor for the building, the circulation corridor further comprising at least one shaft, each shaft housing at least a segment of at least one riser for at least one environmental system;

an apparatus comprising a prefabricated modular volumetric unit of construction for use in constructing a building, the modular unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the framing members comprising at least two upper rails, the apparatus further comprising at least one pre-installed tray fastenable to at least one of the upper rails, and at least one pre-installed electrical system, each tray being adapted to sequester at least one wiring run of the at least one electrical system, the at least one wiring run being adapted to provide electrical power to at least one overhead lighting fixture upon integration of the at least one pre-installed wiring run with the macro-scale building electrical system; and an apparatus comprising a prefabricated modular volumetric unit of construction for use in constructing a building, the modular unit comprising a steel frame shaped as a rectangular parallelopiped that utilizes the ISO cargo container as the basis for its exterior dimensions, the frame comprised of framing members and a node at each of its eight corners, the nodes conforming to ISO standards as to node location and geometry, and the nodes also facilitating selective interconnection with other units, the framing members comprising at least two upper rails, the apparatus further comprising at least one pre-installed tray fastenable to at least one of the upper rails, and at least one pre-installed fire prevention sprinkler system, each tray being adapted to sequester at least one pre-installed piping run of the at least one sprinkler system, the at least one piping run being in fluid communication with at least one overhead fire prevention sprinkler and being adapted to provide water to the at least one sprinkler upon integration of the at least one pre-installed piping run with the macro-scale building fire prevention sprinkler system.

In other aspects of the invention, an architectural building system is provided which may also include one or more of the following, each of which is to be construed as an additional statement of the invention:

a first prefabricated modular volumetric unit of construction comprising a steel frame having a shape that does not utilize the ISO cargo container as the basis for all of its exterior dimensions, yet can be inscribed within a rectangular parallelopiped that utilizes the ISO cargo container as the basis for its exterior dimensions, the frame comprised of framing members and a steel node at each of its corners, the nodes facilitating selective interconnection with at least a second modular unit also having a shape that does not utilize the ISO cargo container as the basis for all of its exterior dimensions, the second modular unit having nodes situated so as to create, upon interconnection with the first unit, a temporary rectilinear volumetric aggregate that utilizes the ISO cargo container as the basis for its exterior dimensions, the nodes conforming to ISO standards as to node location and geometry so as to enable the temporary aggregate to be transportable using the ISO intermodal transportation system;

a prefabricated modular volumetric unit of construction comprising a steel frame having a shape that does not utilize the ISO cargo container as the basis for all of its exterior dimensions, yet can be inscribed within a rectangular parallelopiped that utilizes the ISO cargo container as the basis for its exterior dimensions, the frame comprised of framing members and a steel node at each of its corners, the nodes facilitating selective interconnection with at least one outrigger, the at least one outrigger having nodes situated so as to create, upon interconnection with the modular unit, a temporary rectilinear volumetric aggregate that utilizes the ISO cargo container as the basis for its exterior dimensions, the nodes conforming to ISO standards as to node location and geometry so as to enable the temporary aggregate to be transportable using the ISO intermodal transportation system;

a prefabricated modular volumetric unit of construction comprising a frame shaped as a rectangular parallelopiped and comprised of framing members and a plurality of nodes, each node situated at a corner of the frame for selective interconnection with other units, each node having a plurality of access ports, the exterior dimensions of the frame and the sizes and positions of the access ports conforming to ISO shipping standards, each of the nodes having a shape that may be independently selected from the group consisting of a parallelopiped that is rectangular both in plan and in section, a parallelopiped that is square in plan and rectangular in section, and a parallelopiped that is square both in plan and in section;

a first prefabricated modular volumetric unit of construction comprising a steel frame having a shape that does not utilize the ISO cargo container as the basis for all of its exterior dimensions, yet can be inscribed within a rectangular parallelopiped that utilizes the ISO cargo container as the basis for its exterior dimensions, the frame comprised of framing members and a steel node at each of its corners, the nodes facilitating selective interconnection with at least one other modular unit also having a shape that does not utilize the ISO cargo container as the basis for all of its exterior dimensions, the at least one other modular unit having nodes situated so as to create, upon interconnection with the first unit, a temporary rectilinear volumetric aggregate that utilizes the ISO cargo container as the basis for its exterior dimensions, the nodes conforming to ISO standards as to node location and geometry so as to enable the temporary aggregate to be transportable using the ISO intermodal transportation system, each modular unit embracing at least a segment of at least one member of a steel frame superstructure, the member selected from the group comprising columns and girders;

a first prefabricated modular volumetric unit of construction comprising a steel frame having a shape that does not utilize the ISO cargo container as the basis for all of its exterior dimensions, yet can be inscribed within a rectangular parallelopiped that utilizes the ISO cargo container as the basis for its exterior dimensions, the frame comprised of framing members and a steel node at each of its corners, the nodes facilitating selective interconnection with at least a plurality of other modular units, each also having a shape that does not utilize the ISO cargo container as the basis for all of its exterior dimensions, the plurality of other modular units each having nodes situated so as to create, upon interconnection with the first unit, a temporary rectilinear volumetric aggregate that utilizes the ISO cargo container as the basis for its exterior dimensions, the nodes conforming to ISO standards as to node location and geometry so as to enable the temporary aggregate to be transportable using the ISO intermodal transportation system, the first modular unit being adapted, when aggregated laterally with at least one other modular unit, to carry the same loads and to accommodate the same structural deflections as would otherwise be carried and accommodated by the girders of a standard steel structural frame:

a first prefabricated modular volumetric unit of construction comprising a steel frame having a shape that does not utilize the ISO cargo container as the basis for all of its exterior dimensions, yet can be inscribed within a rectangular parallelopiped that utilizes the ISO cargo container as the basis for its exterior dimensions, the frame comprised of framing members and a steel node at each of its corners, the nodes having a plurality of access ports and facilitating selective interconnection with an associated modular unit having a parallelopiped shape that utilizes the ISO cargo container as the basis for all of its exterior dimensions, the associated modular unit having nodes situated so as to create, upon interconnection with the first unit, a temporary rectilinear volumetric aggregate that is transportable using the ISO intermodal transportation system, the first modular unit adapted to provide a service plenum for distribution to the associated modular unit of at least one service selected from the group consisting of plumbing, electrical, environmental and fire protection services; and a first prefabricated modular volumetric unit of construction comprising a steel frame having a shape that does not utilize the ISO cargo container as the basis for all of its exterior dimensions, yet can be inscribed within a rectangular parallelopiped that utilizes the ISO cargo container as the basis for its exterior dimensions, the frame comprised of framing members and a steel node at each of its corners, the nodes facilitating selective interconnection with at least one other modular unit also having a shape that does not utilize the ISO cargo container as the basis for all of its exterior dimensions, the at least one other modular unit having nodes situated so as to create, upon interconnection with the first unit, a temporary rectilinear volumetric aggregate that utilizes the ISO cargo container as the basis for its exterior dimensions, the nodes conforming to ISO standards as to node location and geometry so as to enable the temporary aggregate to be transportable using the ISO intermodal transportation system, the first modular unit being adapted for a use selected from the group consisting of use as a utility core for accommodation of building service runs for utilities, use as an envelope for incorporation of structural bracing, and use as a backing for architectural expression.

BRIEF DESCRIPTION OF THE DRAWINGS

These and other aspects, features, objects and advantages of the present invention will become more apparent from the following detailed description of the presently most preferred embodiment thereof (which is given for the purposes of disclosure), when read in conjunction with the accompanying drawings (which form a part of the specification, but which are not to be considered limiting in its scope), wherein:

FIG. 2 is an enlarged fragmentary perspective view, partially broken away, of a portion of the volumetric unit of construction of FIG. 1;

FIG. 3 is a further enlarged, cross-sectional view, taken substantially along the lines 3-3 of FIG. 2;

FIG. 4 is an enlarged fragmentary perspective view, partially broken away, of another portion of the volumetric unit of construction of FIG. 1, showing a feature thereof;

FIG. 5 is a further enlarged cross-sectional view, taken substantially along the lines 5-5 of FIG. 4;

FIG. 6 is an enlarged fragmentary perspective view of the volumetric unit of construction of the preferred embodiment of the present invention, showing another feature thereof;

FIG. 7 is a further enlarged, schematic cross-sectional view, taken substantially along the lines 7-7 of FIG. 6;

FIG. 8 is a cross-sectional view showing an alternative configuration of the preferred embodiment of the present invention:

FIG. 9 is an enlarged fragmentary perspective view of a portion of the volumetric unit of construction of the preferred embodiment of the present invention, illustrating another aspect thereof;

FIG. 49 is an exploded perspective view illustrating another modification of the preferred embodiment of the present invention;

FIG. 50 is a diagrammatic view illustrating the environment for the feature shown in FIG. 49;

FIG. 93 is an illustrative enlarged cross-sectional view, taken substantially along the lines 93-93 of FIG. 91;

DETAILED DESCRIPTION OF THE PREFERRED EMBODIMENTS

Figure 1:
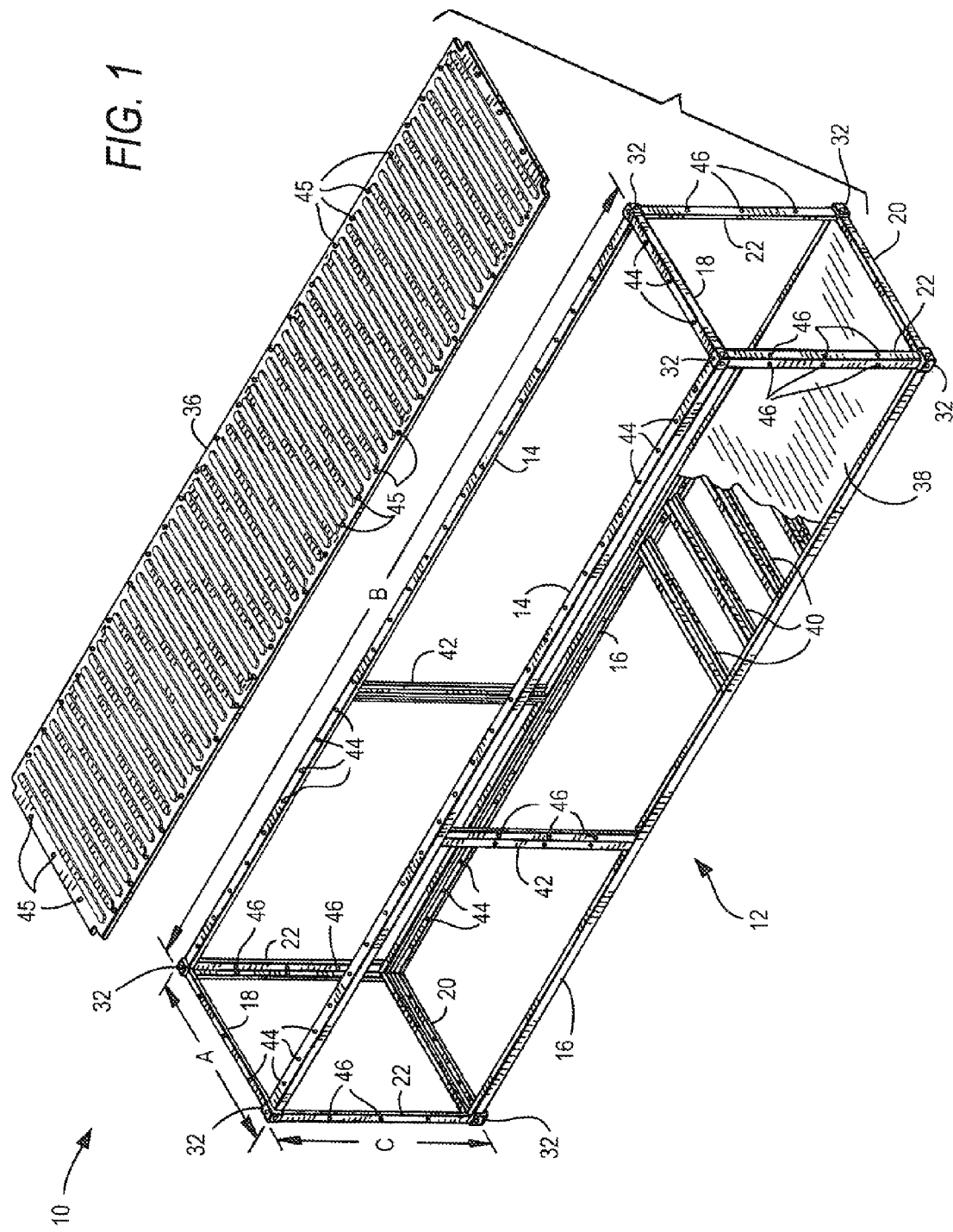
FIG. 1 is an exploded perspective view, partially broken away, of the preferred embodiment of the volumetric unit of construction of the present invention.

The preferred embodiments of the present invention, as well as other embodiments thereof, will now be further described with reference to the accompanying drawings, wherein like reference numerals designate like or corresponding parts throughout the several views. Although the invention will be illustratively described hereinafter and is shown in the drawings mostly with reference to residential construction, it should be understood that the invention is not limited to residential environments, but could be utilized in the construction of other single- and multi-story structures, including, but not limited to, office, retail, industrial, place of assembly, educational and laboratory structures.

Referring now to the drawings, and initially to FIGS. 1-3, a modular, volumetric unit of construction (hereinafter "VUC"), manufactured in accordance with the preferred embodiment of the present invention, is generally designated 10. VUC 10 comprises a skeletal frame 12, the overall appearance of which is illustrated in FIG. 1, comprising an assembly of fixed framing members, including upper side rails 14, lower side rails 16, upper end rails 18, and lower end rails 20, all of which are oriented generally horizontally, as well as corner posts 22, all of which are oriented generally vertically, and which connect upper side and end rails 14, 18 to respective lower side and end rails 16, 20; the rails and corner posts intersect one another at substantially right angles, and therefore together they form a shape for frame 12 that it is fundamentally a rectangular parallelopiped.

Side rails 14, 16, end rails 18, 20, and corner posts 22 are fabricated of steel, and although the thickness of the steel plate from which the rails and posts are formed can vary depending on the expected structural loads, in general the steel plate will range in thickness from about 5 mm. to about 10 mm., with about 6.5 mm. being typical. The various steel components of VUC 10, as described herein, are preferably brake-formed or roll-formed structural shapes, in which flat steel plate is bent to the required profile, although VUC 10 can alternatively be fabricated using standard hot-rolled steel shapes (channels, angles, etc.) which offer fewer dimensional and detailing options, but in some circumstances may be more economical. Preferably, the types of steel from which the various steel components of VUC 10 are fabricated include carbon steel and weathering steel (such as that sold under the trademark Cor-Ten). However, under special circumstances, such as where extreme corrosion protection is required, or for aesthetic reasons, stainless steel may be used.

As shown in FIG. 2, the bent steel plate corner posts 22 are preferably formed with angles that intersect substantially orthogonally in profile, and that extend symmetrically in both directions from the point of intersection for a predetermined distance, typically five inches (the corner posts of VUC 10 are simple right-angle shapes since they do not need to be shaped so as to receive corrugated walls or siding in the manner of a conventional cargo container). As best shown in FIG. 3, each of the bent steel plate side rails 14, 16 and each of the bent steel plate end rails 18, 20 (which may be referred to collectively herein as "edge" rails) is preferably formed in a conventional channel-shaped profile that resembles the letter "C" in cross-section, except that the inwardly-turned upper flange 24 on each of upper side rails 14 and each of upper end rails 18 preferably extends further inwardly than the inwardly-turned lower flange 26 of those rails, and similarly, but in a reciprocal fashion, the inwardly-turned lower flange 30 on each of lower side rails 16 and each of lower end rails 20 preferably extends further inwardly than the inwardly-turned upper flange 28 of those rails, the flanges 24 and 30 most preferably extending inwardly approximately twice the length of flanges 26 and 28, respectively (extended flanges 24 and 30 are provided for purposes of "beam stitching," a feature of the present invention that will be described in further detail hereinafter). In some cases, as shown in FIG. 3, additional steel reinforcement bars 31 may be welded within the channel of sides rails 14, 16 (and within the channel of end rails 18, 20, although the end rails are not shown in FIG. 3) in order to achieve additional floor stiffness, a reinforcement bar 31 preferably abutting and being welded to each of flanges 26 and 28.

Frame 12 of VUC 10 also comprises eight corner fittings (hereinafter "nodes") 32, also made of steel, one of which is disposed at each of the eight corners of frame 12 (only seven of the nodes 32 are visible in FIG. 1: the eighth node is not visible in the perspective view of FIG. 1). As shown best in FIG. 2, which depicts further details at two of the corners of frame 12, each node 32 is formed as a hollow block, with substantially rectangular faces, and each node is welded to the respective side rail, end rail and corner post at the intersection of which it is disposed. Each node 32 has an access port 34 formed in each of its three exterior faces, with those access ports opening into a common recess or cavity within each node (not shown). The nodes 32 are constructed substantially identically to one another, except for the necessary mirror-image differences.

VUC 10 has certain attributes and features that resemble those of a conventional cargo container, but VUC 10 incorporates only those attributes and features of a cargo container that are absolutely required for intermodal shipping. One of these attributes is the dimensional criteria for cargo containers, which have been standardized for interchangeability. Thus, the width of frame 12, represented by dimension A in FIG. 1, will be substantially eight feet, while the length of frame 12, represented by dimension B in FIG. 1, may vary, and will preferably be either twenty, thirty or forty feet (the largest of these values is illustrated in FIG. 1); the height of frame 12, represented by dimension C in FIG. 1, also may vary, but will commonly be nine feet six inches (this value is illustrated in FIG. 1), such that the overall exterior dimensions of VUC 10 are in compliance with at least one of the ISO dimensional standards and tolerances for cargo containers, in particular, those in ISO 668:1995(E), which is incorporated by reference herein and which specifies external dimensional standards for cargo containers, as well as those in ISO 1496-1:1990(E), ISO 1496-1:1990/Amd. 1:1993, and ISO 1496-1:1990/Amd.2:1998, which are also incorporated by reference herein and which deal with minimum internal dimensional standards for cargo containers. However, alternative greater values for dimension C, such as ten feet six inches or even eleven feet, are also contemplated in accordance with the invention; these latter height dimensions may be necessary when higher ceilings will be required in the structure to be erected, and although VUC's having those greater height dimensions will not be ISO-compliant, they may still be shipped using the intermodal transportation system, albeit at a cost premium.

Another feature of conventional cargo containers that is incorporated in VUC 10 is the geometry and structural specifics of the nodes 32, including the size and location of access ports 34. Thus, each node 32 is also in compliance with the ISO standards for cargo container corner fittings, in particular, ISO 1161:1984(E) and ISO 1161:1984/Cor.1:1990(E), which are incorporated by reference herein. ISO-compliant corner fittings are standardized for stacking and lifting conventional cargo containers. In particular, the four lower corner fittings are specifically designed and/or engineered for the purpose of stacking conventional cargo containers on vehicles, including seafaring ships as well as trains, trucks and aircraft, with the access ports being sized either to accept locking members, such as the pins or twist-lock connectors typically provided on vehicle platforms, or to accept twist-lock or other types of connectors so as to anchor one cargo container to another. Similarly, the four upper corner fittings are specifically adapted for engagement with typical hoisting gear, such as crane hooks or spreaders.

By adhering to these ISO standards, the nodes 32 of VUC 10 facilitate the intermodal shipping of VUC 10 by allowing multiple VUC's to be stacked on transports (such as marine vessels) designed to carry cargo containers, the VUC's making vertical contact with one another through the nodes (each of which typically is slightly proud in relation to the frame 12), such that the vertical load is carried through the corners, rather than the sides, of the VUC's. The nodes also allow the VUC's to be anchored to vehicle platforms, and to be manipulated, e.g., hoisted for loading them into, and/or transferring them between, and/or unloading them from, marine vessels and land, rail and air vehicles, using existing equipment designed to handle conventional cargo containers. Furthermore, if greater stability during marine transport is desired, the access ports in the nodes allow adjacent VUC's to be selectively interconnected, utilizing the same twist-lock or other connectors that are designed for use with conventional cargo containers.

As indicated in FIG. 1, VUC 10 preferably further comprises a watertight roof panel 36, which rests upon and is welded to flange 24 of upper side and end rails 14, 18 (as shown best in FIGS. 2 and 3), all in accordance with the ISO standards for the roof panels of conventional cargo containers, in particular, ISO 1496-1:1990(E). Also as indicated in FIG. 1, VUC 10 preferably further comprises a watertight floor deck 38, welded at its peripheral edge 39 to flange 28 of lower side and end rails 16, 20 (as best shown in FIGS. 2 and 3). The weld between roof panel 36 and flange 24, and the weld between floor deck 38 and flange 28, may either be continuous or intermittent, but in the latter case a silicone sealant (not shown in the drawings) is applied between the weld beads for weatherproofing purposes; the decision whether to use continuous or intermittent welding in this instance, as well as in other instances described below where welding is used, will turn on structural engineering considerations relating to the nature, use and geographic location of the structure to be erected.

Preferably, floor deck 38 is supported by a plurality of floor joists 40, separated from one another by a predetermined distance, typically on one foot centers, each of which extends across the width of frame 12 (represented by dimension A in FIG. 1) from one lower side rail 16 to the other. Each floor joist 40 is welded at either end to the inside surface of the face 41 of a lower side rail 16 (i.e., within its channels), so as to provide the required support, and the lower surface of floor deck 38 is welded intermittently to floor joists 40. Each floor joist 40 is preferably fabricated of formed steel plate, and as shown in FIG. 2, each floor joist 40 preferably resembles the letter "Z" in cross section, but may resemble the letter "C" instead.

Roof panel 36 is preferably fabricated of pressed steel plate having transverse ribs or bosses, while floor deck 38 is preferably fabricated of flat steel plate and floor joists 40 are preferably fabricated of bent steel plate; floor deck 38 is typically approximately 6.5 mm. in thickness, and in the event that a one-piece construction for floor deck 38 is impractical, it will be sufficient to provide floor deck 38 in separate sections, in which case the separate sections are welded to one another. Roof panel 36 is typically approximately 2.0 mm in thickness.

Although VUC 10 resembles a conventional cargo container in some respects as set forth above (e.g., it is designed to make contact and/or be selectively interconnected with other horizontally and vertically adjacent VUC's through the nodes, such that when two or more VUC's are stacked, almost all of the vertical load is carried through the nodes and the corner posts), VUC 10 nevertheless has many attributes and features that differ from those of a conventional cargo container. Specifically. VUC 10 does not meet one or more of the ISO certification criteria for transport of cargo, which criteria are specifically incorporated by reference herein; for example, one of the ISO certification criteria which VUC 10 does not meet pertains to door openings. In particular, VUC 10 does not meet the criteria set forth in paragraphs 3.6 and 5.3.2.2 of ISO 668:1995(E).

As another example of the differences between VUC 10 and a conventional cargo container, the latter is structured such that it is completely enclosed with side and end walls made of corrugated steel; these side and end walls, among other attributes, help to achieve the necessary floor stiffness to support the load to which the interior of each cargo container is to be subjected. However, a VUC 10 is utilized in the erection of a structure without being completely enclosed, i.e., either with only partial perimeter wall panels (as will be described in further detail hereinafter), or as shown in FIG. 1, as a completely open frame without any side or end walls at all, and accordingly, as a result of beam stitching, the floor system of a structure comprising two or more vertically adjacent VUC's 10 will meet the dead load, live load, gravity load, lateral load and other applicable requirements necessary for incorporation into a habitable building.

Nevertheless, without any side or end walls, the preferred embodiment of frame 12 of VUC 10 is capable of a maximum clear span of no more than approximately twenty-four feet without additional support. Therefore, if dimension B of a VUC 10 is greater than twenty feet (e.g., if a particular VUC 10 is either thirty or forty feet long, the latter size being illustrated in FIG. 1), then the required intermediate support must be provided in another way. Referring now to FIGS. 4-5 in addition to the aforementioned FIGS. 1-3, in such cases the required support is provided, in accordance with the invention, by constructing VUC 10 with intermediate posts 42, each of which is generally oriented vertically, substantially parallel to corner posts 22. As shown in FIG. 1, intermediate posts 42 extend from an upper side rail 14 to the corresponding lower side rail 16 immediately beneath, and the intermediate posts intersect these upper and lower side rails at substantially right angles.

Each intermediate post 42 is preferably fabricated of formed steel plate, and each intermediate post 42 may be constituted from the same formed steel plate angle posts which constitute corner posts 22. As shown best in FIG. 5, each intermediate post preferably resembles the letter "T" in cross section, with an intermediate post comprising, as will be understood by those skilled in the art, two such corner posts arranged side-by-side, which have been joined into a single structural member by means of a steel spacer plate 43 that is welded between the adjacent back-to-back legs, and that typically extends substantially from the upper end of intermediate post 42 to its lower end; optionally, a conventional watertight sealant 90 may be applied to the outward-facing edge of spacer plate 43, with a customary backer rod 92 affording a bearing surface for the sealant 90, all so as to provide additional moisture protection for the interior of VUC 10. Alternatively, the shape of each intermediate post 42 may be that of tubular steel, and other shapes are also possible.

As shown in FIG. 4, which depicts further details of an intermediate post 42 and illustrates the attachment thereof to the upper and lower side rails with which it intersects, the body of each intermediate post 42 is welded at one end to flange 26 of upper side rail 14 and at the other end to flange 28 of lower side rail 16. However, in order to provide additional stiffening, each intermediate post 42 is also preferably formed with a transversely truncated upper extension 42a and a similar transversely truncated lower extension 42b, the former continuing above flange 26 and extending to and being welded to flange 24 of upper side rail 14, while the latter extends below flange 28 and reaches, and is welded, to flange 30 of lower side rail 16. Flanges 26 and 28 are notched to allow the full depth of extensions 42a and 42b, respectively, to reach flanges 24 and 30, respectively.

The positioning of intermediate posts will vary and will be determined, on a case-by-case basis, by the architectural layout of the structure being erected, with the proviso that an intermediate post is required wherever the span between adjacent corner posts exceeds approximately twenty-four feet, unless another form of support is provided, as will be described hereinafter in conjunction with shear walls; thus, the positions of intermediate posts 42 as shown in FIG. 1 are to be considered as Illustrative only.

Flanges 24 of upper side and end rails 14, 18, and flanges 30 of lower side and end rails 16, 20, are each pierced with at least one aperture 44, more preferably with a plurality of apertures 44 (as illustrated in FIG. 1), thus providing a plurality of attachment points that are separate from the nodes and are for the purpose of beam stitching in the field (to be described in further detail hereinafter), and each corner post 22 as well as each intermediate post 42 is similarly pierced with at least one aperture 46, more preferably with a plurality of apertures 46 (as also illustrated in FIG. 1), each typically identical to an aperture 44, providing a similar plurality of attachment points, separate from the nodes, for purposes of column stitching in the field (also to be described in further detail hereinafter). Apertures 44 and 46 are preferably created in conjunction with or shortly following the initial assembly of frame 12 at the VUC factory (the latter typically being situated at a location that is geographically remote from the job site at which a structure comprising a plurality of VUC's to be erected), and may be produced by any one of many punching or drilling techniques as are well known in the art. Preferably, roof panel 36 is also separately pierced with at least one aperture 45, more preferably with a plurality of apertures 45 (as indicated in FIG. 1), that will align with apertures 44 in upper side and end rails 14, 18 when roof panel 36 is welded to those rails. However, it is also within the scope of the invention to create apertures 44 in upper side and end rails 14, 18 after roof panel 36 has already been attached to those rails, and in that case apertures 44 will also pierce the periphery of roof panel 36, near its edges.

As will be evident to those of skill in the art, the number of apertures 44, 45 and 46 along each rail and post and along the periphery of roof panel 36 will vary depending on the distance of separation between adjacent apertures; most preferably, apertures 44, 45 and 46 are separated from one another (and from any adjacent nodes 32) by a predetermined distance which ranges from a minimum of about six inches to a maximum of about forty-eight inches (the precise distance of separation is to be chosen uniquely for each structure, based upon loads and other well-known structural engineering considerations), but in any case such that there is at least one aperture within every eight feet of span. For example, an acceptable value for the predetermined distance between apertures could be twenty-four inches on centers, but regardless of the actual distance of separation that is chosen, as shown in FIG. 2 the apertures 44 in flanges 24 are aligned with the apertures 44 in flanges 30, and although not specifically shown in the drawings, it is to be understood that the apertures 46 in corner posts 22 are similarly aligned with the apertures 46 in each of the other corner posts 22, and that the apertures 46 in intermediate posts 42 are similarly aligned with the apertures 46 in each of the other intermediate posts 42.

Preferably, apertures 44, 45 and 46 are substantially circular in cross-section and are sized to accommodate standard bolts of a predetermined size (the bolt size is also to be determined uniquely for each structure, also based on loads and other well-known structural engineering considerations), and most preferably, apertures 44, 45 and 46 are formed slightly oversized, so that any subsequent inaccuracies in alignment can easily be overcome As shown most clearly in FIG. 2, in order to facilitate beam stitching in the field (as described below), a plurality of nuts 48, sized to accommodate bolts of the predetermined size, are pre-welded to flanges 30, preferably in conjunction with or shortly following creation of apertures 44 (at the factory remote from the job site), with each nut 48 being situated adjacent to and aligned above a respective aperture 44, ready for bolting in the field. As also shown best in FIG. 2, each of the apertures 44 in flanges 24 is preferably filled at the factory with a temporary fitting 50 comprising, for example, a preformed, elastomeric, pressure-fit gasket 52 that is compressed against roof panel 36 by a bolt 54, and although not shown in the drawings, it is to be understood that each of the apertures 46 is also preferably filled at the factory with a similar temporary fitting 50. Temporary fittings 50 are provided so as to protect the interior of VUC 10 from water penetration during transit from factory to job site, and as will be evident to those skilled in the art, they are removed in the field prior to beam stitching and column stitching.

As mentioned above, the present invention contemplates that a VUC 10 to be utilized in the erection of a structure may in some instances include partial perimeter wall panels, which can be used to create either full or partial side walls or full or partial end walls. In accordance with this aspect of the invention, and referring now to FIGS. 6-7 in addition to the aforementioned FIGS. 1-5, a VUC 10 may comprise one or more permanent, ISO-compliant (in particular. ISO 1496-1: 1990(E)), corrugated shear wall panels 56, disposed along its periphery. Each wall panel 56 is generally oriented vertically, substantially parallel to corner posts 22 of VUC 10, and typically extends either longitudinally (i.e., parallel to side rails 14, 16), as illustrated in FIGS. 6 and 7, or transversely (i.e. parallel to end rails 18, 20). In general, each wall panel 56 extends vertically from an upper side or end rail 14, 18 to a respective lower side or end rail 16, 20, intersecting the upper and lower rails at substantially right angles, and each wall panel 56 is welded (preferably continuously, for compliance with ISO standards) to flanges 26 and 28 of the respective upper and lower rails with which it intersects.

Depending upon architectural and design considerations (as well as structural engineering considerations), each shear wall panel 56 may extend longitudinally (parallel to side rails 14, 16) or transversely (parallel to end rails 18, 20), and may extend either from one of the corner posts 22 to an adjacent corner post 22 (thereby providing a full wall), or from one of the corner posts 22 to a stiffener 58 (thereby providing a partial wall), the stiffener 58 being required for termination of a wall panel short of an adjacent corner post, but in either case, each wall panel 56 is welded (vertically) to the adjacent corner post(s) 22. Stiffener 58 comprises a tube of bent steel, oriented vertically (substantially parallel to corner posts 22), and is illustratively square in cross-section, as shown in FIG. 7. Stiffener 58 is welded (vertically) to wall panel 56, and stiffener 58 is also welded, in a manner similar to intermediate post 42, to the respective upper and lower rails with which it intersects.

The location of one or more shear panels 56 (and stiffeners 58) within a particular VUC 10 will vary, and will be determined, on a case-by-case basis, by the structure and architectural layout of the structure being erected, and the position which the particular VUC will occupy within that structure, with shear panels 56 preferably being positioned where required either for lateral bracing (for floor stiffening), and/or as a backing for opaque portions of an exterior envelope system (such as a rain-screen cladding facade, to be described in further detail hereinafter). However, it will be recalled that the preferred embodiment of frame 12 of VUC 10 is capable of a maximum clear span of no more than approximately twenty-four feet without additional support, and therefore, if dimension B of a VUC 10 is greater than twenty feet (e.g., if a particular VUC 10 is either thirty or forty feet long), then the required intermediate support must be provided in another way. That support may be provided by a stiffener 58 at the termination of a shear wall panel 56, and it is to be understood that there is no need to provide an intermediate post 42 wherever the requisite support will be provided by a stiffener 58 instead, it being understood that a wall panel 56 terminating in a stiffener 58 must be provided (the latter as a substitute for an intermediate post) wherever the span between adjacent corner posts exceeds approximately twenty-four feet. Thus, the position and length of each wall panel 56 is variable, and the position and length shown in FIG. 6 is to be considered as illustrative only.

Referring next to FIG. 8 in addition to the aforementioned FIGS. 1-7, frame 12 of a VUC 10 may, in an alternative configuration, also optionally comprise a further extension 60 of lower flange 30 of lower side and/or end rails 16, 20. Extension 60 is attached to, or is preferably formed integrally with, flange 30, and is shaped to form a trough 62 that is adapted to receive a conventional fin tube radiator (the latter is not shown in FIG. 8). Thus, the decision whether to include this feature will of course be based primarily on the climate at the geographic location in which the structure is being erected. However, because trough 62 is formed as an extension of a lower side and/or end rail of frame 12, and is therefore necessarily located adjacent an edge of a VUC 10, it is particularly adapted for the provision of perimeter radiation, and thus, the decision whether to include this feature may also depend, to some degree, on the form, purpose and design of the structure being erected.

The width of trough 62 is preferably sufficient to accommodate a standard fin tube radiation element, along with any supporting or cradling structure, as well as a convection baffle, the latter creating a convection chamber for proper heat flow (these elements are not illustrated in FIG. 8 but will be discussed in further detail hereinbelow). In addition, wherever trough 62 is provided, as shown in FIG. 8 the peripheral edge 39 of floor deck 38 does not extend to meet, and is not welded to, flange 28 (as would otherwise be the case, as shown in FIG. 3). Instead, the inboard upturned leg 64 of extension 60 supports the peripheral edge 39 of floor deck 38, to which leg 64 is fully welded such that trough 62 is watertight, thus not only contributing to the overall weatherproofing of VUC 10 for transport from factory to job site, but also providing containment in the event of a water leak in the radiator piping during the life of the structure being erected. FIG. 8 also shows that the inside of trough 62 may be provided with apertures 44, and a nut 48 may be pre-welded to the inside of trough 62 in alignment with each aperture 44, so as to enable and to facilitate, respectively, beam stitching (as described below), even in those cases in which perimeter radiation is planned for the structure being erected.

In order to provide the required fire protection, so as to meet the various building/fire codes in effect throughout the United States and elsewhere in the world, the present invention encompasses a fireproofing system which is applied to the structural steel frame and to other elements of VUC 10. In the conventional construction procedures of the prior art, the fireproofing of multi-story steel frame structures is carried out by spraying a cementitious mixture onto the steel frame after the latter has been erected at the job site, but before the installation of interior finishes, environmental systems and facades. However, this approach is not generally available for a structure comprising a plurality of VUC's, since the present invention contemplates assembly of the structural frame, followed by construction of each VUC to a semi-finished state, including installation of one or more of interior fit-out systems and finishes, exterior envelope systems, plumbing systems, electrical systems, environmental systems, and fire protection systems, all at the factory, followed by transport from the factory to the job site, where the VUC's are craned into place to form the structure being erected, and after which the semi-finished modules are then constructed to a finished state. Conventional cementitious fireproofing which, in order to be effective, must be applied to a thickness approaching two inches, cannot be used since it would cause physical interference with the stacking of VUC's one above another and with the side-by-side positioning of laterally adjacent VUC's.

In accordance with the invention, a fireproofing system has been devised which enables most of frame 12 of VUC 10 to be fireproofed at the factory, and then provided with interior fit-out systems (including architectural finishes), environmental systems and exterior envelope systems, all prior to being transported from the factory to a job site. The fireproofing system comprises several aspects, and referring now to FIG. 9 in addition to the aforementioned FIGS. 1-8, one aspect of a preferred fireproofing system, as it relates to frame 12 and to other structural steel elements of VUC 10, is illustrated in FIG. 9 (the remaining aspects of the preferred fireproofing system will be described in detail hereinafter).

Specifically, in this aspect of the fireproofing, each of the steel elements of frame 12 receives a thin coating 66 of an intumescent fireproofing material, which does not cause physical interference with vertical stacking or lateral positioning of VUC's, yet at the same time provides sufficient fire protection for the type of multi-story structure contemplated by the present invention. Intumescent fireproof coatings are available with laboratory-tested fire ratings of up to three hours (as is well understood by persons skilled in the art, a three-hour fire rating generally means that the coating must be able to withstand a fire, of specified temperature and geometry, for a period of three hours without failure), and are also available in durable formulations that are able to withstand exposure to weather, will not deteriorate during transportation, and are blast-resistant as well. An acceptable exterior grade intumescent fireproof coating material (also known as an intumescent "paint") is available from Albi Manufacturing, a division of StanChem, Inc. of East Berlin, Conn., U.S.A., under the trade name Albi Clad 800.

The intumescent fireproof coating material may be applied to almost all of the steel surfaces of frame 12 (as illustrated in FIG. 9), and depending upon the consistency and viscosity of the coating material, it may be applied by spraying, by brushing or by troweling; these surfaces generally receive that coating at the factory, some time after frame 12 has been assembled. However, in order to utilize the beam stitching and column stitching features of the present invention (described below), minimal portions of those steel surfaces, such as in the vicinity of apertures 44 and 46 (which are not shown in FIG. 9), must be left exposed to allow for field bolting. Thus, application in the field of an intumescent (or an intumescent-compatible) patching compound (also not shown in FIG. 9) will be necessary, after bolting is completed. An acceptable intumescent patching compound is marketed by Albi Manufacturing, as a trowel-grade version of its Albi Clad 800 intumescent coating compound mentioned above.

Another aspect of the fireproofing system of the present invention is also shown in FIG. 9. Specifically, because the interior surfaces of the cavity within each node 32 are difficult (although not impossible) to reach with the intumescent fireproof coating via spraying, brushing or troweling, and because the bearing faces of each node 32 cannot be coated (since steel to steel contact must be maintained at connections between nodes 32 of adjacent VUC's), it is preferable to devise alternate ways of maintaining the fire rating of frame 12 at each node 32 that is located at the perimeter of the structure being erected.

Preferably, a piece of mineral fiberboard fireproofing is cut to a shape precisely matching an access port 34 of a node 32, and a second piece of the same material is cut larger all around by approximately one-half inch; the two pieces are then joined together to form a plug 68 having a lip 70, as shown in FIG. 9. A mineral fiberboard fireproofing material that is acceptable for this purpose is available from Albi Manufacturing under the trade name Albi DriClad. The two pieces may be joined either mechanically or with an adhesive that has been pre-approved by the manufacturer of the mineral fiberboard. When inserted into the access port 34 of node 32, plug 68 is friction fit into the opening, and is prevented by the lip 70 from being pushed all the way into the node cavity. Plug(s) 68 are inserted at or near the job site, either prior to or after erection, and a small amount of a compatible fireproof adhesive or sealant (not shown in the drawings) may be applied between node 32 and plug 68 to ensure that plug 68 remains in place.

Alternatively, a pre-formed intumescent brick, shaped to fit into an access port 34 of node 32, would be inserted and friction fit to the access port opening, in the same manner as the mineral fiberboard plug 68. An acceptable intumescent brick product is available from Hilti, Inc. under the trade designation FS 657 Fire Block. This intumescent brick plug would be compatible with the intumescent fireproofing used on the steel of frame 12, and would be secured with an adhesive or a sealant, in the same manner as mineral fiberboard plug 68. However, this alternative is less preferred because intumescent fireproofing materials are likely to be more expensive than mineral fiberboard fireproofing materials. Other alternatives include spraying a fireproof foam, also available from Hilti, Inc. under the trade designation CP 620, into an access port 34 of node 32 in order to fill the cavity within the node, as well as spraying or applying (by hand) an intumescent coating (including hand-applying a trowel-grade version thereof), applying an intumescent putty, or applying any other compatible fireproofing material that maintains the fire rating of frame 12.

Other aspects of the fireproofing system will be described hereinafter, but a different aspect of the invention will now be described. As mentioned above, the present invention contemplates that a VUC 10, to be utilized in the erection of a structure, will be assembled at a factory that is geographically remote from the job site, and that it will be fitted out with architectural finishes, environmental systems and facades (some portions of which may then be removed and stored for shipment, either separately, or within the VUC itself), all prior to the VUC being transported from the factory to a job site. Therefore, a VUC 10 must be rendered substantially weatherproof prior to leaving the factory so as to withstand adverse weather conditions during transit, in order to keep the interior of the VUC (and its contents, if any) dry until its destination job site is reached. In accordance with the latter aspect of the invention, and referring now to FIGS. 10-14 in addition to the aforementioned FIGS. 1-9, VUC 10 further comprises, for this purpose, a plurality of interchangeable, removable and reusable transport protection panels 70, which may be attached at the factory to the open peripheral portions of VUC 10 (i.e., to those portions where there are no permanent shear wall panels), and which will remain in place during transit, to be removed only after the VUC 10 arrives at the job site (or at a staging area adjacent to, or in the vicinity of, the job site), and immediately prior to the time when the VUC is to be craned into place in the structure being erected (or immediately prior to the time when further work must be performed on the VUC prior to craning).

Figure 10:
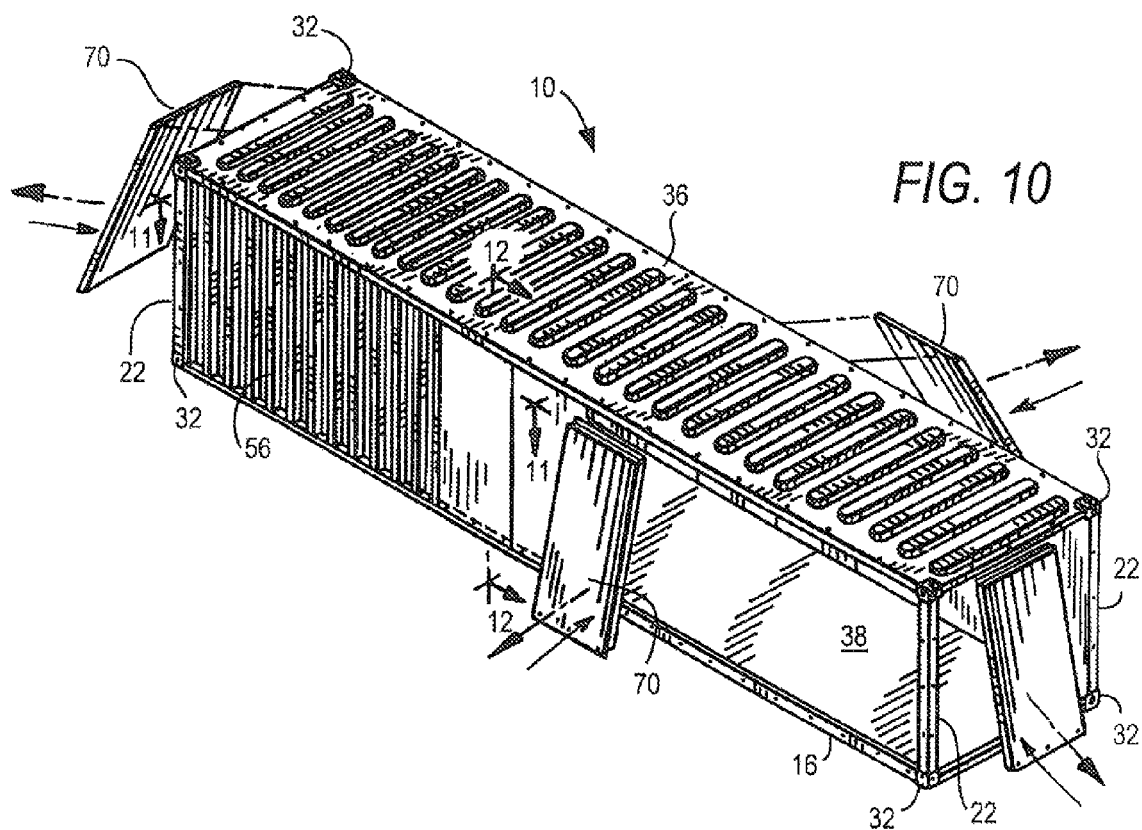
FIG. 10 is another perspective view of the volumetric unit of construction of the present invention, illustrating yet another feature thereof.
Figure 11:
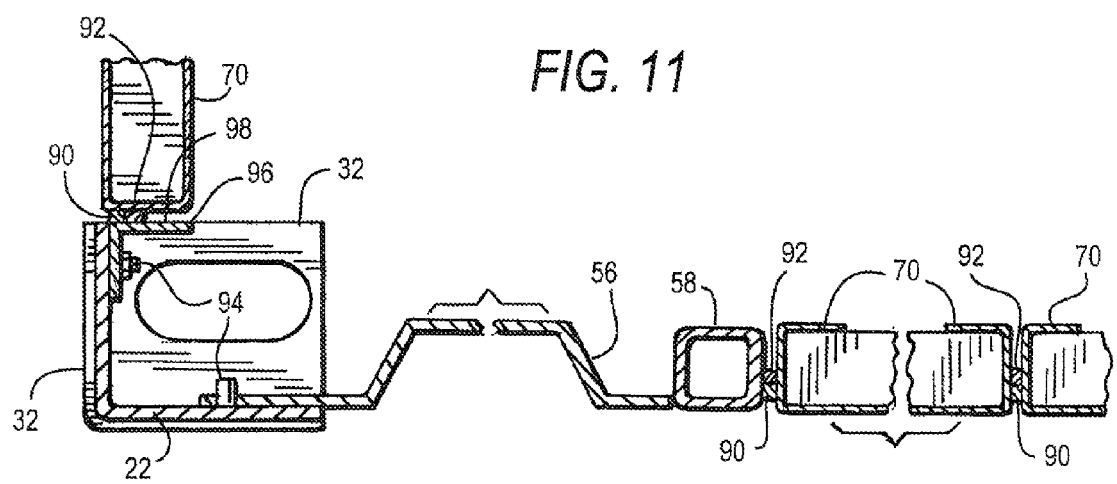
FIG. 11 is an enlarged diagrammatic cross-sectional view, taken substantially along the lines 11-11 of FIG. 10.

The attachment and removal of a number of protection panels 70 to/from a VUC is shown schematically in FIG. 10 of the drawings. Typically, protection panels 70 are fabricated of bent steel plate (so as to function as temporary structural members that stiffen VUC 10 for transit, in addition to providing the needed weather protection). Preferably, protection panels 70 are approximately two inches thick, and most of them are substantially four feet wide, although protection panels that are two feet wide, and/or one foot four inches wide, may also be utilized to allow for dimensional adjustment, especially when the VUC incorporates one or more permanent shear wall panels, as is illustrated in FIGS. 10 and 11.

Figure 12:
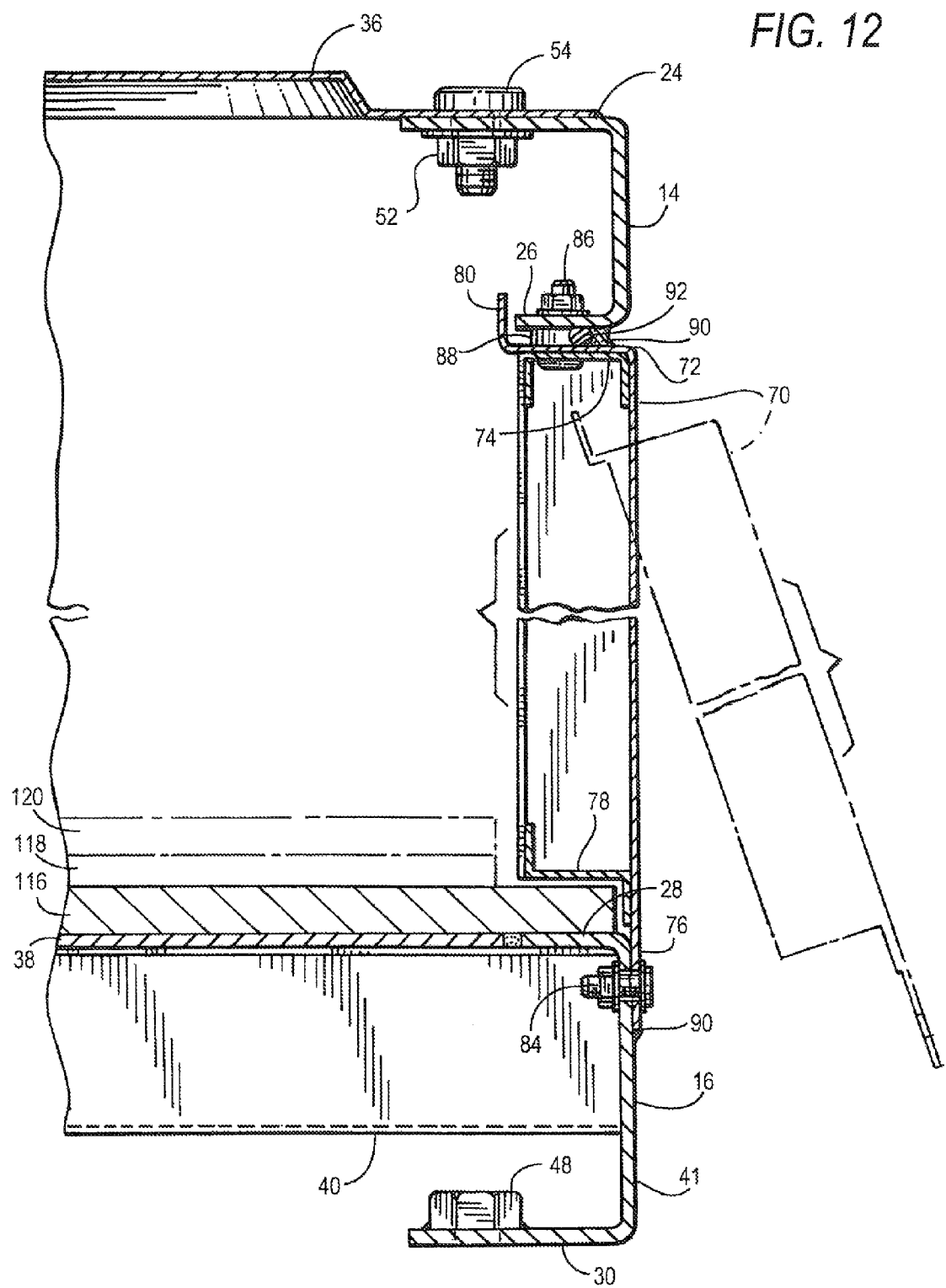
FIG. 12 is an enlarged cross-sectional view, taken substantially along the lines 12-12 of FIG. 10.

FIG. 12 depicts (in phantom lines) a typical protection panel 70 immediately prior to installation, and (in solid lines) the same protection panel after it has been secured into place, albeit temporarily, at the perimeter of a VUC frame. Each protection panel 70 is preferably reinforced near its upper extremity 72 with a stiffener 74, which resembles the letter "C" in cross section, and near its lower extremity 76 with another stiffener 78, which resembles the letter "Z" in cross section. Additional stiffeners may be incorporated, situated in between stiffeners 74 and 78, to increase the rigidity of protection panel 70. Each protection panel 70 preferably further comprises, near its upper extremity 72, an upstanding extension or up-bend 80 which, after protection panel 70 is installed, provides additional moisture protection for the interior of VUC 10.

Each protection panel 70 is temporarily secured to frame 12 of VUC 10 by being bolted, in the vicinity of its upper extremity 72, to an upper side rail 14 (as shown in FIG. 12), and in the vicinity of its lower extremity 76, to a lower side rail 16 (also as shown in FIG. 12), although it is to be understood that one or more protection panels 70 may be secured to frame 12 at one end or the other of VUC 10 (instead of, or in addition to, being secured to the sides of VUC 10), in which case each protection panel 70 is bolted respectively to an upper end rail 18 and to a lower end rail 20 (not shown). In order to facilitate the attachment of protection panels 70, flanges 26 of upper side and end rails 14, 18 are pierced with a plurality of apertures, preferably located on eight-inch centers, and faces 41 of lower side and end rails 16, 20 are pierced with a plurality of apertures, also preferably located on eight-inch centers, all of which are preferably pre-formed (i.e., created in conjunction with, or shortly following, the initial assembly of frame 12 at the VUC factory), and all of which may be produced by any one of many punching or drilling techniques as are well known in the art (these apertures are not shown in the drawings).

As shown best in FIG. 12, protection panel 70 is positioned such that one or more pre-formed apertures (not shown in the drawings) located at or near its upper extremity 72 are aligned with one or more of the pre-formed apertures in flanges 26 (as described in the preceding paragraph), and such that one or more pre-formed apertures (not shown in the drawings) located at or near its lower extremity 76 are aligned with one or more of the pre-formed apertures in faces 41 (as described in the preceding paragraph), in both cases so as to receive conventional bolts 84, 86 which, in conjunction with the corresponding nuts (and utilizing also, in the case of bolt 84, the necessary steel spacer 88), serve to secure protection panel 70 in place.

In order to enhance the required moisture protection, a conventional watertight sealant 90 (paired with a backer rod 92, as and where necessary) is then applied at all of the joints, including (as shown in FIGS. 11 and 12) those between each protection panel 70 and upper side rail 14 (or upper end rail 18), those between each protection panel 70 and lower side rail 16 (or lower end rail 20), as well as those between a protection panel 70 and either an adjacent protection panel 70, or an adjacent tube steel stiffener 58 (terminating a shear wall panel 56), or an adjacent corner post 22 or intermediate post 42. However, for the joints with corner posts 22 and/or intermediate posts 42, the angles of those posts are provided (as shown best in FIG. 11) with a plurality of vertically-aligned, projecting steel studs 94, which have preferably been pre-welded (i.e., at the time of, or shortly following, the initial assembly of frame 12 at the VUC factory) to the interior of the post, and which are preferably located on eight-inch centers (vertically), with each stud 94 sponsoring a clip angle 96, the latter in turn providing a bearing surface 98 on the side of the post against which a protection panel 70 may be sealed (it is to be understood that studs 94 may serve other functions as well, such as sponsoring or receiving various facade components, as well as accessories related to interior fit-out of a VUC, all to be described in further detail hereinafter). Alternatively, instead of providing studs 94 and clip angles 96 on corner posts 22 and/or intermediate posts 42, the latter may be shaped with an additional bend at the end of each angle in order to create the same profile.

Figure 13:
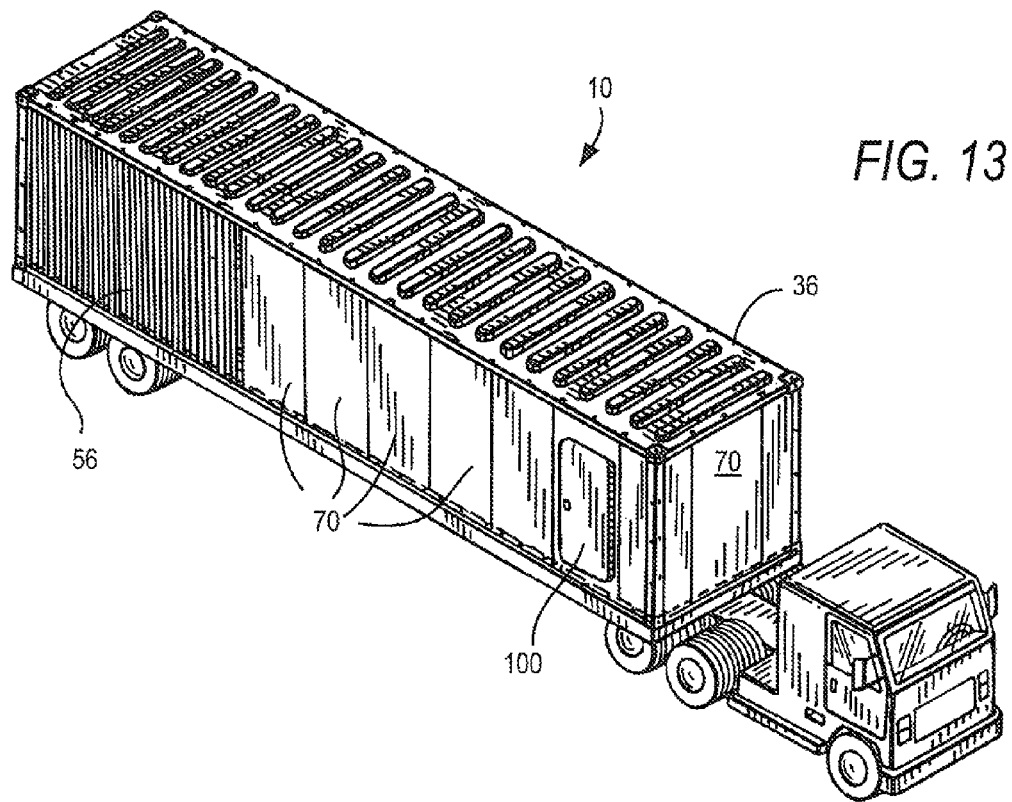
FIG. 13 is another perspective view of one volumetric unit of construction of the dimensions shown in FIG. 1.
Figure 14:
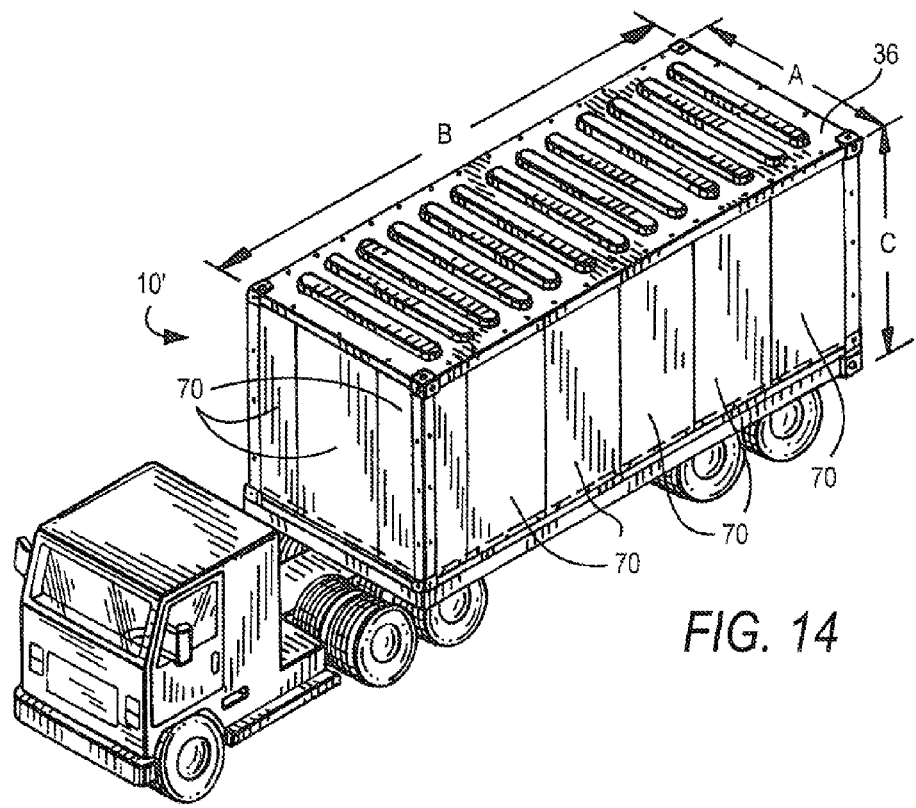
FIG. 14 is another perspective view, similar to that of FIG. 13, but showing a smaller volumetric unit of construction.

FIG. 13 illustrates one mode of transporting a VUC 10 (of the dimensions shown in FIG. 1) from factory to job site, specifically, via ground transportation on a truck bed, while FIG. 14 shows yet another VUC 10' (having one dimension differing from that shown in FIG. 1), being transported in the same illustrative manner from factory to job site, with the removable protective paneling in place on both VUC's (as stated hereinbefore, the length of a VUC, as represented by dimension B, can vary, and will preferably be twenty, thirty or forty feet, the smallest of these values being illustrated in FIG. 14, although the values for dimensions A and C are the same as those shown in FIG. 1). For each VUC 10, a watertight access door 100 (shown only in FIG. 13) is integrated into at least one of the protection panels 70, so as to provide access to the interior of the VUC (for purposes of inspection, for example), during transit.

As mentioned several times above, the present invention also encompasses features which have been denominated as beam stitching and column stitching, which utilize attachment points that are separate from the nodes to fasten VUC's together. Specifically, as used herein, beam stitching is a feature of the invention in which, after two VUC's are stacked and aligned vertically in the field (i.e., at or near the job site at which a structure comprising a plurality of VUC's is being erected), upper side and end rails 14, 18 of a given VUC 10 are structurally connected, preferably via bolting through apertures 44 and 45, to the respective lower side and end rails 16, 20 of the vertically adjacent VUC 10 in the level above, creating a composite floor beam and thereby greatly enhancing the stiffness of the VUC floor (as is well understood by persons skilled in the art, floor stiffness increases in geometric proportion to the depth of the supporting floor beams). Similarly, column stitching is a related feature of the present invention in which, after the VUC's are positioned and aligned horizontally (laterally) in the field, corner posts 22 (and intermediate posts 42, if any) of a given VUC 10 are structurally connected, preferably via bolting through apertures 46, to the respective corner (and intermediate) posts of one or more horizontally adjacent VUC's 10, thereby creating composite columns having increased resistance to buckling. If as mentioned above, the predetermined distance between adjacent apertures 44, 45 and 46 is selected to be approximately twenty-four inches, then these features may be referred to as beam stitching at twenty-four inches on centers, and as column stitching at twenty-four inches on centers. These features of the invention, along with several others, are illustrated in FIGS. 15-21 of the drawings, to which reference is now made.

Figure 15:
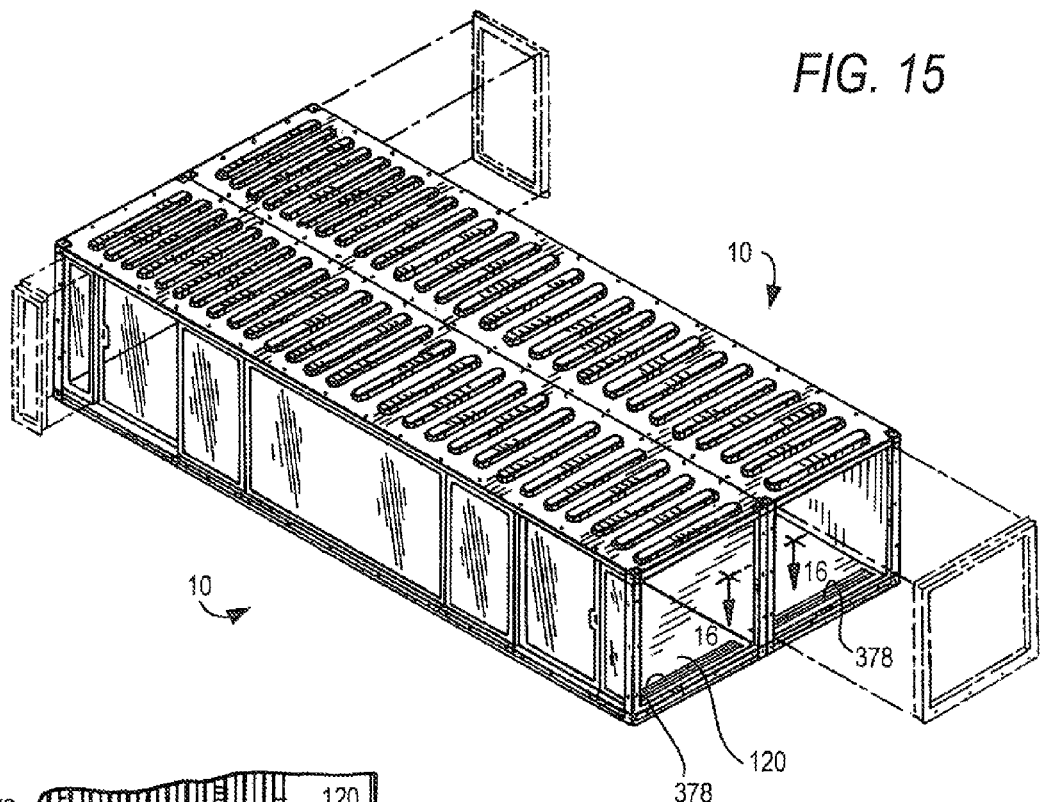
FIG. 15 is a perspective view similar to FIG. 10, showing two volumetric units of construction of the dimensions shown in FIG. 1.
Figure 16:
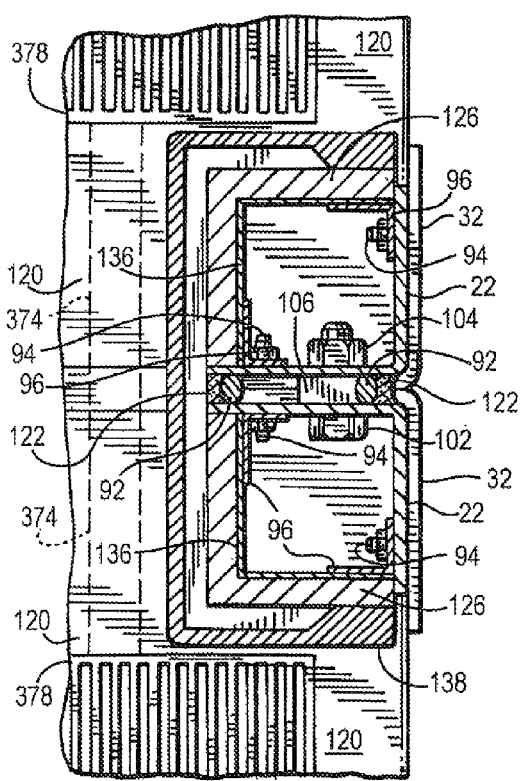
FIG. 16 is a cross-sectional view, taken substantially along the lines 16-16 of FIG. 13.

Turning first to FIG. 15, which in conjunction with FIG. 16 illustrates column stitching, two VUC's 10 are shown oriented side-by-side, after having been transported from the factory to a job site and craned into place, with all of their protective paneling having already been removed, and with window wall facades already installed (or, as shown in phantom lines, in the process of being installed prior to craning) at the periphery of each VUC 10 (the window wall facade and its installation will be described in further detail hereinafter). As shown in FIG. 16, the adjacent corner posts 22 of the two VUC's are fastened to one another along their entire vertical lengths, through each pair of aligned apertures 46 (not shown), by means of a column stitch bolt 102, a column stitch nut 104 and a steel column stitch spacer 106; the latter are preferably tack welded in the field to one corner post 22 or the other, prior to the VUC's being craned into place, and although not shown in the drawings, it is to be understood that each intermediate post 42 (if any) is similarly fastened to a counterpart intermediate post in the adjacent VUC, provided, of course, that the positioning of any such intermediate posts in the respective VUC's (based on the considerations described hereinbefore) results in them being aligned opposite one another after the VUC's are craned into place, such that stitching them is feasible.

Figure 18:
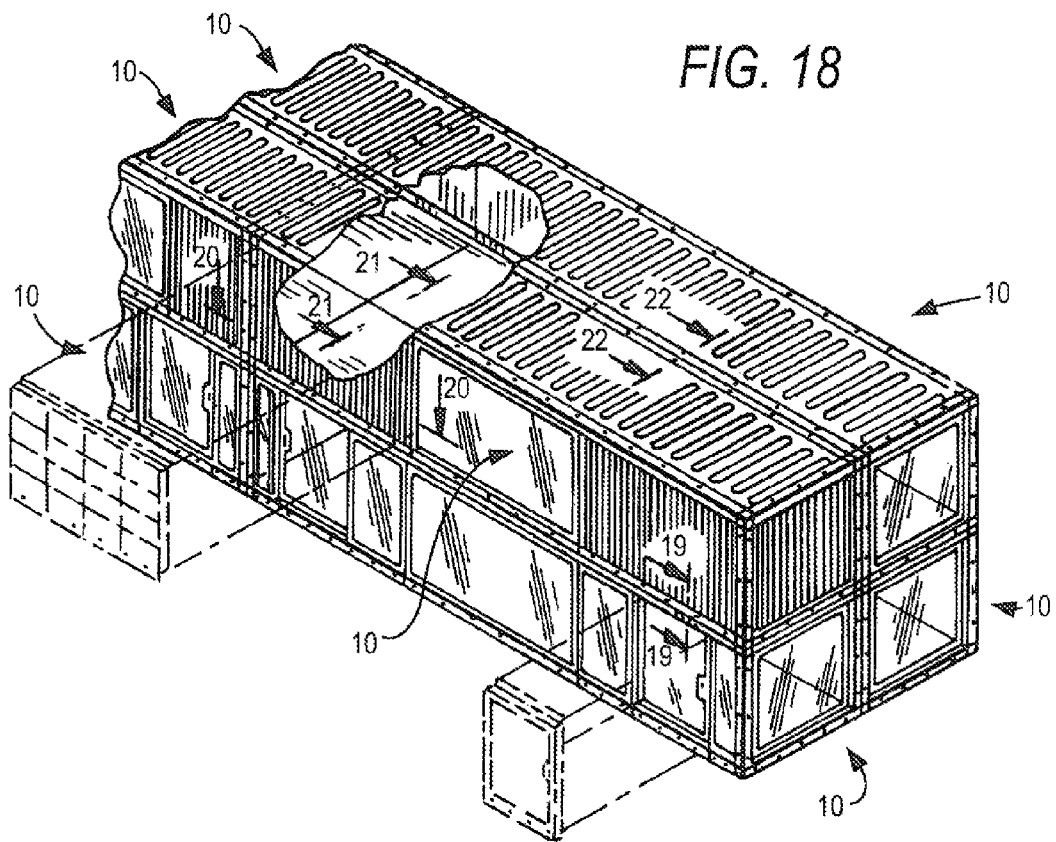
FIG. 18 is a perspective view similar to that of FIGS. 10 and 13, showing an aggregation of eight volumetric units of construction of the present invention.
Figure 20:
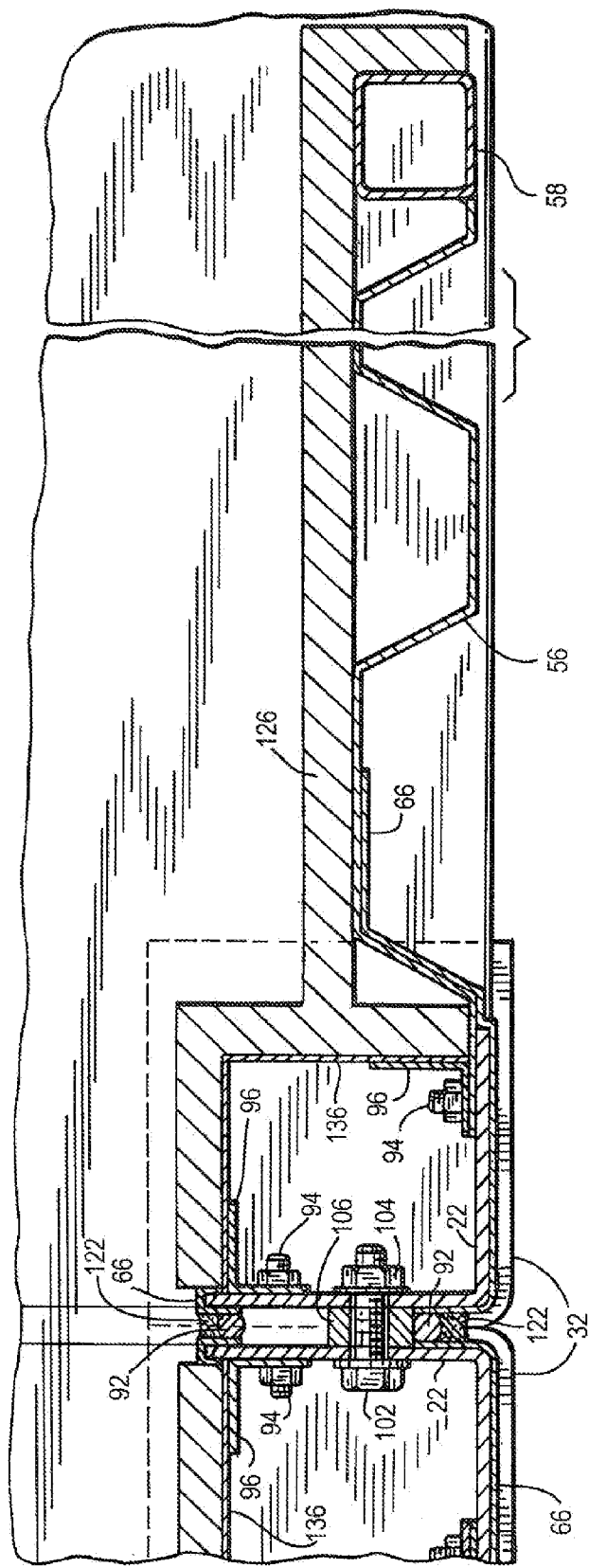
FIG. 20 is an enlarged cross-sectional view, taken substantially along the lines 20-20 of FIG. 18.

Referring next to FIG. 18, which in conjunction with FIG. 20 also illustrates column stitching, an aggregation of eight VUC's 10, all of the dimensions shown in FIG. 1 (but only seven of which are visible in FIG. 18), are shown with four of them oriented side-by-side and end-to-end, and stacked above four additional VUC's, placed side-by-side and end-to-end in a congruent fashion. As with FIG. 15, the VUC's in FIG. 18 are shown after having been transported from factory to job site and craned into place, with all of their protective paneling having already been removed, except that FIG. 18 shows window wall facades already installed (or, again as shown in phantom lines, in the process of being installed prior to craning), and shows (also in phantom lines) a rain-screen cladding facade illustratively in the process of being installed prior to craning, at the periphery of two of the VUC's 10 (the rain-screen cladding facade and its installation will be described in further detail hereinafter). As shown in FIG. 20, the adjacent corner posts 22 of the two VUC's (from one of which a shear wall panel 56 extends towards a stiffener 58) are fastened to one another along their entire vertical lengths, through each pair of aligned apertures 46 (not shown), by means of another column stitch bolt 102, another column stitch nut 104 and another column stitch spacer 106; as mentioned above, spacers 106 are preferably tack welded in the field to one corner post 22 or the other, as the VUC's are being craned into place (or immediately prior thereto).

Figure 17:
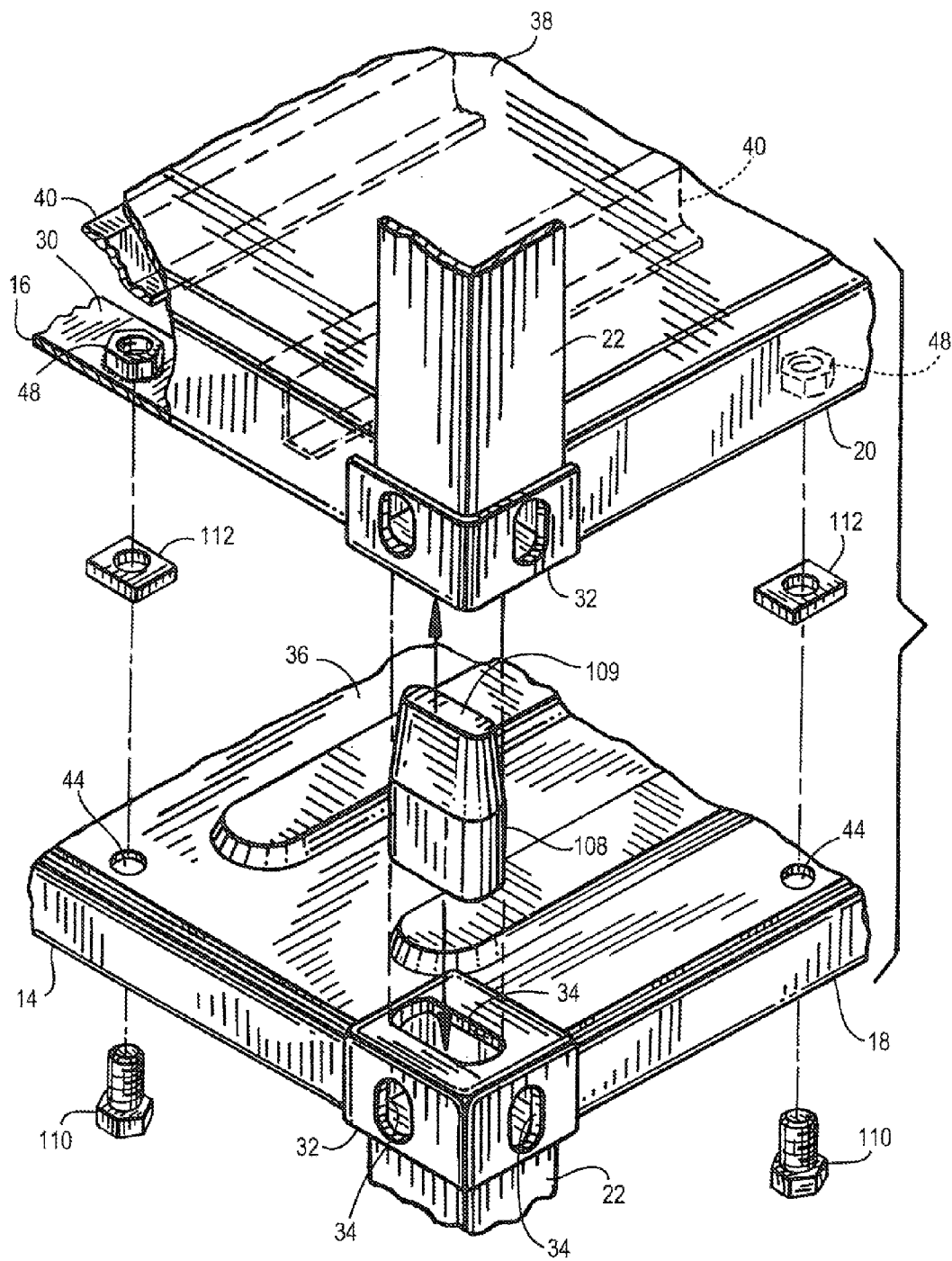
FIG. 17 is an enlarged fragmentary exploded perspective view, showing the adjacent corner portions of two volumetric units of construction, and illustrating the manner in which those units may be stacked one above the other.

Turning now to illustrations of beam stitching, FIG. 17 indicates the manner in which two vertically adjacent VUC's may be brought together through face-to-face contact of their respective nodes 32, and also illustrates the use of an optional guide pin 108 to facilitate alignment and vertical linking of the access port 34 formed in the face of a node 32 that makes direct contact with the corresponding node on a vertically adjacent VUC (only one of those access ports, which is typically somewhat larger than the other access ports in the same node, is shown in FIG. 17). Guide pin 108 is preferably fabricated of solid steel, and may be cast, or in the alternative, cut from a larger steel bar, and as indicated in FIG. 17, the upper tapering portion 109 of guide pin 108 preferably has a rectangular conoid shape and is thereby keyed for insertion into the appropriate access port 34 via a friction fit.

Figure 19:
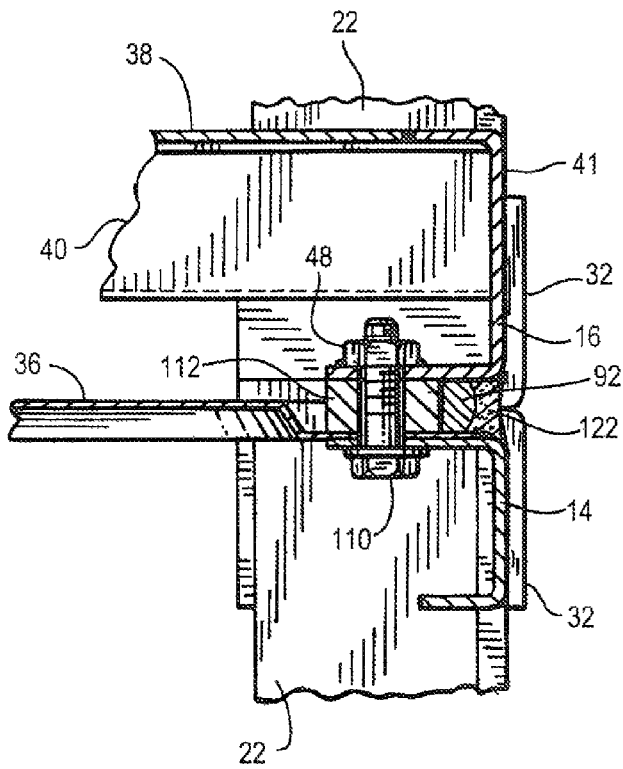
FIG. 19 is an enlarged cross-sectional view, taken substantially along the lines 19-19 of FIG. 18.
Figure 21:
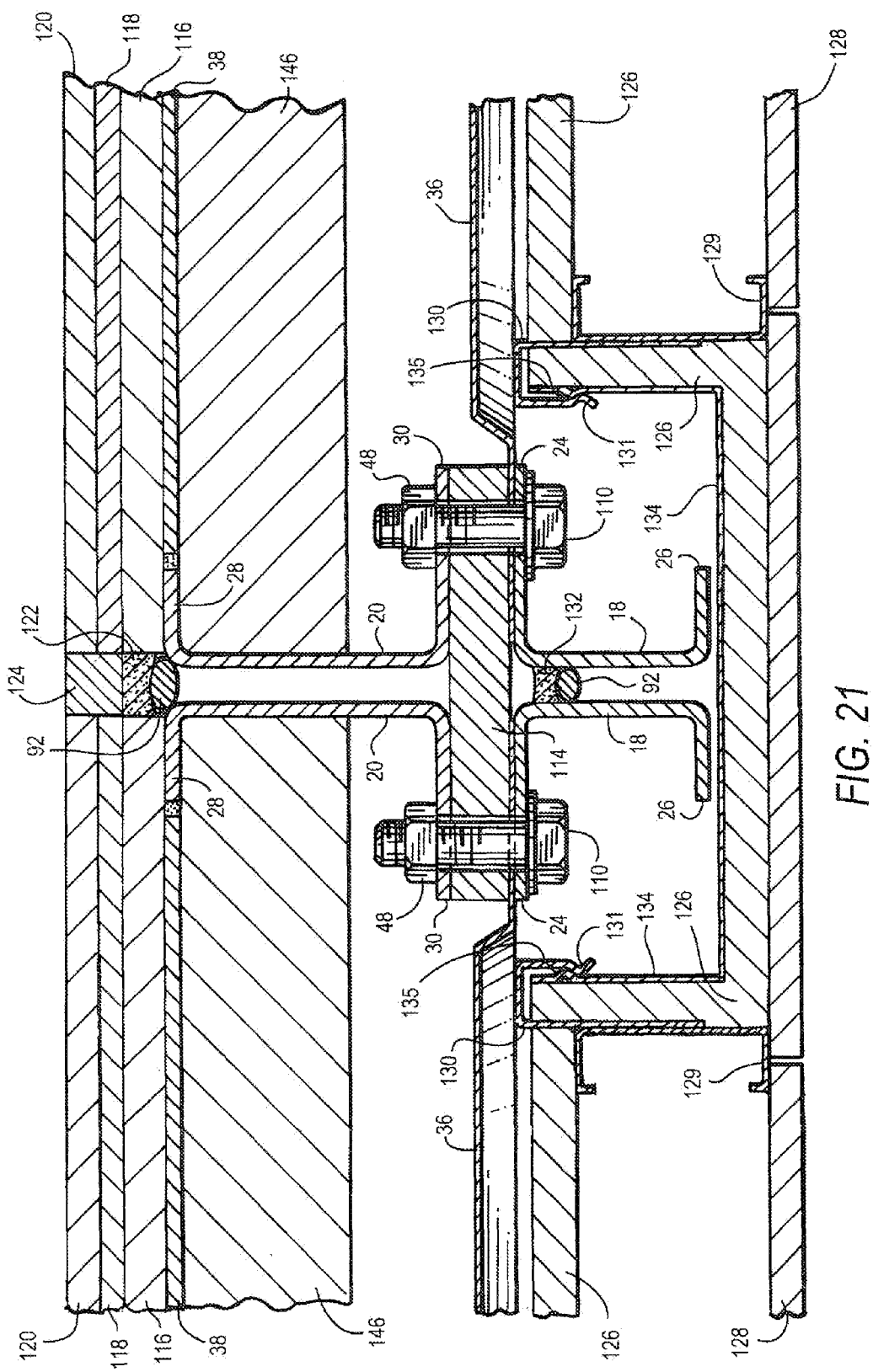
FIG. 21 is an enlarged cross-sectional view, taken substantially along the lines 21-21 of FIG. 18.

Referring now to FIGS. 19 and 21 in conjunction with FIG. 17, the adjacent lower side and end rails 16, 20 of a VUC at one level are fastened, along their entire horizontal lengths, to the upper side and end rails 14, 18 of a VUC in the level below, through each pair of aligned apertures 44 (not shown), by means of the previously mentioned pre-welded nut 48, as well as a beam stitch bolt 110 and a steel beam stitch spacer 112; each beam stitch spacer 112 is preferably tack welded in the field to roof panel 36 of the VUC in the level below, above a corresponding aperture 44 in upper side and end rails 14, 16, as the VUC's are being craned into place. As shown best in FIG. 21, when beam stitching is carried out at an interior juncture of VUC's that are both horizontally and vertically adjacent, preferably a larger, composite steel beam stitch spacer block 114 is utilized in lieu of the smaller, separate beam stitch spacers shown in FIGS. 17 and 19, the spacer block 114 bridging the juncture between the horizontally adjacent VUC's.

While the use of a spacer block 114 is shown in the drawings only where beam stitching between vertically adjacent VUC's is carried out in parallel, along the respective side rails of two VUC's that are longitudinally adjacent (side-to-side), it is to be understood that a similar juncture-bridging composite spacer block may also be utilized when beam stitching between vertically adjacent VUC's is carried out in parallel, along the respective end rails of two VUC's that are transversely adjacent (end-to-end), although it is to be understood that beam stitching is not strictly required along the end rails of VUC's in any event, since those end rails are typically only eight feet long and provide sufficient stiffness under normal floor load conditions without beam stitching. Beam stitching along the end rails may be required, however, as part of the lateral load resisting system of a building comprised of a plurality of VUC's.

In addition, it will be understood by those of skill in the art that even along the side rails, beam stitching is unnecessary and will not ordinarily be carried out where shear panels 56 occur, since those panels will provide the necessary floor stiffness; nevertheless, if a shear panel does not extend along the side of a VUC for the entire distance from one of the corner posts 22 to an adjacent corner post, but instead extends from one of those corner posts only part of the way to an adjacent corner post (thereby providing a partial side wall), then beam stitching, utilizing perhaps only a few or even just one of the apertures 44, may still be necessary along the open peripheral portion of that side of the VUC (i.e., along that portion of the side to which the shear panel does not extend).

Furthermore, although not shown in the drawings, it is to be understood that when beam stitching is carried out between vertically adjacent VUC's that include intermediate posts 42, preferably a similar larger beam stitch spacer block is utilized with the stitch bolts positioned on either side of the back-to-back legs of the intermediate posts, the spacer block thereby functioning at the same time to provide continuity such that the load carried by an intermediate post in the VUC in the level above is transferred downward to another intermediate post in the VUC in the level below.

As mentioned above, the primary benefit of beam stitching is that it creates composite edge rails, thereby enhancing the stiffness of the VUC floor; similarly, the primary benefit of column stitching is that it creates composite corner posts having increased resistance to buckling. The flexural stiffness of the rails can be quantitatively measured by calculating the moment of inertia, and the resistance of the corner posts to buckling is proportional to the radius of gyration; in particular, the flexural stiffness of a composite edge rail assembly is given by the moment of inertia about the horizontal neutral axis of its cross-section, while the resistance to buckling of a composite corner post is determined with respect to the vertical neutral axis of its cross-section. These values are set forth below in Table 1.

TABLE 1

| | | | | | | | |
|---|---|---|---|---|---|---|---|
| | | Area | Section Modulus | | Moment of Inertia | | Radius of Gyration | |
| Member | | $A$ (in$^2$) | $S_x$ (in$^3$) | $S_y$ (in$^3$) | $I_x$ (in$^4$) | $I_y$ (in$^4$) | $r_x$ (in) | $r_y$ (in) |
| Single Corner Post | 3.61 | 2.42 | 2.42 | 8.74 | 8.74 | 1.56 | 1.56 |
| Two Stitched Corner Posts | 7.22 | 4.84 | 11.1 | 17.5 | 40.0 | 1.56 | 2.35 |
| ISO Container Floor Edge Rail (unstitched) | 1.67 | 2.64 | — | 9.29 | — | 2.36 | |
| Top Edge Rail | 2.34 | 2.39 | — | 5.25 | — | 1.50 | — |
| Bottom Edge Rail | 4.28 | 6.48 | — | 22.3 | — | 2.28 | — |
| Stitched Edge Rail Assembly | 6.62 | 14.2 | — | 77.7 | — | 3.43 | — |
| Stitched Reinforced Edge Rail Assembly | 8.12 | 19.3 | — | 105 | — | 3.60 | — |

Table 1 also includes, for purposes of comparison, values that represent the flexural stiffness of the individual unstitched edge rails and corner posts of a VUC, values that represent the radius of gyration of individual unstitched corner posts, and values that represent the flexural stiffness of the unstitched floor edge rail of a typical prior art ISO-compliant cargo container, as well as a value that represents the flexural stiffness of the composite edge rail assembly when reinforced with reinforcement bars 31. These data show that a marked increase in flexural stiffness results from the use of composite edge rail assemblies created with beam stitching, and increased resistance to buckling from the use of composite corner post assemblies created with column stitching, not only as compared with the corresponding unstitched framing members of a VUC, but also (particularly as to beam stitching) as compared with the unstitched floor edge rail of a typical prior art ISO-compliant cargo container. For completeness, and also for purposes of comparison, Table 1 also includes other structural property data for each of the framing members mentioned above.

In addition to providing additional floor stiffness, a secondary benefit of beam stitching is that once the beam stitch bolts 110 are tightened, the beam stitch spacers 112 and/or spacer blocks 114 cause floor decks 38 of horizontally adjacent VUC's (as well as any finished flooring that may have been layered above floor decks 38) to be brought substantially into horizontal alignment.

As will be understood by those skilled in the art, both beam stitching and column stitching between adjacent VUC's take place as or just after the VUC's are craned into place in the structure being erected. However, FIGS. 18-21, as well as the aforementioned FIGS. 15-16, also illustrate that in accordance with another aspect of the present invention, many architectural finishes, and even environmental systems and facades, which in conventional construction are only applied or added at the job site itself (as the structure is being erected), may advantageously be applied or added to a VUC at the factory, before it is transported from there to a job site. For example, as mentioned above, VUC 10 is initially assembled with a steel plate floor deck 38, but it will be evident to those skilled in the art that floor deck 38 cannot function, on its own, as the usable floor in residential or office space, but must instead function only as a sub-floor, supporting a stacked floor assembly comprising other elements layered above it.

As shown best in FIG. 21, the stacked floor assembly for use with the present invention preferably comprises a floor underlayment 116, preferably composed of a layer of cement-bonded particle board fireproofing (to be described in further detail hereinafter), which directly overlies the steel plate sub-floor 38, over which is superimposed a layer of acoustic absorption padding 118, over which, in turn, a finished floor layer 120 is applied (the latter may consist, for example, of wood, ceramic tile or any other material commonly used as flooring in residential, commercial and other habitable structures). Each of these elements of the stacked floor assembly is preferably (although not necessarily) installed while the VUC's are being assembled at the factory and before they are transported to a job site, and in fact, as shown best in FIG. 12, the temporary protection panels 70 are preferably shaped so as to provide clearance for the floor underlayment 116 to run continuously to the edge of the VUC, i.e., beyond the peripheral edges 39 of floor deck 38, so as to substantially overlie flange 28 of lower side rail 16 (or lower end rail 20).

Once the VUC's reach a staging area at or near the job site, but before they are craned into place, the space under each floor deck 38 may be filled with a layer of acoustical insulation, preferably a conventional semi-rigid coated mineral fiber insulation 146, as shown best in FIG. 21. In addition, the gaps between the respective floor assemblies installed in horizontally adjacent VUC's may be "patched" at the mate lines (where necessary to provide continuous flooring), preferably with an intumescent sealant 122 (paired with a backer rod 92), above which an illustrative conventional cork strip 124 may be applied, also as shown in FIG. 21. An acceptable high-performance intumescent sealant is marketed by Hilti, Inc. under the trade name FS-One.

Also as mentioned above, VUC 10 is initially assembled with a pressed steel plate roof panel 36, but it will similarly be evident to those skilled in the art that the roof panel cannot function, in and of itself, as the finished ceiling in living or office space, but must instead support and/or be supplemented by a ceiling assembly comprising other elements layered (or suspended) below. As shown in FIG. 21, a suspended ceiling assembly for use with the present invention typically comprises a layer of mineral fiberboard fireproofing 126 (to be described in further detail hereinafter), and a finished ceiling 128, typically comprised of a plurality of panels and consisting, for example, of gypsum board, acoustic tile or any other material commonly used as for suspended ceilings in residential, commercial and other habitable structures), sponsored by a sheet metal bracket 130 that is welded to roof panel 36 and that supports conventional framing for the finished ceiling. In particular, bracket 130 is illustratively formed on one side with one or more spring clips 131 for attachment to a chassis that supports a layer of fireproofing, and bracket 130 is illustratively fastened on the other side to a conventional continuous C-channel 129, the latter supporting finished ceiling 128. Bracket 130 can either be continuous, in which case spring clip 131 will be continuous as well, or there can be a discontinuous plurality of discrete brackets 130, each one paired with a discrete spring clip 131.

Each of these elements of the ceiling assembly is also preferably installed while the VUC's are being assembled at the factory, and before they are transported to a job site. However, since the bolts 110 for beam stitching are not inserted until the VUC's reach the job site and are being craned into place, and since those bolts are inserted from below (as shown schematically in FIG. 17), a strip at the perimeter of the finished ceiling is preferably left open at the factory, so as to allow access for bolting in the field, prior to which a backer rod 92 and a conventional silicone sealant 132 (which need not be intumescent, or even fireproof) are placed, as shown in FIG. 21, so as to fill the gap between the respective upper end rails 18 (and/or upper side rails 14) of two horizontally adjacent VUC's; sealant 132 serves not only as a temporary weather seal during field assembly, but also as a permanent smoke seal in the erected structure. As will be evident to those skilled in the art, backer rod 92 and sealant 132 are installed before the next story of VUC's in craned into place, and after they are installed, the unfinished strips that had been left open at the perimeter of the finished ceiling may be completed by installing a layer of mineral fiberboard fireproofing followed by finished ceiling panels at those locations, all backed by a formed metal chassis 134 which, as mentioned above, may be fastened to sheet metal bracket(s) 130 via spring clip(s) 131, chassis 134 preferably being formed with one or more projections 135 for engagement with the spring clip(s) 131.

Other finishes, facades, and systems that may be installed in the VUC before it leaves the factory for transport to the job site will be described in further detail hereinafter, but now further aspects of the preferred fireproofing system of the present invention will be described. Due to the relatively high cost of the intumescent fireproof coating 66 (mentioned above as preferred for providing a fire rating for steel frame 12 of VUC 10), it is advantageous to utilize less expensive materials to provide fireproofing wherever possible. Thus, the fireproofing system, in another aspect thereof, comprises the utilization of a cement-bonded particle board fireproofing material for the floor underlayment 116 (as mentioned above in connection with the floor assembly), which not only provides the appropriate fire rating, but simultaneously adds mass to the stacked floor assembly for the purpose of reducing the transmission of sound and vibration. Cement-bonded particle board fireproofing materials are available that have the strength required to function as a floor underlayment, while at the same time having laboratory-tested fire ratings of up to two hours, which is sufficient to meet nearly all floor assembly fireproofing requirements. Acceptable cement-bonded particle board fireproofing materials are marketed by U.S. Architectural Products of Lincoln, R.I., U.S.A., under the trade name Versaroc, and by Euroform Products Ltd., of Appleton, Warrington, U.K., under the trade name Versapanel.

Figure 23:
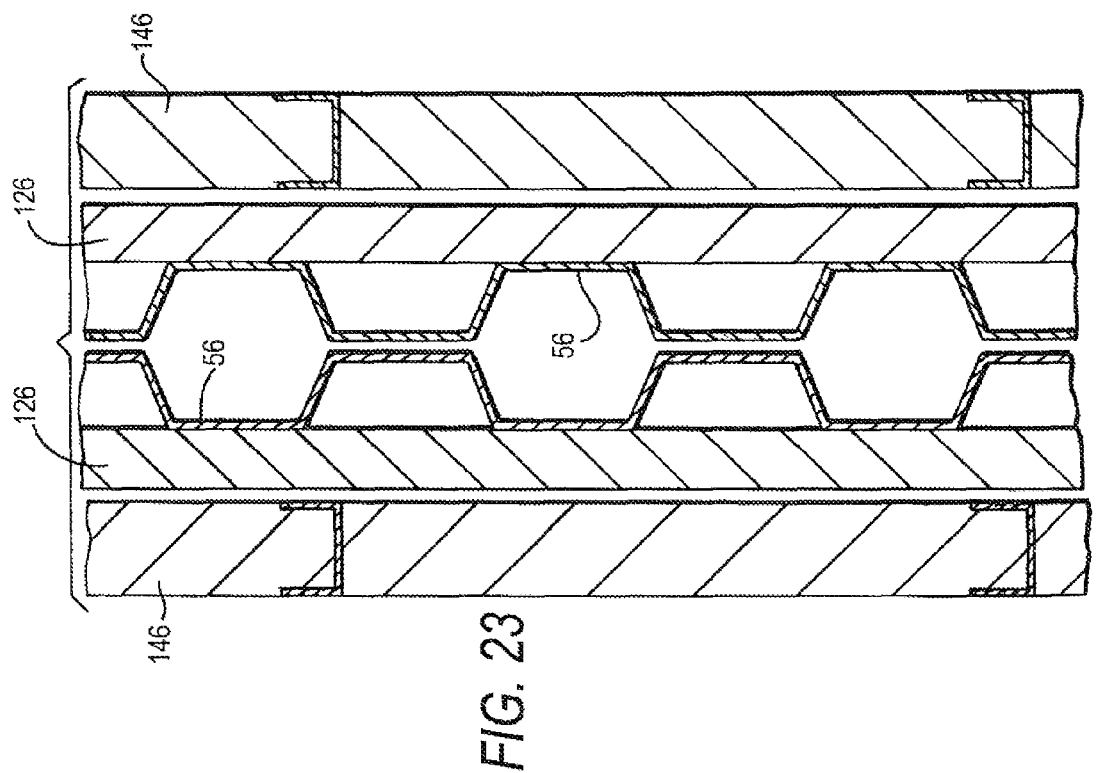
FIG. 23 is a cross-sectional view, taken substantially along the lines 23-23 of FIG. 22.
Figure 22:
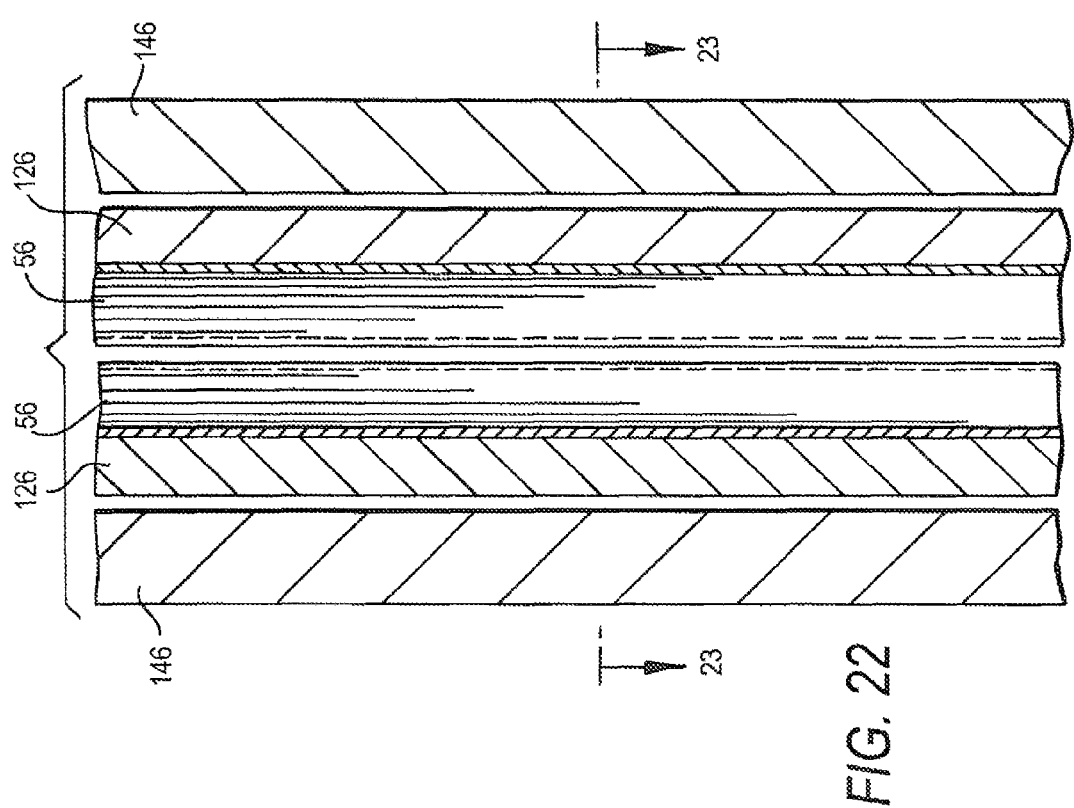
FIG. 22 is a further enlarged cross-sectional view, taken substantially along the lines 22-22 of FIG. 18.

In yet another aspect of the fireproofing system, a more lightweight and even less expensive material, that can still provide an appropriate fire rating, is preferred for use with the suspended ceiling assembly, where strength, weatherproofing and acoustical considerations are less important. In this aspect, the fireproofing system comprises the utilization of a layer of mineral fiberboard fireproofing material 126, not only in the ceiling assembly (as mentioned above), but elsewhere as well. For example, and turning now to FIGS. 22-23 in addition to the aforementioned FIGS. 1-21, the same mineral fiberboard fireproofing material 126 may also be used advantageously on the interior of every shear panel 56, as shown in FIGS. 20, 22 and 23, the mineral fiberboard to be concealed subsequently by an architectural finish such as conventional gypsum wallboard, plywood paneling, etc. (not shown), with an optional layer of mineral fiber insulation 146 situated between that finish and the mineral fiberboard 126, as shown best in FIGS. 22 and 23, the mineral fiber insulation 146 providing supplemental thermal shielding, and/or supplemental fireproofing, and/or acoustical shielding.

Also, as shown in FIG. 20 (and in FIG. 16 as well), the same mineral fiberboard fireproofing material 126 may additionally be used advantageously on the interior of each corner post 22, supported by a sheet metal backing 136 affixed to clip angles 96, the fireproofing system further comprising an intumescent sealant 122 (paired with a backer rod 92), so as to fill the gap between the respective corner posts 22 of two laterally adjacent VUC's; preferably, an intumescent sealant 122 (paired with a backer rod 92) is applied at two locations, as illustrated in FIG. 16, one on the interior side of column stitch bolt 102 and one on the exterior side of column stitch bolt 102 (although not part of the fireproofing system, FIG. 16 also illustrates the use of a conventional architectural finish known as a GFRG column cover 138, which spans the adjoining corner posts 22 on the interior side of the mineral fiberboard fireproofing 126, and which is fastened to clip angles 96, in a manner not shown in the drawing, directly through that mineral fiberboard fireproofing material).

Mineral fiberboard fireproofing materials are available with laboratory-tested fire ratings of up to four hours, which is sufficient to meet even the most stringent of fireproofing requirements imposed by building/fire codes, and as indicated above, an acceptable mineral fiberboard fireproofing material for these purposes is available from Albi Manufacturing, under the trade name Albi DriClad.

Figure 24:
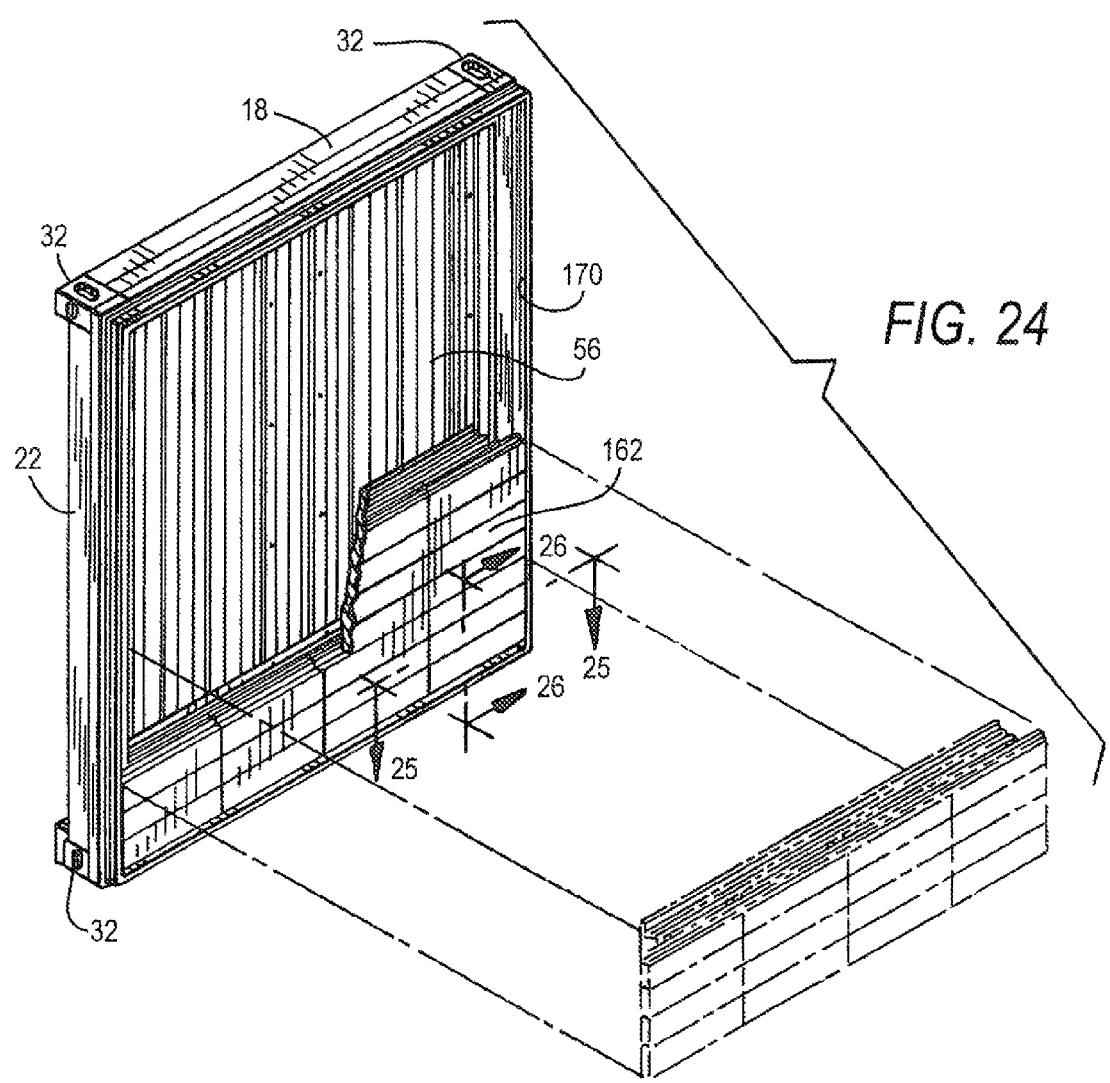
FIG. 24 is a partially exploded perspective view, illustrating a component of a facade structure for use with the present invention.
Figure 25:
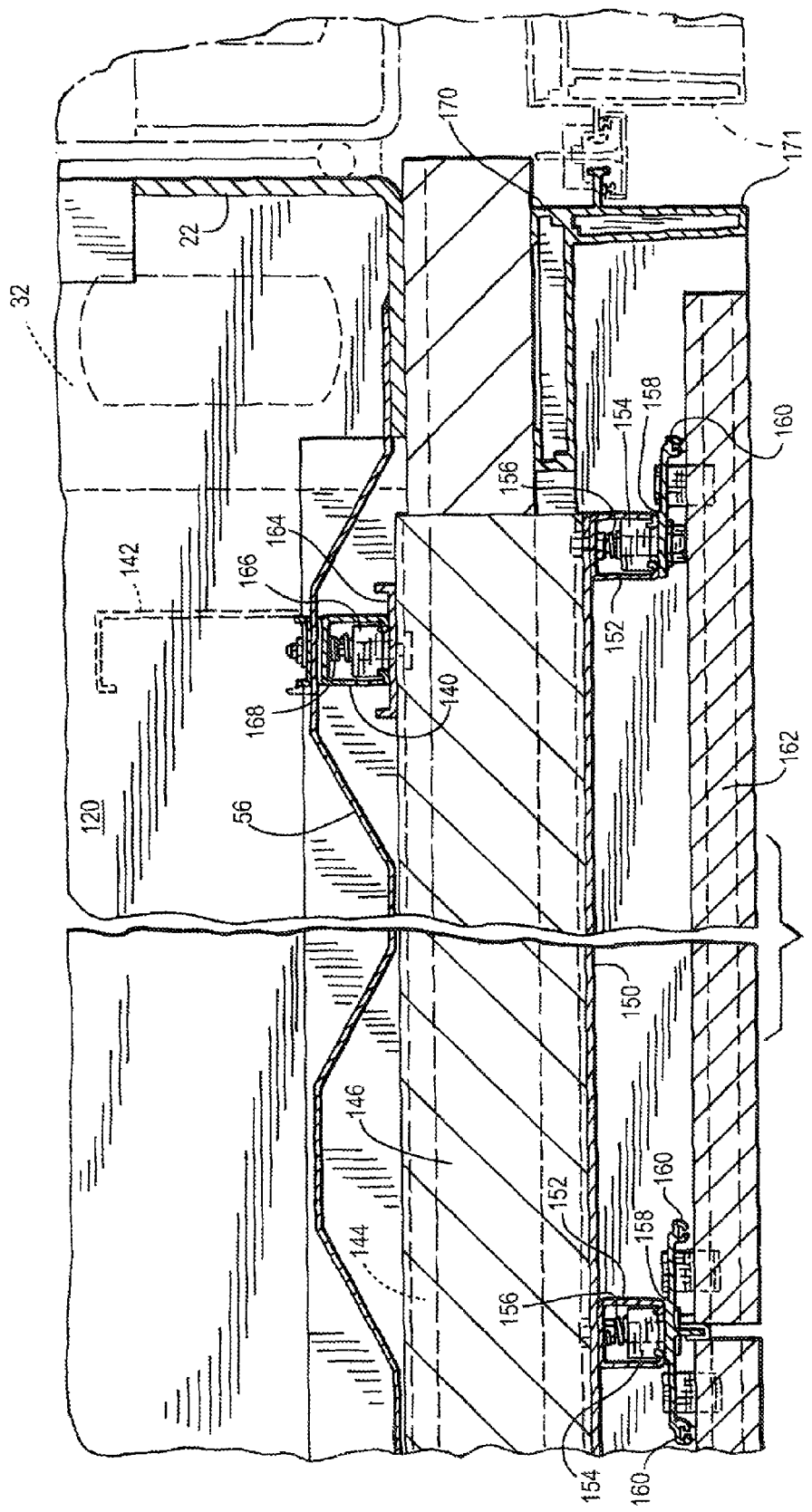
FIG. 25 is an enlarged cross-sectional view, taken substantially along the lines 25-25 of FIG. 24.
Figure 26:
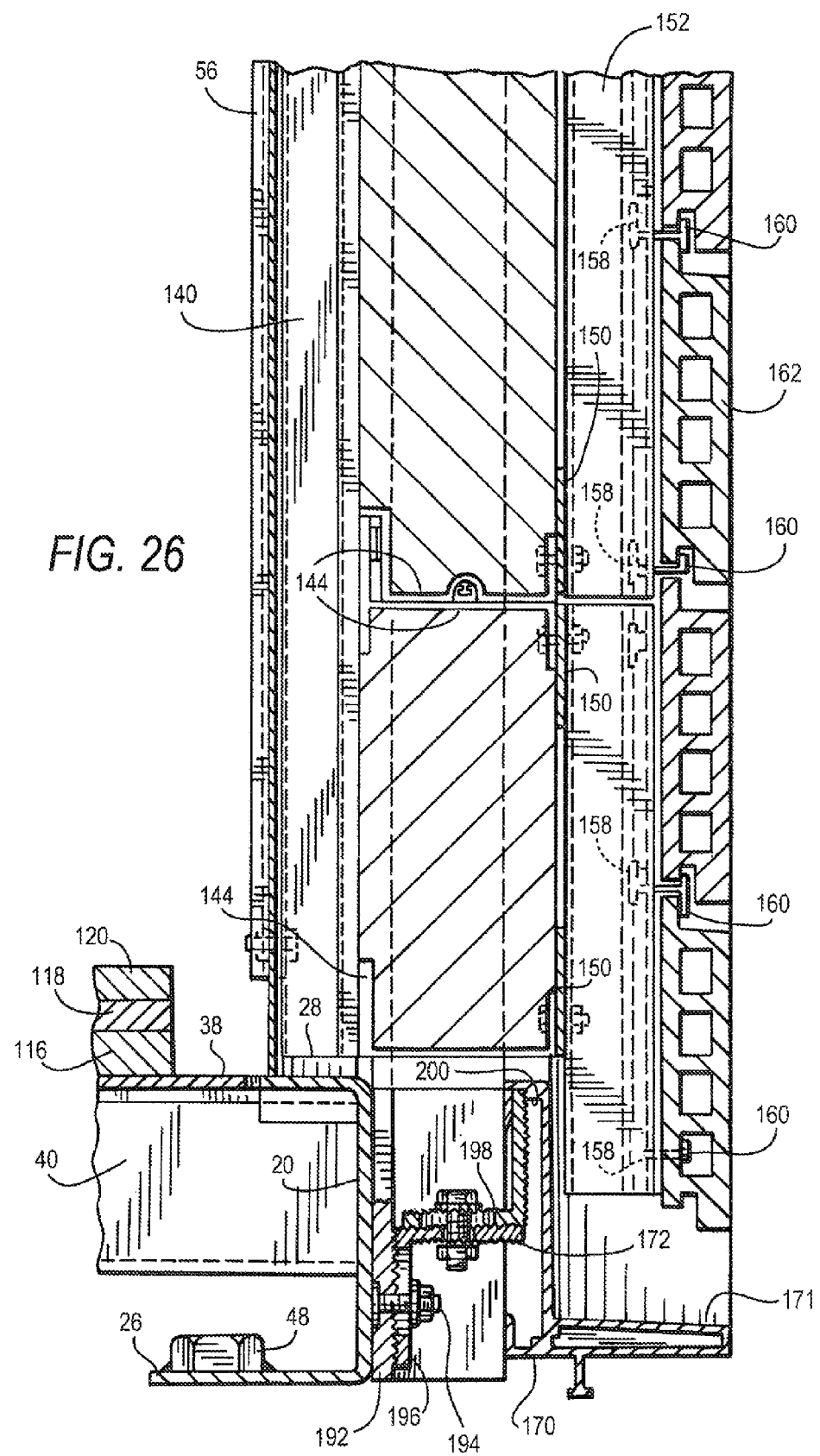
FIG. 26 is an enlarged cross-sectional view, taken substantially along the lines 26-26 of FIG. 24.

As previously alluded to, the present invention also contemplates that a VUC may be fitted out with exterior envelope systems, particularly either opaque rain-screen cladding facades or transparent window wall facades, or both, all prior to the VUC being transported from the factory to a job site. Turning now to FIGS. 24-26 in addition to the aforementioned FIGS. 1-23, the assembly of a rain-screen cladding system, which is particularly suited for use as a preferred component of the overall exterior envelope system of a structure comprised of a plurality of VUC's of the present invention, will now be described. As is well known in the art, a rain-screen cladding system creates a drained and ventilated cavity that allows air to circulate freely, such that any water which penetrates the rain-screen panel joints is removed, in part, by running down the rear face of the rain-screen panels and out the base, and any residual moisture evaporates. Rain-screen facades require a structurally stiff, airtight and waterproof backup wall, in order to equalize the air pressure in the cavity formed between the cladding and the backup wall with the external air pressure (this pressure equalization prevents water from being driven into the interior of the building through any breaks in the backup wall), and the corrugated steel shear wall panels 56 inherently meet all of the criteria for an excellent rain-screen backup wall.

FIGS. 24-26 depict a typical example of ventilated rain-screen cladding, and illustrate the manner in which components of a rain-screen facade structure may be assembled and integrated with the skeletal frame 12 of a VUC 10. In particular, the finished cladding material is placed on the exterior side of a wall panel 56, but in order to prepare the wall panel 56 at the VUC factory to receive the rain-screen system, a plurality of vertical unistrut channel members 140 (only one of which is shown in the drawings) are first bolted to the wall panel, spaced as required to resist the anticipated wind load, but located only in the valleys of the corrugated profile of wall panel 56 so that the channel members 140 do not project beyond the face of VUC 10, thereby enabling the VUC to be transported, from the factory to a staging area near the job site, with the channel members 140 in place but without the rain-screen cladding itself (which, if fully installed prior to transit, would project beyond the ISO-compliant dimensions of a VUC). Although not shown in the drawings, conventional seals may be provided where the channel members 140 are bolted to wall panel 56 in order to maintain the watertight integrity of the latter, and where required for additional stiffness for wind resistance, each channel member 140 can optionally be bolted to a steel stiffener 142 located on the interior of wall panel 56 (although illustratively shown in the drawings as resembling the letter "C" in cross section, stiffeners 142 may be fabricated in any shape that performs the required function, and if they are used, they can be conveniently concealed later within interior wall furring).

The rain-screen cladding itself is preferably assembled separately as a cassette, the latter typically comprising, as shown in FIGS. 25 and 26, a pair of horizontal girts 144 made of fiberglass pultrusions and typically embracing (especially in colder climates) a layer of a thermal insulation (preferably mineral fiber insulation 146), as well as a mounting frame which comprises horizontal members 150 bolted to girts 144 and a plurality of vertical unistrut channel members 152 welded to horizontal members 150 (both the horizontal members 150 and the vertical channel members 152 preferably being fabricated of extruded aluminum), and a plurality of gutters 154 (also preferably fabricated of extruded aluminum), each with an elastomeric gasket 156 and each bolted to a respective channel member 152, each gutter 154 also formed with a mounting plate 158 supporting a plurality of clips 160 arranged in a vertically-adjustable array that is adapted to receive cladding materials of various dimensions, each cassette further comprising one or more panels or other units of the finished rain-screen cladding facade material 162 itself, attached to one or more of the clips 160.

As Indicated above, and as shown best in FIG. 25, for a structure being erected in a climate with a cold winter, a layer of thermal insulation 146 is located in the cavity between the cladding and the backup wall, where it is uninterrupted by interior floor and wall construction, thereby creating a continuous "thermal blanket." An acceptable semi-rigid coated mineral fiber thermal insulation material is marketed by Roxul, Inc. of Milton, Ontario, Canada, under the trade name CavityRock. The benefits that result from this configuration include improved thermal performance both in terms of insulation values and air infiltration/exfiltration, control of moisture and condensation, and control of building-induced movement, as well as thermal expansion and contraction, of the cladding. However, for some warmer climates, the thermal insulation may instead be placed on the interior side of shear wall 56 (i.e., between the shear wall and conventional interior partitioning), in which case the thermal insulation will not form a part of the rain-screen cladding system.

The rain-screen cladding facade material 162 may be fabricated of any substance that is conventionally used in a rain-screen application, including but not limited to terra cotta, brick, aluminum panels (conventional or press-formed), zinc panels, stainless steel panels (conventional or press-formed), copper panels, porcelain panels, wood planks (natural or resin-impregnated, oriented either horizontally or vertically), roll formed metal siding (oriented either horizontally or vertically), weathering steel (such as that sold under the trademark Cor-Ten), natural stone, cast stone, synthetic stone, fiber-cement, glass fiber reinforced cement (GRFC), spandrel glass, photovoltaic panels or solar hot water panels, all of which are well-known construction materials available from a wide variety of suppliers.

Preferably, a plurality of such rain-screen cladding cassettes are prefabricated, and are pre-fitted to one or more VUC's at the VUC factory, each such cassette being attached to a wall panel 56, as shown best in FIG. 25, via a series of fastening plates 164, each of which carries a gutter 166 with an elastomeric gasket 168, each gutter 166 being bolted to a respective channel member 140 located in the valleys of the corrugated profile of wall panel 56. Thereafter, the rain-screen cladding cassettes are preferably removed and shipped separately (typically in an ISO-compliant cargo container) to a staging area at or near the job site, where they are re-attached to the VUC's prior to the latter being craned into place in the structure being erected.

The rain-screen cladding system described above maximizes the available space for thermal insulation, while providing for resistance to wind load, minimal thermal bridging through support framing, removal of any water that gets into the ventilated cavity between the rain-screen cladding panels and the backup wall, space for ventilation of that cavity, adjustability for manufacturing and assembly tolerances, speed of assembly, and standardization with the flexibility to accommodate a the range of cladding materials enumerated above. In addition, the rain-screen cladding system described above allows compliance with most highway transportation regulations in that it does not increase the width of the VUC by more than six inches while the latter is being transported from factory to job site; therefore, the total width of the VUC does not exceed eight feet, six inches, thereby avoiding the need to obtain special permits that would otherwise be required for a wider load.

FIGS. 24-26 illustrate the rain-screen cladding facade system described above in conjunction with another preferred facade system according to the invention, namely, a facade face frame 170, which is attached to frame 12 of VUC 10 via a plurality of mounting assemblies 172, and which will be described in further detail hereinafter. However, since a facade face frame 170 is preferably capable of being used, also according to the invention, in conjunction with transparent window wall facades as well, the latter will be described first. Nevertheless, and as will become apparent, the dual-seal strategy that characterizes a rain-screen cladding system, in which the cladding acts as the first line of defense against water penetration and the corrugated shear panel acts as the airtight backup, is also employed, in accordance with the invention, in the design of the other facade systems, as described below.

Figure 27:
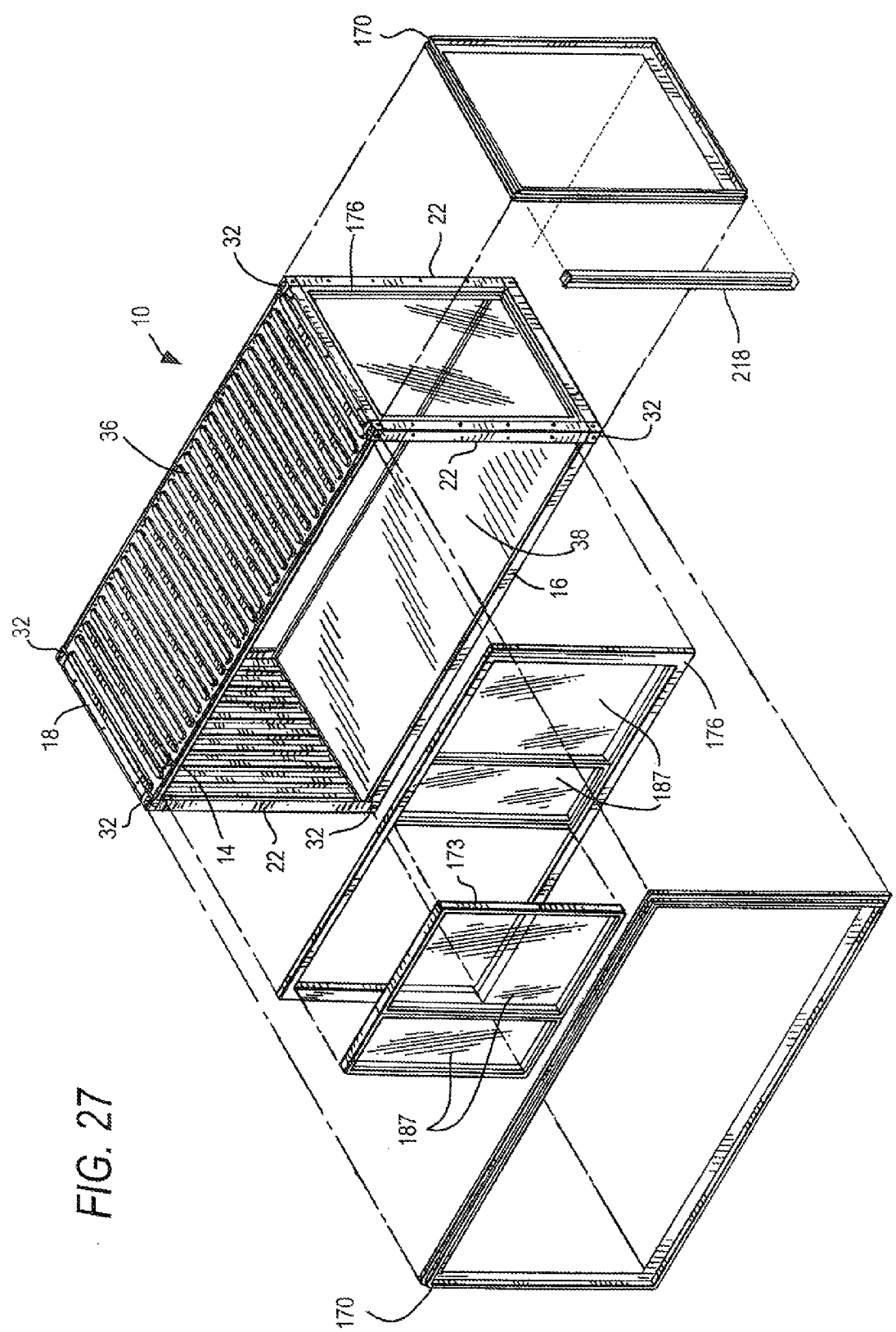
FIG. 27 is a partially exploded schematic perspective view, illustrating another component of the facade structure.
Figure 28:
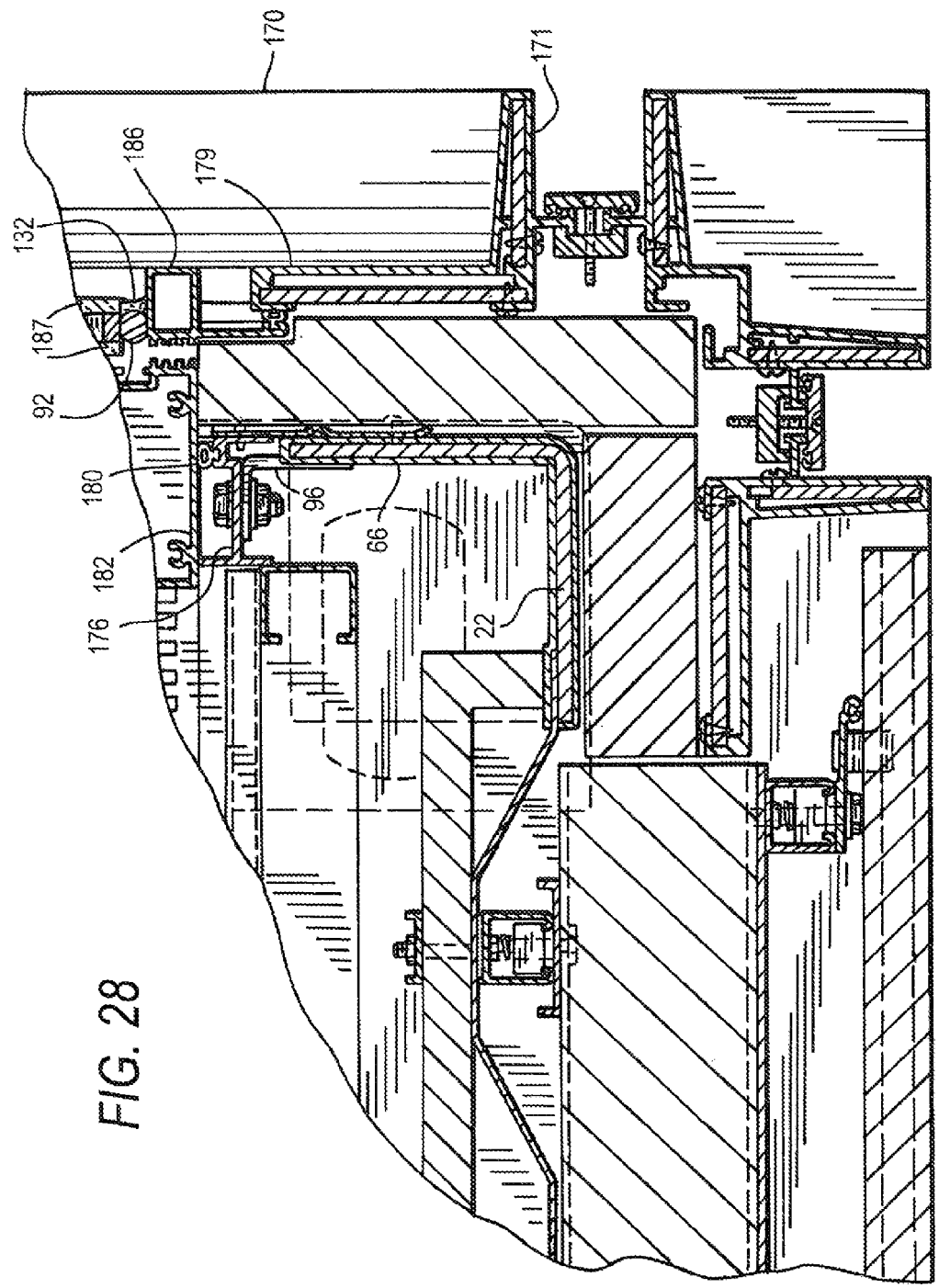
FIG. 28 is a representative enlarged cross-sectional view showing details of the component of FIG. 27.
Figure 29:
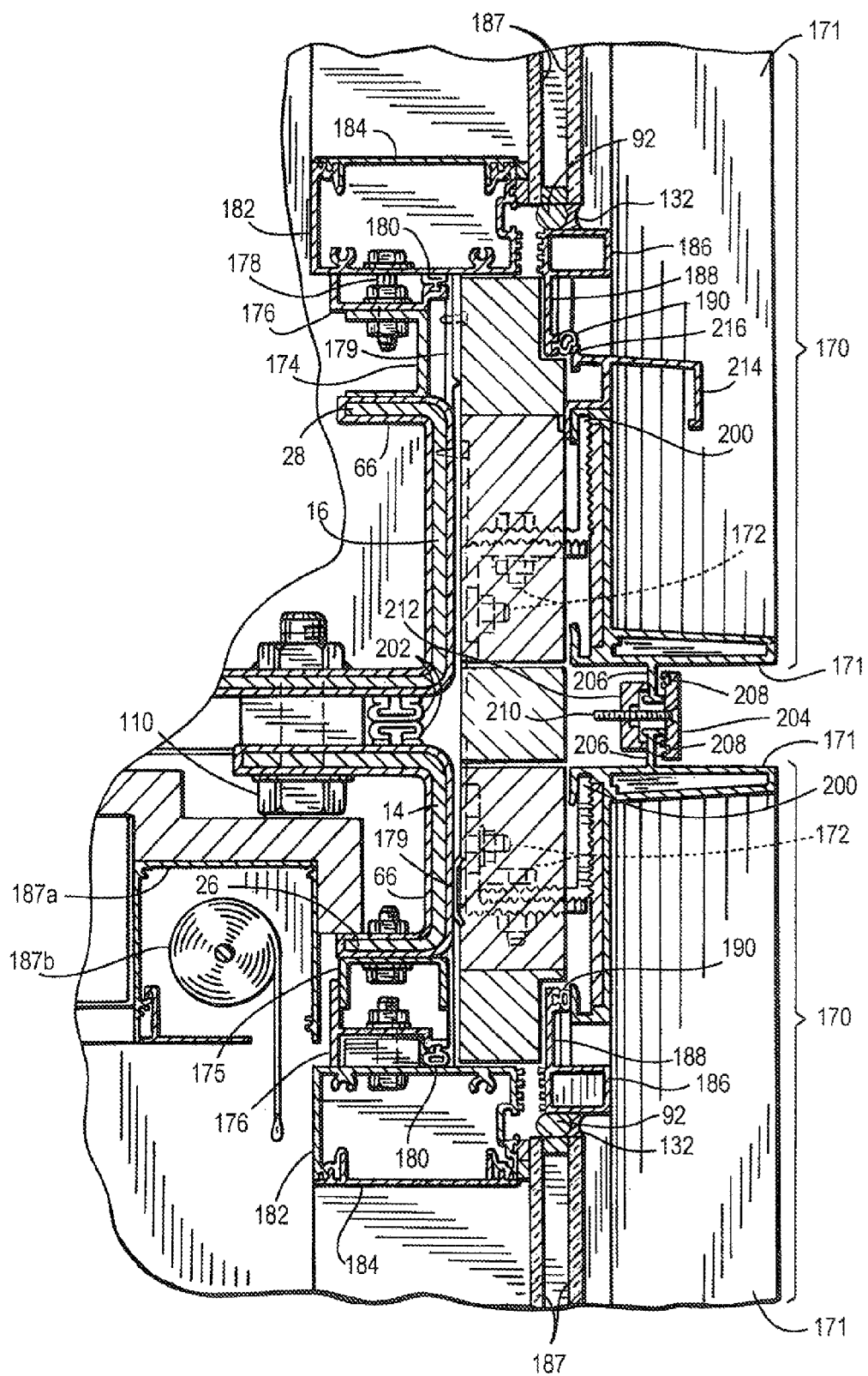
FIG. 29 is another representative enlarged cross-sectional view showing further details of the component of FIG. 27.

Turning now to FIGS. 27-29 in addition to the aforementioned FIGS. 1-26, the assembly of a window wall facade (sometimes referred to as a "curtain wall" facade), which is particularly suited for use as another preferred component of the overall exterior envelope system of a structure comprised of a plurality of VUC's of the present invention, will now be described. Since any window wall system (like the rain-screen cladding system described above), when fully assembled, would project beyond the ISO-compliant dimensions of a VUC, and since glass is also obviously prone to breakage in the handling of VUC's during intermodal transport, it is necessary to devise a window wall system that enables pre-glazed window wall frames to be shipped separately, and yet assure ease of installation and proper fit when the window wall frames are mounted to the VUC, either at or near the job site.

The welded steel frame 12 of a VUC 10 is a suitable chassis to which the window wall facade can be fastened, and which is structurally capable of supporting the dead loads and wind loads transmitted to it by the window wall. Moreover, since the frame 12 of a VUC 10 is manufactured to closer tolerances than a conventionally-constructed steel building frame, the window wall anchors can be designed with smaller adjustments for tolerance, which reduces the size of those anchors and allows for more precise joinery than would be typical for standard construction.

According to the invention, and as shown in FIGS. 27-29, in order to prepare VUC 10 to receive one or more pre-glazed window wall frames 173, a plurality of bent channel clips 174 are first welded to flange 28 of lower side rails 16 (and/or lower end rails 20) of frame 12, and as shown best in FIG. 29, a rectangular adaptor frame 176 (preferably fabricated of extruded aluminum) is then fastened to channel clips 174; the latter are preferably fabricated of stainless steel so as to prevent galvanic corrosion due to contact between the aluminum of adaptor frame 176 (and the aluminum of the other window wall framing), on the one hand, and the carbon steel or weathering steel of frame 12 on the other. As shown best in FIGS. 28 and 29, the lower horizontal segment of adaptor frame 176 may be bolted to channel clips 174 using bolts 178, which are also preferably fabricated of stainless steel, while the vertical segments of adaptor frame 176 may be bolted to clip angles 96 on the adjacent corner posts 22. Although the spacing between adjacent channel clips 174 along each lower side (or end) rail may vary, it is to be understood that for each pre-glazed window wall frame 173 to be installed within adaptor frame 176, there will be at least two associated channel clips 174. In order to provide an airtight and watertight seal between adaptor frame 176 and frame 12 of VUC 10, elastomeric flashing 179, which preferably is adhesive-backed and is provided with stainless steel termination bars, may be installed between adaptor frame 176 and lower side rails 16 (and/or lower end rails 20), outboard of channel clips 174.

Adaptor frame 176 is situated and dimensioned such that it does not project beyond the perimeter of VUC 10, thus enabling the VUC still to be transported, from the factory to the staging area near the job site, in the manner described hereinbefore; at the same time, adaptor frame 176 may also conveniently function as a molding against which floor, wall and ceiling finishes may abut, thereby allowing the latter to be completed, substantially up to the edge of each pre-glazed window wall frame that the VUC will contain, all prior to the VUC leaving the factory. While still at the factory, each pre-glazed window wall frame 173 is pre-fitted within adaptor frame 176, as shown schematically in FIG. 27, and thereafter the pre-glazed window wall frames are removed, are preferably wrapped and packed, and are transported to the staging area (typically either within the VUC itself that they are intended to clad, or in a separate ISO-compliant cargo container), where they are re-mounted within adaptor frame 176 prior to the VUC being craned into place in the structure being erected, each pre-glazed window wall frame 173 being bolted to the adaptor frame 176 (as shown best in FIG. 29, the bolts not being visible in FIG. 28). Preferably, elastomeric gaskets 180 are also utilized in order to create a watertight seal, as well as an air infiltration barrier, between the pre-glazed window wall frame 173 and the adaptor frame 176.

However, in order to allow for deflection of frame 12 of a VUC 10 without transmitting load into the window wall, a special configuration of the adaptor frame 176 is used at the head of each window wall, the special configuration comprising (as best shown in FIG. 29) a plurality of bent channel clips 175, preferably fabricated of stainless steel, which are welded to upper side rails 14 (and/or upper end rails 18) of frame 12 of VUC 10, so as to provide a "slip face" bearing surface against which the edges of adaptor frame 176 may be juxtaposed, enabling channel clips 175 to slide against adaptor frame 176 when under load. Although the spacing between channel clips 175 along each upper side (or end) rail may vary, it is to be understood that for each pre-glazed window wall frame 173 to be installed within adaptor frame 176, there will be at least two associated channel clips 175. As described above, elastomeric flashing 179 may also be installed between adaptor frame 176 and upper side rails 14 (and/or upper end rails 18) of frame 12, outboard of channel clips 175, so as to provide an airtight and watertight seal therebetween.

As will be evident to those of skill in the art, the pre-glazed window wall frames 173, including the mullions 182 (each of which comprises a snap-in cover 184 and a snap-on cap 186), are preferably fabricated of extruded aluminum. In order to optimize thermal performance, mullions 182 are manufactured with thermal breaks, which are positioned in relation to the face of the VUC frame such that there is a continuity among the thermal breaks, the air cavity of the insulated glass used in the pre-glazed window wall frames 173, and the mineral fiber thermal insulation 146 used in the rain-screen cladding system (as described above).

It is to be understood that either fixed windows or operable windows (or a combination thereof) may be incorporated in the pre-glazed window wall frames 173, and that glazing units may be incorporated therein using glazing materials such as conventional insulated glass units 187 and various methods of glazing, including pressure plate and cover cap glazing, and both two-sided and four-sided structural glazing, as well as point fixed glazing with flush countersunk glass bolts and monolithic or laminated insulated glass units (or combinations thereof), and even double glass facades, in which two glass panels (one insulated and the other monolithic) are separated by an air cavity to provide improved thermal and acoustical performance. Those of skill in the art will also recognize that the window wall system described above may be utilized even with glazing materials other than glass, such as polycarbonate or translucent fiberglass sandwich panels, or "channel glass" such as that marketed by Pilkington Group Limited of St. Helens, Merseyside, U.K. under the trade name Profilit. (Although not part of the window wall facade system, FIG. 29 also illustrates the incorporation of an architectural design feature, namely, a recessed rectangular pocket 187*a*, within which a conventional interior roll-up fabric sun shade 187*b* may be suspended, into the finished ceiling adjacent to, and inboard of, the head of the window wall facade system.)

As mentioned previously, yet another preferred facade system according to the invention, namely, a facade face frame 170, is preferably used interchangeably, either in conjunction with the opaque rain-screen cladding facade system (as illustrated in FIG. 25), or in conjunction with the transparent window wall facade system described (as illustrated in FIGS. 27-29). The facade face frame serves as a mediating element either between adjoining rain-screen cladding and window wall framing, or between either one of those facade systems and the perimeter of the VUC to which either facade system may be attached, where, in either case, it is desirable to provide trim that confers a consistent, finished appearance, and where (particularly at the joints between adjacent VUC's) a weather seal is required, which must be installed after the structure is erected. As a result, the facade face frame serves to minimize the amount of exterior "finish work" that must be done in the field, and also serves to standardize the treatment of the joints between adjacent VUC's.

As shown in FIGS. 25-29, a facade face frame 170 is provided wherever a VUC will carry either a window wall facade or a rain-screen cladding facade (the latter optionally incorporating one or more windows), with the gaps between the adjacent projecting legs 171 of the facade face frames on adjacent VUC's being centered on the gaps between those adjacent VUC's. In order to prepare VUC 10 at the factory to receive each facade face frame 170, a mounting assembly 172 (shown best in FIG. 26) is fastened to upper and lower side rails 14, 16 (and/or upper and lower end rails 18, 20) of frame 12, so as to create a point of attachment at or near each of the corners of facade face frame 170, which is generally rectangular in shape; thus, for each facade face frame 170, four mounting assemblies 172 will preferably be used.

As shown in FIG. 26, each mounting assembly preferably comprises an extruded aluminum starter plate 192, fastened to the VUC using a stainless steel bolt 194 and protected by non-metallic bushings (not shown in the drawings) to ensure that there is no steel-to-aluminum contact that could cause galvanic corrosion. Starter plate 192 has a serrated surface that is adapted to mate with a similarly serrated surface on a first extruded aluminum clip angle 196, allowing for up/down adjustment of first clip angle 196, the latter being inserted over bolt 194 and tightened down after adjustment. A matching second extruded aluminum clip angle 198, also with serrated surfaces, is bolted to first clip angle 196 and adjusted to its proper in/out position before being tightened. The use of clip angles 196, 198, with mating serrated surfaces, ensures that there is no slippage under gravity or wind load.

Once the clip angles are properly adjusted, the facade face frame(s) 170 may be set in place and checked for fit, with slots 200 in the back of each facade face frame 170 providing a snug fit over second clip angles 198, after which they are removed. The facade face frame(s) 170 may then be shipped separately, typically in an ISO-compliant cargo container, to the staging area near the job site, where they may be rapidly mounted to the VUC's before the latter are craned into place, with slots 200 again providing a snug fit over second clip angles 198, at least initially, following which a set screw (not shown in the drawings) can be tightened to lock the facade face frame in place.

However, before the facade face frames are mounted to the VUC's, the gaps between adjacent VUC's are first weather sealed, either with a "gunned in" sealant, or with a pre-compressed expanding filler strip, or most preferably (and as shown best in FIG. 29) with a pair of elastomeric gaskets 202, one member of each pair being pre-attached to each VUC at the appropriate location so as to create an aligned pair. In addition, and also as shown in FIG. 29, the gaps between the adjacent projecting legs 171 of the facade face frames 170 attached to adjacent VUC's are themselves closed with an extruded aluminum cover or spline strip 204, the latter being fastened to flanges 206 that are arranged in pairs along the adjacent projecting legs 171, with each flange 206 preferably being fabricated integrally with one of the projecting legs 171. Thus, the dual-seal facade strategy mentioned above is employed, in that spline strip 204 acts as the first line of defense against water penetration, with gaskets 202 acting as the backup.

Spline strip 204 preferably also carries elastomeric gaskets 208 with which to create a weather seal, and is pre-assembled with stainless steel screws 210 attached to extruded aluminum cams 212 that are drilled and tapped to act as nuts. The cams 212 are inserted vertically into the gap between the adjacent facade face frames 170, and they are then rotated ninety degrees to allow the back of each cam 212 to engage the flanges 206. As the screws 210 are tightened, gaskets 208 are compressed against flanges 206 until metal-to-metal contact prevents gaskets 208 from being over-compressed.

The dual-seal facade strategy is also employed in the integration of the facade face frame system with the window wall facade system. In order to provide a watertight seal between a facade face frame 170 and an abutting window wall facade system, the latter further comprises a leg 188, which is fabricated of extruded aluminum and which, as illustrated in FIG. 29, depends from (and is preferably fabricated integrally with) mullion cap 186, an elastomeric gasket 190 filling the gap between leg 188 and facade face frame 170. Thus, gaskets 208 act as the first line of defense against water penetration, with gaskets 190 providing the backup and maintaining the continuity of the weather seal. FIG. 29 also illustrates that the portion of facade face frame 170 that extends horizontally, below the pre-glazed window wall frame 173, may optionally further comprise an extruded aluminum drip edge 214, which may also serve as a windowsill; drip edge 214 illustratively may be fastened to the body of facade face frame 170 in the vicinity of second clip angle 198, and it comprises a flange 216 against which gasket 190 may bear, although where a drip edge 214 is used, a different shape for gasket 190 may be required, such that it functions not only as a seal, but also specifically so as to direct water towards drip edge 214.

Figure 30:
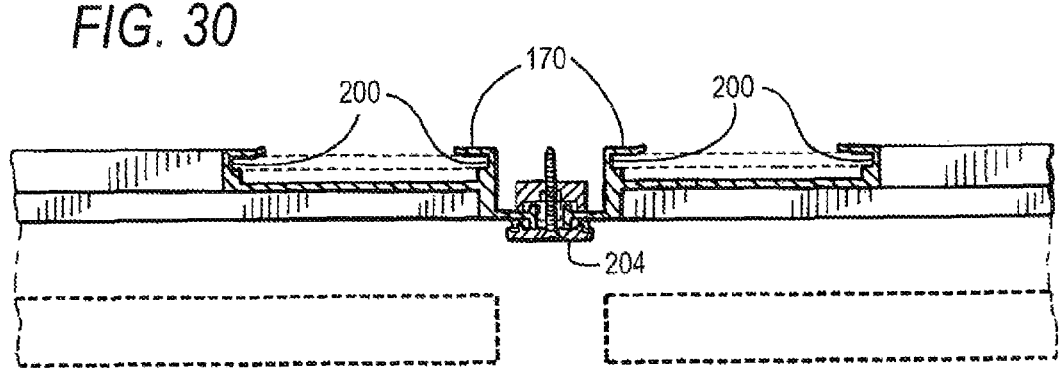
FIGS. 30-32 illustrate several alternate embodiments of yet another component of the facade structure.
Figure 31:
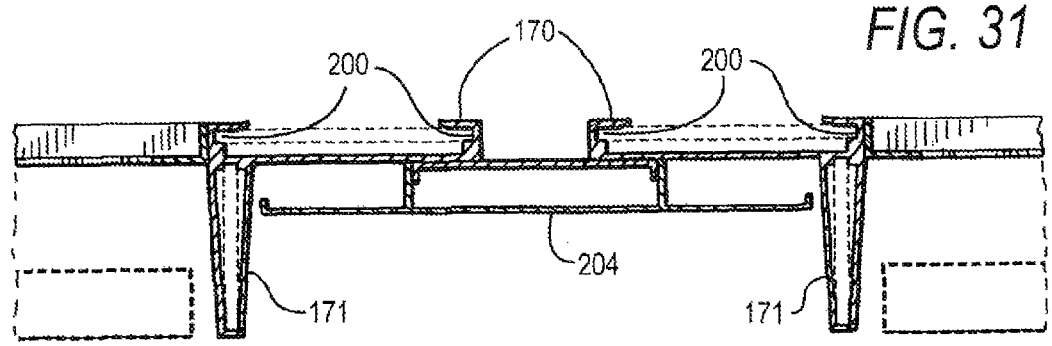
Figure 32:
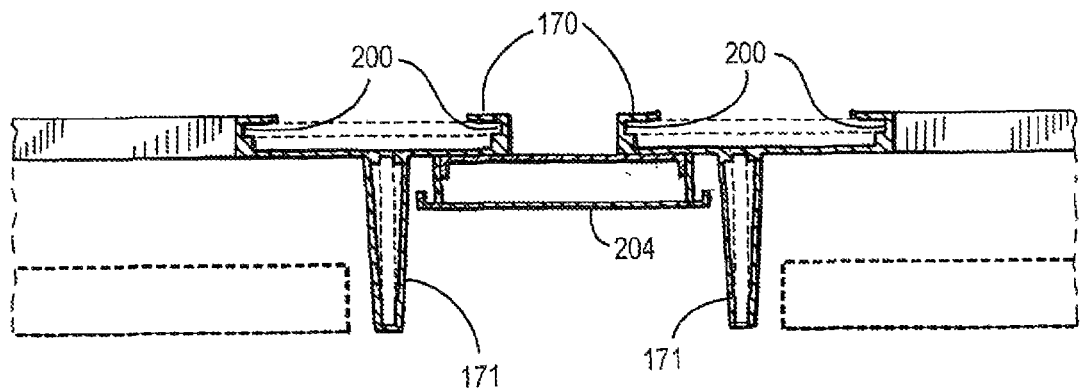

It will be understood by those of skill in the art that the design and configuration of facade face frame 170, including, for example, the distance between the adjacent projecting legs 171 of the facade face frames attached to adjacent VUC's, and the distance by which each leg 171 projects outward from the VUC frame, as shown in FIGS. 28 and 29 (and in FIGS. 25 and 26 as well), are not essential but may be varied, and that other configurations are therefore possible. FIGS. 30-32 illustrate several other typical alternate profiles for the facade face frame, including one in which there are no projecting legs at all (FIG. 30), and two in which the distance between the adjacent projecting legs 171 is increased (FIGS. 31 and 32), thereby requiring a corresponding increase in the width of spline strip 204. It will also be understood that, as shown in FIG. 27, facade face frame adapters 218, fabricated of extruded aluminum and each having connectivity and a profile matching that of the adjacent facade face frame(s) 170, may be used to provide transitions where the facade of a building turns a corner, and/or where the building facade terminates vertically, i.e., where the facade reaches its maximum height (and, in some cases, where it reaches its minimum height as well), as measured from the ground.

Although not shown in the drawings, for VUC's in which dimension B (as shown in FIG. 1) is forty feet, it should be understood that each of the horizontal members of facade face frame 170, rather than comprising a unitary member which is forty feet long, may instead consist of several shorter horizontal segments joined together to create a continuous forty-foot run. In addition, for VUC's that comprise one or more intermediate posts 42, it should also be understood that the vertical members of a facade face frame 170 would occur at the location of each intermediate post.

Turning next to FIGS. 33-36 in addition to the aforementioned FIGS. 1-32, a facade face frame, in addition to forming a closure between adjacent VUC's as well as forming a closure with adjoining window framing and/or rain-screen cladding, can also be adapted to provide access to attachment points for optional accessories for the facade structure, such as balconies, sun shading devices of various types, fin walls and architectural surrounds. The sun shading devices may include grilles or louvers of various materials (such as wood, metal, terra-cotta, ceramic, glass, photovoltaic sandwiches, etc.), which may be oriented vertically or horizontally, and which may either be fixed or may be manually or electromechanically operable; the sun shading devices may also include exterior fixed fabric awnings or exterior roll-up fabric shades. Balconies may be bracketed off of a VUC, or suspended by a tension hanger from a structural member above, and in either case they may be integrated into an architectural surround that is clad in rain-screen material.

Figure 33:
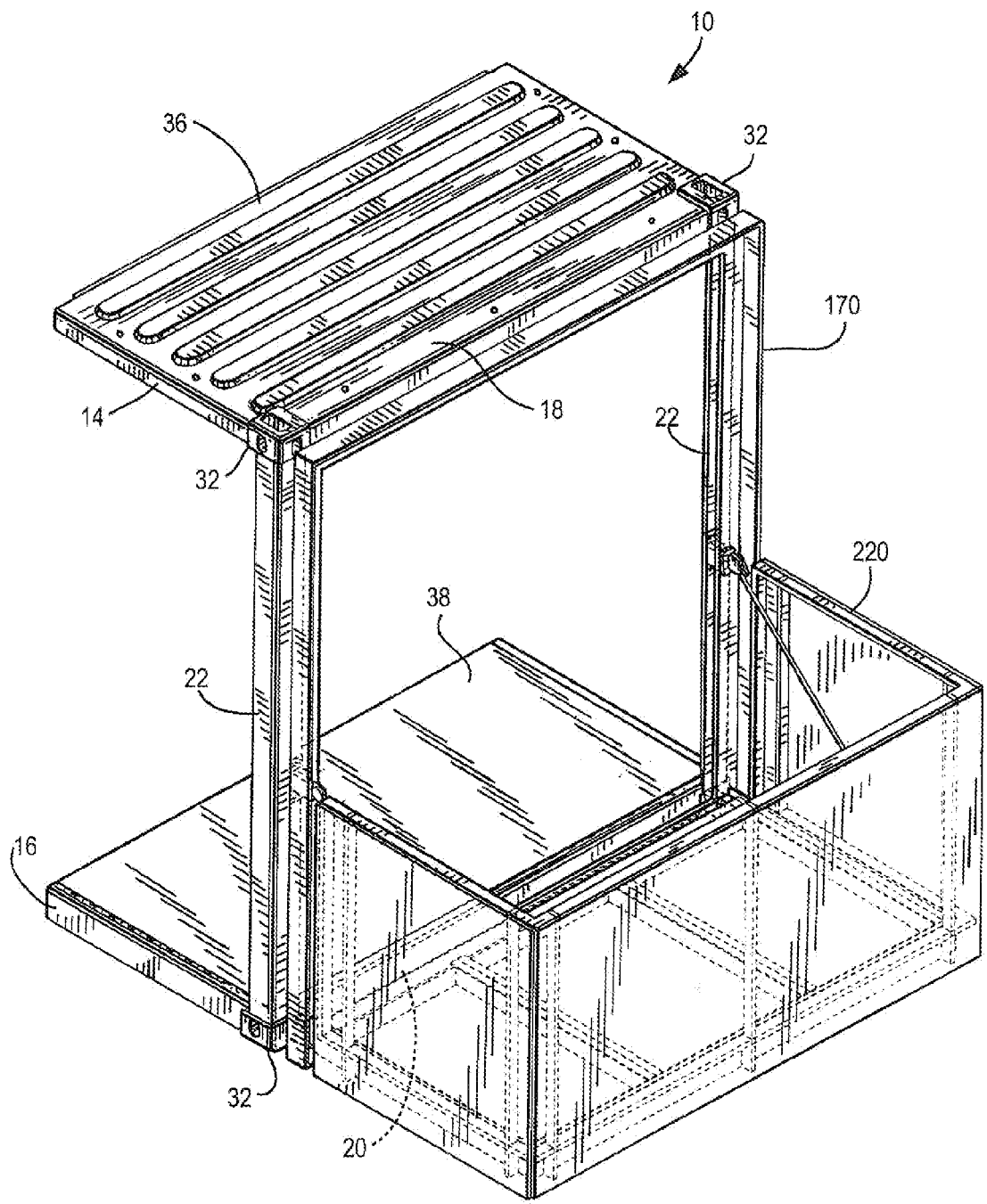
FIG. 33 is a perspective view of an optional component of the facade structure.
Figure 34:
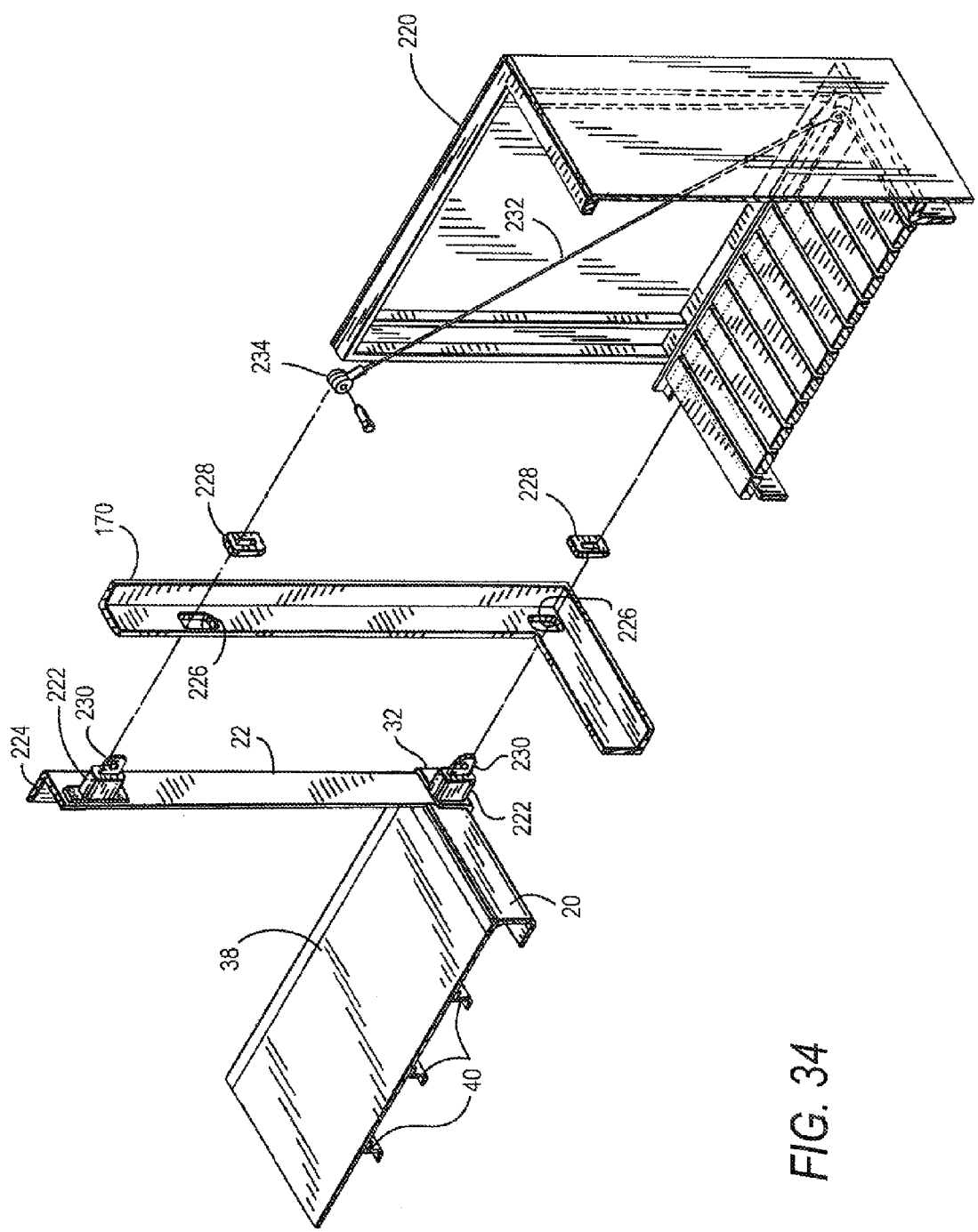
FIG. 34 is an enlarged exploded view of the component of FIG. 33.

For example, and as shown in FIGS. 33 and 34, a facade accessory such as a balcony 220 may be bracketed off of a VUC 10, using a structural attachment that properly resists gravity and wind loads. Illustratively, such an attachment may comprise a plurality of rectangular tube stub beams 222, fabricated of stainless or galvanized steel, and each welded either to a node 32 or to a plate 224 that is bolted to a corner post 22 at a predetermined distance above or below an adjacent node 32 (preferably, holes for the bolts are pre-formed in the corner post 22 at the VUC factory, and a temporary gasketed compression fitting is installed to prevent water penetration during the transit from factory to job site). If the anticipated load will be greater than that which a standard corner post is designed to resist, then additional stiffening may be added to the inside of the corner post at the VUC factory. Each stub beam 222 is bolted to the corner post 22 at the staging area (at or near the job site), before the facade face frame 170 is mounted. The facade face frame 170 is fabricated with openings 226 that match the profile(s) and locations of stub beams 222, and which allow facade face frame 170 to be mounted over stub beams 222. Preferably, a pre-molded elastomeric boot 228 forms a seal between facade face frame 170 and each stub beam 222 to prevent water penetration.

The outer end of stub beam 222 may be shaped, punched, or fitted with hardware, so as to sponsor a variety of connections for the purpose of mounting a facade accessory. Illustratively for a balcony, and as shown best in FIG. 34, stub beams 222 carry a protruding tab 230 which (for the lower connections, only one of which is shown in FIG. 34) is adapted to be received in a pre-formed slot (not shown) situated at the inboard base of balcony 220, or to which (for the upper connections, only one of which is shown in FIG. 34) a diagonal hanger rod 232 fitted at its upper end with a first conventional jaw fitting 234 may be attached, first jaw fitting 234 being fastened to tab 230, and hanger rod 232 extending to a second jaw fitting 235 located at its lower end, fastened at or near the outboard base of balcony 220.

Figure 35:
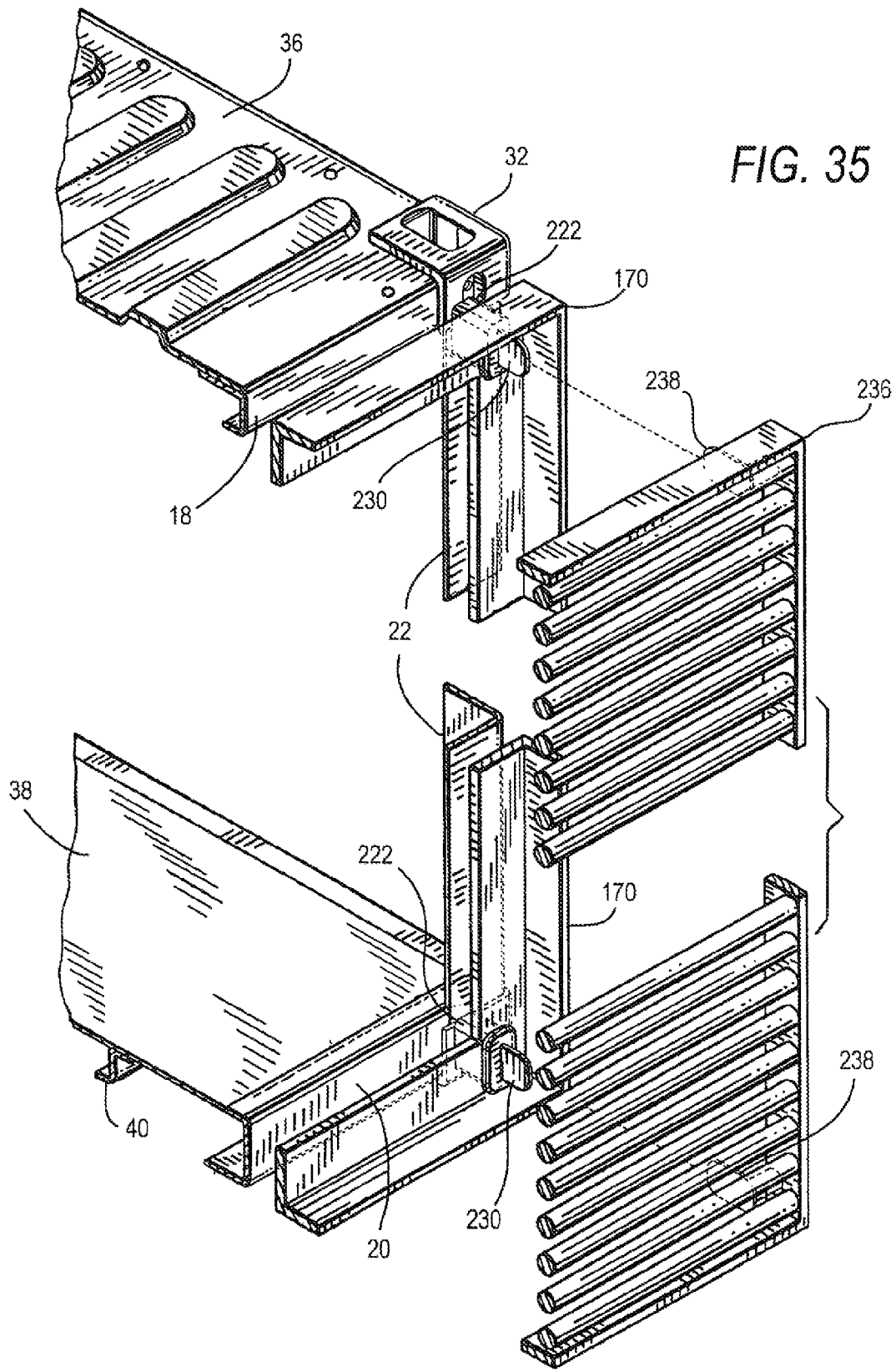
FIGS. 35-36 are perspective views of other optional components of the facade structure.
Figure 36:
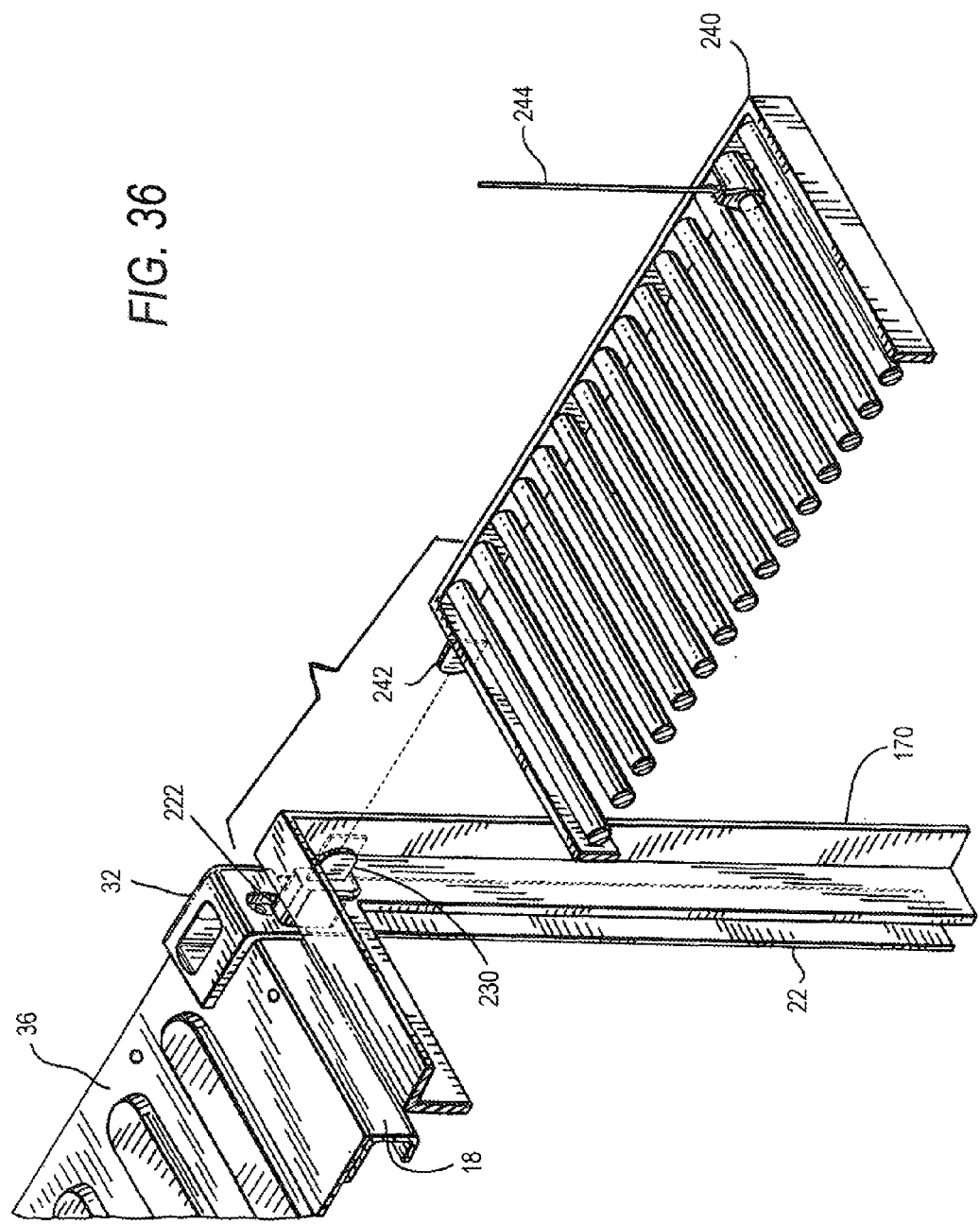

Similarly, as illustrated in FIG. 35 for a fixed, grille-type sunshade device 236, the tabs 230 on stub beams 222 may simply be fastened (for both the upper and lower connections) to corresponding pre-formed inward projections 238 on sunshade 236, while as shown illustratively in FIG. 36 for an operable, grille-type sunshade device 240, the tabs 230 on stub beams 222 may be pivotably fastened in a conventional fashion to pre-formed inward projections 242 on sunshade 240 (for the upper connections), with sunshade 240 being attached at its lower end to a tension hanger 244 extending from a supporting structure (not shown).

Figure 37:
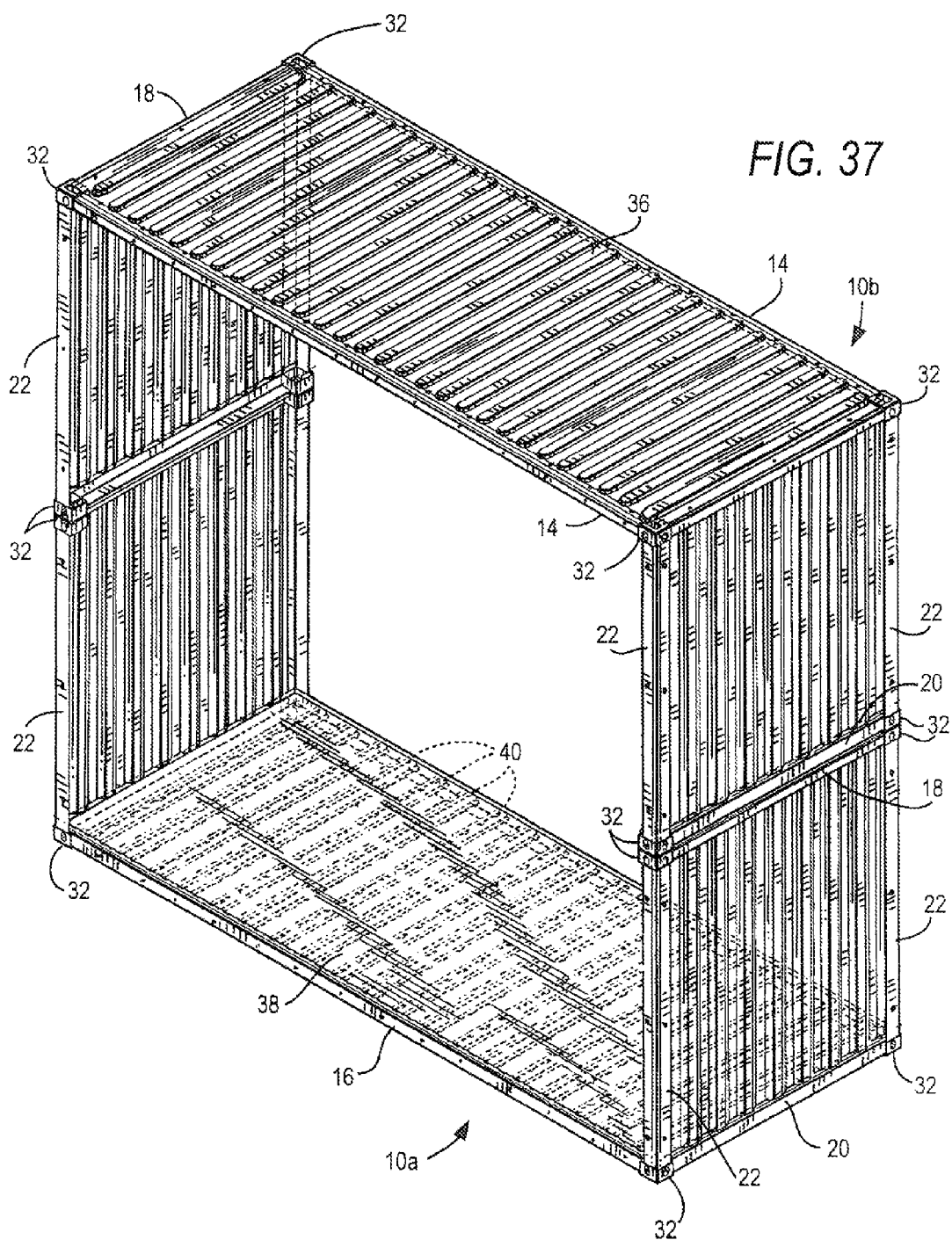
FIG. 37 is a perspective view of two alternate embodiments of a volumetric unit of construction which, when combined, create a double height volumetric space when compared with the dimensions shown in FIG. 1.

Turning next to FIG. 37, an alternate configuration for a VUC is shown. Although as set forth above the value of dimension C (as shown in FIG. 1) is commonly nine feet six inches, two VUC's can be configured, where needed, to provide a "double height" space, such that dimension C is nineteen feet. As shown in FIG. 37, the lower VUC 10a has a floor deck 38, corner posts 22, nodes 32, lower side and end rails 16, 20, and upper end rails 18, but no upper side rails and no roof, while the upper VUC 10b has a roof panel 36, corner posts 22, nodes 32, upper side and end rails 14, 18, and lower end rails 20, but no lower side rails and no floor. Apart from these differences, however, a double-height VUC may be fitted out and finished at the factory in the same manner as a single height VUC (as described elsewhere herein), and may also be transported and craned into place in the structure being erected, provided that, for the latter, temporary bracing is added to the interior for additional stiffness. Moreover, after being craned into place, the perimeter rails, corner posts and intermediate posts (if any) of a double-height VUC may be stitched to the respective perimeter rails, corner posts and intermediate posts (if any) of adjacent single- and/or double-height VUC's, in the same manner as described above, and in addition, subject to certain height restrictions that are based upon load considerations (to be mentioned hereinafter), double-height VUC's may also be stacked one upon the other in the formation of multi-story structures.

Although not shown in the drawings, it will be understood by those of skill in the art that other alternate rectangular configurations are also possible for a VUC. For example, VUC's may be manufactured using a smaller value for dimension A than is standard for an ISO-compliant cargo container, and then, for purposes of transport, a number of those units may be temporarily connected together so as to conform to the standard value of eight feet. Thus, the value for dimension A may be chosen to be four feet, or two feet eight inches, or even two feet, and then two four-foot-wide units, or three two-foot-eight-inch-wide units, or four two-foot-wide units, could be assembled temporarily so that the overall width of the combined units would equal eight feet. Virtually any combination of non-standard values for dimension A which, when combined, would total the ISO standard width value of eight feet, may be used without surrendering the advantages that are obtained by transporting the VUC's as volumetric rectangular blocks using the ISO intermodal transportation system. Similarly, values for dimensions B and C that are smaller than their respective ISO standards, but which, when combined, add up to those standards, may also be utilized.

Figure 38:
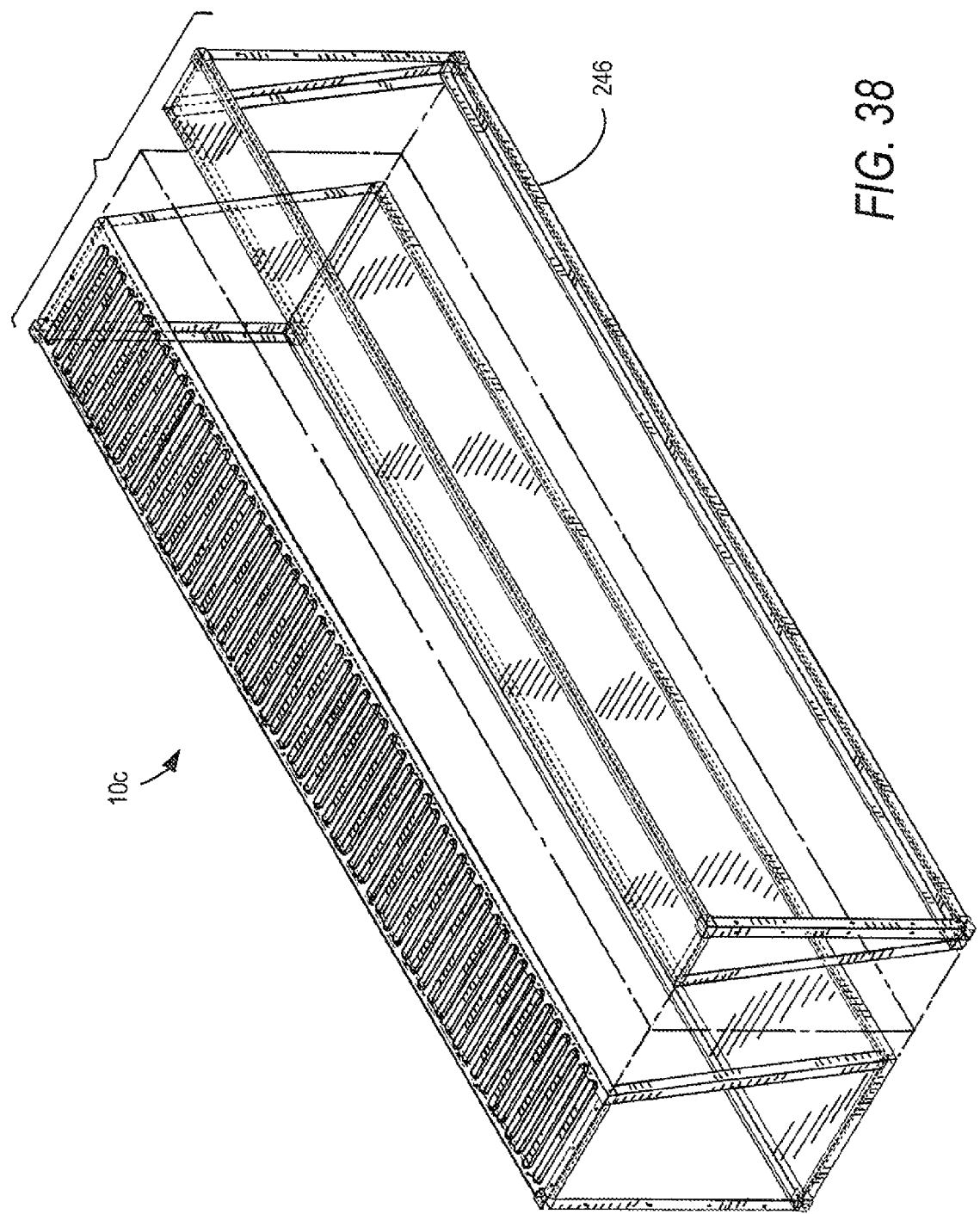
FIG. 38 is a perspective view of another volumetric unit of construction having dimensions differing from that shown in FIG. 1.
Figure 39:
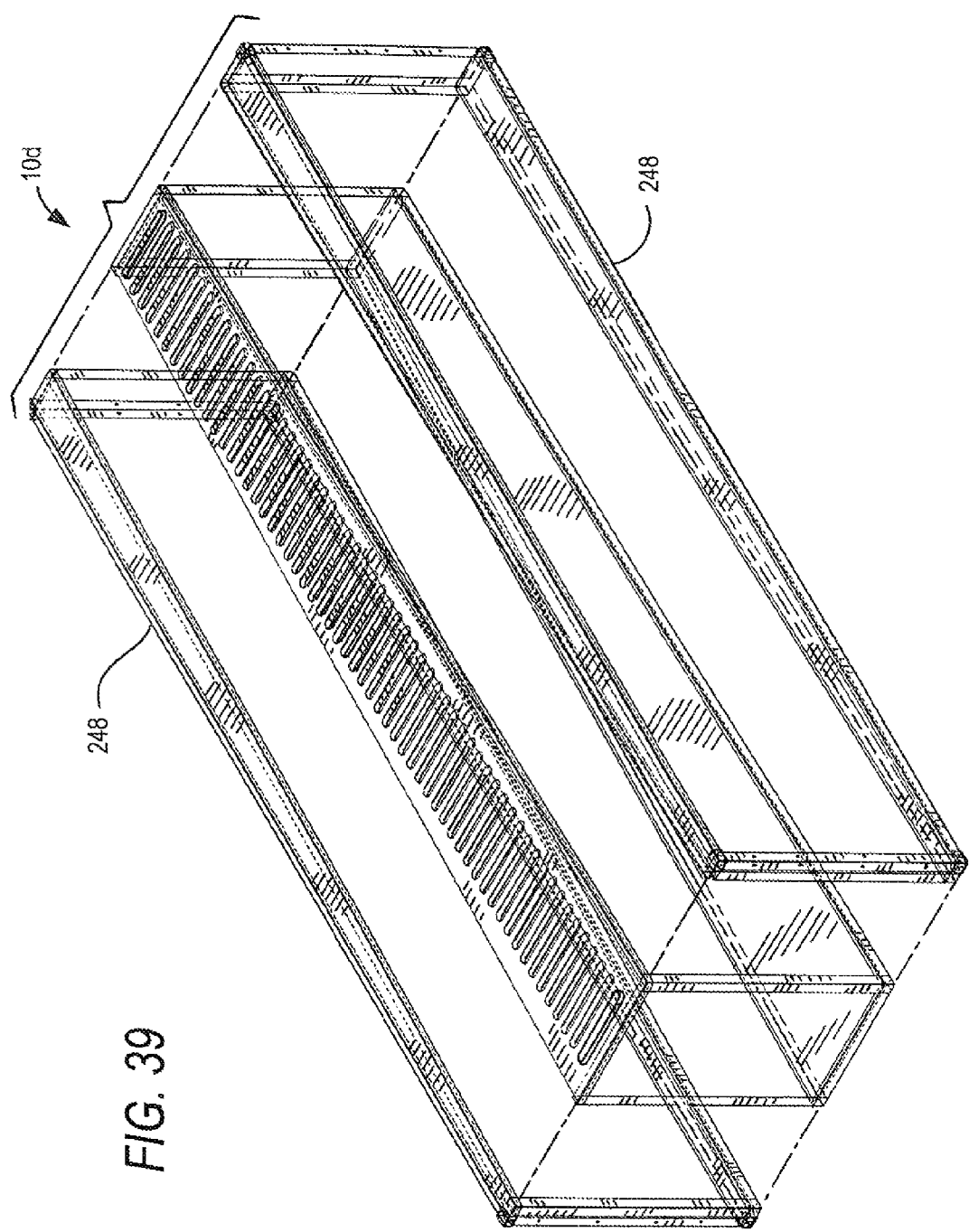
FIG. 39 is a perspective view of still another volumetric unit of construction having dimensions differing from that shown in FIG. 1.
Figure 40:
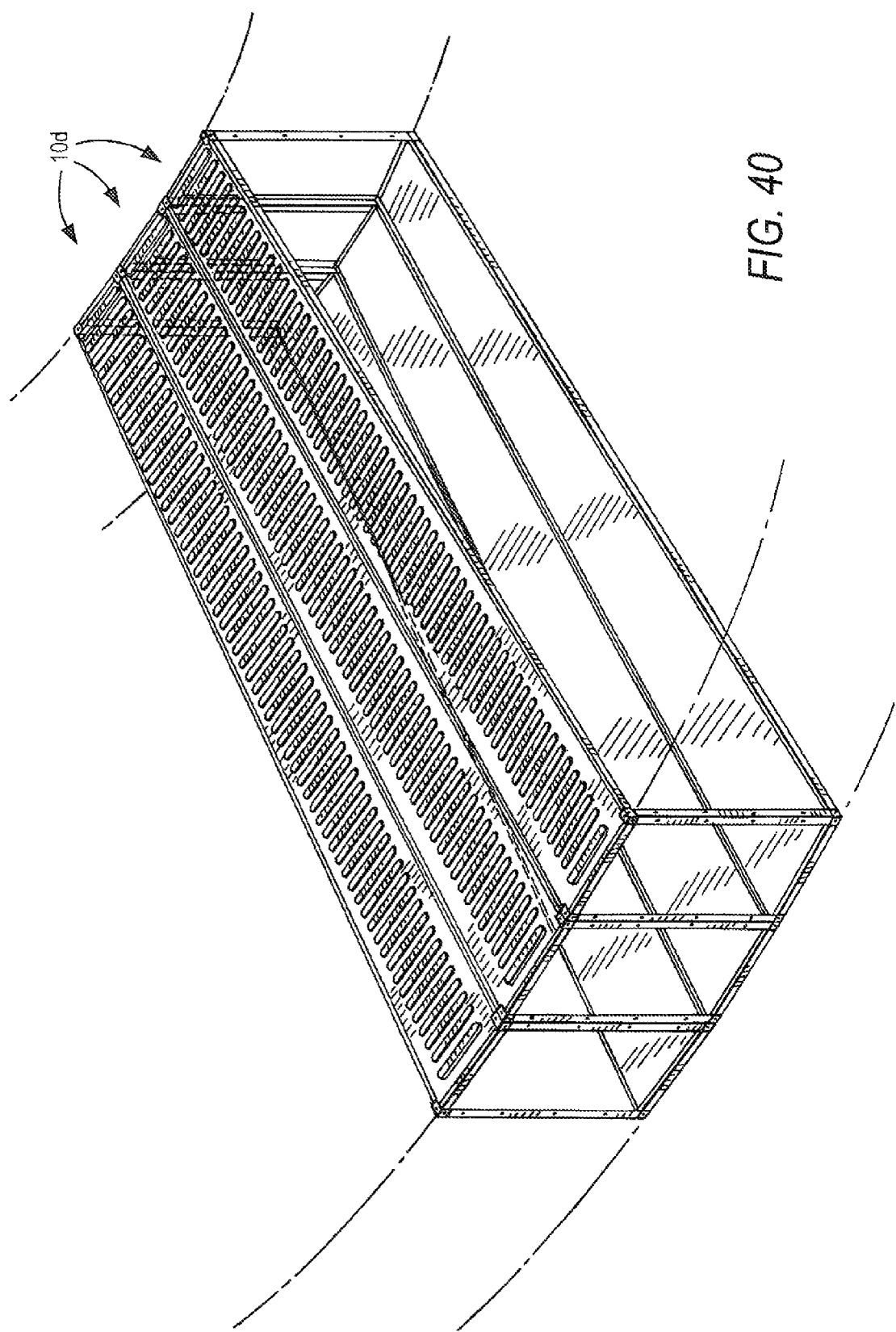
FIG. 40 is a perspective view showing three volumetric units of construction of the dimensions shown in FIG. 39.

Referring now to FIGS. 38-40 in addition to the aforementioned FIGS. 1-37, although most typically a VUC will be shaped as a rectangular parallelopiped, other configurations are possible; virtually any shape that can be inscribed within the boundaries of a standard ISO cargo container can be used. For example, as shown in the drawings, a VUC that is trapezoidal in cross-section (either as an isosceles trapezoid or as a non-isosceles trapezoid, the latter being illustrated by VUC 10c in FIG. 38), as well as a VUC that is trapezoidal in plan (as illustrated by VUC 10d in FIG. 39), may be used, the former to create building facades that slope inwards or outwards, or that zig-zag in and out (not shown in the drawings), the latter to create non-orthogonal, plan forms. FIG. 40 illustrates an example of the manner in which several VUC's 10d having the alternate configuration depicted in FIG. 39 may be aggregated to achieve a structure with a curvilinear facade.

These irregular VUC's will require temporary framing or outriggers, as illustrated at 246 and 248 in FIGS. 38 and 39, respectively, with nodes situated so as to create aggregates that conform to ISO dimensional standards and tolerances, enabling those temporary aggregates to be transportable as volumetric rectangular units using the ISO intermodal transportation system; the temporary frames or outriggers 246, 248 would then be removed at or near the job site, prior to craning of the irregular VUC's for incorporation into the structure being erected. As will be evident, other irregular building shapes may be created, for example, by varying the geometry of the facade plane of the constituent VUC's, while keeping the remaining five faces of each VUC orthogonal, and keeping all node-to-node relationships normative (that is, there is full contact and alignment at the interface of each pair of mated nodes).

Figure 41:
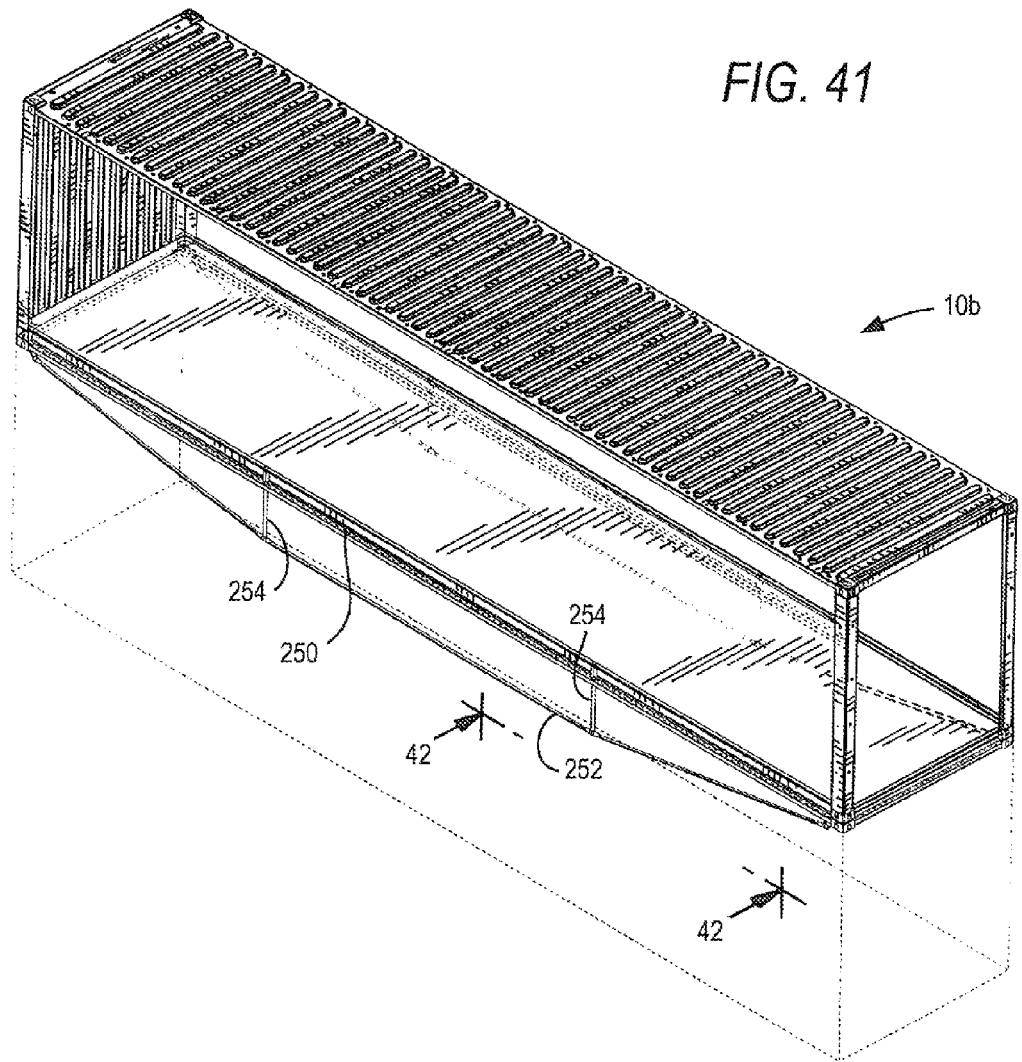
FIG. 41 is a perspective view showing another alternate configuration of the preferred embodiment of the present invention.
Figure 42:
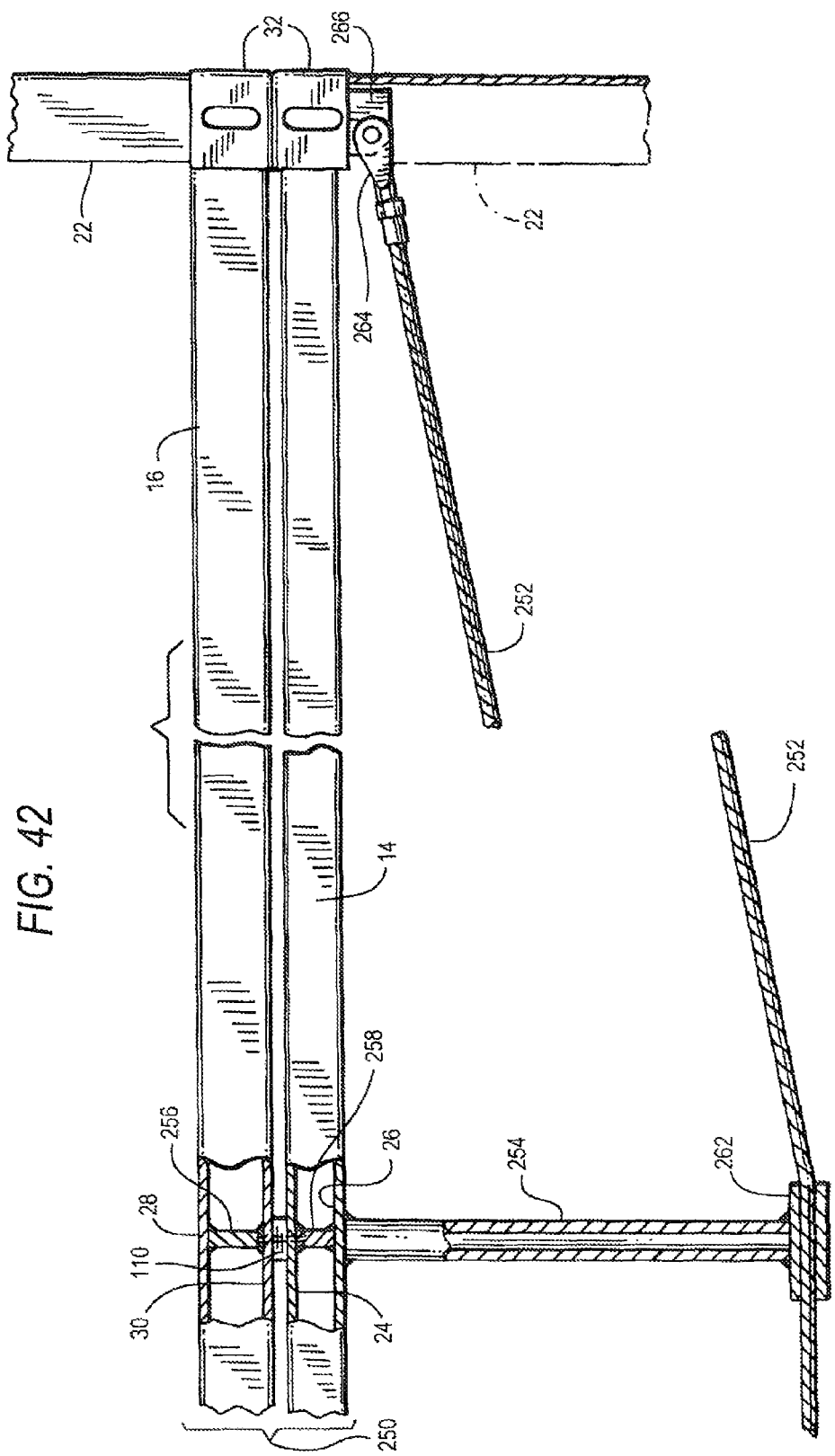
FIG. 42 is an enlarged partial elevational view, taken substantially along the lines 42-42 of FIG. 41.

Turning next to FIGS. 41 and 42, in accordance with another aspect of the invention the incorporation of a tension truss into the structure of a VUC is shown. Provided that the upper side rail 14 of a VUC will be bolted to the lower side rail 16 of another VUC in the level above (or to the side rail of a roof module, the roof module to be described in further detail hereinafter), so to form a beam-stitched composite rail 250 as discussed hereinbefore, the tension truss reinforces the floor of the VUC in the level above (or the surface of the roof member, as the case may be) and/or eliminates the need for an intermediate post where one would otherwise be necessary to support a clear span extending more than twenty-four feet. Specifically, as shown in FIG. 41, the floor stiffness of a VUC 10b (or of a roof module [not shown]) may be increased by incorporating a tension member, such as a tension rod or cable 252 that is held off of the composite rail 250 by one or more compression members, such as downwardly-projecting compression posts 254 fastened to that rail, thereby imposing on cable 252 either a simple "V" shape (if only one post 254 is used) or, as shown in FIGS. 41 and 42, a funicular polygonal shape (if more than one post 254 is used).

Compression post(s) 254 may be fastened to the composite rail 250 by any number of methods well known to those of skill in the art. For example, as shown best in FIG. 42, compression post 254 may be welded at one end to the bottom of flange 26, along the centerline of a representative beam stitch bolt 110, and a stiffening member such as a stiffener plate 256, also disposed on the same centerline, may be welded to flanges 24 and 26, the stiffener plate extending inwardly between those flanges by approximately the same distance as flange 26 itself extends inwardly; another stiffener plate 258, disposed on the same centerline, may be welded to flanges 28 and 30, with stiffener plate 258 extending inwardly between those flanges by approximately the same distance as flange 28 extends inwardly. The other end of compression post 254 may be fitted with a clamp 262 so as to hold tension cable 252 at the apex of the "V" (if only one post 254 is used) or at each of the apices of the funicular polygon (if more than one post 254 is used), with tension cable 252 being fastened at each of its ends to a node 32 of the VUC 10a in the level below by means of a conventional jaw fitting 264 connected to a steel gusset plate 266 welded to the node.

Tension may be applied to cable 252 by several different means such as a turnbuckle arrangement (not shown), either as a turnbuckle integrated with cable 252 or as a threaded device integrated into jaw fitting 264, and enough tension is applied to remove slack and to apply sufficient upward force so as to ensure that cable 252 is always engaged (but not so much as to cause excessive upward camber in composite rail 250), thereby transforming composite rail 250 into a pure compression member by virtue of it becoming the top chord of a truss. Typically, the side rails of each VUC utilized in a multi-story structure could be supplemented with such a tension truss, and the tension trusses at adjacent VUC's could be configured as parallel pairs.

Since the use of such a tension member significantly increases the spanning capability and stiffness of the VUC floor system, it may also be utilized so as to transfer structural loads across double-height and multi-story interior spaces within the structure being erected. By properly sizing the tension truss members and also proportioning the geometry of the funicular polygonal shape, the structural loads of additional stories may be transferred across the double height space, with the intermediate posts 42 in the VUC's above aligning vertically with the struts 254 supporting the tension truss.

Figure 43:
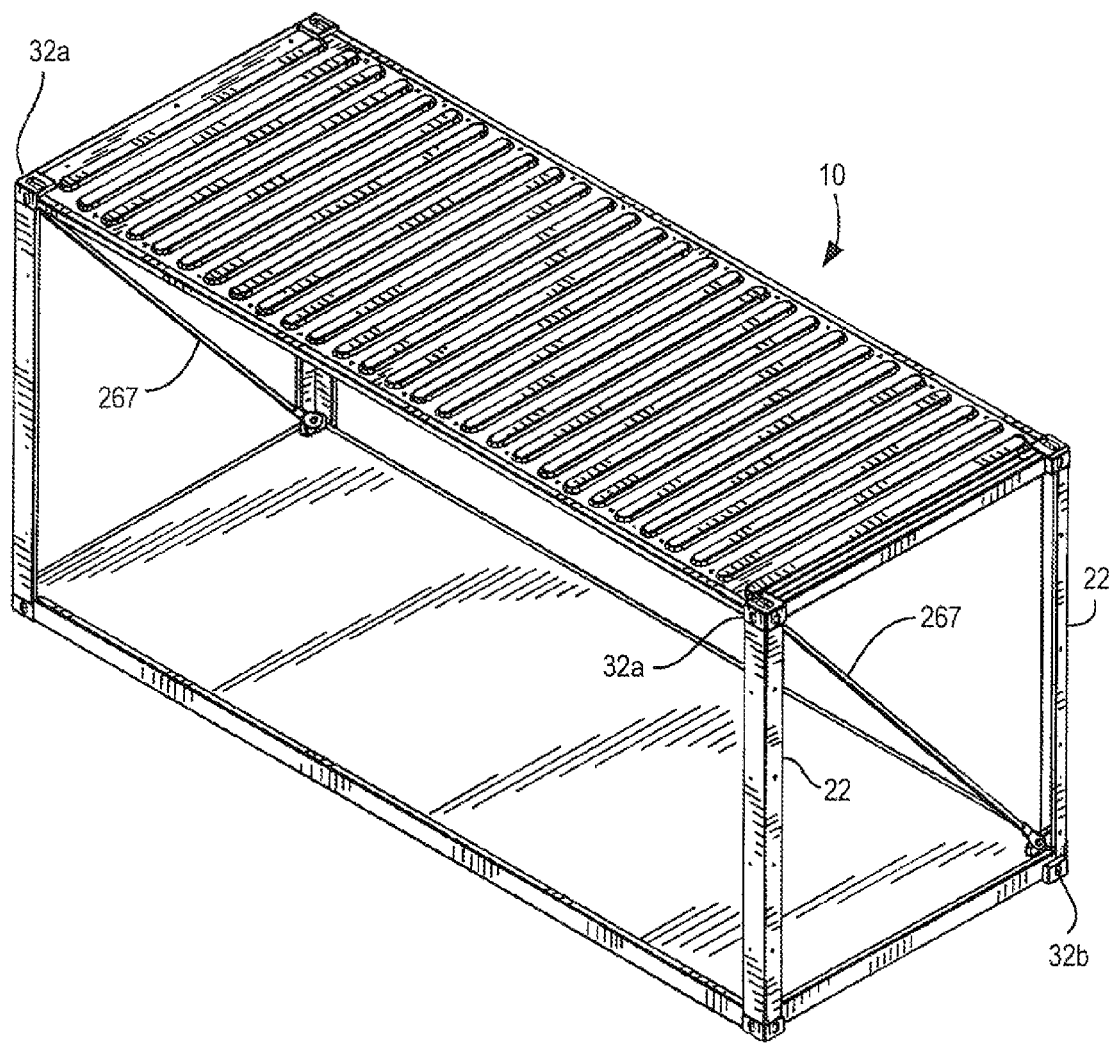
FIG. 43 is a perspective view showing yet another alternate configuration of the preferred embodiment of the present invention.
Figure 44:
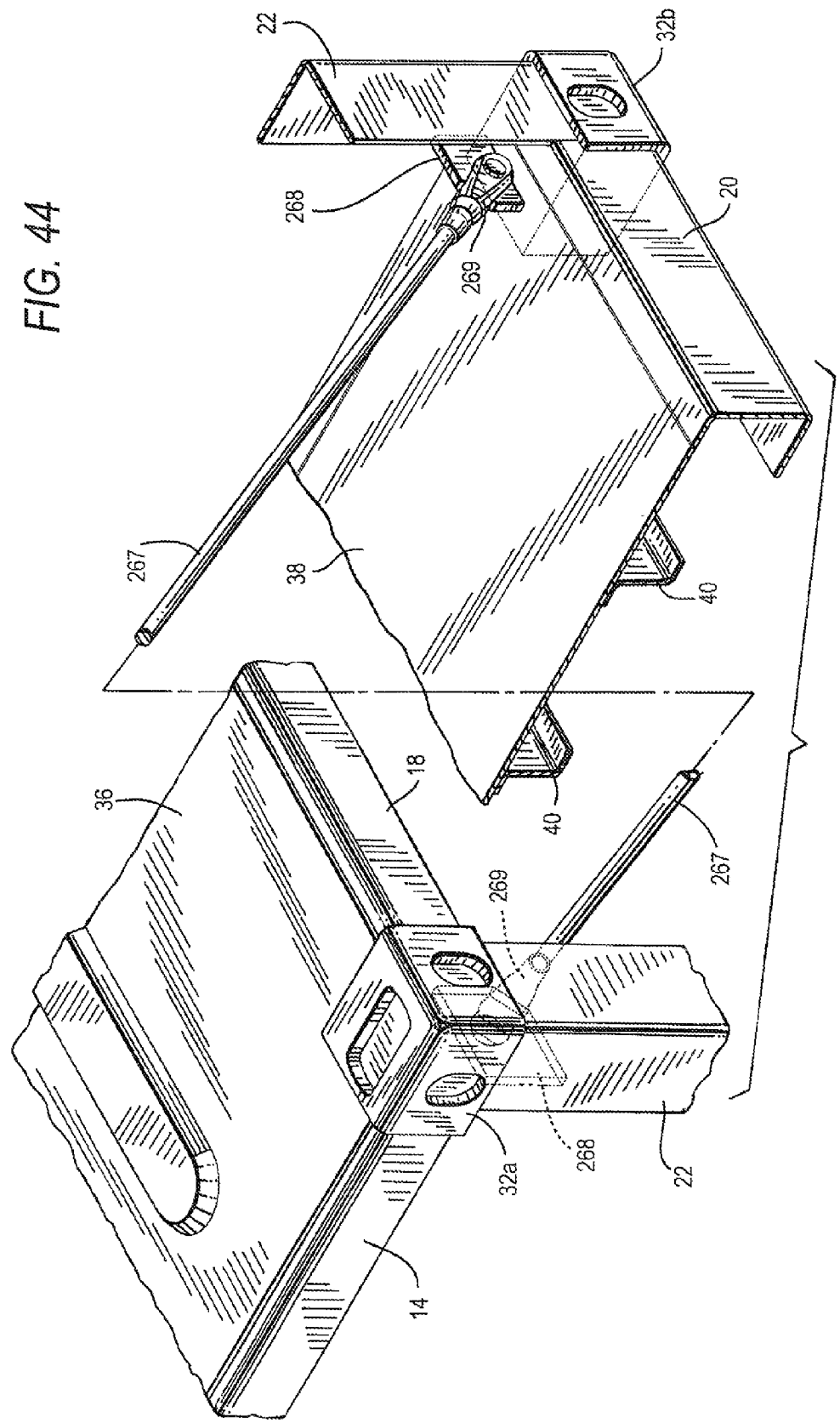
FIG. 44 is an enlarged perspective view of two regions of the feature shown in FIG. 43.

FIGS. 43 and 44 illustrate the incorporation of diagonally-oriented tension members into a VUC structure which does not otherwise incorporate any shear wall panels, in order make possible, in the structure being erected, overhanging or "cantilevered" VUC's which create habitable spaces that project horizontally, beyond any direct vertical support. As is well known in the art, diagonally-oriented tension members such as hanger rods may be used to transmit loads from a cantilevered structure to adjacent, non-cantilevered, horizontal and vertical structural framing members. This is best accomplished in the context of the present invention if the VUC nodes themselves are used to make the connections to the hanger.

As shown in FIG. 43, a VUC 10 may be provided with at least one tension member 267 (which could take the form of a cable or a strut or a rod) which is fastened at one end to an upper node 32*a* and at the other end to a lower node 32*b* that is in the same vertical plane as, but diagonally opposite, upper node 32*a*, by means of a plate, clip, bracket or other appurtenance, preferably a steel gusset plate 268 which is welded to the node between the corner post and the adjacent rail, and which is fitted so as to make a connection with tension member 267, the gusset plate 268 preferably adapted to receive a conventional jaw fitting 269; these fastening elements are shown best in FIG. 44. It should be understood that if a cantilevered VUC incorporates a clear span of more than twenty-four feet, and therefore comprises a pair of intermediate posts aligned opposite one another for additional support, then a similar diagonally-oriented tension member (not shown in the drawings) must be fastened, at one end, to the point where the inboard member of the pair of intermediate posts intersects the upper side rail, and at the other end to the point where the outboard member of the pair of intermediate posts intersects the opposite lower side rail; if necessary, this diagonally-oriented tension member between the two intermediate posts can thereafter be concealed by an internal partition (not shown).

Loads from the cantilevered VUC are transmitted, through tension members 267, to the inboard corner posts, where the reaction is divided between the load passing downward through the corner posts of the adjacent VUC (eventually to the ground, through a footing or other substructure), and the load that is transmitted to the horizontal framing members of the adjacent VUC; for the latter portion of the load, another diagonal member such as a rod (not shown), similar to tension member 267, or a shear panel (not shown) is placed in the load path at a location where it can re-direct the load from the horizontal framing to a vertical post and then downwardly, eventually to the ground.

Figure 45:
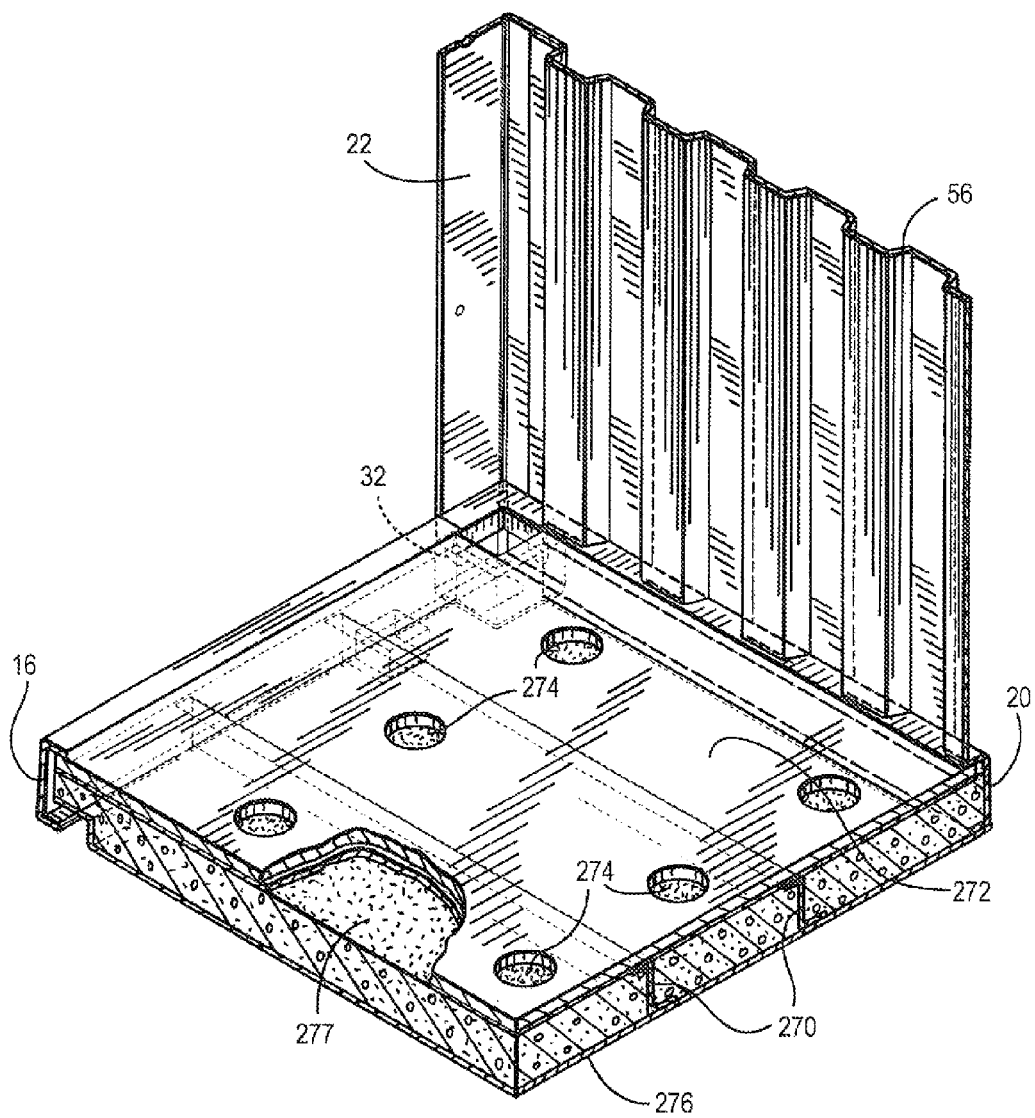
FIG. 45 is an exploded perspective view showing a modification of the preferred embodiment of the present invention, and illustrating one mode of achieving it.

FIGS. 45-48 illustrate alternate structures and compositions for the floor deck of VUC 10, as well as modes of achieving those alternate structures. Although in the preferred embodiment as described above the sub-floor deck 38 of VUC 10 is comprised of steel plate, an acceptable alternative, in order to increase stiffness and/or to reduce structurally transmitted sound from impacts such as footfalls, and also to provide a non-combustible and fire-rated base for the finished floor assembly that will enable VUC 10 to meet various building codes in effect throughout the U.S. and elsewhere, is a concrete sub-floor which, as shown in FIG. 45, may preferably be created by initially providing VUC 10 at the factory with a plurality of formed metal floor joists 270, similar or identical to floor joists 40 as described hereinbefore, and with a standard, ISO-compliant plywood floor deck 272, the latter supported by floor joists 270 at the same sub-floor elevation as the steel floor deck 38 described above, the plywood deck to serve as the floor of the VUC until it is transported from the factory to the staging area near the job site.

At the staging area, plywood floor 272 is prepared with a plurality of openings 274, preferably punched at regular intervals, and a sheet metal closure 276 is fastened to the bottom of floor joists 270 to act as form-work to contain the concrete. In addition, floor joists 270 are preferably provided with punched holes (not shown), which allow concrete to flow, in its plastic state, into the separate spaces compartmented by floor joists 270 so as to form (after the concrete cures) a monolithic structure from those concrete-filled spaces. Floor joists 270 may also be provided with reinforcements such as bars, clips, studs, ledge angles, etc. (also not shown) so as to engage the concrete to form a composite construction, the reinforcements optionally being insertable through the holes in floor joists 270 (not shown) so as to make the reinforcement continuous through all joist compartments. Thereafter, the concrete 277 may be introduced through openings 274, either by pumping it into the compartmented spaces from above, or by applying it using a spray nozzle from below, in which case sheet metal closure 276 is not required. Plywood floor 272 is preferably left in place to serve as a floor underlayment (to which a finished floor may subsequently be screwed, glued, etc.).

Figure 46:
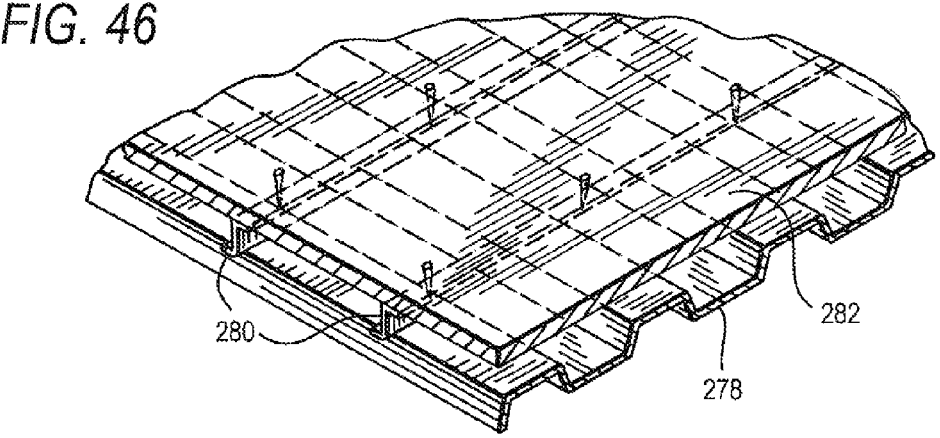
FIGS. 46-48 are sequential views showing an alternate mode of achieving the modification of FIG. 45.
Figure 47:
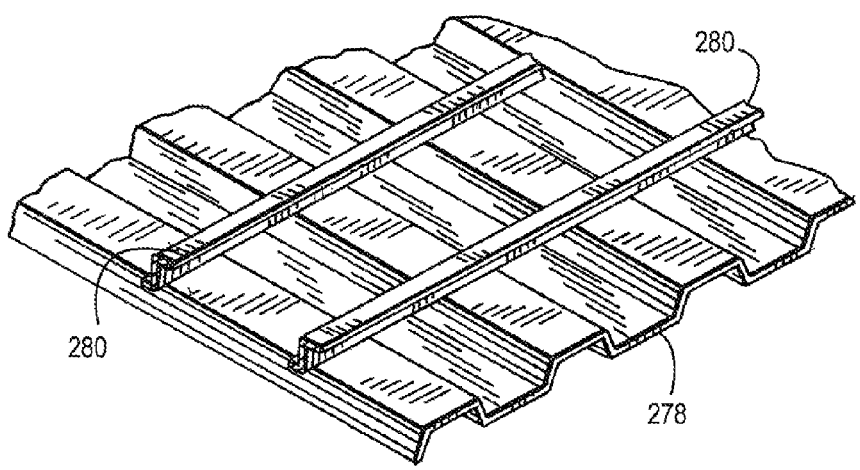
Figure 48:
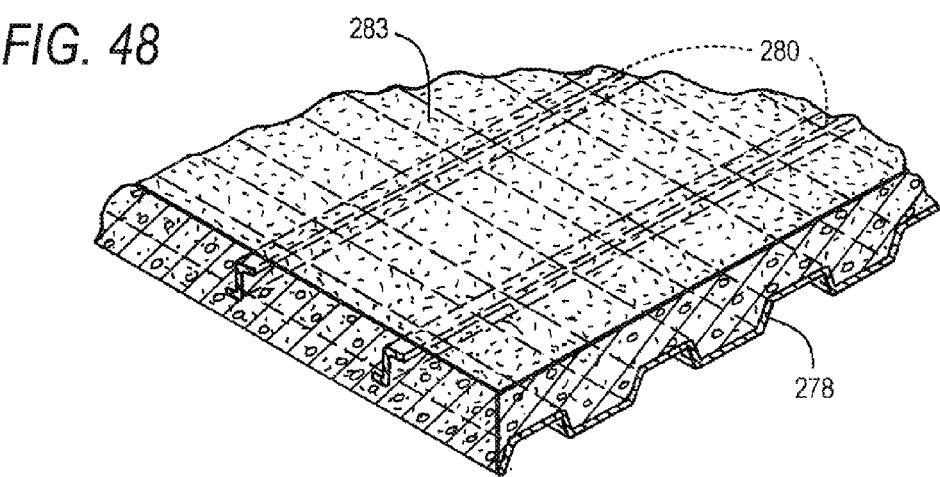

Alternatively, and as shown in FIGS. 46-48, VUC 10 may be provided at the factory with a floor deck 278, set to a predetermined depth below the conventional sub-floor elevation and fabricated of corrugated steel, with the flutes of the corrugations parallel to the shorter side (dimension A as shown in FIG. 1) of the VUC. A plurality of formed metal runners 280, preferably "Z"-shaped in cross-section, are then welded to the upper surface of floor deck 278, perpendicular to the corrugations, and a standard plywood floor 282 is fastened to runners 280 so as to provide a temporary floor at the same sub-floor elevation as steel floor deck 38 as described above, the plywood deck 282 to serve as the floor of the VUC until it is transported from the factory to the staging area at or near the job site. At the staging area, plywood floor 282 is unfastened and removed, and concrete 283 is poured into the corrugated floor deck 278 up to the level of the sub-floor elevation, with runners 280 left in place to serve as reinforcement for the concrete.

Although in the preferred embodiment of the invention, the nodes 32 of each VUC 10 must be formed in strict compliance with the ISO standards for cargo container corner fittings, including those standards relating to the size and shape of the corner fittings as well as the standards relating to the size, shape and position of the access ports 34, acceptable alternatives for the shape of the nodes 32 may be available for use in the present invention, provided that the size, shape and relative positions of the access ports 34 remain constant. Referring now to FIGS. 49-52 in addition to the aforementioned FIGS. 1-48, variant shapes for nodes 32, as well as for the associated guide pin(s) (if any), are illustrated. Specifically, although an ISO-compliant node will be rectangular both in plan and in section, changing the shape of the node so as to be square in plan, that is, so that face 284 is square, as shown in FIG. 49, would facilitate the stacking of VUC's at right angles in successive levels, as Illustrated schematically in FIG. 50. In order to accommodate such stacking, a modified guide pin 290 could be used, in which the upper tapering portion 292 thereof, having the rectangular conoid shape, is rotated by ninety degrees with respect to the lower non-tapering portion 294 thereof.

Figure 52:
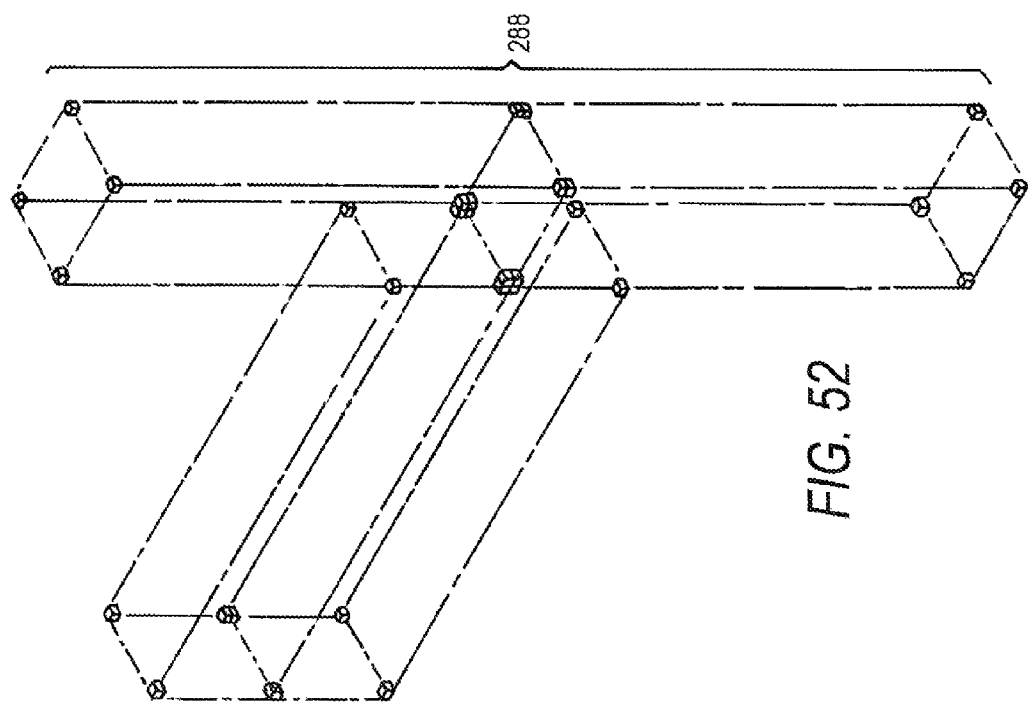
FIG. 52 is a diagrammatic view illustrating the environment for the feature shown in FIG. 47.
Figure 51:
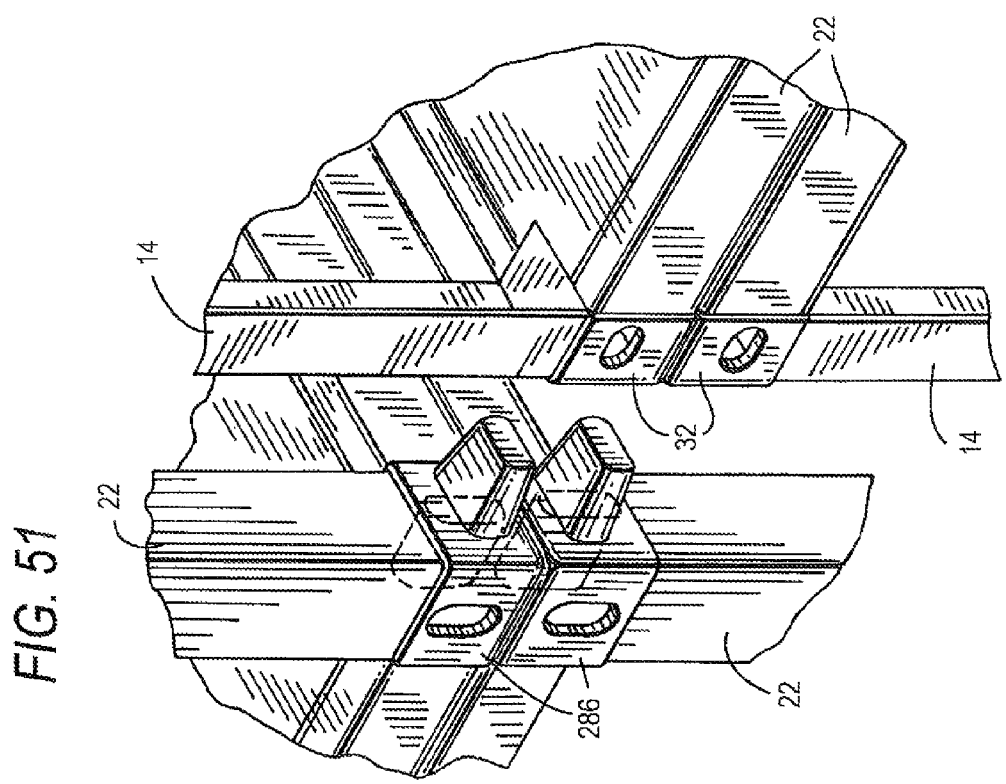
FIG. 51 is an exploded perspective view illustrating yet another modification of the preferred embodiment of the present invention.

Similarly, as shown in FIG. 51, changing the shape of the node so as to be square both in plan and in section, that is, so that all faces are square (resulting in a node that is essentially cubic in shape, as indicated at 286), would facilitate the arrangement of VUC's orthogonally, in the manner illustrated schematically in FIG. 52 (in which the VUC's stacked end-to-end vertically, as indicated at 288, could be used, for example, to form an elevator shaft or hoistway). In order to accommodate this configuration of VUC's, a further modified guide pin 296, comprising only the upper tapering conoidally-shaped portion 292 of guide pin 290 (illustrated in FIG. 49 and described above), could be used by fastening it transversely, as shown in FIG. 51, thereby superimposing it across one of the access ports on node 286.

Figure 53:
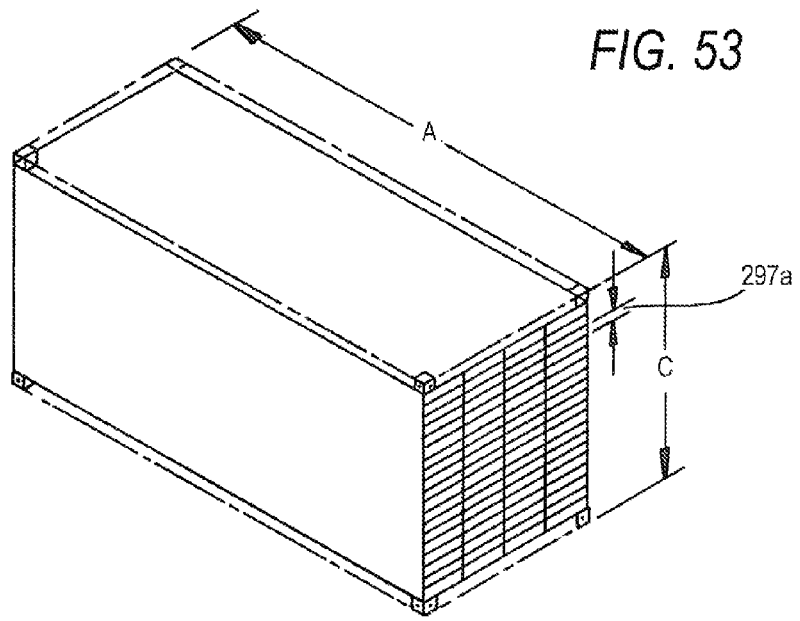
FIGS. 53-54 are diagrammatic views of another feature of the present invention.
Figure 54:
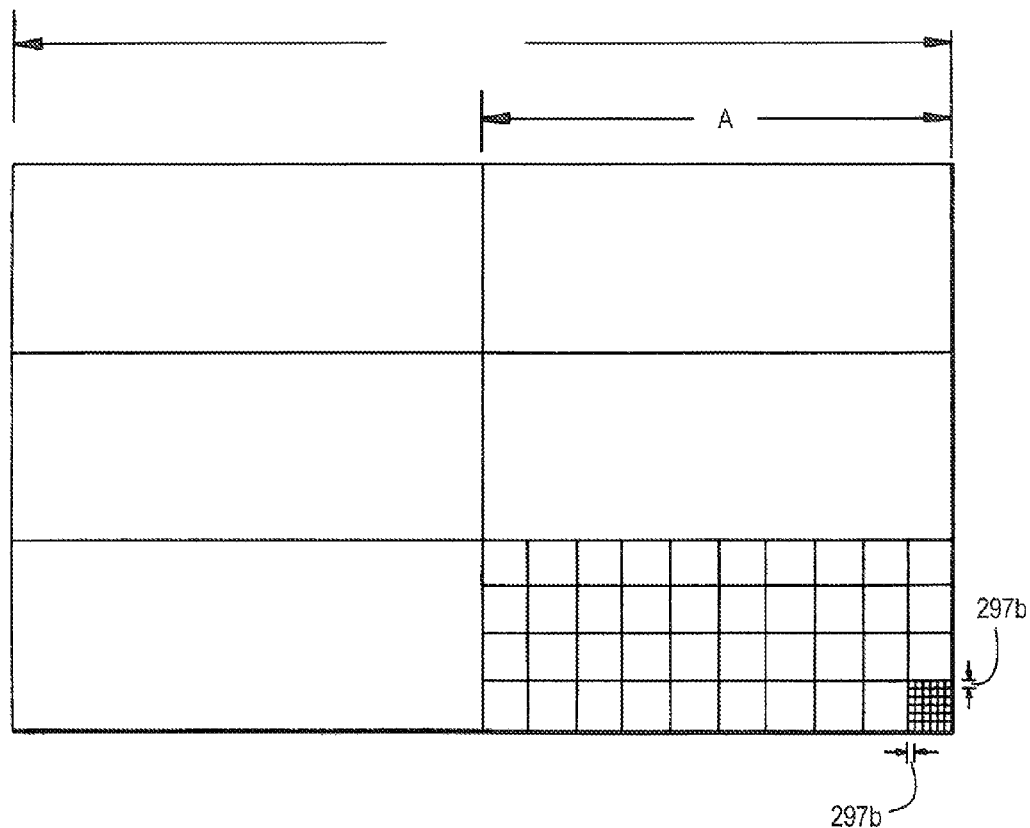

Turning now to another aspect of the present invention, the VUC may be subdivided internally in a hypothetical fashion in order to coordinate the dimensions and positioning of interior components, such as partitions, floor systems, ceiling systems, cabinetry, etc. FIGS. 53 and 54 illustrate diagrammatically hypothetical grids with which the interior space within one or more VUCs may be subdivided.

For the VUC's of the present invention, the largest common dimensional denominator in elevation is six inches, and therefore the subdivisions preferably occur every six inches vertically, as illustrated at 297a in FIG. 53, in which dimension A of VUC 10' is illustratively twenty feet. However, for the VUC's of the present invention in which dimension A is ten, twenty, thirty, forty or even fifty feet, the largest common dimensional denominator in plan is two feet, but this subdivision may be broken down into even smaller increments, and therefore the subdivisions preferably occur every four inches horizontally, as illustrated at 297b in FIG. 54 (in which six VUC's 10' are depicted as clustered together, but with the subdivisions depicted in only one of them). Other subdivisions are possible, provided that the dimensional units are small enough to allow for subtle adjustments in the interior layout and facade of the habitable space being constructed.

The use of grids that subdivide the VUC in three dimensions leads to standardization of the design and detailing of interior components so that they can fit together in a multiplicity of configurations. The VUC may be fitted with attachment points laid out on the grid, so that interior components can be installed with a minimum of connections. The attachment points function like nodes in miniature, in that the concept of standardization of the VUC itself for purposes of stacking VUC's, is translated into standardization of the interior elements for purposes of placing or installing them within a VUC.

The standardization of interior components and their application on a large scale can lead, in turn, to the development of new manufacturing technologies to reduce labor cost and waste, and to maintain and/or improve the prevailing standard of construction quality. Methods such as large scale injection molding, die casting, extrusion, stamping, etc., may be employed to manufacture rigid one-piece components out of a single material, rather than making them up out of multiple separate pieces of framing members and face panels that are mechanically fastened together.

The use of manufacturing technology, in contrast to traditional field construction, enables fabrication and installation tolerances to be reduced and improves the quality of buildings at the detail scale. Precise joinery and high quality surface finishes are attainable at a reasonable cost. Services, such as electrical and telephone/data wiring, may be fabricated as sub-assemblies and later incorporated into components like floors, partitions and ceilings in a way that allows those components to "plug in" to the building services infrastructure, as will be described in further detail hereinafter.

Figure 55:
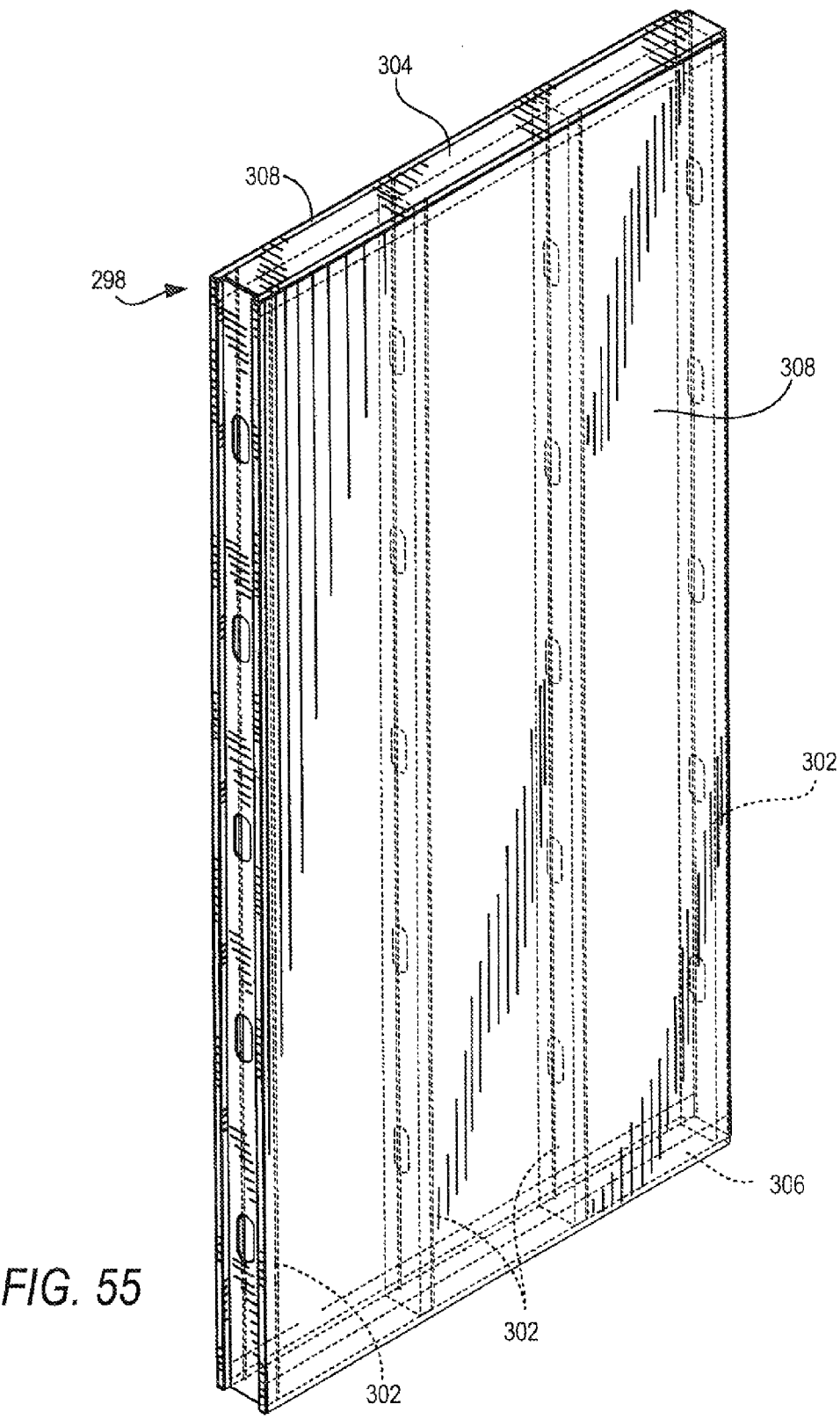
FIG. 55 is a perspective view of an modular interior partition panel for use with the present invention.
Figure 56:
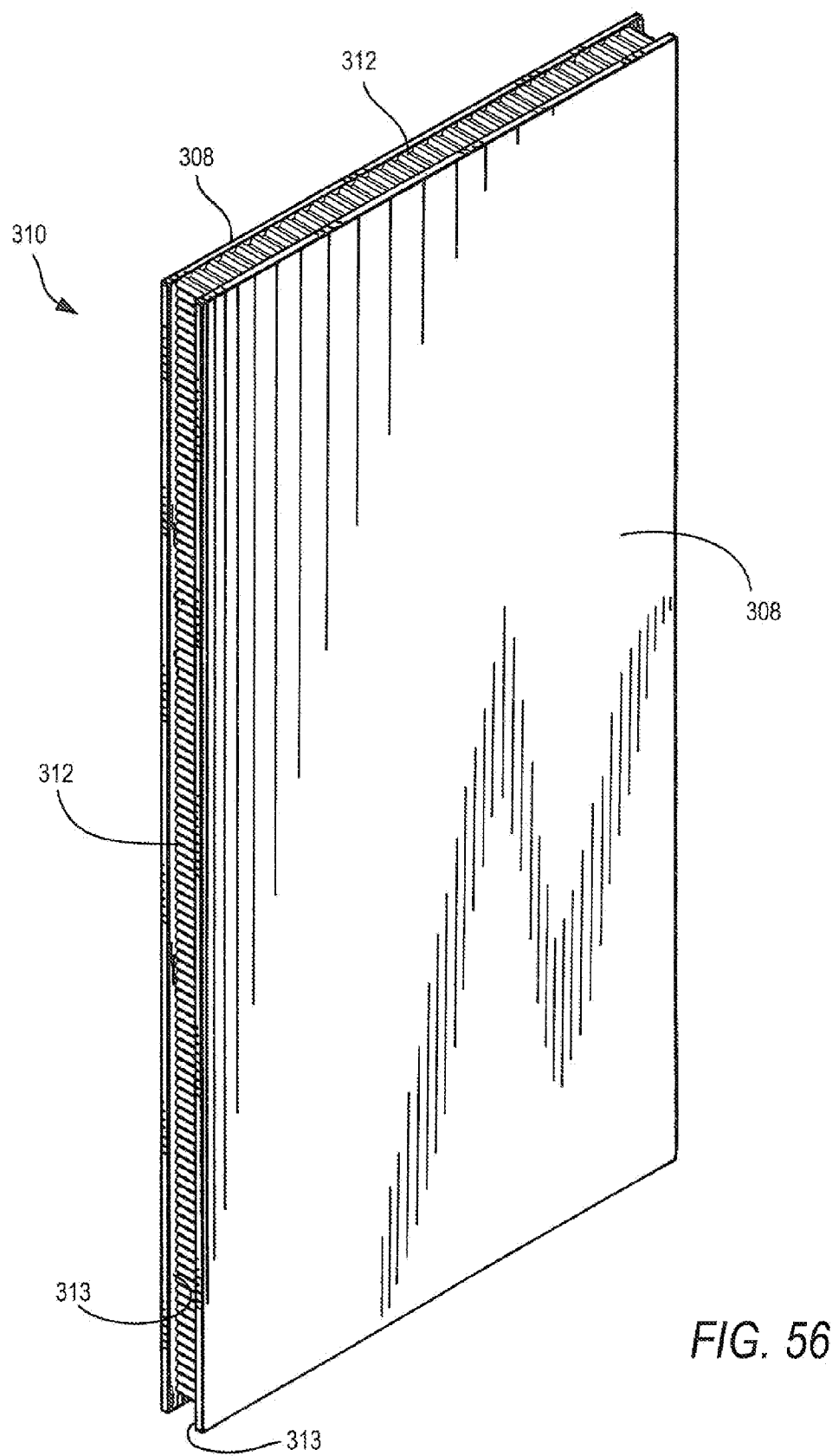
FIG. 56 is a perspective view of an alternative configuration for the modular partition panel of FIG. 55.
Figure 57:
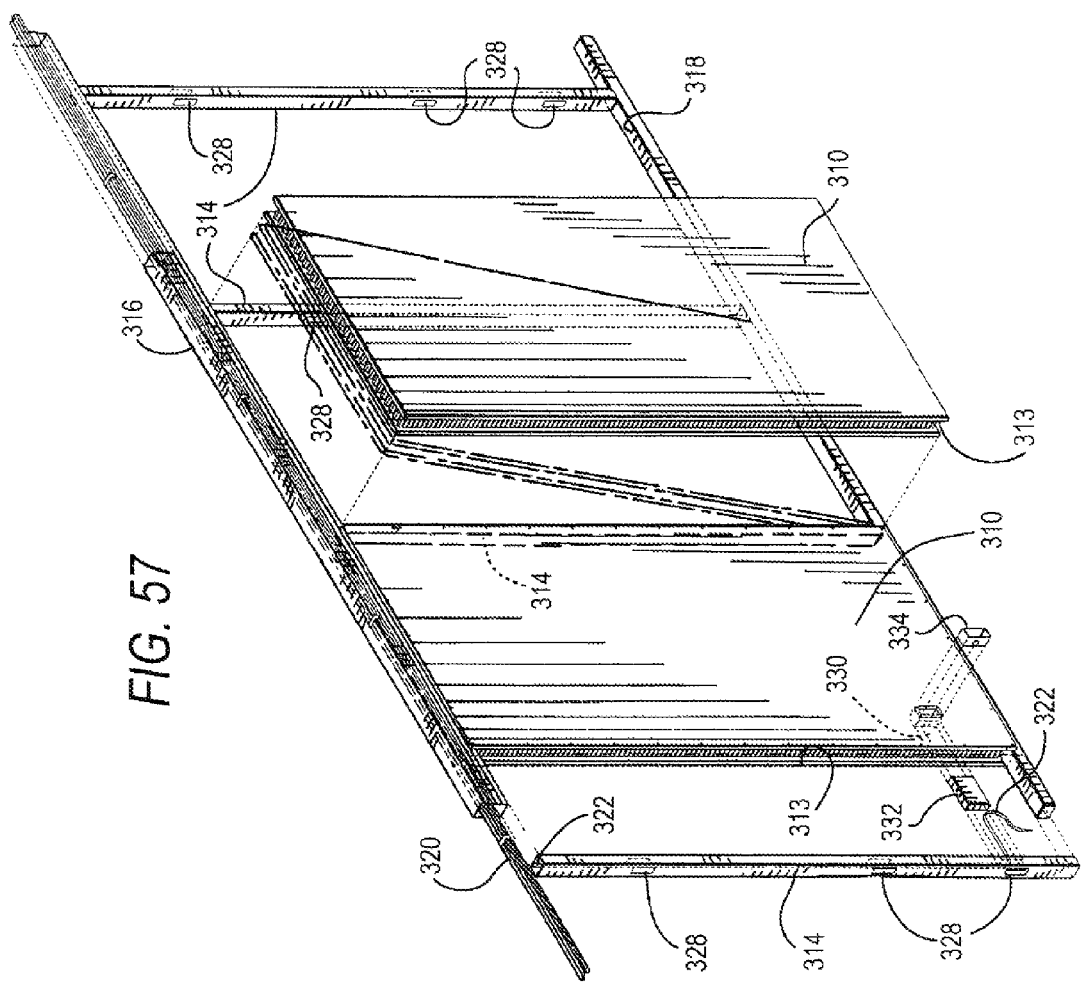
FIG. 57 is a diagrammatic perspective view showing the integration of several of the modular partition panels of FIG. 56 to form an interior partition.

FIGS. 55-57 illustrate the use of prefabricated partition panels within a VUC as a component of interior fit-out. In the conventional construction procedures of the prior art, the use of gypsum wallboard (also known as "drywall") fastened to metal stud framing is a common technique in which, after the exterior of a structure has been erected at the job site, a framework of horizontal tracks and vertical metal struts is formed in the interior. However, this approach is not acceptable for a structure comprising a plurality of VUC's, since the present invention contemplates installation of interior fit-out systems such as partitions (and other interior finishes, as well as other systems such as environmental systems and exterior envelope systems) at the VUC factory, followed by transport from the factory to the job site, where the VUC's are craned into place to form the structure being erected. Thus, another aspect of the present invention is directed to the use of facing panels such as conventional gypsum wallboard in the prefabrication (using modern industrial supply chain concepts) of modular partition panels, which may thereafter be combined in various ways and installed, all at the VUC factory, to form an interior partition layout.

As shown in FIG. 55, a modular interior partition panel 298 may be formed as a "sandwich" in which a framework comprising a plurality of conventional metal studs 302, oriented in parallel fashion and typically spaced on sixteen inch centers, each of which is fastened at one end to a metal top track segment 304 and at the other end to a metal bottom track segment 306, is embedded between two separate but substantially identical facing panels, such as conventional gypsum wallboard panels 308, each of which is fastened on an opposite side of the framework of studs. Preferably, and as illustrated in FIG. 55, the gypsum wallboard panels 308 are affixed to the framework such that they are offset from the edges of studs 302 by approximated one-half the width of a stud 302, so as to allow partition panel 298 to be "nested" adjacent an identical partition panel to form a continuous wall, thereby bringing the metal top track segments 304 and metal bottom track segments 306 of adjacent partition panels 298 into alignment.

An alternative modular interior partition panel 310 may similarly be formed as a "sandwich," as shown in FIG. 56, in which a monolithic honeycomb core material 312, typically fabricated of aluminum foil, Kraft paper or other materials that have been formed into cells, and no more than approximately six inches (typically less than four inches) thick, is embedded between two substantially identical facing panels, such gypsum wallboard panels 308, each of which is laminated to core 312 using an epoxy film adhesive (or other appropriate adhesive) that is applied with heat and under pressure until the adhesive cures. Preferably, however, as shown in FIG. 56, while the honeycomb core material 312 extends to the edges of gypsum wallboard panels 308 at the top, it is tailored to terminate approximately one inch inboard from the edges of those panels on the sides and at the bottom, so as to create recesses 313 (only one of which is shown in FIG. 56) to accommodate other elements to be described below. Acceptable honeycomb core material products are available, as prefabricated panels, from Plascore, Inc. of Zeeland, Michigan, U.S.A., and an acceptable epoxy film adhesive is marketed by J.D. Lincoln Inc. of Costa Mesa, Calif., U.S.A.

The prefabricated partition panels 310 as described above offer flexibility over the prefabricated partition panels 298 described earlier, in that the thickness of the honeycomb core material 312 can be varied, so as to accommodate the use of varying layers of facing panel material (e.g., gypsum wallboard) to meet acoustical, fire rating, architectural detail and/or other requirements, and still maintain a constant outside-to-outside thickness, e.g., five inches, for all partition panels. By contrast, conventional metal stud construction leads to a myriad of different partition thicknesses, depending on the number of layers of gypsum wallboard and additional finishes such as ceramic tile. This ability to standardize the thickness of the partition panels is critical in the process of standardizing all of the dimensions of the partition panels and laying them out on a predetermined planning grid.

Turning to another aspect of the partition panels, it is well known that electrical devices such as outlets, switches, and even light fixtures, as well as the wiring associated with such devices, are located in interior partitions throughout almost any habitable space, and in the conventional construction procedures of the prior art, such electrical devices and the associated wiring are almost always "roughed in" to the stud framework prior to the application of facing panels (such as gypsum wallboard panels) to that framework. This approach, however, is the antithesis of prefabrication, since each of the involved trades must work sequentially in the same space. The present invention, which allows electrical devices and associated branch wiring to be integrated with prefabricated partitions that have already been faced, such as with gypsum wallboard, overcomes this problem.

Figure 58:
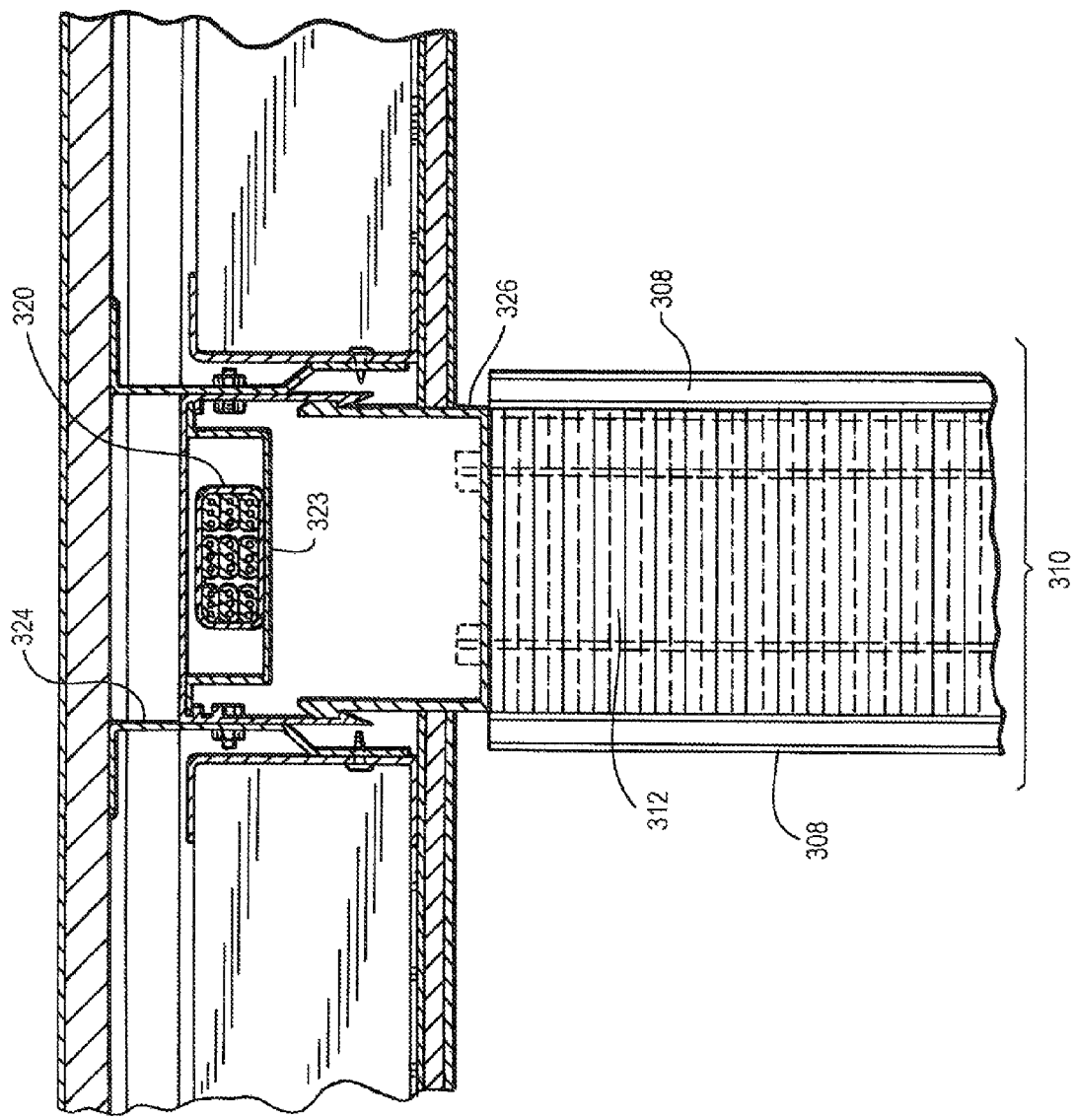
FIG. 58 is an enlarged representative cross-sectional view, showing further details of the partition elements shown in FIG. 57.
Figure 59:
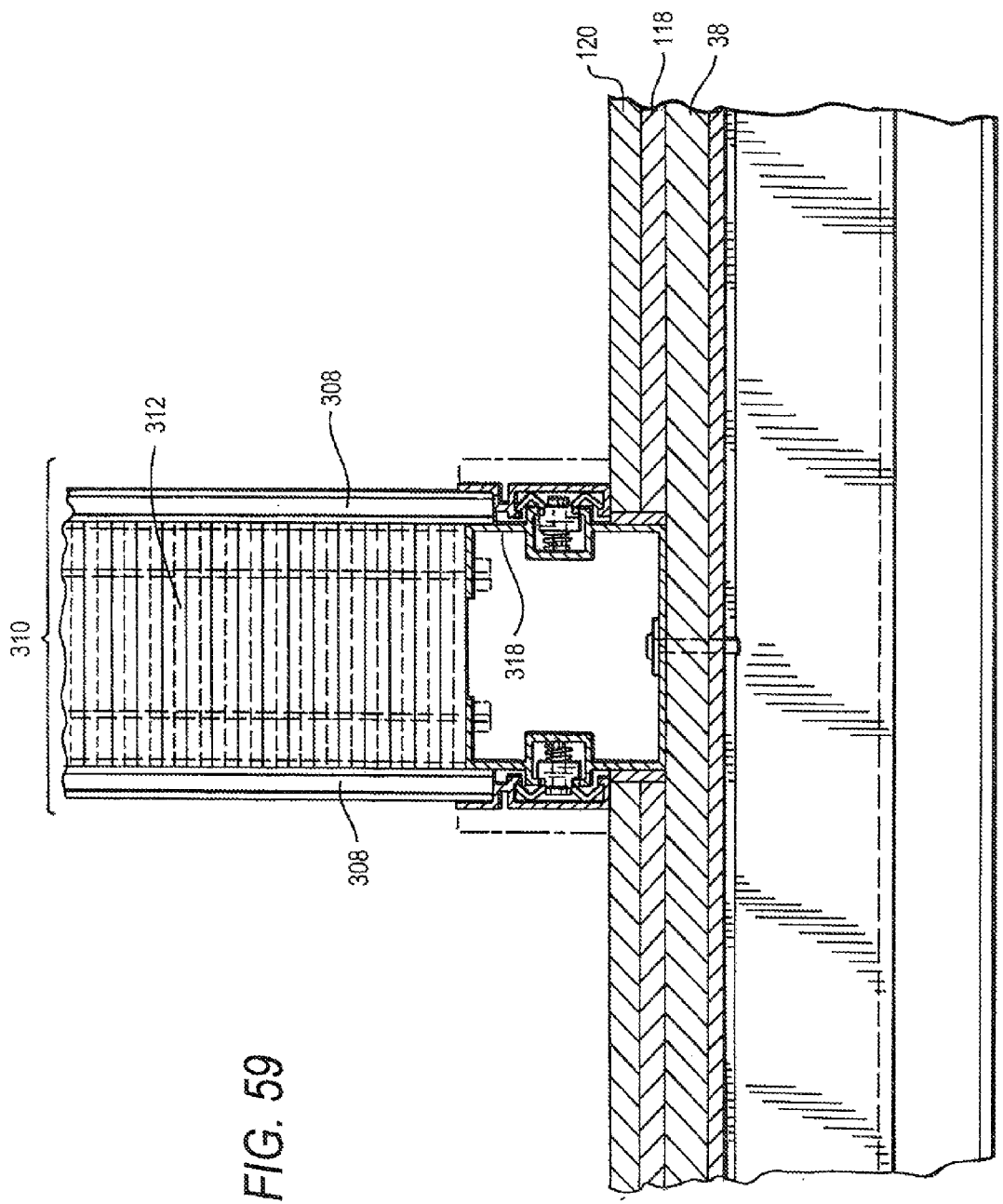
FIG. 59 is an enlarged representative cross-sectional view, showing further details of the partition elements shown in FIG. 57.
Figure 60:
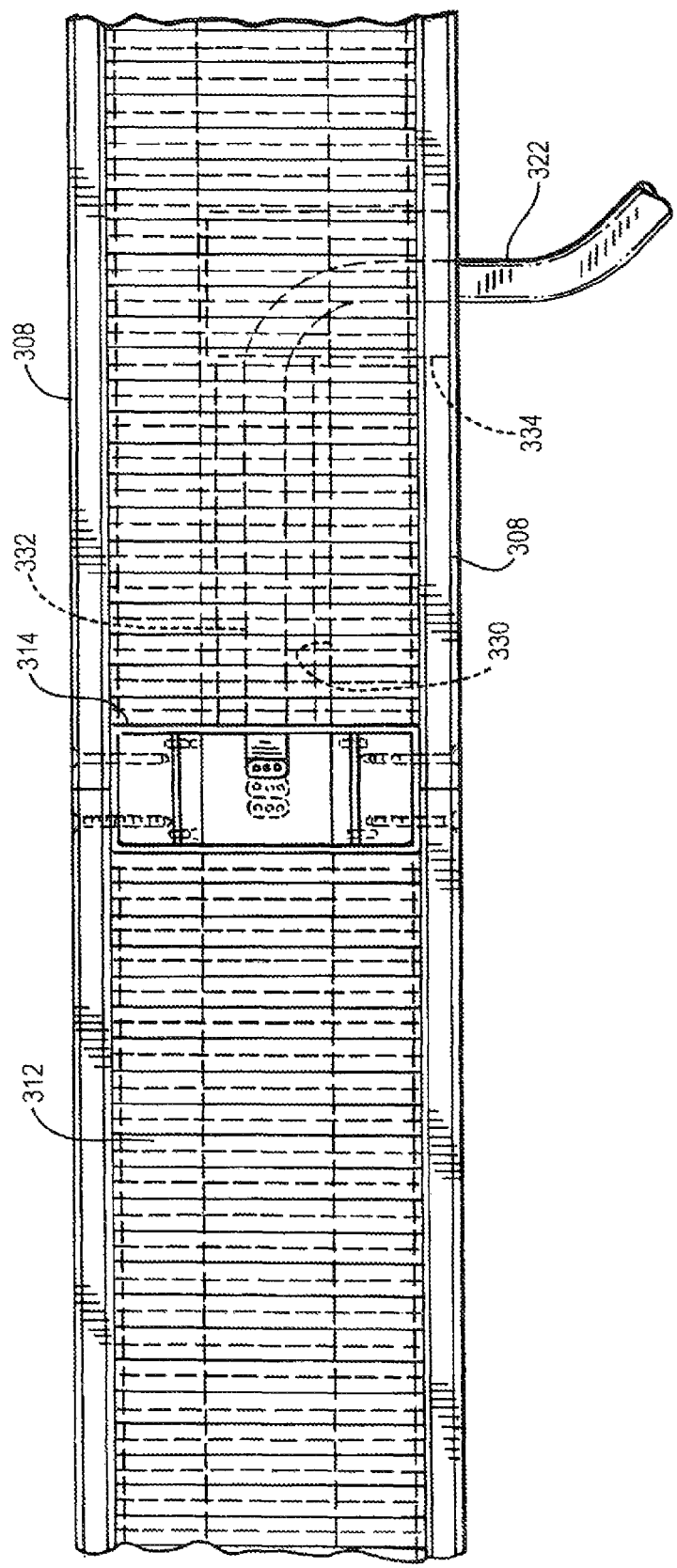
FIG. 60 is an enlarged representative elevational view, showing further details of the partition elements shown in FIG. 57.

As shown in FIG. 57, and in further detail in FIGS. 58-60, this aspect of the invention further comprises a plurality of partition posts 314, which may be fabricated of extruded aluminum or of formed galvanized sheet steel, in combination with an upper track 316 and a lower track 318, both of which are fabricated of the same material as the partition posts 314, the combination of tracks and posts functioning not only as a structural frame to receive partition panels 310, but also as a raceway to carry wiring. In particular, upper track 316 is adapted to enclose a pre-assembled wire harness 320, which originates in a junction box (not shown) located elsewhere in the VUC, and which contains branch wiring for each electrical device intended to be located in the particular partition panels 310 above which harness 320 may be situated (a typical individual branch circuit cable is designated by the reference numeral 322 in FIGS. 57 and 60). The configuration of wire harness 320, as shown in FIG. 58 should be considered as illustrative only, since the exact configuration will vary depending upon the interior electrical layout.

Illustratively, wire harness 320 is carried in a conventional trapeze carrier 323, and preferably, as shown best in FIG. 58, upper track 316 is comprised of two sections, an upper section 324 that is supported from the VUC roof structure and that supports, in turn, trapeze carrier 323 containing harness 320, and a lower section 326 adapted to nest within upper section 324 and to which partition panels 310 are eventually fastened with screws, the nested structure allowing lower section 326 to slip upward and downward within upper section 324 so as to accommodate structural deflections without imposing additional load on partition panels 310.

The assembly sequence for an interior wall comprised of a plurality of partition panels 310 would include fastening upper section 324 of upper track 316 to the VUC roof structure, attaching trapeze carrier containing wire harness 320 to upper section 324, with each individual branch circuit cable draping down at its intended location, nesting lower section 326 into upper section 324, and pulling each of the branch circuit cables 322 through knock-outs (not shown) located in lower section 326 at positions which correspond to the expected positions of partition posts 314. After fastening lower track 318 to the VUC sub-floor deck 38 (as shown best in FIG. 59), the first partition post 314 is installed and mechanically fastened to lower section 326 of upper track 316. Then the first partition panel 310 is inserted into lower track 318 and is tipped into position, engaging upper track 326, and is then slid sideways so that a recess 313 on one side of partition panel 310 engages partition post 314. If there is a branch circuit cable 322 draping down at the partition post location, then the cable is first inserted into the partition post and is pulled through a knock-out 328 in partition post 314 that is nearest to the location at which the electrical device is intended to be situated in or mounted on the interior wall being assembled.

Each partition panel 310 in which an electrical device is intended to be situated, or on which an electrical device is intended to be mounted, will preferably be prepared in advance by forming a channel 330 within core 312, into which is inserted a wireway 332, fabricated of the same material as the partition posts 314 and tracks 316, 318, and forming a conduit from the partition post 314 to a pre-installed junction box 334 for the electrical device. Thus, in the assembly sequence the associated branch circuit cable 322 may then be pulled through wireway 332 into junction box 334, after which partition panel 310, having already been raised from the tipped position to a fully vertical position, may be slid into place. In the process of tipping each partition panel 310 into position, the lower section 326 of upper track 316 is first urged upward into upper section 324, and then slips downward, thereby fitting snugly to partition panel 310. Partition posts 314, having already been fastened to upper track 316 but not yet having been anchored to lower track 318, also lift slightly along with lower section 326 of upper track 316.

A second partition post 314 may then be installed, engaging the recess 313 on the other side of the first partition panel 310, and the process repeated (as shown best in FIG. 57) until the partition layout is completed, following which the partition posts 314 are mechanically fastened to lower track 318, and the partition panels 310 are then mechanically fastened to upper track 316, to lower track 318, and to the partition posts 314. Thereafter, the joints in the thus-assembled interior wall may be taped and spackled in a conventional fashion (or the entire wall may be skim coated, if desired), and the electrical device(s) installed into or adjacent junction box(es) 334, as the case may be. An analogous process may be followed to assemble an interior wall comprising a plurality of partition panels 298.

In order to minimize the mechanical and thermal stresses on prefabricated partition construction that are introduced by transportation of VUC's (as they are craned, placed and moved on ships, trains, trucks, etc.) and by exposure of the finished drywall work to changes in temperature and humidity during the course of transportation and storage of the VUC's (and prior to the time when the finished structure is sealed and climate-controlled), the joints in the assembled interior wall are preferably taped using limited-stretch fiberglass drywall tape which will prevent or minimize damage to finishes. An acceptable drywall tape for use in this aspect of the invention is available from USG Corporation of Chicago, Ill., U.S.A. under the trademark SHEETROCK.

The prefabricated partition panels 298, 310 of the present invention, whether they comprise studs 302 or a monolithic honeycomb core material 312, may be utilized not only to create finished walls that subdivide the interior of a VUC (with one or more of the partition panels also optionally comprising framing for an interior door, as desired), but also to create finished walls that are adjacent a shear panel at the perimeter of a VUC. In the latter case, however, one of the facing panels (fabricated, e.g., of conventional gypsum wallboard 308) may be omitted, and the thus-modified partition panels may be assembled, as otherwise described above, adjacent the mineral fiberboard fireproofing (of the type described hereinbefore) that is already situated on the interior side of each such shear panel, thus creating fire-rated partitions. It is anticipated that the combination of such drywall construction with mineral fiberboard fireproofing and shear panels will provide significant advantages in reducing sound transmission from one habitable space to another within a structure comprising a plurality of VUC's.

Although partition panels 310 have been described above either as comprising a single facing panel laminated to a honeycomb core (as in the preceding paragraph), or as comprising two separate but substantially identical facing panels laminated to a honeycomb core interposed therebetween, it is to be understood that other materials besides conventional gypsum wallboard may be used as the facing panels adhered to the honeycomb core, including but not limited to wood veneer panels, fabric-faced panels, lacquered MDF panels, ceramic tile-faced panels, and porcelain-faced panels.

FIGS. 61-64 illustrate several VUC's, in each of which a plurality of prefabricated partition panels have been pre-assembled into various illustrative interior partition layouts, and those interior partition layouts (as well as other illustrative finishes and functional elements, including plumbing fixtures and even kitchen appliances) have been pre-installed at the VUC factory, prior to transport of the VUC from the factory to the job site. In particular, FIGS. 61-64 demonstrate in an illustrative fashion how the interior partition layouts in any one VUC may be designed so as to dovetail with the interior partition layouts in one or more laterally adjacent VUC's, such that, when the VUC's are aggregated together laterally, the interior partition layouts merge to form complete walls, a clear distinction from the narrow one-to-one correspondence, understood by the prior art as required, between the closed box of a conventional ISO cargo container and a habitable dwelling unit.

Figure 61:
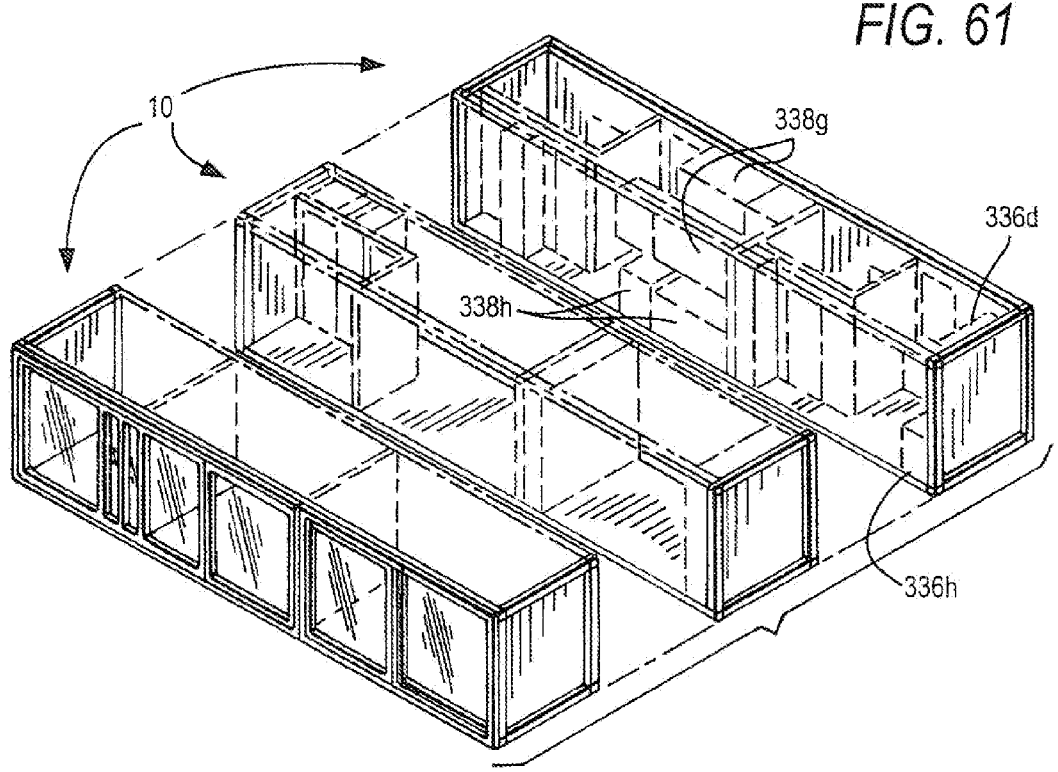
FIG. 61 is an exploded schematic perspective view, partially broken away, showing three volumetric units of construction of the dimensions shown in FIG. 1.
Figure 62:
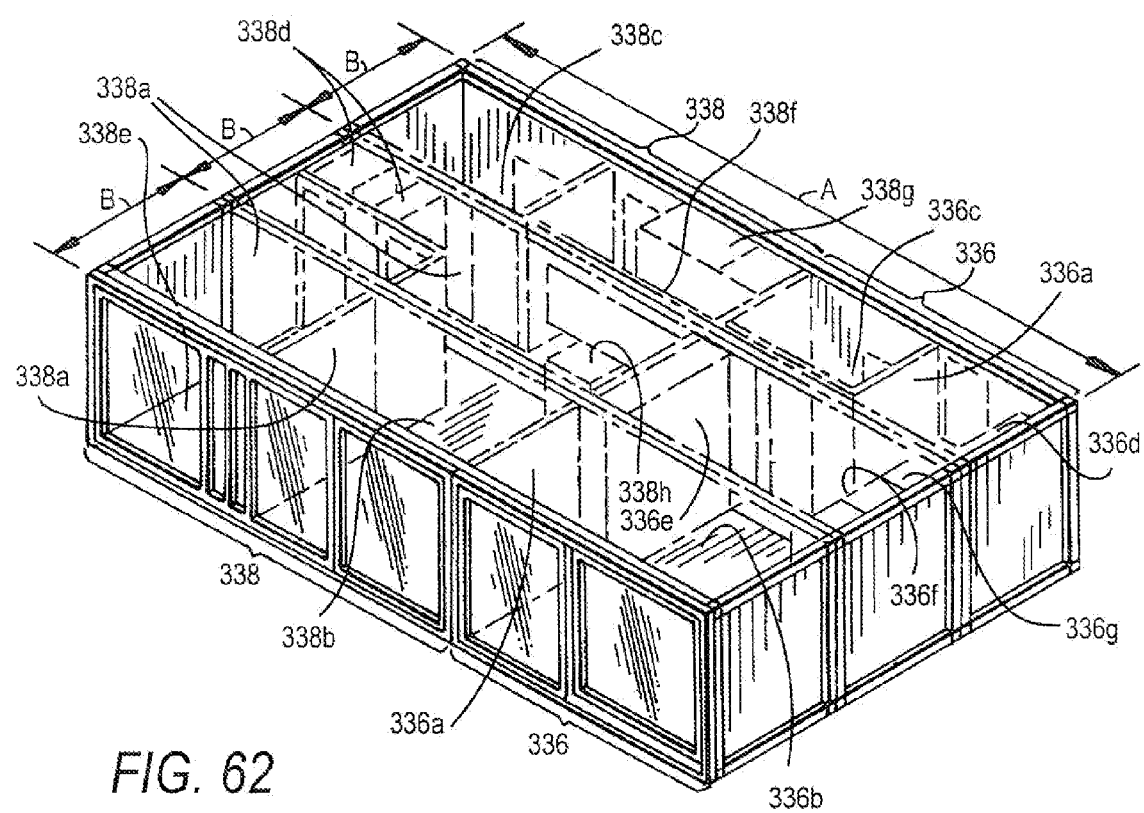
FIG. 62 is a schematic perspective view, also partially broken away, of an aggregation of the three volumetric units of construction of FIG. 61.

More specifically, FIGS. 61-62 illustrate schematically how three VUC's 10, each of the dimensions shown in FIG. 1, when positioned side-by-side, may be used to form two illustrative, but separate and different, adjacent one-story habitable dwelling units, one of which is a "studio" apartment 336 and the other a "one-bedroom" apartment 338. Apartments 336 and 338 are each provided with several internal walls 336a, 338a, formed of modular partition panels as described hereinbefore, some of which incorporate internal doors, thus illustratively forming discrete closed rooms, including respective living rooms 336b, 338b, respective bathrooms 336c, 338c, with plumbing fixtures therein (not shown), closets 336d, 338d, and bedroom 338e in apartment 338 (apartment 336, being a "studio" apartment, does not have a separate, closed bedroom—rather, the living room also functions as the bedroom, as is well known in the art, and thus living room 336b is illustratively provided for this purpose with a "Murphy bed" 336e that may be retracted into an interior wall). Also, apartments 336 and 338 are each provided with respective open kitchen areas 336f, 338f, each including illustrative kitchen cabinetry 336g, 338g and even kitchen appliances 336h, 338h.

Figure 63:
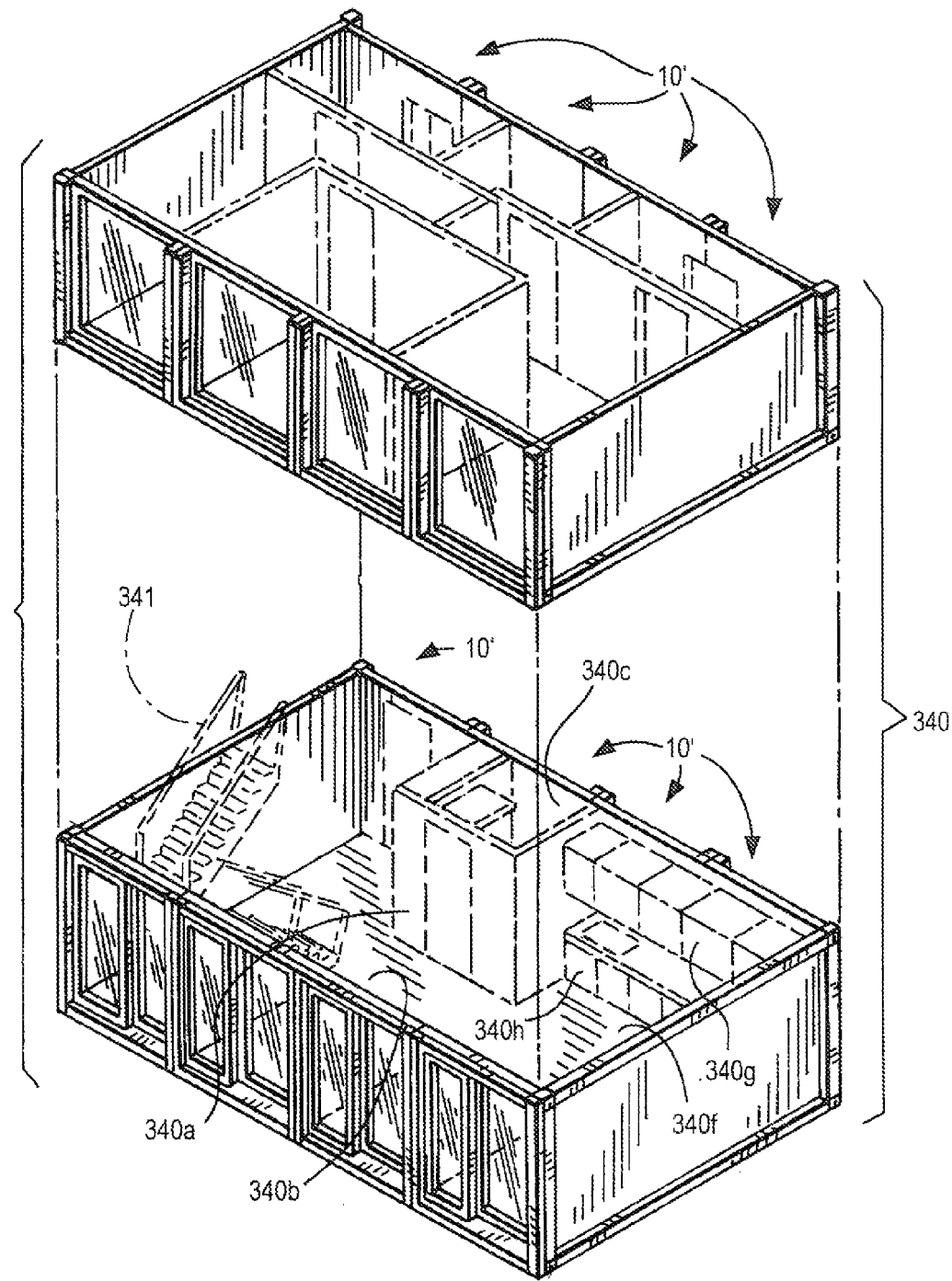
FIG. 63 is an exploded schematic perspective view, also partially broken away, of a first aggregation of four volumetric units of construction of the dimensions shown in FIG. 14, and a second aggregation of four volumetric units of construction of the same dimensions.
Figure 64:
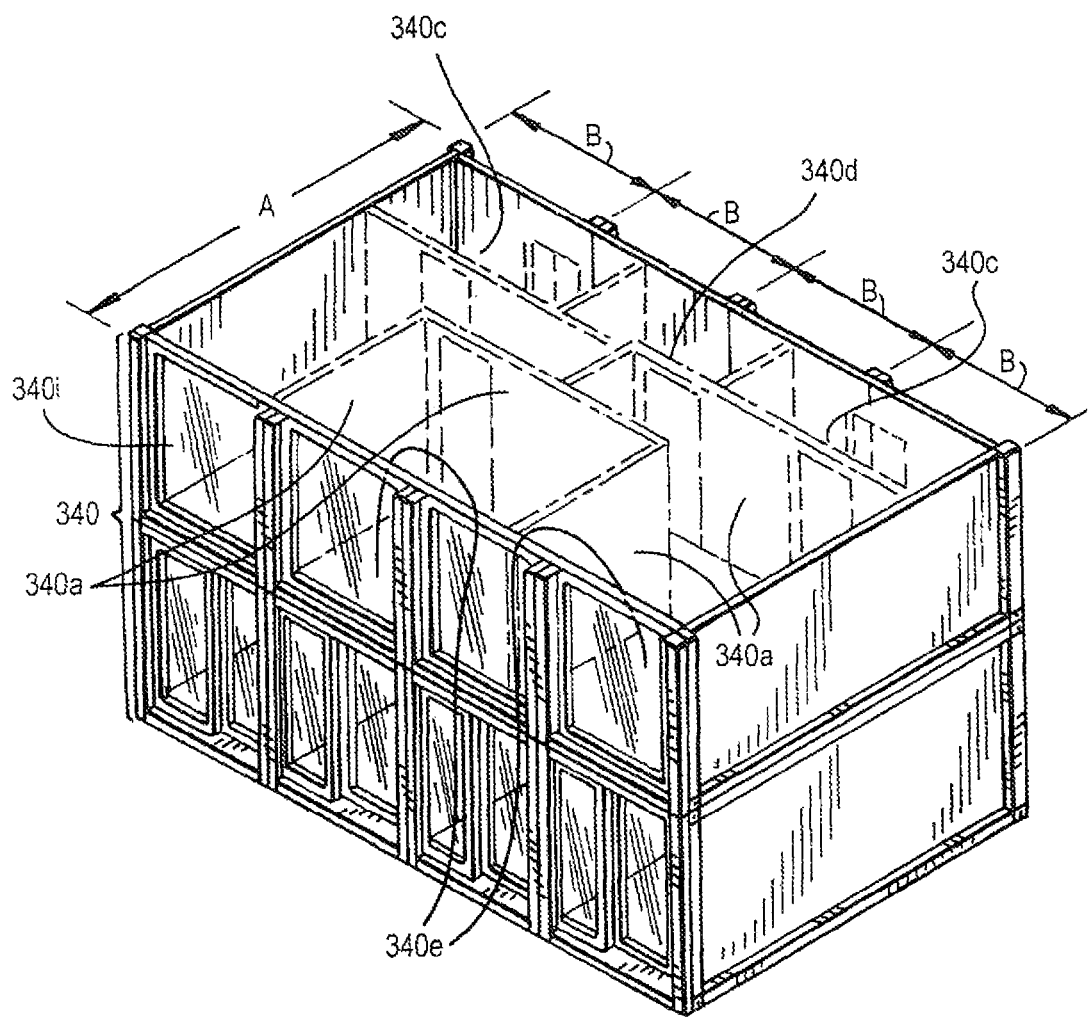
FIG. 64 is schematic perspective view, also partially broken away, showing the first aggregation of FIG. 63 stacked vertically upon the second aggregation of FIG. 63.

In a similar fashion, FIGS. 63-64 illustrate schematically how four VUC's 10', each of the smaller dimensions shown in FIG. 14, when oriented side-by-side, may be stacked upon four other VUC's of the same dimensions, also oriented side-by-side, to form a two-story combination, comprising a single illustrative habitable dwelling unit, in this case a two-story or "duplex" apartment 340 with an internal stairway 341. Apartment 340 is also provided with several internal walls 340a, formed of modular partition panels as described hereinbefore, some of which incorporate internal doors, thus illustratively forming discrete closed rooms, including a living room 340b, bathrooms 340c, with plumbing fixtures therein (not shown), closets 340d, and bedrooms 340e. Also, apartment 340 is provided with an open kitchen area 340f, including illustrative kitchen cabinetry 340g and even kitchen appliances 340h, as well as a stairwell area 340i. It should be noted that each of the three VUC's used jointly to form apartments 336 and 338 in FIGS. 61-62 is oriented longitudinally, while the eight VUC's used jointly to form apartment 340 in FIGS. 63-64 have transverse orientations.

Figure 65:
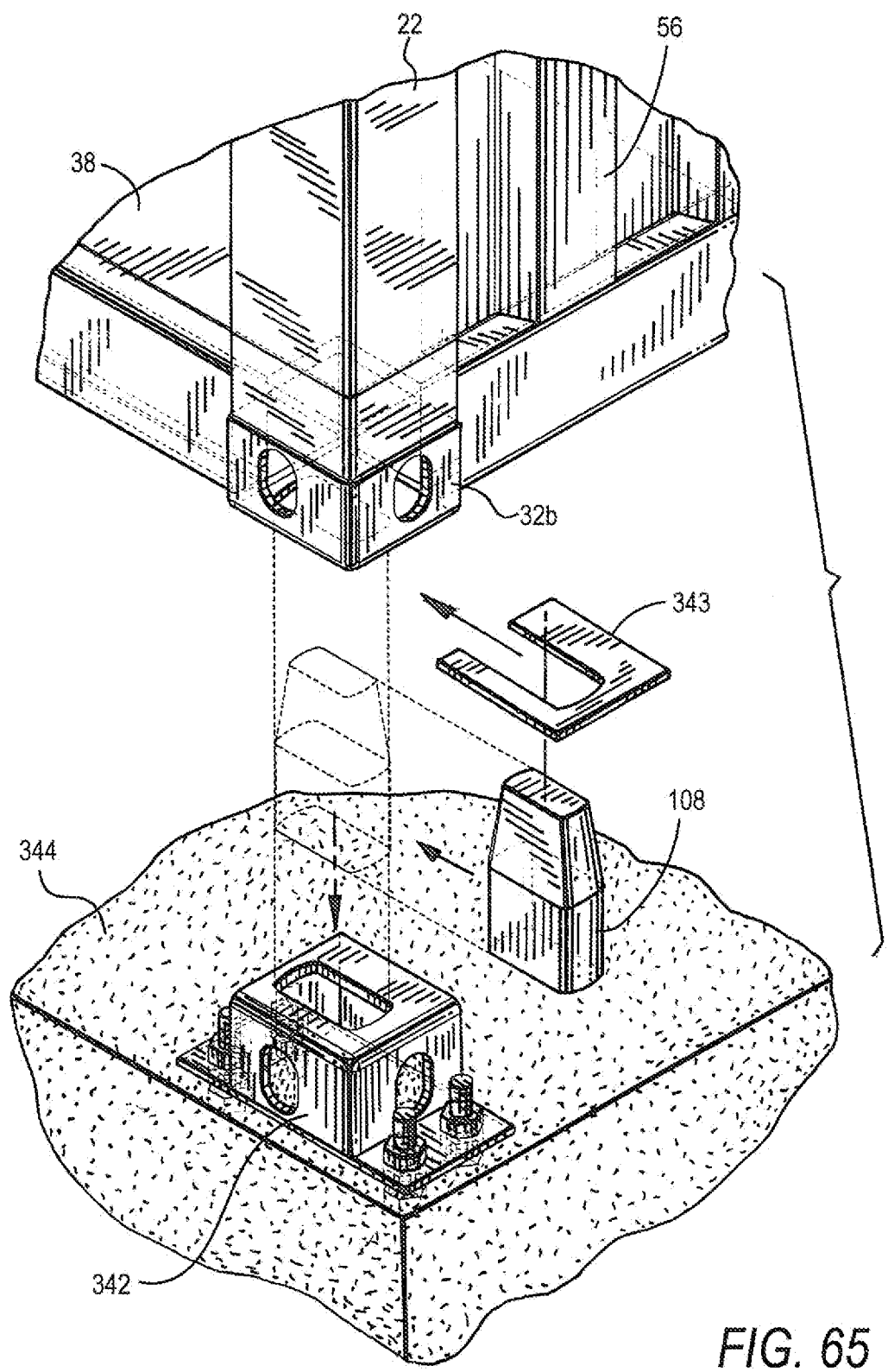
FIG. 65 is an enlarged perspective view of a portion of the volumetric unit of construction of the present invention, illustrating one embodiment of an interface for use therewith.
Figure 66:
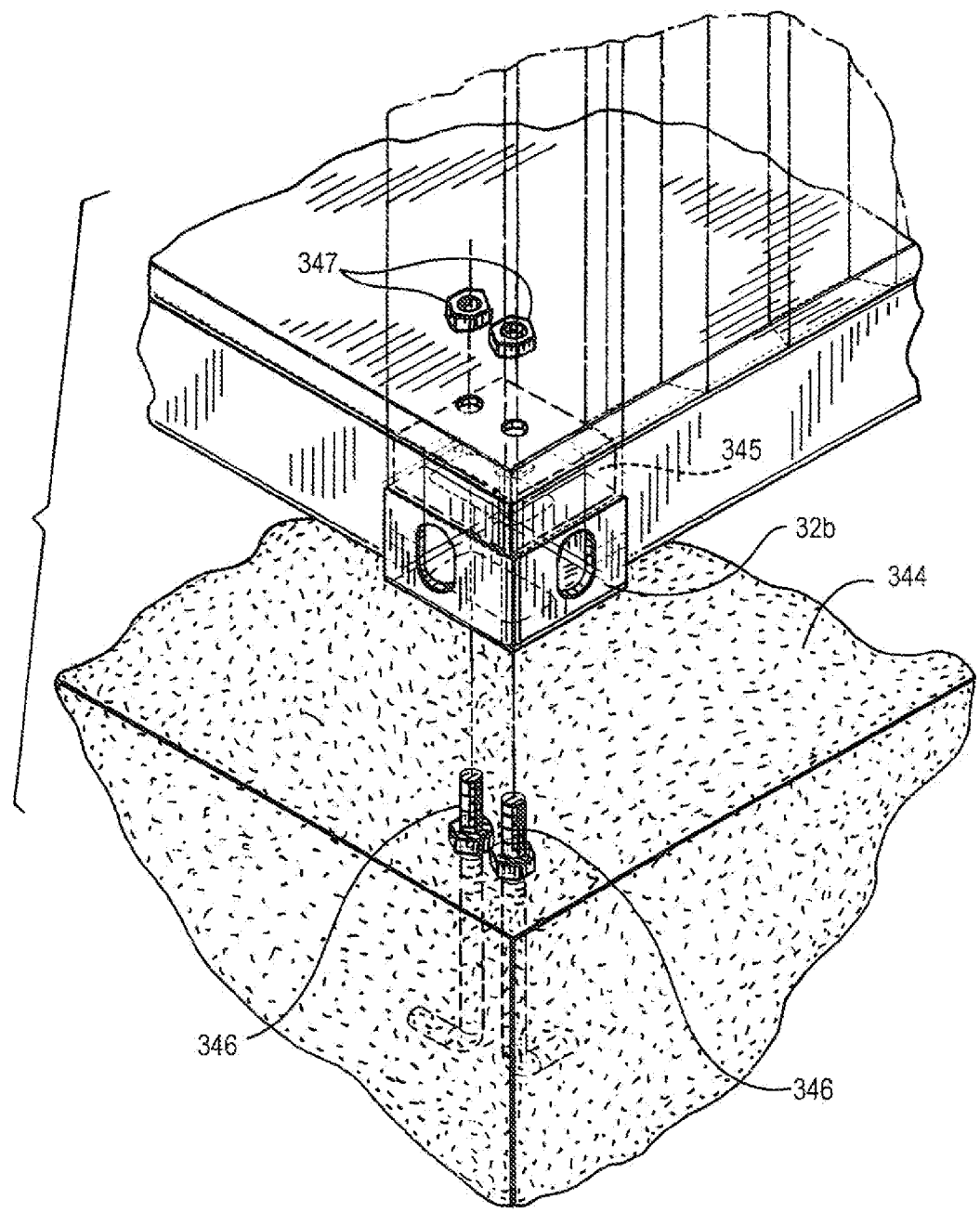
FIG. 66 is an enlarged perspective view of a portion of the volumetric unit of construction of the present invention, illustrating another embodiment of an interface for use therewith.
Figure 67:
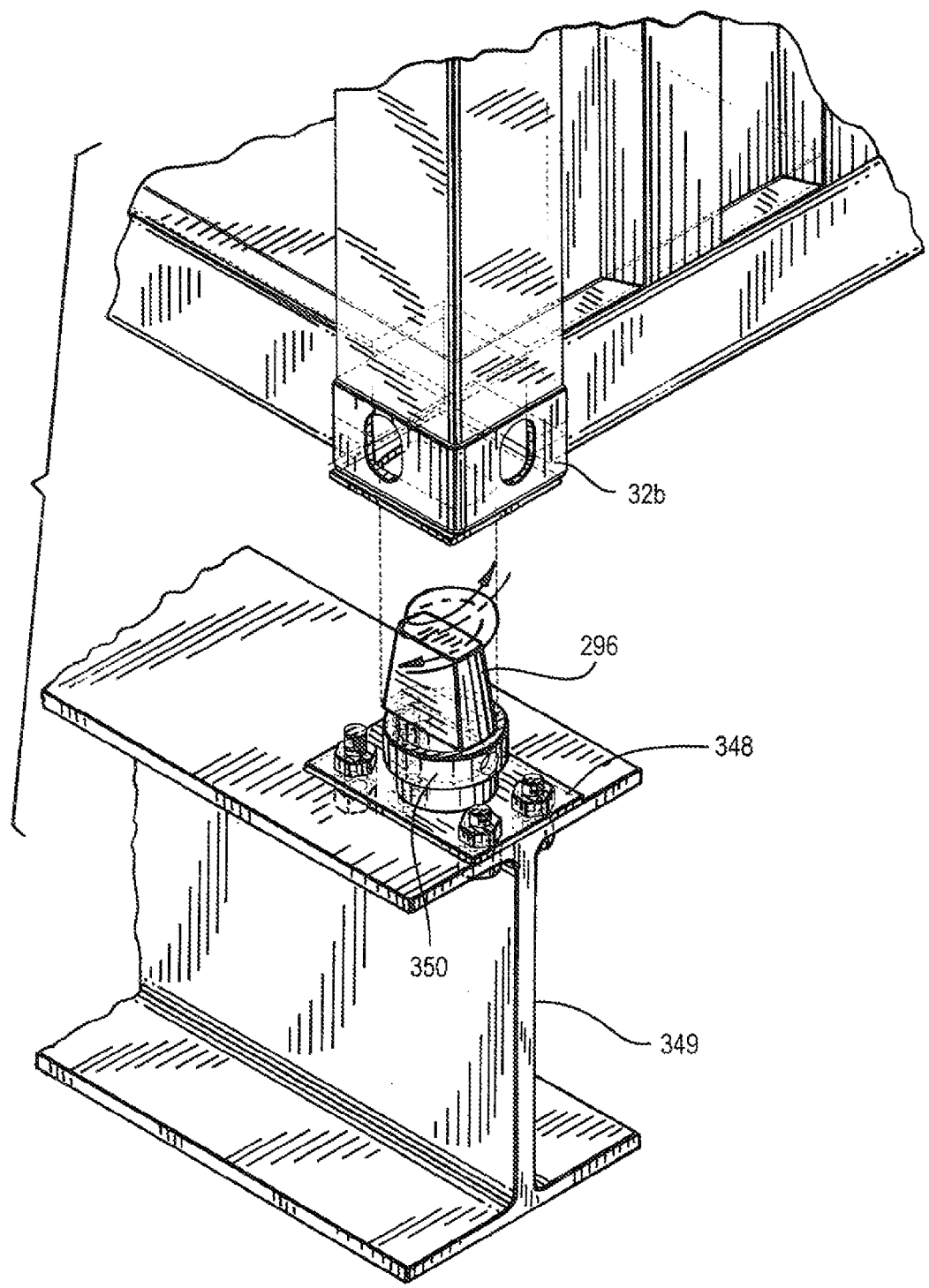
FIG. 67 is an enlarged perspective view of a portion of the volumetric unit of construction of the present invention, illustrating still another embodiment of an interface for use therewith.

In the erection of a structure comprising a plurality of vertically and horizontally adjacent VUC's, the lowermost story will most commonly bear on a conventional foundation system such as a concrete slab and/or concrete footings, or on a conventionally-built load bearing sub-structure not fabricated of concrete (the latter may be fabricated of steel and may be used, for example, to provide space for a ground-floor retail environment in a multi-story structure comprising residential units above the retail environment). Referring now to FIGS. 65-67 in addition to the aforementioned FIGS. 1-64, in another aspect of the invention several alternative embodiments for a foundational interface for the lowermost VUCs in such a multi-story structure are illustrated, and although two of these foundational interfaces are illustrated in FIGS. 65 and 66 only with respect to a concrete foundation, it is to be understood that the same two interfaces can easily be adapted by one skilled in the art to a conventionally-built load bearing sub-structure not fabricated of concrete and comprising, for example, a steel beam, as is shown with respect to the foundational interface illustrated in FIG. 67.

As shown in FIG. 65, the necessary foundational interface may be provided by bolting a plurality of individual, ISO-compliant foundational nodes 342 (only one of which is shown in FIG. 65) to the concrete foundation slab/footing 344, or by bolting or welding them to a steel sub-structure (not shown), in a rectangular array corresponding to the footprint of the VUC, each such foundational node 342 to be accurately located and leveled prior to fastening. Each foundational node 342, along with an optional guide pin 108 and one or more optional leveling shims 343 (if needed), provides a starting platform to which one of the lower nodes 32b in the lowermost story of VUC's may be bolted.

Alternatively, as shown in FIG. 66, a plurality of pairs of conventional anchor bolts 346 (only one pair of which is shown in FIG. 66) may be cast into slab/footing 344, or welded to a steel sub-structure (not shown), in a rectangular array corresponding to the footprint of the VUC, with one or more leveling shims (not shown in FIG. 66) interposed (if needed) between each of the lower nodes 32b and slab/footing 344 (or sub-structure). Anchor bolts 346 may be secured with nuts 347, but since the latter, when tightened, must bear on sub-floor deck 38, a spacer block 345 is preferably interposed so as to fill the gap between sub-floor deck 38 and each lower node 32*b*, thus providing additional support for sub-floor deck 38 in that region and preventing nuts 347 from causing sub-floor deck 38 to buckle.

Another alternative structure for the foundational interface is shown in FIG. 67, comprising a plurality of base plates 348 (only one of which is shown in FIG. 67) anchored to a non-concrete sub-structure (illustratively a steel I-beam 349), or anchored to a concrete slab/footing (not shown in FIG. 67), in a rectangular array corresponding to the footprint of the VUC. A conventional cylindrical screw jack arrangement 350 (providing vertical adjustability for leveling purposes) is mounted on each base plate 348, with a guide pin 296 as described hereinbefore (comprising only the upper tapering conoidally-shaped portion of guide pin 290), projecting upwardly from the screw jack arrangement, guide pin 296 being keyed for insertion into the appropriate access port of a lower node 32*b* in the lowermost story of VUC's via a friction fit.

With any of these three alternatives, provision can be made for a post-tensioned cable (not shown) that would create a structural connection between the lowermost story of VUC's and the foundation (concrete or other sub-structure) in order to resist uplift. Also, in addition to providing a foundational interface, these alternatives are equally suited for the attachment of VUC's to a transfer girder at any level of a multi-story structure, such as a steel beam of the superstructure that is part of a high-rise stack of VUC's (to be described in further detail hereinafter). Although leveling shims 343 are shown only in FIG. 65, and only in conjunction with the foundational interface illustrated therein, it is to be understood that similar leveling shims may also be used between the nodes of any two vertically adjacent VUC's at any level in the structure being erected, not solely at the foundation.

In the erection of a structure comprising a plurality of vertically and horizontally adjacent VUC's, the lowermost story may in some Instances be intended for burial below grade, there to function as a basement or cellar, and with appropriate surface treatment of the frame and shear panels (if any) to prevent corrosion, one or more VUC's can be adapted for use as prefabricated basement or cellar modules. The airtight and watertight qualities inherent in a VUC (if fabricated in accordance with the invention as described hereinbefore) lend themselves to this usage, and the appropriate surface treatments may include, but are not limited to, bituminous paint, epoxy paint, or other coatings that my provide equivalent corrosion protection.

Figure 68:
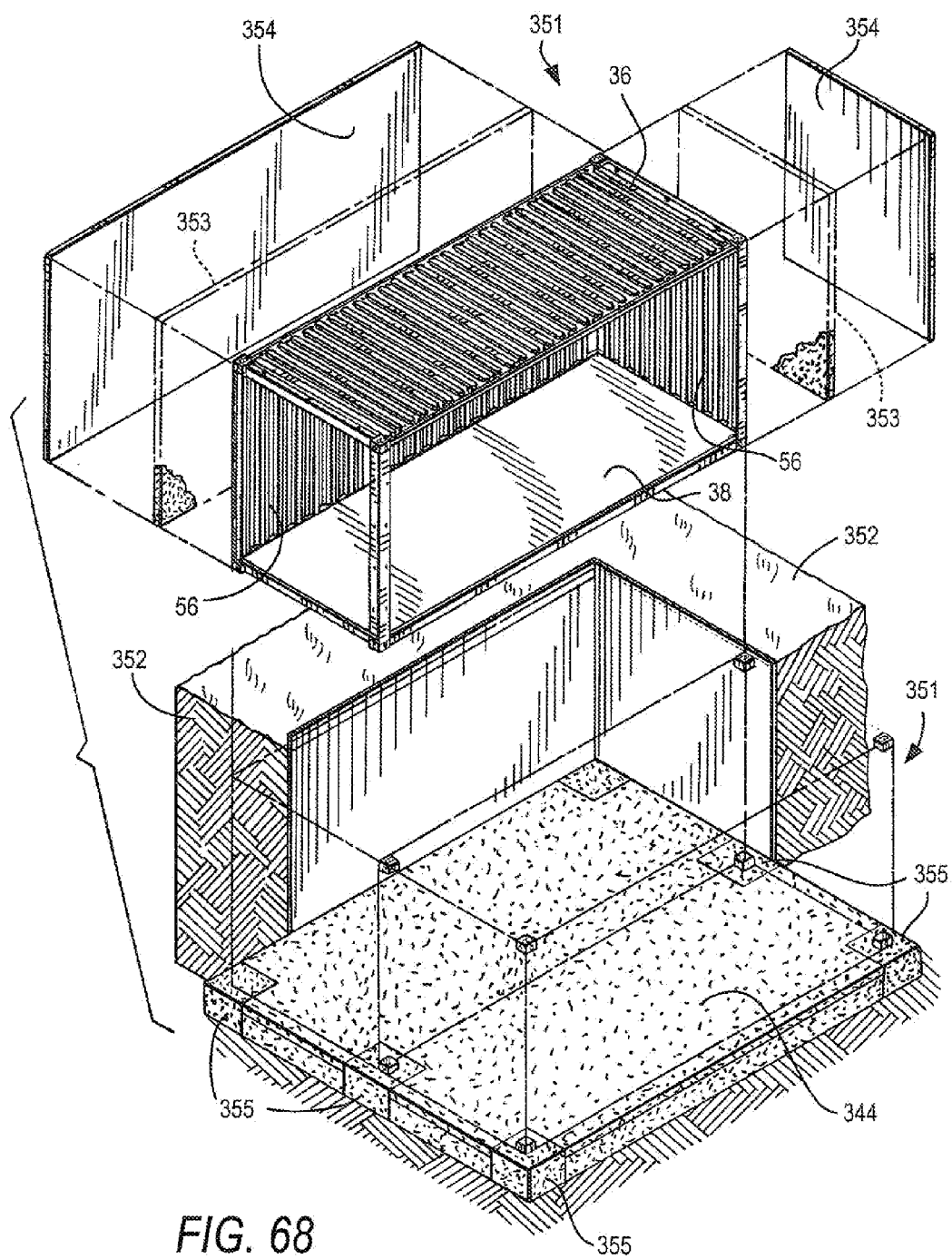
FIG. 68 is a partially diagrammatic, exploded perspective view, showing the use of the volumetric unit of construction of the present invention in the erection of a structure.

As illustrated in FIG. 68, in this aspect of the invention a basement or cellar VUC 351 may be constructed with shear panels 56 on the sides (and/or ends) that will be juxtaposed adjacent the surrounding earthwork 352, and thermal insulation 354 is applied to the outside of the VUC adjacent those shear panels, either prior to or after VUC placement via craning. The disposal of insulation 354 on the outside of VUC 351 is consistent with the facade concepts described hereinbefore, and maintains the continuity of the thermal envelope of the structure being erected. Joints between adjacent VUC's at the basement/cellar level may be sealed with a conventional gunned-in sealant or with pre-compressed foam strips (not shown), or with a combination thereof.

The basement/cellar VUC's 351 may be pre-fitted with mechanical, plumbing, electrical and fire protection services, and may even include large components of the plant such as boilers, chillers, pumps, tanks, and large components of the electrical system such as main disconnect switches, switchgear, panel boards, etc. Fire-rated partitions meeting local codes may be pre-installed, and light fixtures and other components (such as sprinkler heads, ventilation grilles, etc.) may be pre-fitted in the same manner as described elsewhere.

The preparation of the excavation and foundation may proceed in a conventional manner, wherein concrete footings 355 are provided at node points, with foundational interfaces as described hereinbefore, after which the earth between the footings 355 may be leveled and compacted, and finished with a layer of gravel. A polyethylene vapor barrier may be placed over the gravel and sealed around the node points in such a way as to maintain continuity of the vapor barrier.

However, as known to those of skill in the art, in some cases it may be advisable to pour a conventional monolithic concrete foundation slab 344 on grade (rather than utilize discrete concrete footings 355), with a layer of waterproofing designed to resist upward hydrostatic pressure, and with integrated foundational interfaces (as described hereinbefore) for connection to basement/cellar VUC's 351. After waterproofing, the slab 344 may be sealed to the VUC shell to provide resistance to water penetration, and conventional underslab piping (not shown), designed to conduct water away from the basement, may also be incorporated.

Once the concrete footings 355 or concrete slab 344 are in place (and, in the former case, the sub-grade has been prepared, or in the latter case, the waterproofing has been applied), basement/cellar VUC's 351 may be craned into place, although it may be advisable thereafter (for reasons known to those of skill in the art) to spray or pour a concrete outer shell 353 against the outside of the corrugated shear panels 56 of basement/cellar VUC's 351 after the latter have been craned into position; in these cases the slab 344 may be keyed into the concrete outer shell 353 (rather than sealed to the VUC itself), utilizing conventional waterstops or other known technology, to prevent water penetration at the joints. The superstructure VUC's (not shown) may thereafter be stacked directly on the basement/cellar VUC's 351, so that the process of erection proceeds as an uninterrupted sequence.

Figure 69:
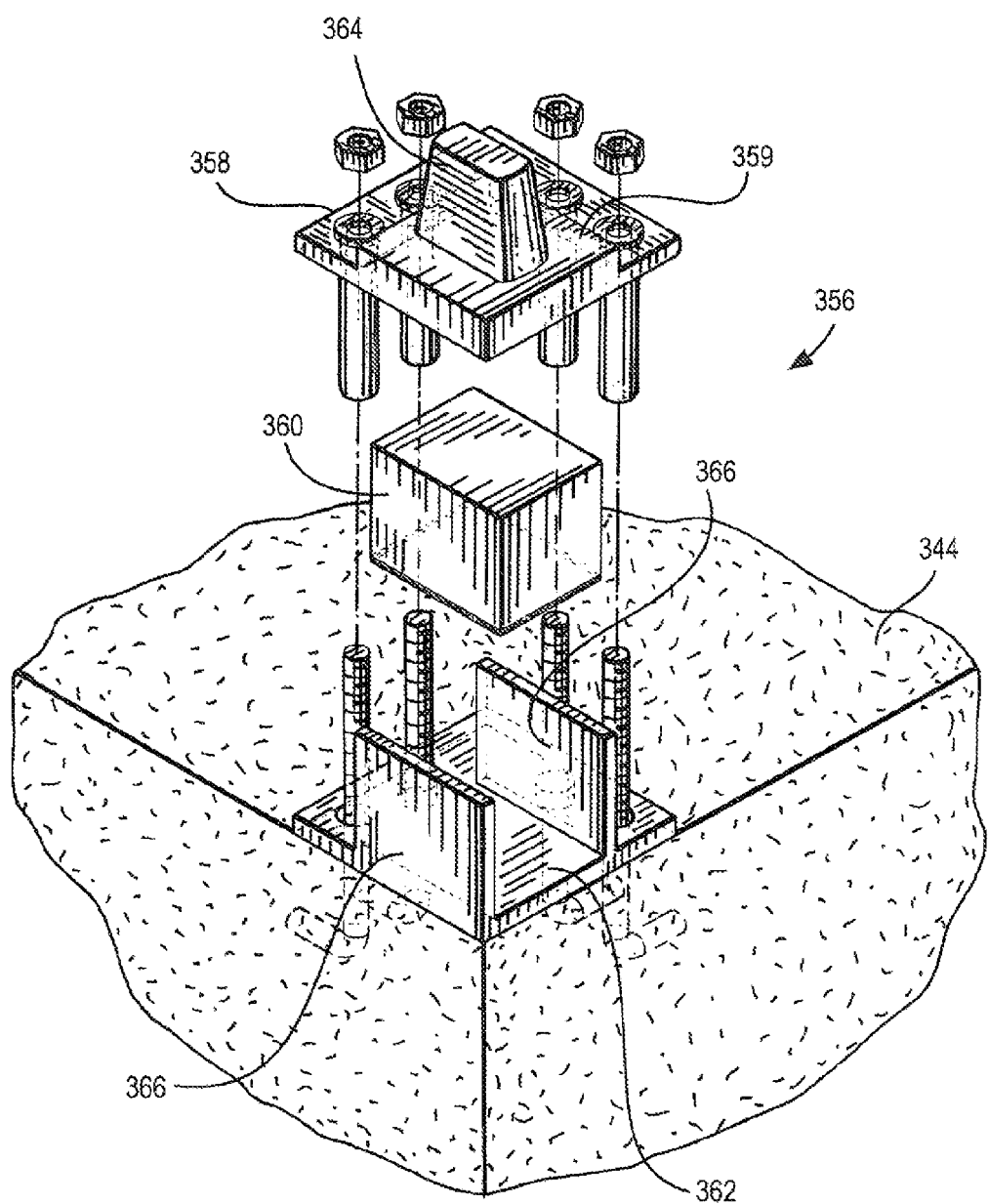
FIGS. 69 and 70 are perspective views illustrating an optional component for use with the present invention.
Figure 70:
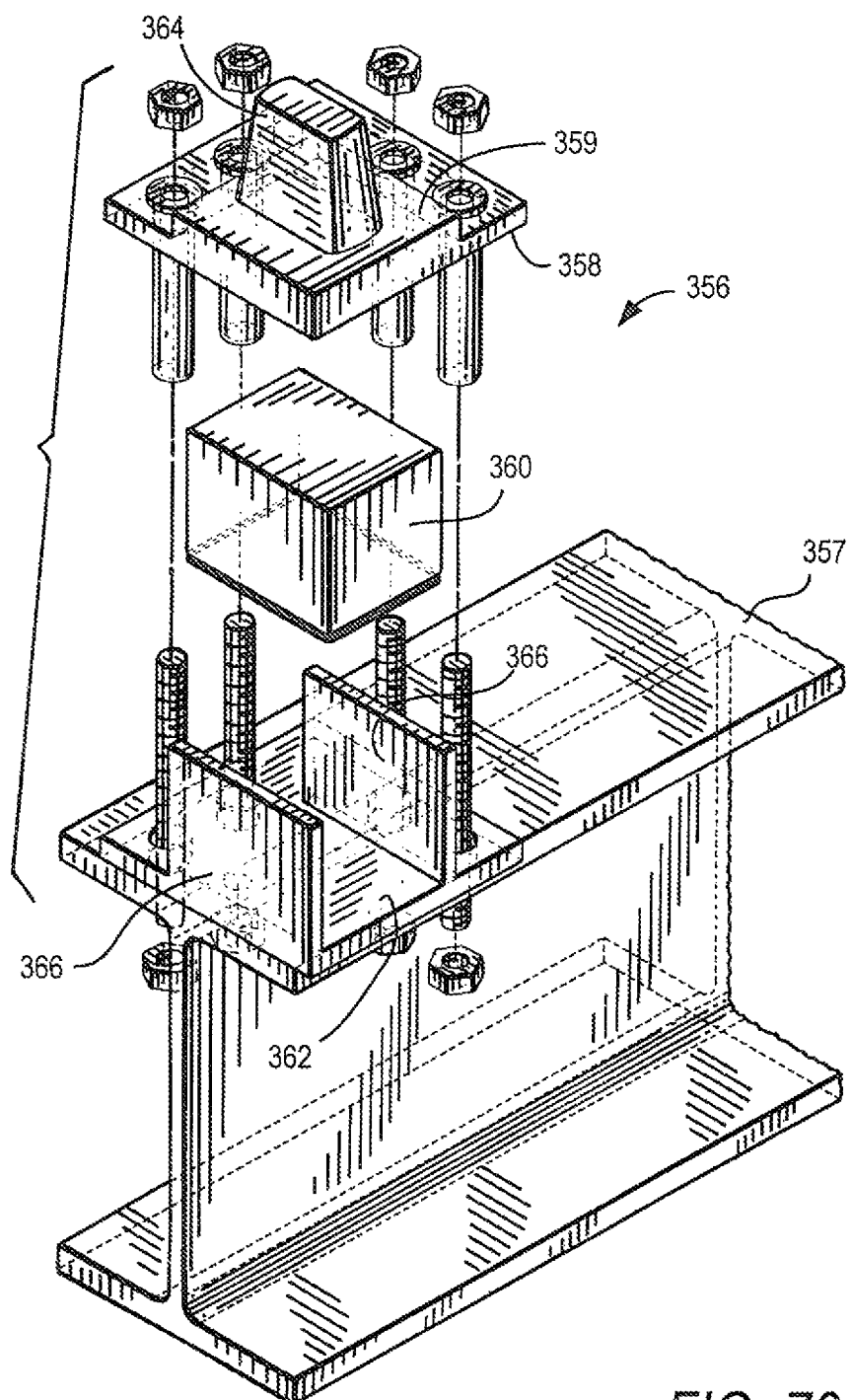

Turning now to FIGS. 69 and 70 in addition to the aforementioned FIGS. 1-68, the incorporation of acoustical isolation blocks in the erection of a structure comprising a plurality of vertically and horizontally adjacent VUC's is illustrated. As is well-known in the art, there are field conditions in which it may be necessary to isolate the nodes of a VUC acoustically from a supporting structure below so as to prevent transmission of ground-based noise and/or vibration, such as the vibration caused by a nearby subterranean rail transportation system.

Such acoustical isolation can be achieved in accordance with another aspect of the invention, by utilizing an acoustic isolation assembly 356 illustratively mounted on a foundation, comprising either a concrete slab/footing 344 (as shown in FIG. 69) or on a load bearing sub-structure not fabricated of concrete such as a steel transfer girder 357 (as shown in FIG. 70), the acoustic isolation assembly 356 comprising a steel top plate 358, a conventional neoprene (or other elastomeric) isolator block 360, a steel base plate 362, and a solid steel alignment peg 364 welded to the upper surface 359 of top plate 358 to form a mounting configuration specifically adapted to the footprint of, and for engagement with, a VUC node, the alignment peg 364 preferably being similar to guide pin 296 as described hereinabove (comprising only the tapering conoidally-shaped portion of guide pins 108 and/or 290), and being keyed for insertion into the appropriate access port of a node via a friction fit. Top plate 358 is preferably bolted to the node (not shown), with peg 364 facilitating alignment.

Most preferably, isolation assembly 356 further comprises a pair of steel side plates 366 supported by, and extending upwardly from, base plate 362. Side plates 366 extend just short of, and therefore do not, upon manufacture, make contact with, top plate 358, so that any failure of the neoprene or other elastomeric material under extreme heat conditions during the life of the structure being erected will result in only a negligible degree of settlement. Preferably, the top, side and base plates 358, 362, 366 are fireproofed, either conventionally or with the intumescent fireproof coating mentioned hereinbefore. Neoprene blocks that are acceptable for use in the acoustic isolation assembly of the present invention are available from Mason Industries, Inc. of Hauppauge, N.Y., USA, from the Vibration Mounting & Controls division of VMC Group of Bloomingdale, N.J., USA, and from others.

As mentioned above in connection with the foundational interface, a post-tensioned cable can be used to create a structural connection between the lowermost story of VUC's and the foundation (concrete or other sub-structure) in order to resist uplift. A similar post-tensioned tie-down system may be used in conjunction with the erection of a structure comprising a plurality of VUC's, in order to anchor several vertically adjacent VUC's to one another so as to resist overturning and/or excessive structural movement due to lateral (e.g., wind and/or seismic) loads, as required by local building codes. As such, the post-tensioned tie-down system, along with the corrugated shear wall panels described hereinbefore and shear blocks (to be described hereinafter), together comprise the overall lateral load resistance system for a structure comprising a plurality of VUC's. Thus, the post-tensioned tie-down system supplements the lateral load resistance provided by shear panels, and therefore it will typically be used to anchor vertically-stacked VUC's at the perimeter of a multi-story structure, since at least some (if not all) of the perimeter VUC's in such a structure will ordinarily incorporate shear panels in order to support an opaque facade, although a post-tensioned tie-down system may also be used at interior locations where shear panels occur within the multi-story structure as well.

Figure 71:
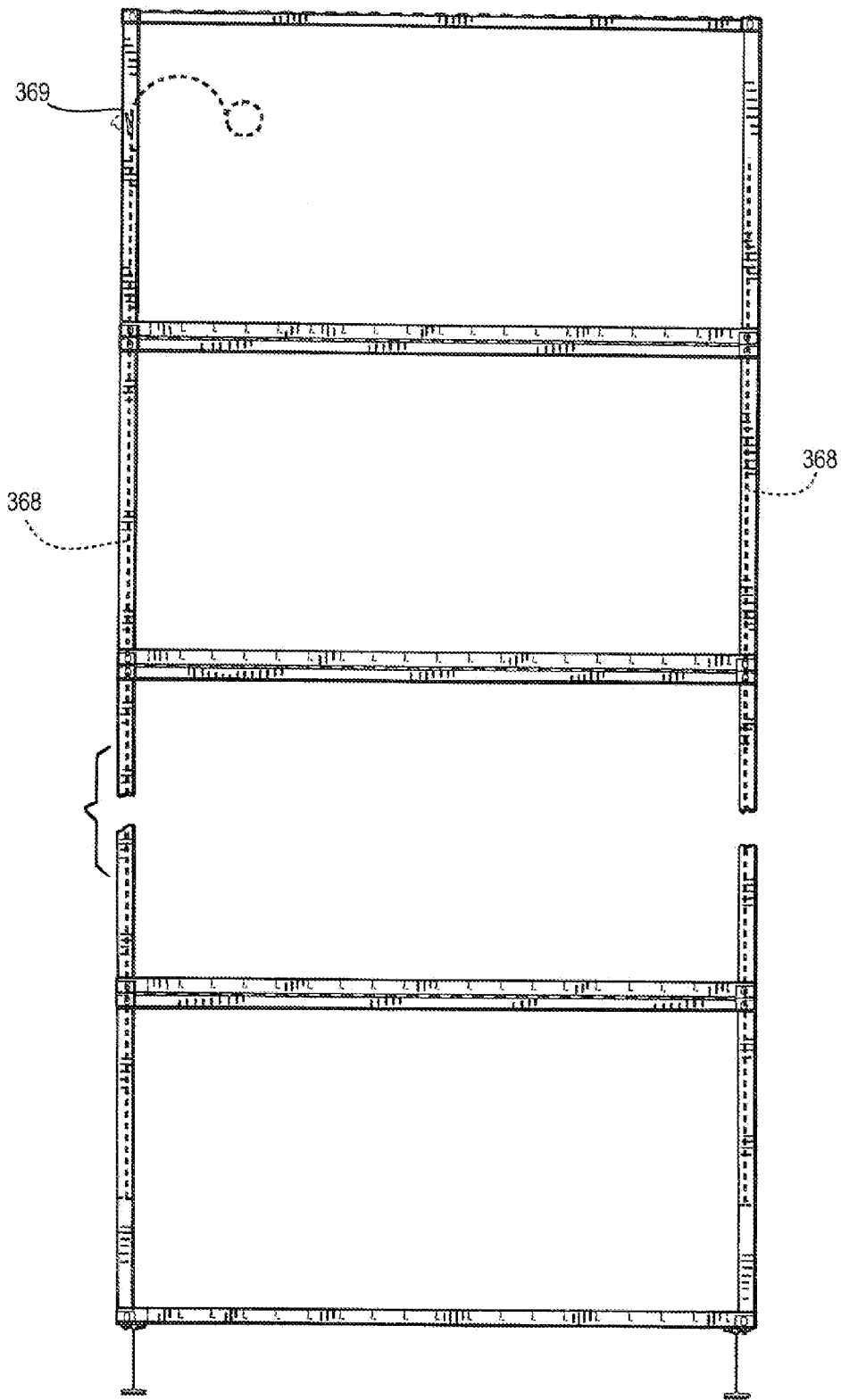
FIG. 71 is a diagrammatic view, showing a feature of the present invention.
Figure 72:
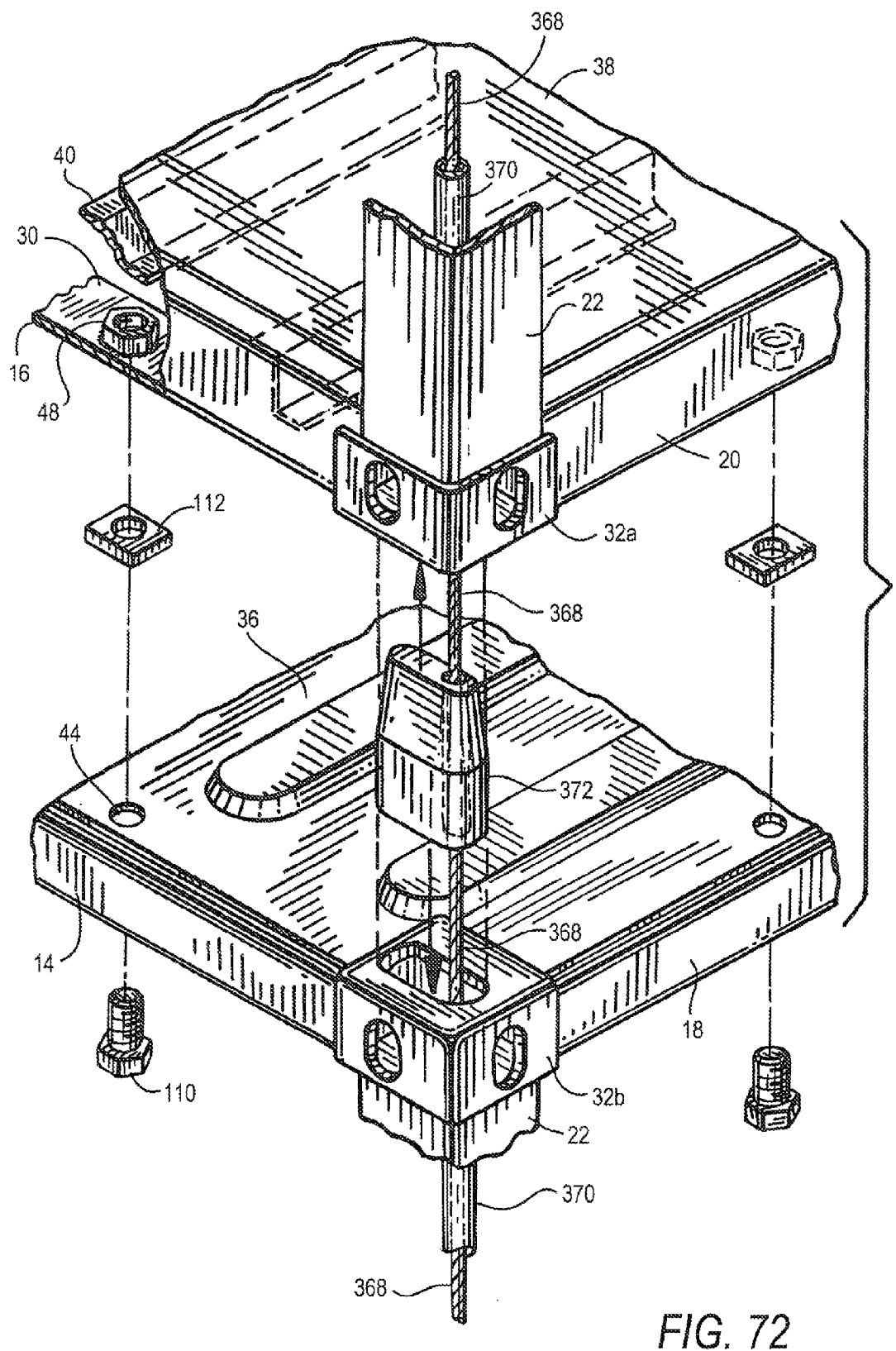
FIG. 72 is an enlarged exploded perspective view, showing the adjacent corner portions of two volumetric units of construction, and illustrating additional aspects of the feature of FIG. 71.

In accordance with this aspect of the invention, and as shown in FIGS. 71-72, a post-tensioned cable or monostrand 368 is provided, which runs continuously from the uppermost VUC to the lowermost VUC in a given VUC stack, and which acts as a "tie-down" to resist the tendency of the windward side of the structure to experience uplift in extreme wind (or in seismic) conditions. Tension may be applied to cable 368 by several different conventional means, such as a turnbuckle arrangement (not shown) integrated with cable 368, or an external removable tensioning device (such as a jack 369, shown diagrammatically in FIG. 71) with which tension may be applied at the lock-off point. Due to the inherent stiffness of the VUC's, it is not necessary for cable 368 either to extend to the top of, or above, the uppermost VUC (i.e., to or above the roof line), or to extend to the bottom of, or below, the lowermost VUC (i.e. to the foundation or to the ground); rather, the termination points for cable 368 may lie somewhere within the uppermost and lowermost VUC's themselves, as shown best in FIG. 71.

As indicated in FIG. 71, cable 368 is threaded vertically through the nodes of the VUC's in the stack, and accordingly, the post-tensioned tie-down system further comprises, for each cable 368, a conduit 370, situated interiorly of corner post 22 and extending, as shown best in FIG. 72, within each VUC, from a hole drilled in the interior face (not shown) of upper node 32a, to a similar hole drilled in the interior face (also not shown) of the lower node 32b located immediately below.

In most instances, and as shown in FIG. 72, the lateral load resistance provided by the shear panels and the post-tensioned tie-down system is supplemented still further by the use of a plurality of shear blocks 372, each of which is shaped similarly to guide pin 108. Thus, shear block 372 facilitates alignment of vertically adjacent VUC's in the same manner as guide pin 108; however, a hole in the vertical axis through shear block 372 allows the post-tensioned cable 368 to be threaded through the entire node assembly, and therefore, when shear blocks 372 are clamped in place by the force exerted when tension is applied to cable 368, the overall resistance of the structure to horizontal displacement is increased. Accordingly, although if desired shear blocks 372 may always be included as part of the overall lateral load resistance system, they may also sometimes be omitted, depending on structural engineering considerations related to the structure being erected, and provided that the number of bolts used in beam stitching, particularly along the portions of the composite beam in the vicinity of the nodes, is increased sufficiently.

Although the shear block 372 illustrated in FIG. 72 will most often be used in cases in which the shear force is in the horizontal plane, there may also be cases in which the shear force is in the vertical plane, and in which one or more shear blocks are therefore needed in the horizontal axis. For example, if several VUC's are aggregated longitudinally in order to span multiple eight-foot increments, a post-tensioned cable may be threaded horizontally (not shown in the drawings) through the access ports in the nodes of the adjacent VUC's.

Figure 73:
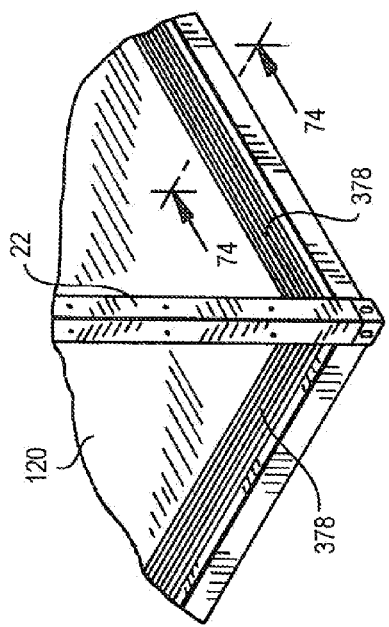
FIG. 73 is a perspective view illustrating the use of the modification shown in FIG. 8.
Figure 74:
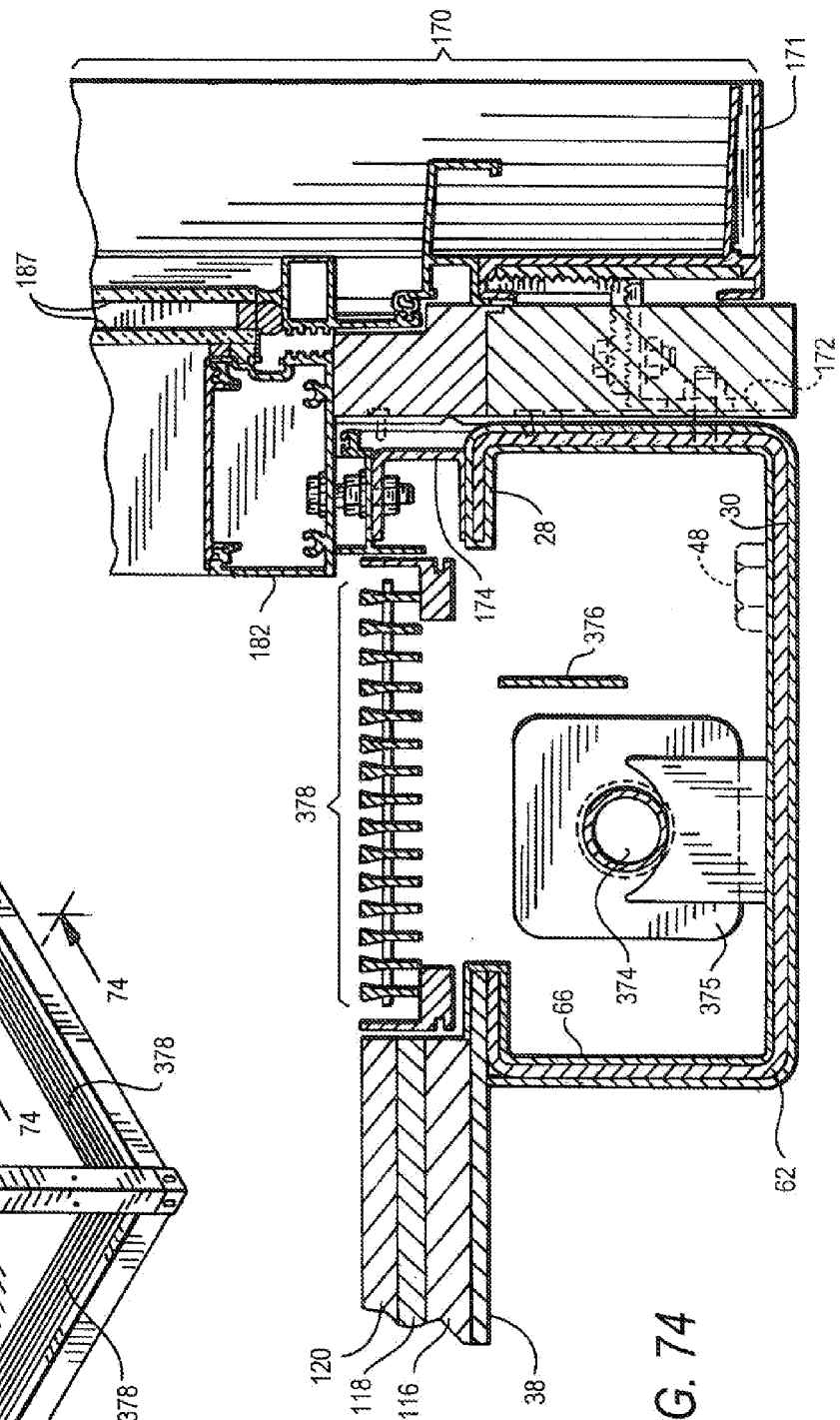
FIG. 74 is an enlarged cross-sectional view, taken substantially along the lines 74-74 of FIG. 73.

As mentioned previously, for a structure being erected in a climate with a cold winter, where perimeter radiation will often be required in order to offset heat loss through windows and window walls, the VUC's destined to be incorporated at the perimeter of the structure being erected will preferably be fabricated with a trough 62 that is adapted to form a floor radiator pocket in which a conventional fin tube radiator and associated heating system components may be situated, as described in connection with FIG. 8. Turning now to FIGS. 73 and 74 (and, in part, in FIGS. 15 and 16 as well), this aspect of the present invention, by integrating the trough 62 with the VUC floor construction, allows the heating elements (e.g., fin tube piping 374, fins 375, convection baffle 376, etc.) to be mounted in that trough, preferably below a grille 378 set flush with the finished floor (the floor grille 378 providing a walkable floor surface while allowing air convection currents to flow), and for the heating elements and grille to be pre-installed at the VUC factory, prior to field erection. This arrangement is to be contrasted with the conventional construction procedures of the prior art, in which the components of the heating system (as well as other HVAC systems) are almost always installed at the job site itself (as the structure is being erected).

This aspect of the invention, which is equally applicable to hot water and steam radiation, and even to electric radiation, allows the radiative element (piping 374 for hot water or steam radiation, or wiring for electric radiation, as the case may be) to be stubbed up near the VUC corner post (not shown in FIG. 74), so that during field integration, connections may be made between adjoining radiative elements. In addition, at the end of each leg or branch of the radiative element, a home run (not shown) preferably extends vertically, inside the adjacent VUC corner post and behind any associated column cover (shown in FIG. 16), and then turns, extending horizontally (above the finished ceiling) to a point of connection (located elsewhere in the VUC and not shown in FIGS. 73 and 74) with a main building run.

In the erection of a structure comprising a plurality of vertically adjacent VUC's, the vertical stacking of the VUC's alone (i.e., without any other support) is limited to seven or eight stories, since the corner posts are subject to buckling, and/or building loads are magnified in such a way as to complicate structural connections, if the height of the stack exceeds the bearing capacity of the corner posts. Therefore, although VUC's alone can be utilized in the erection of mid-rise structures, in order to allow for the erection of high-rise structures utilizing a plurality of VUC's a "superframe" must be used as an adjunct. In this aspect of the invention, and referring now to FIG. 75 in addition to the aforementioned FIGS. 1-74, a superframe, generally designated 380, comprises a conventional steel frame superstructure consisting of a plurality of a plurality of vertical steel columns 384 and a plurality of transverse transfer levels, the transfer levels functioning to carry the load of a stack of VUC's (shown diagrammatically) to the columns 384, which in turn carry the load to a foundation (not shown).

Figure 75:
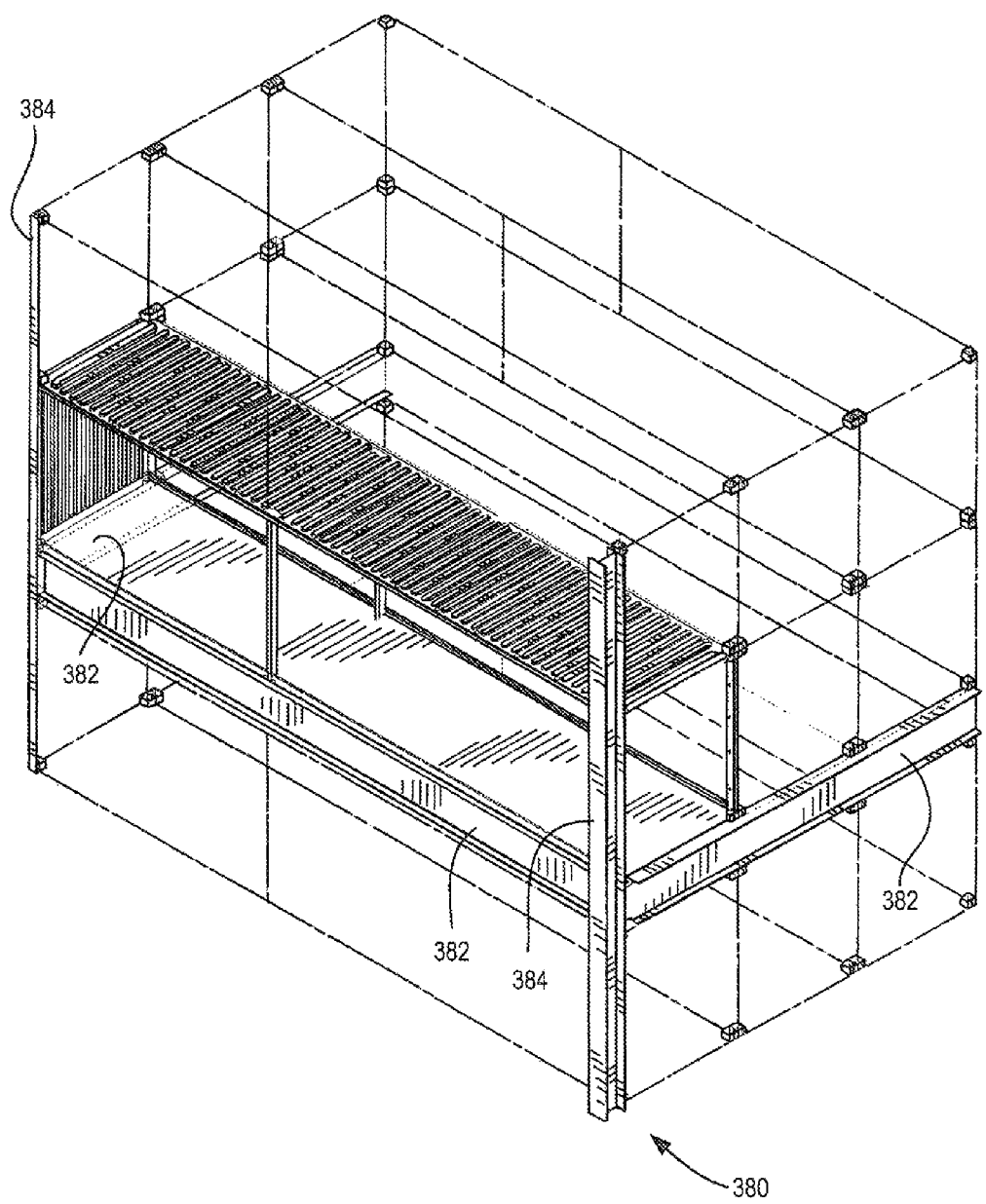
FIG. 75 is a partially diagrammatic perspective view showing another adaptation of the volumetric unit of construction of the present invention in the erection of a structure.

Preferably, the same crane and workforce that is used to erect superframe 380 is used to erect the VUC's as well. Superframe 380 is either conventionally fireproofed and covered with an architectural cladding (not shown), or receives an intumescent coating such as that described hereinbefore, and is left exposed. Depending on the requirements of any local building codes, the transfer levels would each consist of either open steel frame girders 382, as shown in FIG. 75, to which base nodes (not shown) that are adapted to receive the first level of VUC's are welded (these base nodes are similar to the foundational nodes 342 of the foundational interface, described above); alternatively, the transfer levels could consist of concrete decks (not shown) that are poured prior to stacking the VUC's, to which base nodes (not shown) are bolted (these nodes also being similar to the foundational nodes 342 described above). If the transfer levels comprise steel girders 382, then beam stitching and/or post-tensioned cables may also be used at the transfer level, in order to secure the first level of VUC's to the transfer girders 382.

Superframe 380 may be conventionally detailed, fabricated and site-erected, or it may be "packaged" as separate structural VUC's (to be described in further detail below) that are compatible with international shipping standards, and in the latter case, column and beam units that occur at building facades can be pre-fitted with column and beam covers or spandrels integrated into the VUC window wall system described above. The erection process then fully integrates the craning of standard VUC's along with "packaged superframe" VUC's that are used as structural components of superframe 380.

Although superframe 380 is preferably fabricated of steel, pre-cast concrete framing members, including columns, beams, tees and double tees, etc., which may or may not be pre-tensioned or post-tensioned, may be used in lieu of steel. Poured-in-place reinforced concrete frames, while less adaptable to the construction sequence, are also feasible, at least in principle, for use in lieu of steel in fabricating superframe 380. Regardless of its composition, however, superframe 380 must be laterally braced to meet wind and seismic requirements, either by shear wall, or braced frame, or moment connection, or combinations thereof. Alternatively, the inherent lateral stiffness of the VUC's themselves may be used so as to laterally brace superframe 380.

Figure 76:
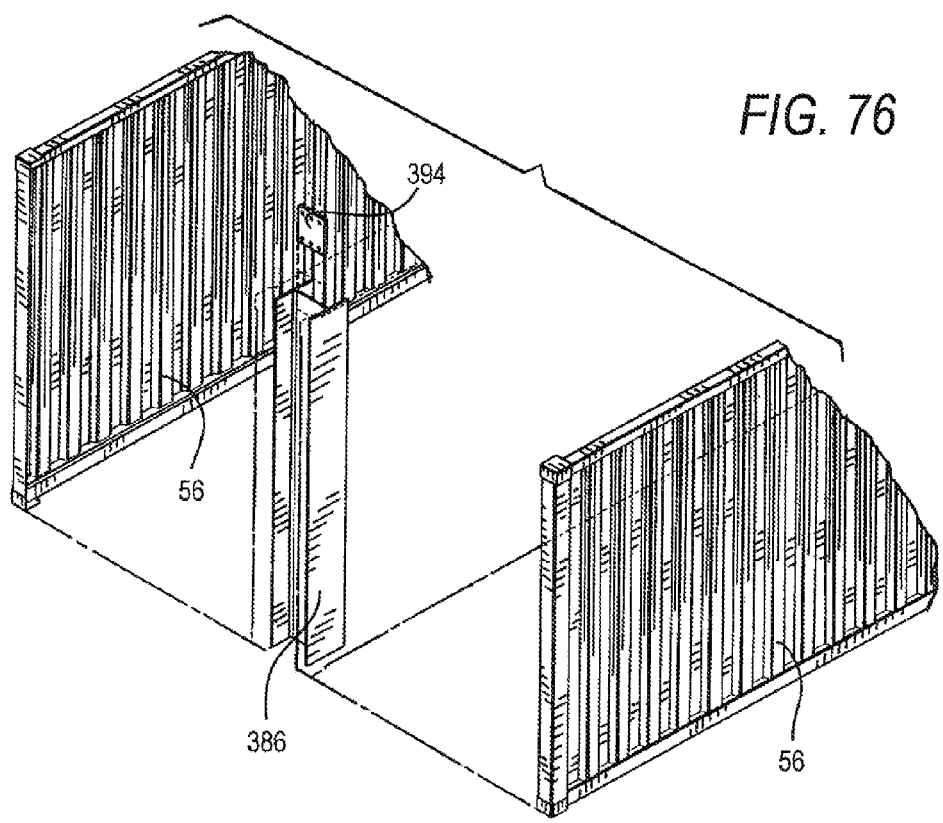
FIG. 76-78 are partially diagrammatic perspective views showing variants of the adaptation illustrated in FIG. 75.
Figure 77:
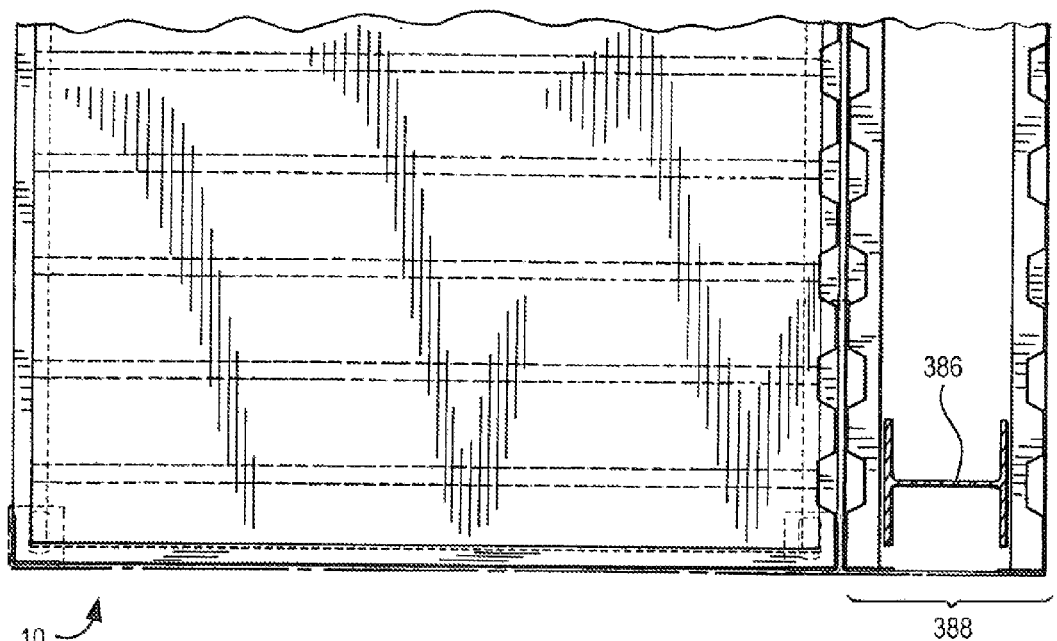
Figure 78:
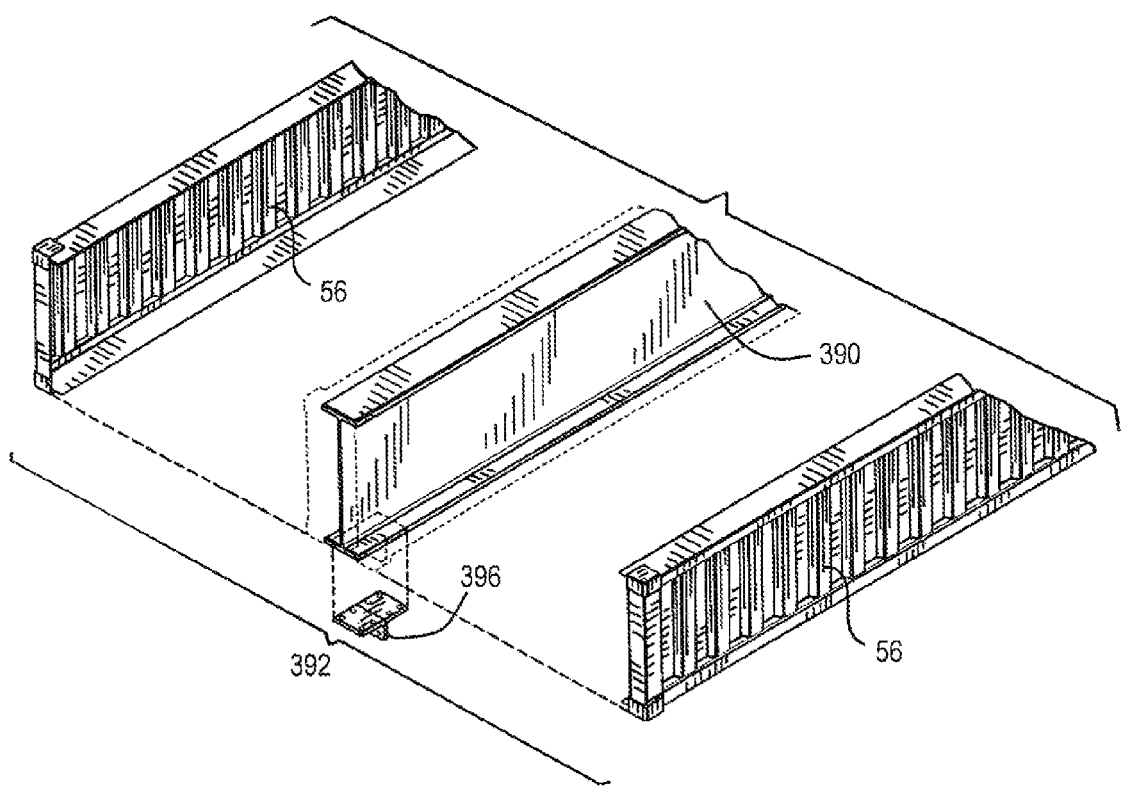

As mentioned above, it is within the scope of the invention to "package" components of superframe 380 as individual VUC-like units. Referring to FIGS. 76-78, this alternative to the superframe needed in the erection of a high-rise structure utilizing a plurality of VUC's involves pre-disposing one or more individual vertical steel column segments 386 within a VUC-like structure 388 that is of non-standard width. i.e., narrower than eight feet wide and typically one foot to three feet wide, such that the column segments 386 are substantially enveloped within the VUC-like structure 388, as illustrated in FIGS. 76-77, and/or, as illustrated in FIG. 78, pre-disposing individual horizontal steel transfer girder segments 390 within a VUC-like structure 392 that is not only of non-standard width, but is of non-standard height as well, i.e., less than nine feet six inches high, such that each girder segment 390 is substantially enveloped within the VUC-like structure 392. Similar VUC-like structures can be pre-assembled for wind bracing (not shown). In any of these cases, groups of these VUC-like units may be connected together at the factory to form a single, standard-sized, ISO-compliant unit for shipping purposes, and after reaching the job site, they may be separated and then craned into place and fastened together to yield the superframe 380 needed for erection of a high-rise structure comprising a plurality of VUC's.

These VUC-like structures 388, 392 may be pre-fireproofed (with mineral fiberboard, or with intumescent or conventional cementitious fireproofing, either of which may be sprayed on), and they may also be pre-fitted with exterior facades, both as described hereinbefore (for the latter, each such VUC-like structure will comprise at least one corrugated shear wall panel 56, forming a complete wall extending from one corner post to the adjacent corner post, as shown best in FIGS. 76 and 78); these VUC-like structures may even be pre-fitted with interior finishes, also as described hereinbefore. However, the structural connections required between and among the steel column segments 386 and/or the steel transfer girder segments 390 packaged within VUC-like structures 388, 392, respectively, will be substantial, and after craning, the ends of column segments 386 and the ends of transfer girder segments 390 must remain accessible for bolting (utilizing steel connectors of varying configurations, two of which are illustrated at 394 and 396 in FIGS. 76 and 78, respectively). The connections must also remain accessible for inspection subsequent to erection, following which they may be concealed with finish materials as would normally be utilized at the mate lines in conventional steel superstructures.

Figure 79:
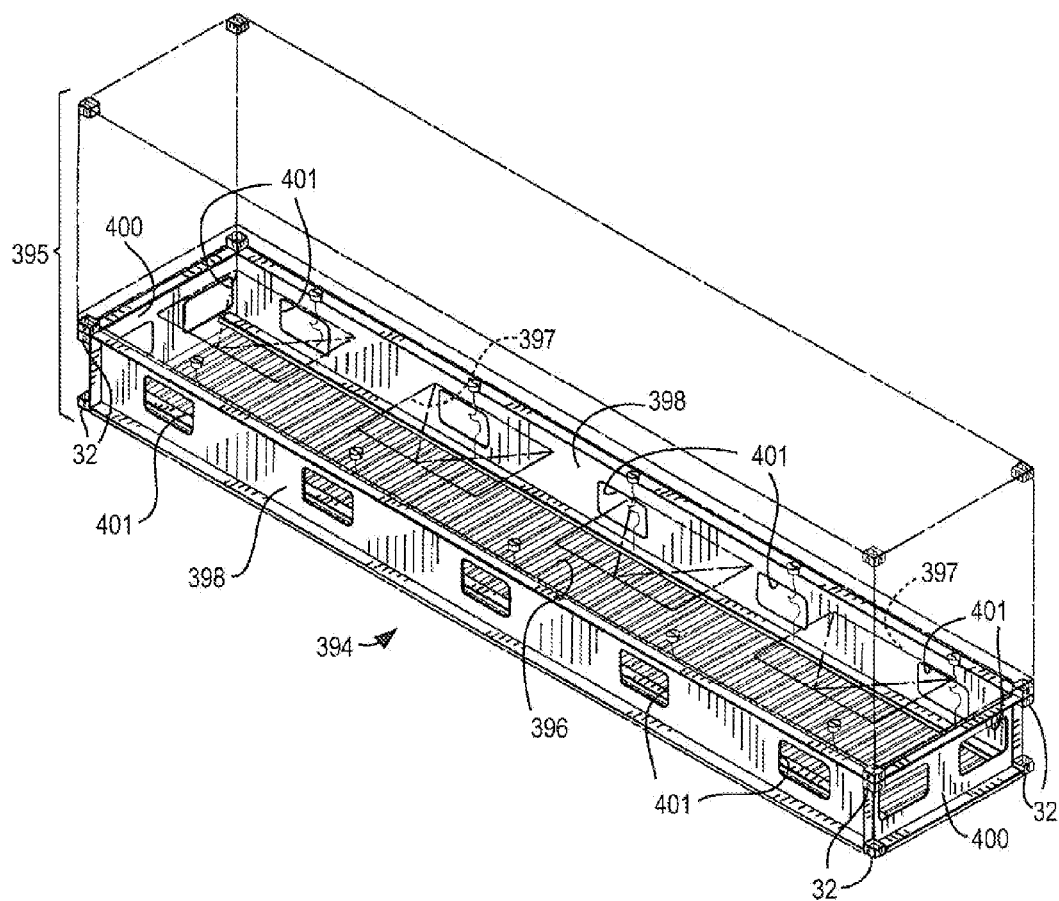
FIGS. 79-80 are partially diagrammatic perspective views showing yet another adaptation of the volumetric unit of construction of the present invention in the erection of a structure.
Figure 80:
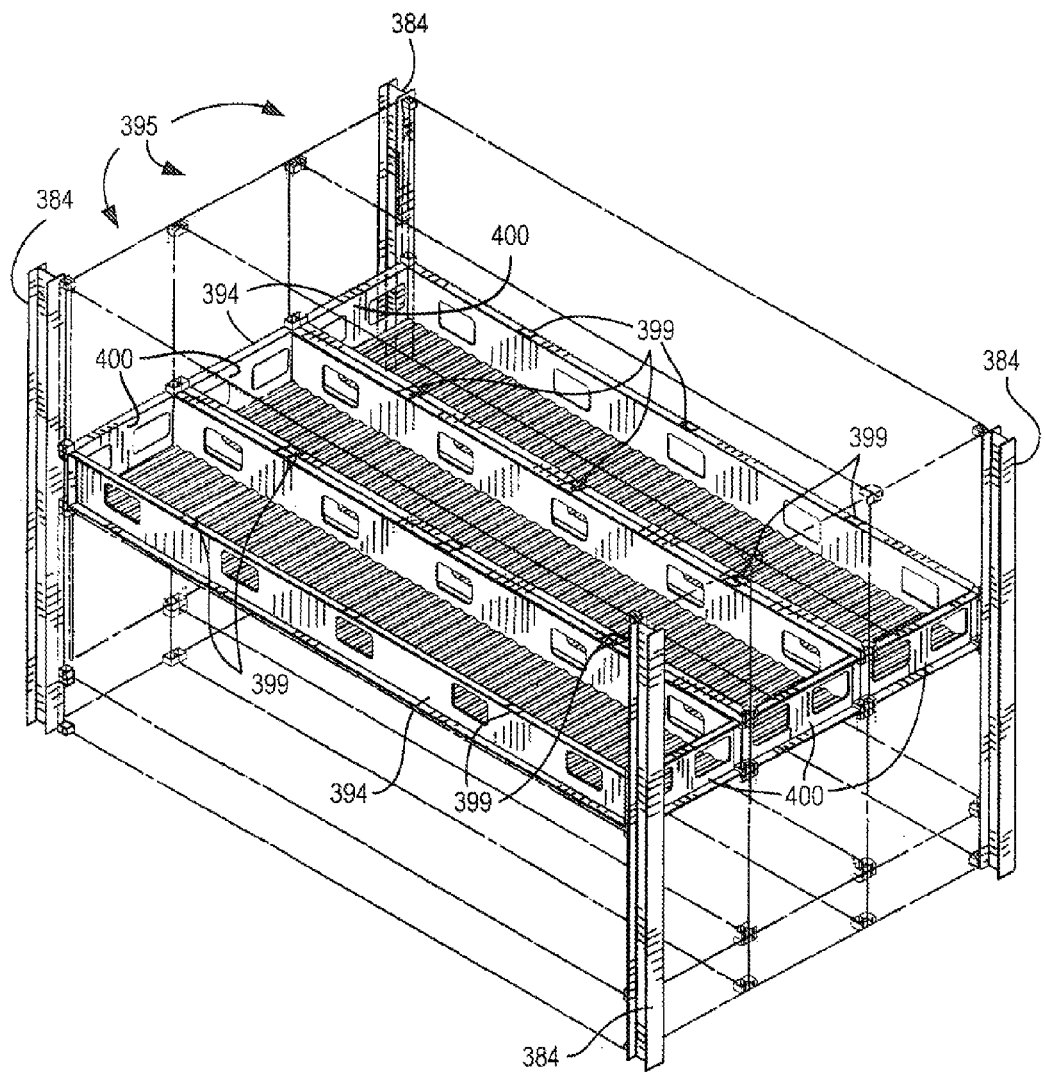

Another alternative to the superframe needed for use in the erection of high-rise structures utilizing a plurality of VUC's is illustrated in FIGS. 79 and 80. Although this alternative may include the traditional vertical columns 384 of a conventional steel frame superstructure (and/or the VUC-like structures 388 described above, within which steel column segments 386 are "packaged"), it enables the elimination of the transverse transfer levels, and involves instead the use of another VUC-like structure, to be referred to hereinafter as a flat rack service module. As shown in FIG. 79, flat rack service module 394 is similar to a VUC in that it has the same length and width dimensions and comprises ISO-compliant nodes 32 at the corners, but is dissimilar in that its perimeter framing members comprise two side beams 398 (rather than four side rails) and two end beams 400 (rather than four end rails) and no corner posts, each side beam 398 and each end beam 400 comprised of a steel beam (preferably a standard, commercially-available hot-rolled shape) of a depth and cross-section such that the side beams 398 are capable of providing a clear forty-foot span; preferably, side beams 398 and end beams 400 are fabricated with a plurality of cutouts 401 in their respective shafts, the cutouts 401 being separated from one another by a predetermined distance (to be chosen based upon well-known structural engineering and other considerations that will be unique to the structure being erected), and flat rack service module 394 preferably further comprises a steel deck 396 laid in to create a floor surface, all as illustrated in FIG. 79.

As shown diagrammatically in FIG. 79, a VUC 10 (shown in phantom) may then be stacked upon and joined with a flat rack service module 394 to form a combined module 395, and as illustrated in FIG. 80, several (illustratively three) of such combined modules 395 may be aggregated or "ganged" horizontally (by means of bolting, or post-tensioning) between adjacent vertical superstructure columns 384. The individual, eight-foot long end beams 400 of the three ganged flat rack service modules 394 are thereby moment connected, so as to form a single composite beam spanning twenty-four feet, the ends of which are then conventionally fastened to the vertical columns 384 (or to a steel column segment 386 within a VUC-like structure 388). Thus, the end beams 400 (and the side beams 398 as well) must also be sized appropriately so as to carry the same loads, and so as to accommodate the same structural deflections, as would otherwise be carried/accommodated by the conventional girders of a standard steel structural frame.

In this alternative to the superframe, the vertical steel columns 384 may either be conventionally detailed, fabricated and site-erected, or as already mentioned they may be "packaged" as separate VUC-like structures compatible with international shipping standards (as described above). Further, the columns 384 are either conventionally fireproofed and covered with an architectural cladding, or receive an intumescent coating such as that described hereinbefore, and are left exposed (also as described above). Pre-cast concrete columns may be used in lieu of steel, and any vertical columns situated at the facade of the structure may be pre-fitted with column covers, which are then integrated with the window wall system of adjacent VUC's (also as described above).

The use of flat rack service modules in lieu of conventional steel girders as set forth above results in a reduction in the number of separate or individual conventional steel members needed to erect a high-rise structure. Moreover, the same crane and workforce that is used to erect the columns 384 of superframe 380 may also be used to erect the flat rack service modules 394; the latter may either be craned separately, or craned jointly with a VUC as part of a combined module 395 as set forth above, in which case the flat rack service module 394 may be pre-assembled with a VUC to form such a combined module 395 either at the factory, or at a staging area near the job site. On the other hand, if not pre-assembled with VUC's to form combined modules, several flat rack service modules 394 may be stacked together for intermodal shipping. For example, three flat rack service modules, each of which is three feet two inches high, when stacked are equivalent in height to one standard, ISO-compliant, nine-foot-six-inch-high cargo container. Other combinations are also possible, such as four flat rack service modules, each of which is only two feet high, and which when stacked together are equivalent in height to one cargo container built in accordance with the alternate, eight-foot-high ISO standard.

Furthermore, the additional strength resulting from the sizing of the perimeter beams 398, 400 of a flat rack service module 394 enables the associated VUC (in a combined module 395) to span more than twenty-four feet, thus eliminating the need for any intermediate posts in the VUC with which it is combined, provided that the associated VUC is supported by means of steel plates 399 situated at intermediate bearing points (as shown in FIG. 80), each steel plate 399 welded between the top of a side beam 398 and flange 30 on a respective lower side rail 16 of the associated VUC. In addition, each flat rack service module 394 encloses an interstitial crawl space to which access may be provided from the associated VUC (from above, as shown in FIG. 79, or from below, as described hereinafter) via access panels 397. The crawl space allows for the pre-assembly of modular mechanical, electrical, telephone/data, fire protection and other environmental systems, and that is ready for craning as a packaged service plenum, creating (when combined with a VUC) a prefabricated unit which is suited for connection to building service risers in mid- or high-rise construction, particularly in the construction of office space and other non-residential building types, such as schools, laboratories, hospitals and similar health care facilities, all of which generally require more elaborate mechanical, electrical and other supporting systems than residential construction.

Thus, it will be understood that in the erection of non-residential structures of this type, flat rack service modules 394 may be utilized, with each functioning as a packaged service plenum, even if they are not needed to replace the horizontal steel transfer girders that would otherwise form a part of a conventional steel frame superstructure. It will also be understood that in the erection of structures for non-residential use, particularly those for office use, the interior of a VUC (whether or not combined with a flat rack service module 394) may be fitted out at the factory with, e.g., interior partitions (as described hereinbefore), or may be left unfinished at the factory, in anticipation of a conventional tenant fit-out after the structure is erected.

Mechanical systems for incorporation into flat rack service modules may include overhead air distribution with ductwork, pressurized under floor air distribution, hot water, steam or electric perimeter radiation, radiant floors (or ceilings), fan coils or heat pumps, etc., as would be used in conventional construction. Preferably, each flat rack service module will contain its own pre-assembled mechanical system distribution, with provision for hook-up to central building systems, and as will be apparent to those of skill in the art, flat rack service module 394 is as equally suited for serving a VUC 10 situated below as it is for serving a VUC 10 stacked above. Thus, while deck 396 will be laid into the bottom of flat rack service module 394 (as described above) for underfloor air distribution to, or to provide a radiant floor for, a VUC situated above it, it will be understood (although not shown in the drawings) that deck 396 may instead be attached to the top of flat rack service module 394 for overhead air distribution to, or to provide a radiant ceiling for, a VUC situated below it. It should be understood, however, that a VUC will not be carried structurally by a flat rack service module situated above it, even if that VUC is served with mechanical systems by that flat rack service module from above.

Also, if additional plenum space is required to house ductwork or other elements, then the ISO-compliant nodes 32 situated at the upper corners of flat rack service module 394 may be omitted, and instead a short post (not shown), with an ISO-compliant node welded to one end, can be erected upon and welded at its other end to the intersection of the respective side and end beams 398, 400 at each upper corner of flat rack service module 394, the four posts in combination to act as "stilts" upon which a VUC situated above may be positioned, thereby expanding the plenum space vertically.

Electrical systems may similarly be pre-assembled in the flat rack service module, ready for connection to building power systems, and sprinkler piping may also be installed therein at the assembly plant, with provision for hook-up to the building fire-protection water supply; depending on whether the interior is to be fitted out or left unfinished, appropriate sprinkler heads may be pre-Installed. The load bearing framing members of a flat rack service module may be fireproofed using intumescent or conventional cementitious fireproofing, as described hereinbefore, and the surface of steel deck 396 may either be spray fireproofed or provided with a poured concrete or gypsum floor that meets fire rating requirements.

Although the preferred structure for a flat rack service module is described above, it will be evident to those of skill in the art that it is also possible to utilize a VUC of non-standard height (e.g., four feet high) (not shown), complete with side rails, end rails, shear panels, nodes and a roof, in lieu of, but to serve the same purposes as, a flat rack service module 394.

Figure 81:
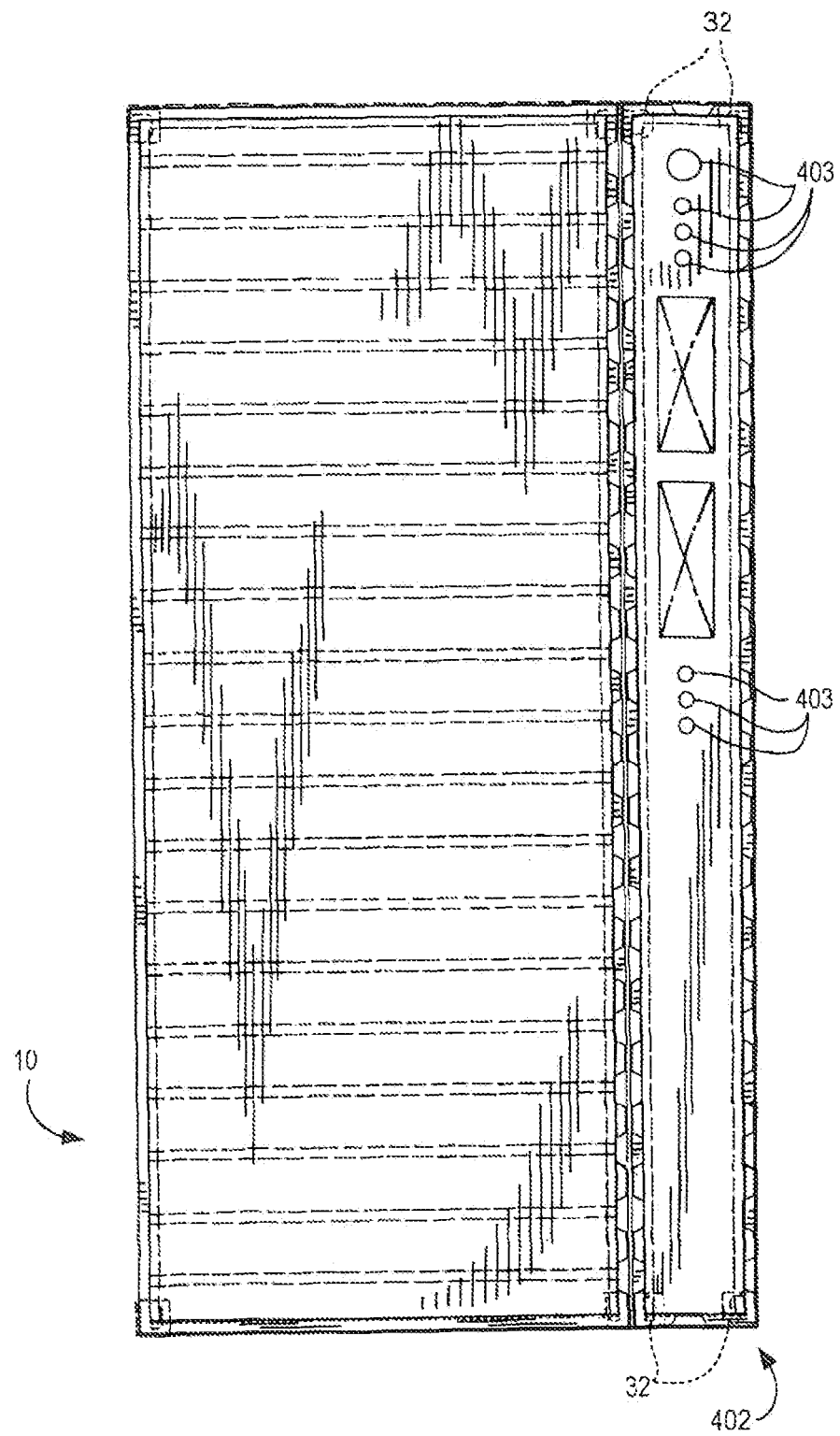
FIG. 81 is a partially diagrammatic perspective view showing still another adaptation of the volumetric unit of construction of the present invention in the erection of a structure.

Yet another VUC-like structure, to be referred to hereinafter as a side pack module, with a non-standard value for width dimension A which is less than the ISO standard of eight feet (similar to structure 388 shown in FIGS. 76-77), may be adapted for use as a utility core (for the purpose of accommodating building service runs), or for incorporation of structural bracing, or even simply for architectural expression. As shown in FIG. 81, which illustrates its use as a utility core, side pack module 402 comprises a framework similar to a VUC, with ISO-compliant nodes 32 at the corners, but which is typically only one foot to four feet wide, and through which various utility risers 403 and other building services may pass; side pack 402 typically may also be joined laterally with a VUC 10 (using column stitching as described above). As with flat rack service modules, several side pack modules 402 may be aggregated together, so as to form the equivalent of one standard, ISO-compliant, eight-foot wide cargo container, for intermodal shipping purposes. Side pack modules 402 may be fitted out and finished at the factory, and they may be provided with any combination of exterior envelope systems such as rain-screen and/or window wall facade systems, either or both in combination with facade face frames, all as described hereinbefore.

Figure 82:
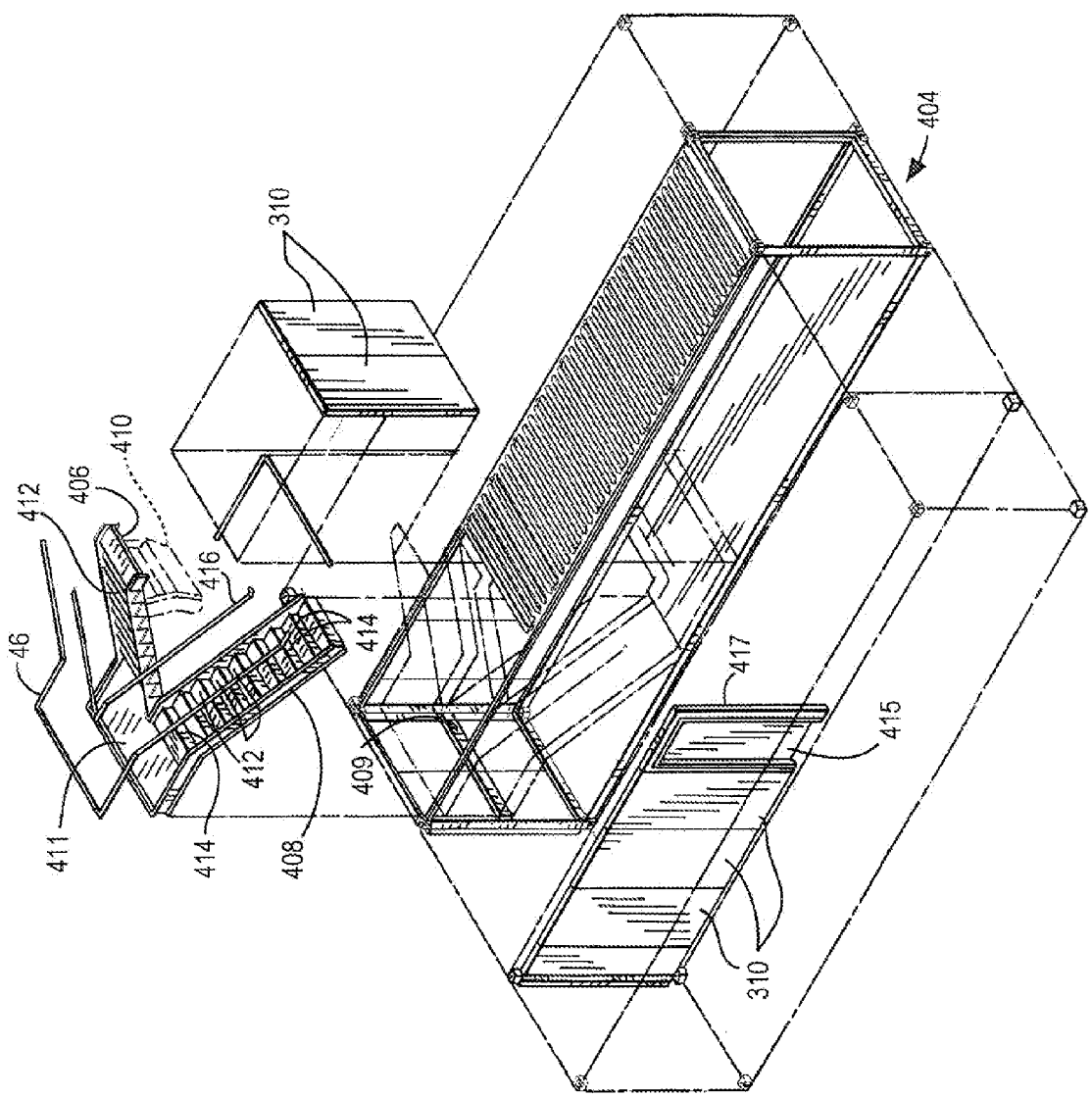
FIG. 82 is a partially diagrammatic perspective view showing a further adaptation of the volumetric unit of construction of the present invention in the erection of a structure.

In the erection of almost any structure comprising two or more vertically adjacent levels of VUC's, it will be necessary to provide for stairs and stair enclosures. Referring now to FIG. 82 in addition to the aforementioned FIGS. 1-81, in accordance with another aspect of the invention a stair VUC 404 may be adapted for use as a pre-assembled stair enclosure, with the roof and floor appropriately configured to receive a prefabricated, steel framed stair 406 at floor landings, where the stair stringers 408 are connected to steel cross-beams (not shown) situated in the plane of the roof and floor, respectively. Although the configuration of stair 406 is illustratively shown as switch-back in FIG. 82, with an additional steel cross-beam 409 situated in the end plane of stair VUC 404 so as to brace stair 406 adjacent intermediate landing 411, a stair VUC 404 may be adapted to any stair configuration that would fit the dimensions of a VUC, whether in switch-back, straight-run, or scissor configuration.

As shown in phantom in FIG. 82, the small portion 410 of each flight of stairs that would otherwise extend above the roof line of the VUC may be fitted with a hinge (not shown) which allows that portion to be retracted out of the way for intermodal shipping, and then rotated back into position and fixed in place after the stair VUC has been incorporated into the structure being erected. Alternatively, although not shown in the drawings, the hinge point may be placed at the intermediate landing 411 so that the entire stair run is hinged, and may be swung into position after incorporation of the stair VUC 404. If required for transportation and craning, temporary diagonal bracing and weather protection (also not shown in the drawings) may be provided in the plane of the VUC roof and floor.

Stair stringers 408 may be channel-shaped, as illustrated in FIG. 82, or they may be tubular, flat plate, or any other shape that may provide the required structural support. Stair treads 412 may be steel pan with cement fill, steel plate, grating, or any other type of material that meets the requirements of any local building codes. For decorative applications, materials such as terrazzo, stone, glass, carpet, wood or other material as appropriate and as meets local building codes may be used for stair treads 412. Stair risers 414 may be open (i.e., "missing") if local building codes permit, or closed with sheet metal or other material as appropriate. Stair railings 416 may be pre-fitted and pre-installed, and any segments thereof that may interfere with transportation may be shipped loose for field installation, or may be attached to any hinged sections of stair 406 and shipped in "folded" position.

The fire rating of stair VUC 404 may typically be achieved by the application of a tested drywall assembly to the inside thereof, or by fireproofing the sides of adjoining VUC's in order to form a continuous fire-rated enclosure. Alternative methods of achieving the required fire rating could include the use of mineral fiberboard fireproofing, cementitious fireproofing, intumescent fireproofing, plaster, or other laboratory tested and approved materials applied to the shell of the stair VUC 404. Fire-rated stairway doors 415 and door frames 417 may be integrated into stair VUC 404 (or in one or more adjoining VUC's) in such a manner as to meet any local building codes and to conform to laboratory-tested assemblies. After incorporation of the stair VUC 404 into the structure being erected, the stack joints at the fire-rated enclosure are fire-stopped and sealed in accordance with laboratory-tested and approved methods. In addition, fire stand-pipes (not shown), where required, may be pre-fitted within the stair VUC 404, with provision for making final connections between lengths of risers after erection. Lighting is also preferably pre-installed and pre-wired, for final connection in the field to a power source, and fire alarm systems are similarly pre-installed and pre-wired.

The pre-fabricated stair VUC 404 is suitable for both pressurized and non-pressurized applications, and where building codes allow, stair VUC 404 may be glazed adjacent to stair 406 using window wall technology as described hereinabove. To the extent that the removal of the VUC shell, for purposes of glazing, may require the addition of structural bracing, that bracing may be in the form of diagonal bracing, diagonal tension rods, or moment connections.

Figure 83:
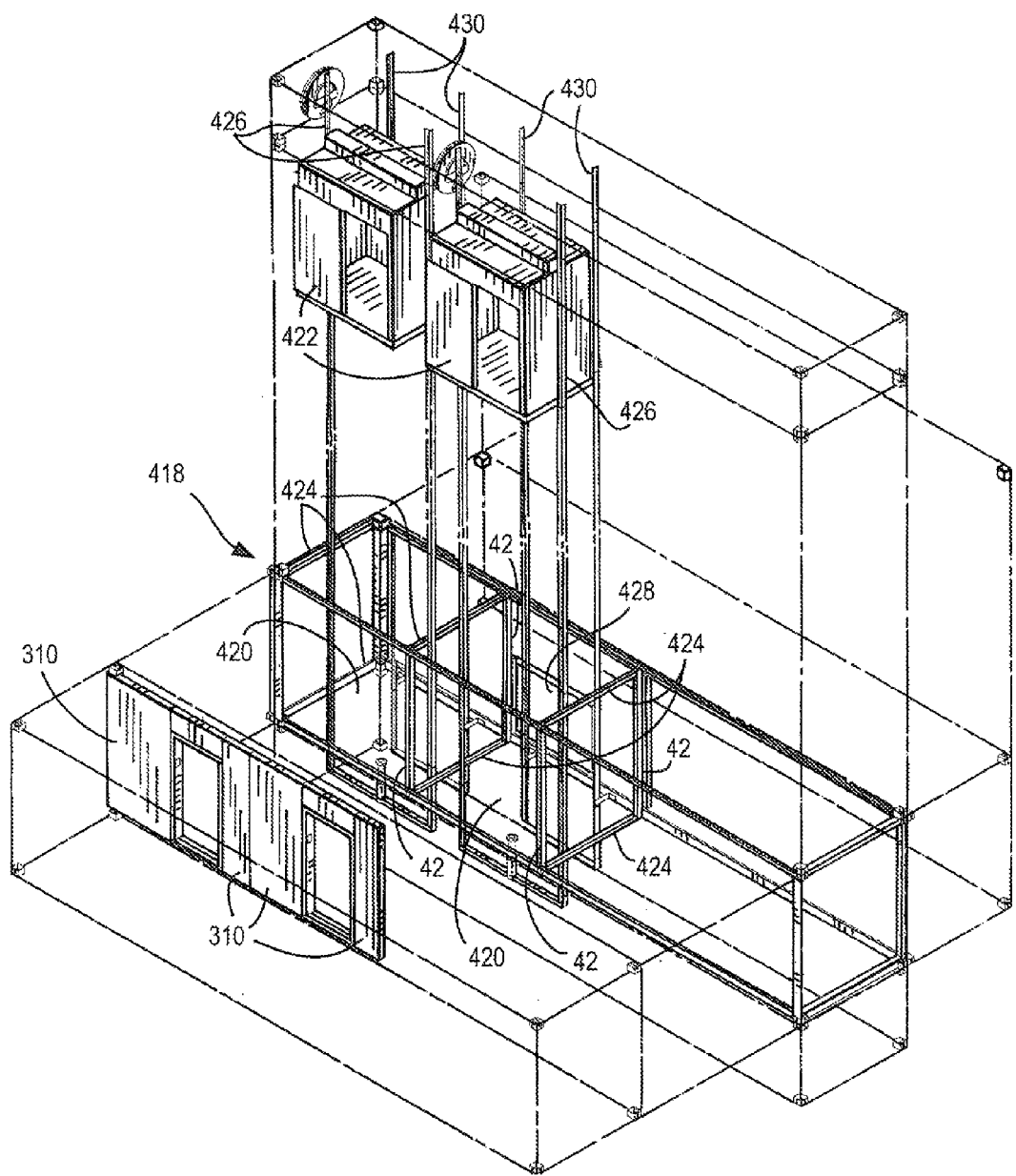
FIG. 83 is a partially diagrammatic perspective view showing yet a further adaptation of the volumetric unit of construction of the present invention in the erection of a structure.

In the erection of any mid- or high-rise structure comprising a plurality of vertically and horizontally adjacent VUC's, it will be necessary to provide for elevators and elevator enclosures/hoistways. In accordance with this aspect of the invention, and as shown in FIG. 83, a hoistway VUC 418 may be adapted for use as a pre-assembled elevator enclosure, with the roof and floor appropriately configured with one or more hoistway openings 420, each opening 420 being of the required dimensions to accommodate at least one elevator car 422, the hoistway VUC 418 also comprising a plurality of transverse intermediate rails (hereinafter spreader beams) 424, each of which is connected (preferably welded) at both ends to a respective upper or lower side rail 14, 16; the spreader beams 424 are situated at the edges of each hoistway opening 420, and are also situated between any adjacent hoistway openings 420, and as illustrated in FIG. 83, intermediate posts 42 provide additional support for spreader beams 424. If required for transportation and/or for craning, temporary weather protection and/or temporary bracing may be provided in the plane of the roof, as well as in the plane of the floor, of hoistway VUC 418 in the vicinity of each hoistway opening 420.

The fireproofing of hoistway VUC 418 may typically be achieved in the same manner as described above for stair VUC 404. Call buttons, hall lanterns, directional indicators and the like, with associated wiring, may be integrated into hoistway VUC 418 in such manner as to meet any local building codes., and the wiring may be interconnected after erection of the structure to form a functioning elevator call system. Structural reactions on the frame of hoistway VUC 418 may be taken into account in advance, and any necessary reinforcement may be applied during prefabrication thereof. Elevator cars 422, as well as elevator guide rails 426, counterweights 428 (only one of which is shown in FIG. 83 for ease of illustration) and counterweight rails 430 may be shipped loose and attached to pre-installed brackets (not shown), or alternatively, may be pre-installed with provision for final adjustment after erection.

The prefabricated hoistway VUC 418 is suitable for use with traction elevators and hydraulic elevators, arranged in various configurations. It is particularly well suited to newer "machine room-less" elevator technology, in which the elevator machinery is pre-mounted within a VUC, furnished with power, lighting and panel boards, and is pre-wired such that it is ready for connection to the building power supply. This newer technology is available from the Otis Elevator Company, a division of United Technologies Corporation of Farmington, Conn., U.S.A., under the trade name Otis Gen2, and from Kone Oyj of Espoo, Finland, and Moline, Ill., U.S.A., under the trade name Kone Ecospace. Alternatively, however, for elevators requiring conventional machine rooms, the appropriate spaces therefor may be prefabricated from an arrangement of VUC's specially configured for this purpose (not shown).

In the erection of almost any structure comprising an plurality of aggregated VUC's, it will be necessary to provide a finished roof system to be applied to the top of the structure being erected, after the VUC's of the uppermost level have been craned into place and secured. In accordance with this aspect of the invention, and referring now to FIGS. 84-88 in addition to the aforementioned FIGS. 1-83, alternate structures for roof systems, as well as modes of achieving those alternate structures, are illustrated. In each case, however, the roof system is based on a roof member which incorporates a waterproof membrane 431 formed from a mixture comprised of a liquid polyurethane resin and a curing catalyst that is gunned into polyester fleece, the latter serving to reinforce the mixture as it cures. When in the liquid state, however, the raw materials from which this waterproof resin/fleece membrane is formed are of low volatility, and are thus particularly suited for indoor use, such as in the factory in which prefabrication of the roof systems takes place; they are also compatible with planted (i.e., "green") roofs. Acceptable raw materials for use in forming the roof membrane for use with the present invention are available from Kemper System GmbH & Co. of Vellmar, Germany, under the trade name Kemperol 2K-PUR.

Figure 84:
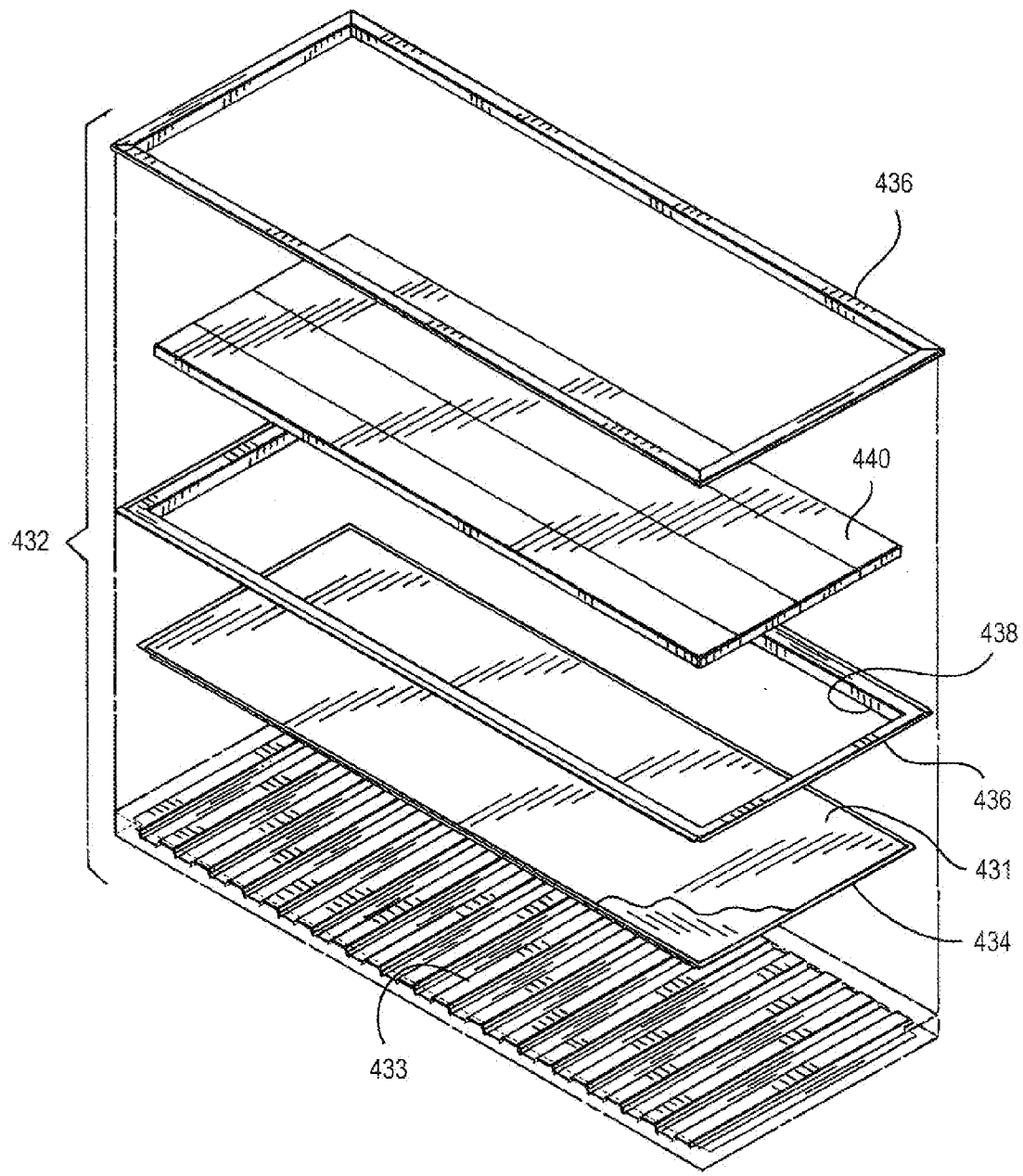
FIG. 84 is an exploded perspective view showing still a further aspect of the erection of a structure comprising a plurality of the volumetric units of construction of the present invention.

As shown in FIG. 84, roof member 432 comprises a corrugated steel deck 433, to which a flat sheet metal plate 434 is spot welded, and metal plate 434 is then coated (or may be pre-coated) with the raw materials described above to form the waterproof resin/fleece membrane 431 thereon. Thereafter, metal plate 434 is overlaid with a curb flashing 436, having inward edges 438 that slope downwardly so as to create a well, in which a layer of thermal insulation 440 may then be positioned, superimposed upon metal plate 434. The placement of insulation layer 440 above the resin/fleece membrane is appropriate for colder climates, and is consistent with the placement of insulation within the rain-screen cladding system described hereinbefore, although in some climate zones, the position of thermal insulation layer 440 may be varied, in order to accommodate temperature, humidity and dew point conditions expected locally. In either case, a rigid thermal insulation is preferably used. Also, conventional cement board panels 435 (not shown in FIG. 84, but illustrated in conjunction with FIG. 88) may be used in lieu of sheet metal plate 434 in order to create the smooth, flat surface on which to receive the resin/fleece membrane 431.

Figure 85:
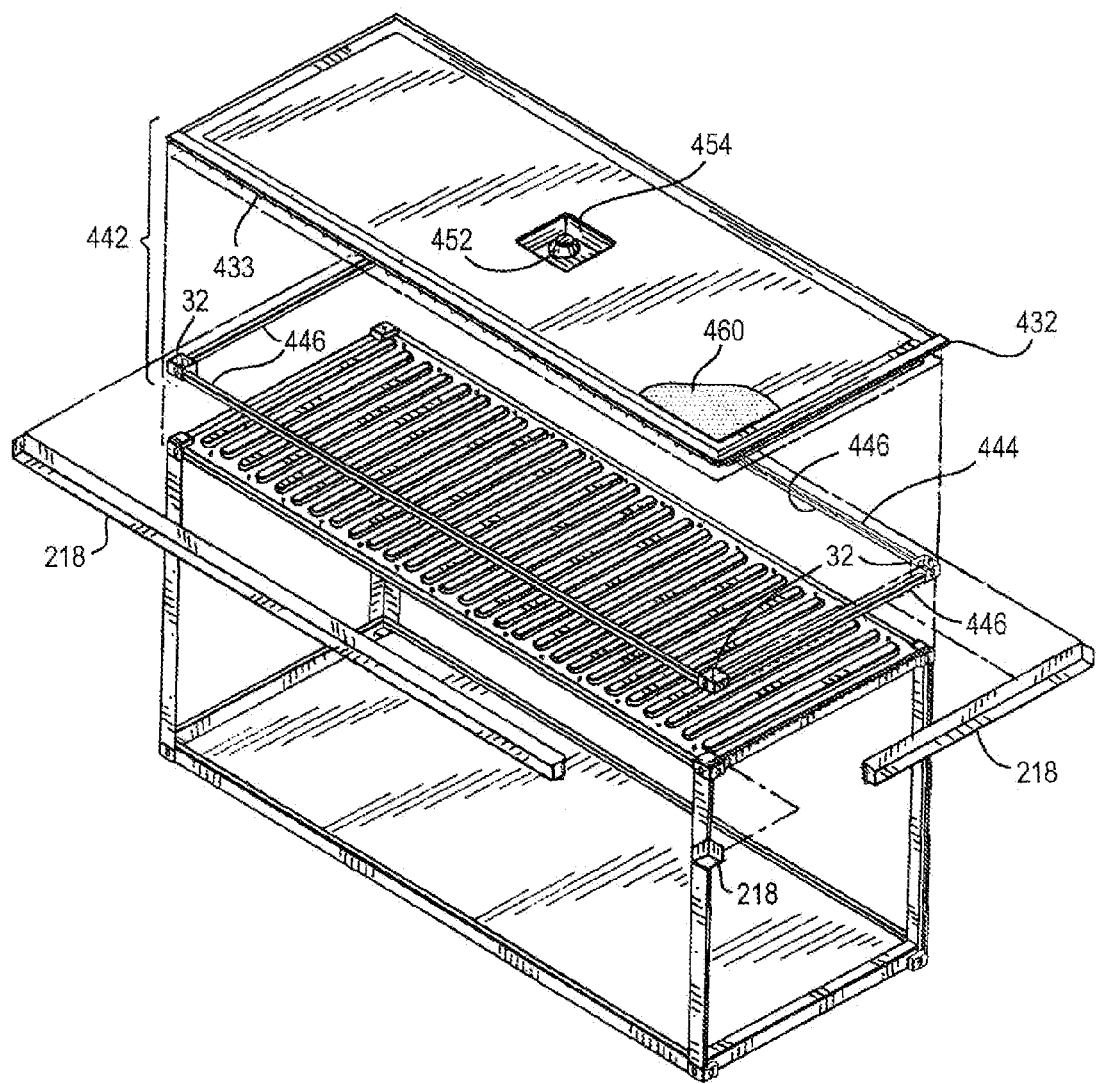
FIG. 85 is a partially diagrammatic, exploded perspective view illustrating one mode of utilizing the feature shown in FIG. 84.
Figure 86:
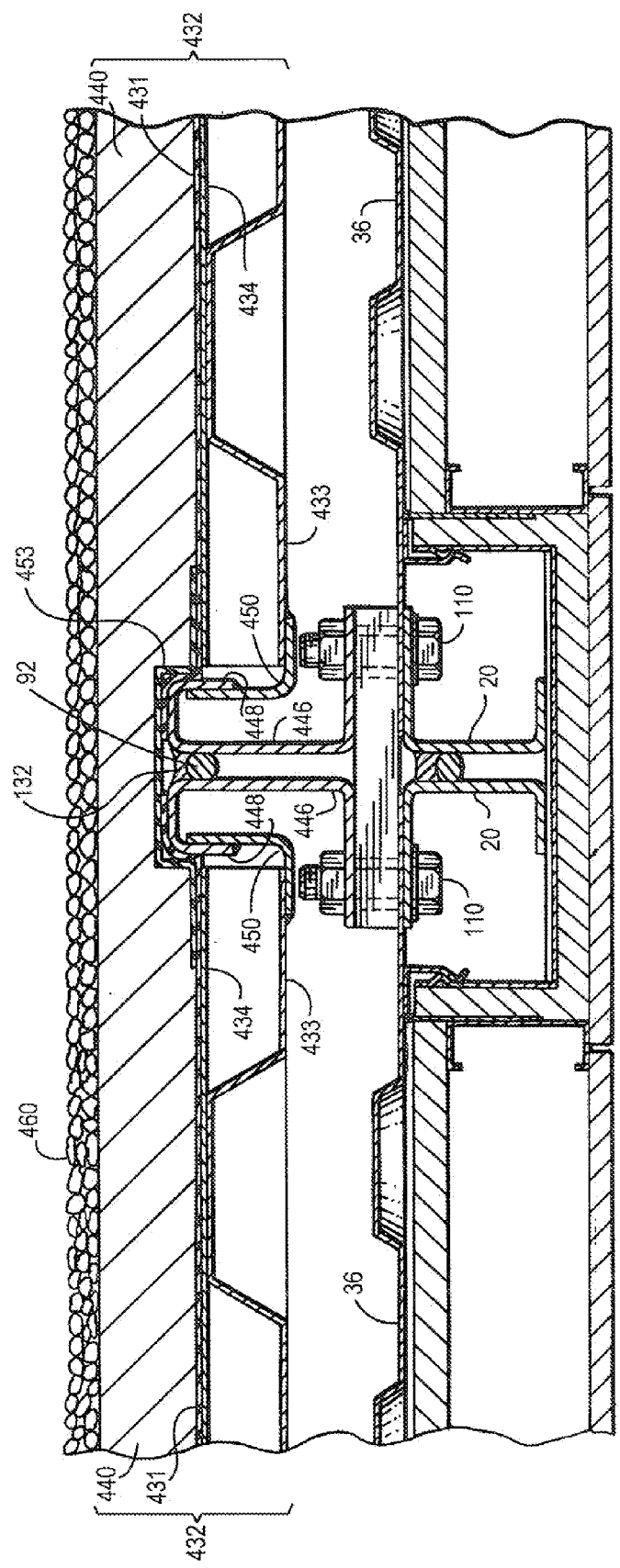
FIG. 86 is a representative enlarged cross-sectional view of the mode illustrated in FIG. 85.

As illustrated in FIGS. 85 and 86, in the preferred embodiment of a roof system in accordance with this aspect of the invention, a prefabricated roof module 442 comprises a perimeter framework 444 having ISO-compliant nodes 32 at the corners (for connection with a VUC that is situated immediately below, in the uppermost level of VUC's of the structure being erected), the nodes of framework 444 being interconnected with one another by framework members such as rails 446, each of which, although similar to the lower side and end rails 16, 20 of a VUC, carries an additional downturned leg 448 to which a bent plate shelf angle 450 is welded, the shelf angle 450 being adapted to support roof member 432 and being positioned, as shown best in FIG. 86, such that it does not interfere with the beam stitching to be completed later. Roof member 432 is then set within perimeter framework 444, and corrugated deck 433 is welded to shelf angle 450, following which resin/fleece membrane 431 is flashed to perimeter framework 444. A roof drain 452 is set in a sump or depression 454 in the plate 434 and flashed into resin/fleece membrane 431; although roof drain 452 and sump 545 are shown in FIG. 85 as being situated approximately in the center of roof member 432 (and are shown in FIG. 87 as being situated approximately in the same position), it is to be understood that this position is illustrative only, and that other locations are possible, in order to facilitate piping runs.

A plurality of such roof modules, each constructed as described above, may be assembled in a factory remote from the job site, and may be stacked either curb-to-curb or node-to-node, in either case to form, for intermodal shipping purposes, a bundle (not shown in the drawings) that is the dimensional equivalent of one standard ISO-compliant, cargo container. Upon arrival at the job site, these roof modules may then be craned into place and secured, after which they will appear similar to a series of shallow "bathtubs," each with a drain. The gaps between adjacent roof module "bathtubs" may then be sealed with a conventional silicone sealant 132 (paired with a backer rod 92), as shown in FIG. 86, and the rims of these "bathtubs" may be counter-flashed in the field with a strip of membrane (not shown) lapped over and down the sides of each curb. The gaps may then be bridged, if and as necessary, with a resin/fleece bridge membrane 453, formed in the field and identical in composition to the membrane 431 utilized within each roof module, or the gaps may be bridged with some other suitable material that is compatible with membrane 431.

Figure 87:
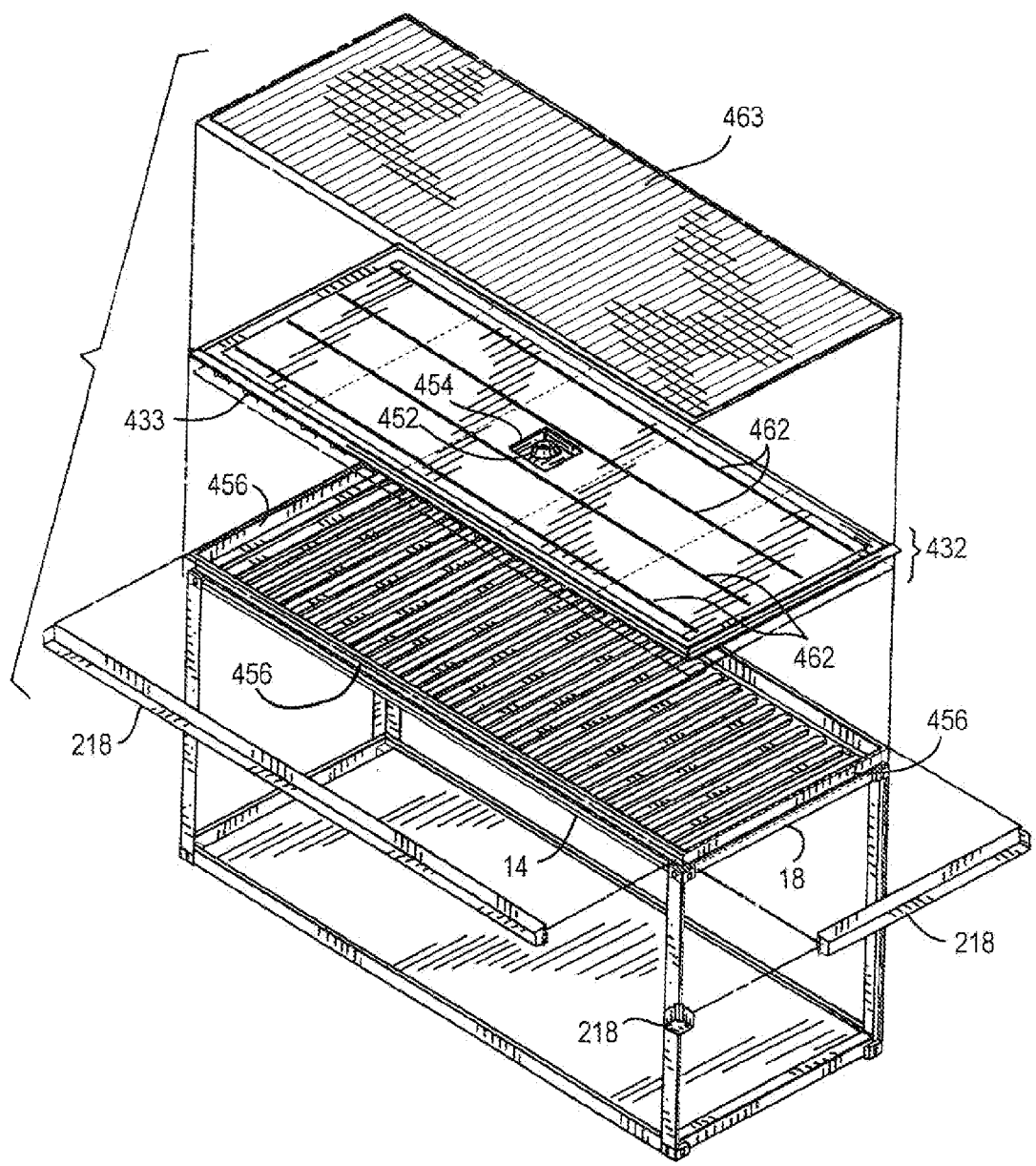
FIG. 87 is a partially diagrammatic, exploded perspective view illustrating an alternate mode of utilizing the feature shown in FIG. 84.
Figure 88:
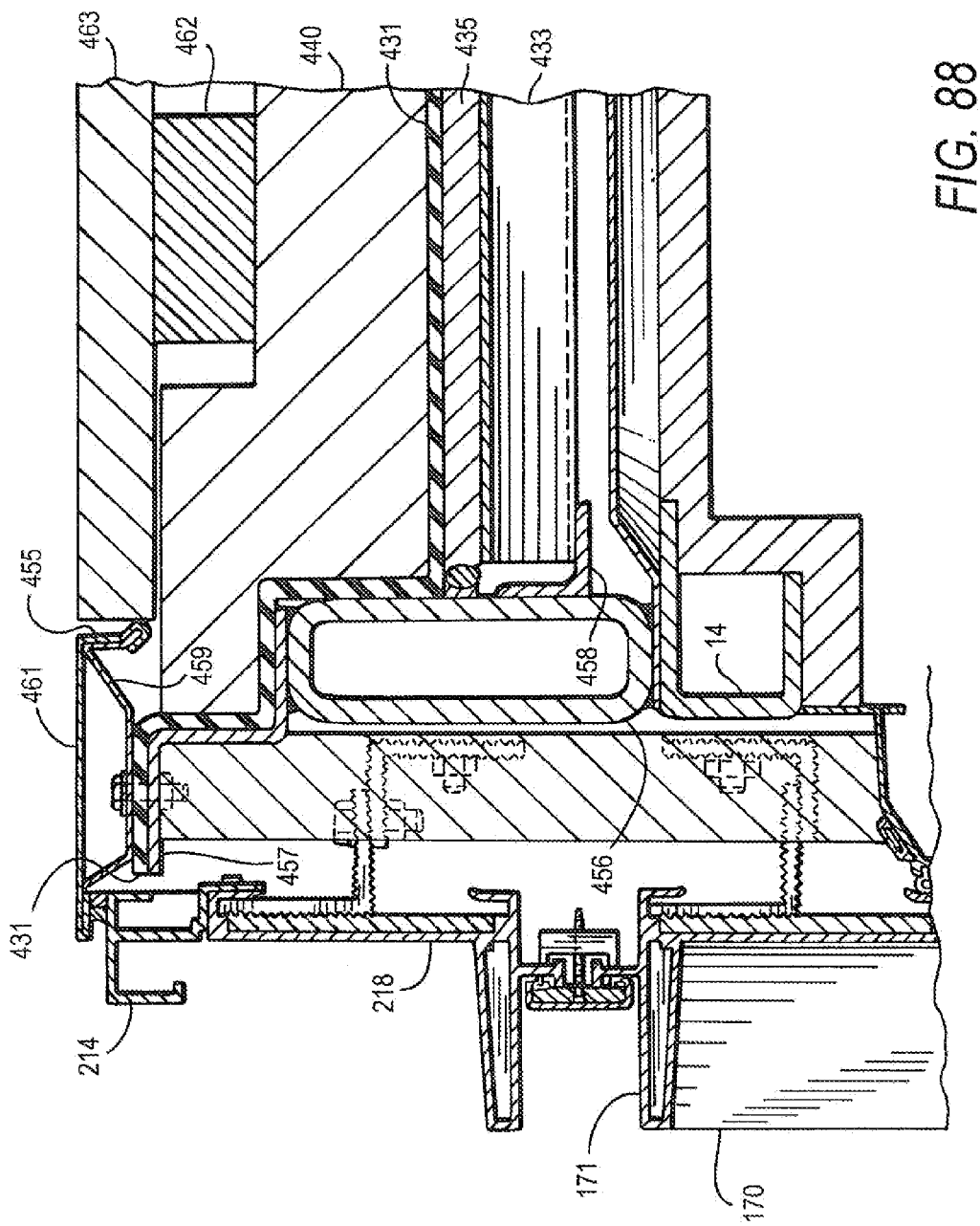
FIG. 88 is a representative enlarged cross-sectional view of the mode illustrated in FIG. 87.
Figure 89:
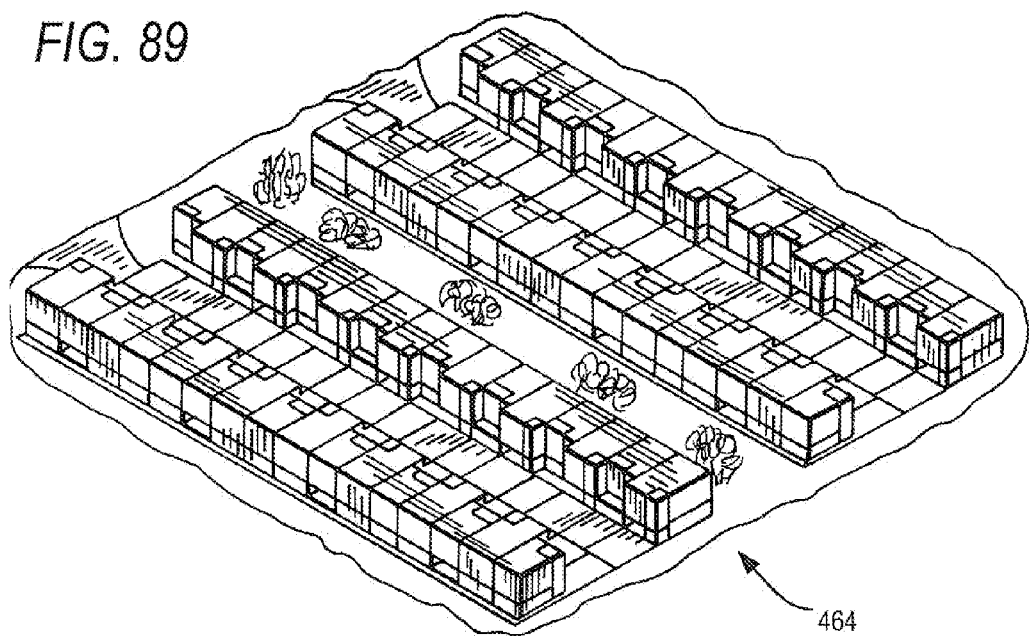
FIG. 89 is a perspective view, partially broken away, illustrating a typical configuration for a structure that can be built using the volumetric units of construction of the present invention.

In an alternative embodiment of the roof system in accordance with the invention, rather than prefabricating separate roof modules, each of which is craned into place in the field (above the uppermost level of VUC's), the roof system may instead be formed integrally with each of the VUC's that are destined to form that uppermost level, as illustrated in FIGS. 87 and 88, but due to their consequent departure from an ISO-compliant height, those VUC's will require special handling, although they may still be shipped using the intermodal transportation system, albeit at a premium. In this alternative embodiment, as shown best in FIG. 88, upwardly extending beams 456 are fastened to the upper side and end rails 14, 18 of the VUC in order to provide the augmented stiffness necessary to accommodate the increased structural load.

While upwardly extending beams 456 may be of any profile, the rectangular tube profile shown in FIG. 88 is preferred, since it creates a smooth surface on which to receive any additional, gap-bridging, resin/fleece membrane that may be applied in the field, and when used on two adjacent VUC's, it creates a joint with two parallel planes (not shown in the drawings) which is suitable to accept a conventional silicone sealant 132 (paired with a backer rod 92). Each of the upwardly extending beams 456 has a shelf angle welded 458 to it (or is formed integrally with such a shelf angle), as shown in FIG. 88, the shelf angle extending inwardly and being adapted to support roof member 432; the latter is then set within beams 456, and deck 433 is welded to shelf angle 458, following which roof membrane 431 is flashed to beams 456, and the gaps sealed as described above in connection with the preferred roof system embodiment.

Regardless of which embodiment of the roof system is utilized, it may then be completed in the field with a layer of conventional gravel or stone ballast 460, as shown in FIGS. 85 and 86, or it may be converted into a walkable surface, as shown in FIGS. 87 and 88, by first applying a plurality of sleepers 462 to the upper surface of insulation 440 so as to provide connectivity, and by then adding thereon a standard decking 463 of wood or synthetic wood, or by adding stone pavers or pre-cast concrete pavers (not shown). In each of these cases, a guardrail (not shown), bolted to metal deck 463 and flashed into resin/fleece membrane 431 near its perimeter, will typically be required to provide protection from falling, as required by local building codes.

Optionally, it is possible to convert all or part of the roof surface into a garden planter by providing an appropriate root barrier and drainage system, and by further extending either rails 446 or beams 456, as the case may be, to achieve sufficient depth for soil; walkable surfaces and planted areas may be combined. The roof system may also be equipped with photo-voltaic or solar hot water panels, and the associated wiring and/or piping can be pre-installed at the factory; following erection, final connections may be made from the roof system to the main building service runs in the conventional fashion. In addition, it may be appropriate for energy performance in some cases to create a double roof, in which roof member 432 is shaded with a rigid material.

As shown in FIG. 88, in order to provide a transition to the roof system from the exterior envelope system (such as rainscreen and/or window wall facade systems, either or both in combination with facade face frames 170 and facade face frame adapters 218, all as described previously), where the latter adjoins the roof system as the facade reaches its maximum height as measured from the ground, a roof coping 461, fabricated of extruded or formed aluminum, may be provided. Coping 461 is snapped into a continuous spring clip 459, which is bolted to the top of a continuous Z-bar 457, the latter being welded to the top of upwardly extending beam 456 in the embodiment of the roof system shown in FIG. 88, or to the top of rail 446 in the preferred embodiment of the roof system shown in FIG. 86 (neither the coping, nor any transition to the roof system from the exterior envelope system, is shown in FIG. 86); both spring clip 459 and Z-bar 457 are preferably fabricated of stainless steel. Resin/fleece membrane 431 laps over the top of Z-bar 457, and is sandwiched between that element and spring clip 459.

Coping 461 extends inwardly (to the right as seen in FIG. 88) to form a drip edge 455 and to abut either decking 463 (as shown in FIG. 88) or other paving material (not shown), or to create a retainer for gravel ballast 460 (not shown in FIG. 88). To complete the transition from the exterior envelope system to the roof system, the outward edge of coping 461 is made weathertight to the drip edge 214 of facade face frame adapter 218 by application of a conventional silicone sealant 132 (paired with a backer rod 92), or by a pre-formed elastomeric gasket (not shown) integrated into the edge of coping 461, in either case thus completing the first line of defense against water penetration. Although not shown in the drawings, the edge of coping 461 may alternatively be formed so as to extend outward and fold down over drip edge 214, so that water may be shed without requiring a sealant joint or a gasket.

As mentioned above, a plurality of the VUC's of the present invention can be stacked one upon another and one next to another in the field, so as to create a variety of single- and multi-story (mid-rise and high-rise) residential building and other structure types. In particular, a number of VUC's can be combined to form individual residential units of various sizes and floor configurations, such as those depicted in FIGS. 62 and 64, which can, in turn, be assembled repetitively into multiple-unit residential buildings and building complexes. However, since it is an important aspect of the present invention that each prefabricated VUC be fitted out at the VUC factory with environmental systems (including, but not limited to, HVAC, plumbing, electrical, fire protection, etc.), followed by transport from the factory to the job site where the VUC's are craned into place to form the structure being erected, it is equally important that those residential environmental systems be stubbed up conveniently at the periphery of each VUC, and that the stub-outs be accessible for connection in the field to the risers and/or lateral runs of the corresponding building services, so that the environmental systems of the individual VUC's can be integrated into macro-scale building systems that connect, in turn, to central plant equipment or to municipal utilities.

In order to carry out this aspect of the invention, the building cores of the mid- and high-rise residential structures to be erected must be organized so as to integrate these environmental systems connections with corridors and vertical circulation, and it has been found that this can be accomplished most readily with certain building typologies, illustrative configurations of which are depicted in FIGS. 89-92. In the first of these, commonly referred to as a townhouse or rowhouse configuration (shown in FIG. 89 and generally designated 464), each unit typically is up to three and one-half stories in height and is occupied by one family, with the possibility of a basement unit with its own separate entrance. Kitchens and bathrooms may be organized along a party wall, or as a central core. Risers (not shown) are connected from one VUC stacked above another by means of ceiling access. Once connections are made, access openings are closed up and finished to match adjoining construction.

Figure 90:
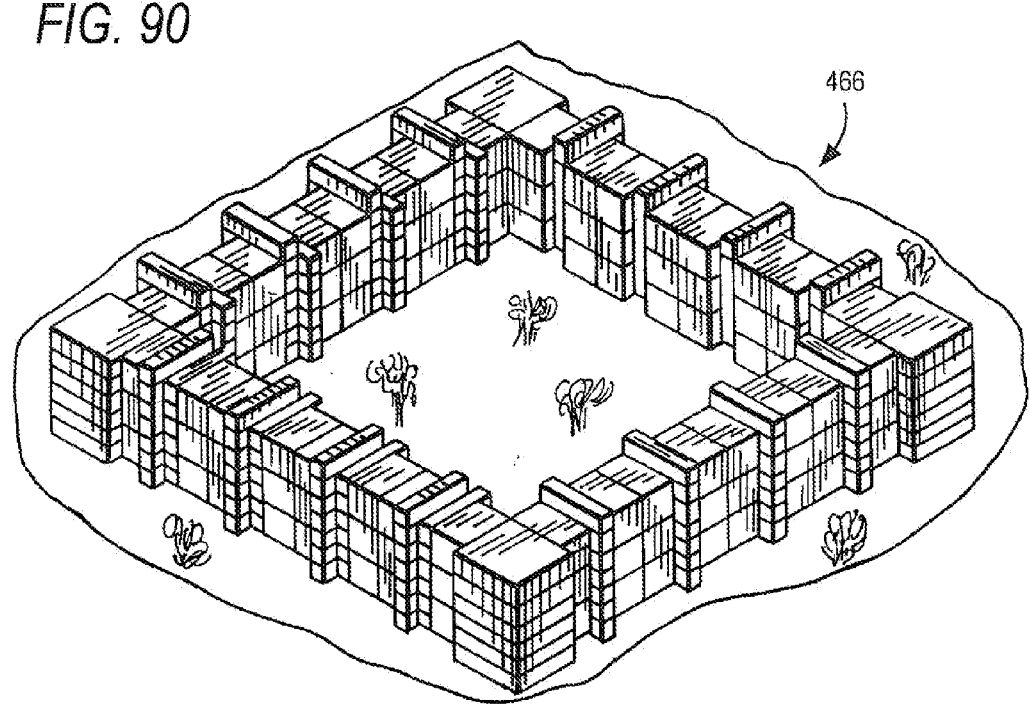
FIG. 90 is a perspective view illustrating another typical configuration for a structure that can be built using the volumetric units of construction of the present invention.

Another illustrative configuration, referred to herein as a perimeter block, is shown in FIG. 90 and is generally designated 466. Perimeter blocks are mid-rise residential apartment buildings situated close to the street line in an urban setting; when placed in series, these buildings yield a continuous street wall. Perimeter block housing may consist of stacks of residential dwelling units up to seven stories in height. The dwelling units flank an entrance hallway (not shown) that is oriented perpendicular to the street facade, and that incorporates a stair and elevator, and typically, one or two residential dwelling units (each one either single floor or duplex) open off of each side of the hallway.

Risers are organized in fire-rated shafts (not shown) on either side of the hallway (which may itself comprise a VUC) adjoining the residential units. Bathrooms and kitchens are organized along the shaft walls, and stub-outs for the necessary environmental services are accessible from the hallway side through special access openings. Risers (not shown) are preferably installed in the shafts at the VUC factory, with provision made for final alignment in the field. Connections are made from stub-outs in residential unit VUC's to risers in the hallway shafts, and riser segments are connected vertically down to the basement, where utilities are brought into the building from the street in conventional manner, and are connected to the risers.

Figure 91:
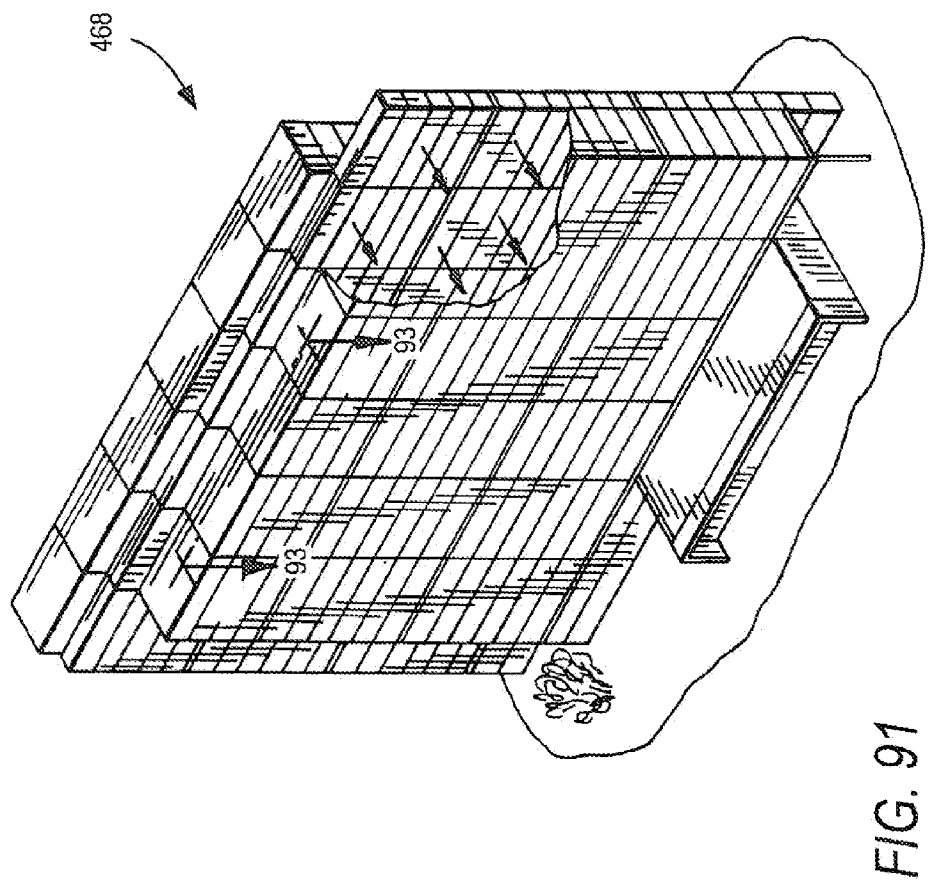
FIG. 91 is a perspective view, partially broken away, illustrating yet another typical configuration for a structure that can be built using the volumetric units of construction of the present invention.

Yet another illustrative configuration, shown in FIG. 91 and generally designated 468, is referred to herein as a slab. Slabs are defined as mid- to high-rise apartment buildings, typically characterized by a double-loaded corridor with a central elevator and stair core, although slabs may also have single-loaded corridors, or a combination of single- and double-loaded corridors. Slabs may be any height up to about forty stories, and are typically rectangular in plan and between fifty feet and seventy feet in width. VUC's adapted to serve as circulation corridors (to be described in further detail hereinafter) are designed with fire-rated shafts lining each side of the corridor, for the purpose of connecting the residential dwelling units to the building's central environmental services. The shafts may be made permanently accessible from the corridor side, if necessary for service and maintenance.

As with perimeter block configuration 466, bathrooms and kitchens in slab configuration 468 are generally organized along or near the shaft walls, and, stub-outs for environmental services are accessible from the corridor side through special access openings (not shown). Risers are installed in the shafts at the assembly plant, with provision made for final alignment in the field. Connections are made from stub-outs in residential dwelling units to risers in the corridor shafts, and riser segments are connected vertically down to the basement, where utilities are brought into the building from the street in conventional manner, and are connected to the risers. In the case of some of the environmental systems, such as the electrical, the stub-outs from the residential dwelling units may instead be connected to lateral runs that are pre-installed above the corridor ceiling. Accessible openings at mate-lines allow lateral runs to be connected in the field so as bridge the mate lines.

Figure 92:
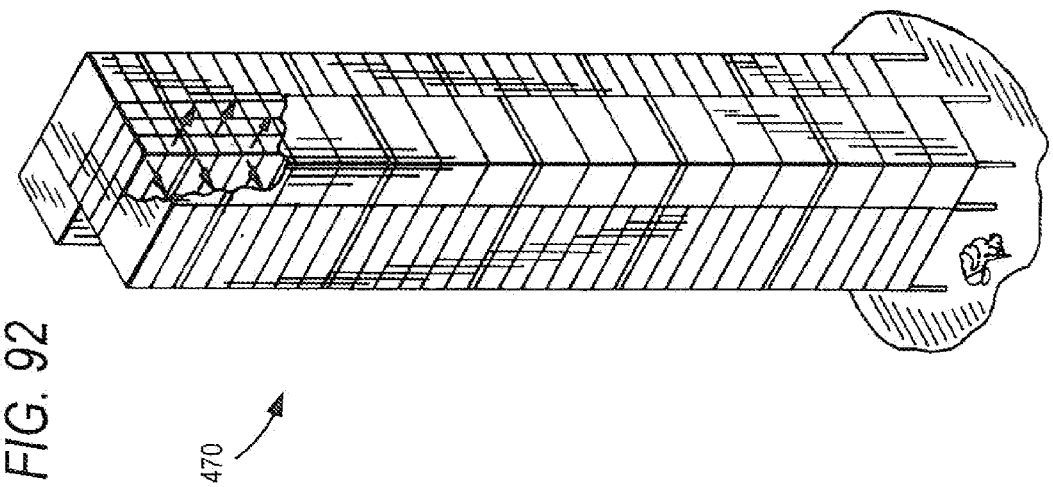
FIG. 92 is a perspective view illustrating still another typical configuration for a structure that can be built using the volumetric units of construction of the present invention.

Still another illustrative configuration, shown in FIG. 92 and generally designated 470, is referred to herein as a tower. Towers are mid- to high-rise apartment buildings up to forty stories or so in height, characterized by a centralized circulation system. A tower configuration 470 differs from a slab configuration 468 in that instead of a double-loaded corridor with residential dwelling units (or other units, as above) opening off of both sides, a corridor loop surrounds the stair and elevator core, and the residential units are organized on three or four sides of the core. In some cases the corridor configuration may be other than a loop, provided that access is still afforded to the residential units on at least three sides of the core. Tower configurations 470 typically are closer to square in plan than are slab configurations 468.

Regarding the manner in which stub-outs are connected to vertical risers, tower configuration 470 utilizes a similar strategy of fire-rated shafts integrated into the VUC's adapted to serve as circulation corridors, and riser connections are made in the same way. Laterals may simply cross the corridor to a vertical shaft (or shafts) organized within the stair and elevator core.

FIG. 93 illustrates a VUC adapted to serve as a double-loaded circulation corridor 472, with a plurality of shafts 474 lining each side of corridor 472, in a structure configured as a slab 468 in which illustrative residential dwelling units 476, 477 (only four of which are shown, each formed from adjoining VUC's) flank corridor 472 (the floor layouts of dwelling units 476 and 477 resemble those of apartments 336 and 338, respectively, the latter described above in connection with FIGS. 61-62). Each shaft 474 of corridor VUC 472 houses a plurality of vertical environmental system riser segments (not shown), which are preferably pre-installed at the VUC factory, and which are adapted to be fastened together vertically with like segments in other, vertically adjacent corridor VUC's 472 (as the latter are stacked one upon another), so as to form completed vertical building risers. FIG. 93 also illustrates how bathrooms 478 and kitchens 480 may be organized along or near the walls 482 of shafts 474, so that horizontal connections to environmental systems may easily be made from the residential units to the vertical building risers (not shown) in each shaft 474.

Figure 94:
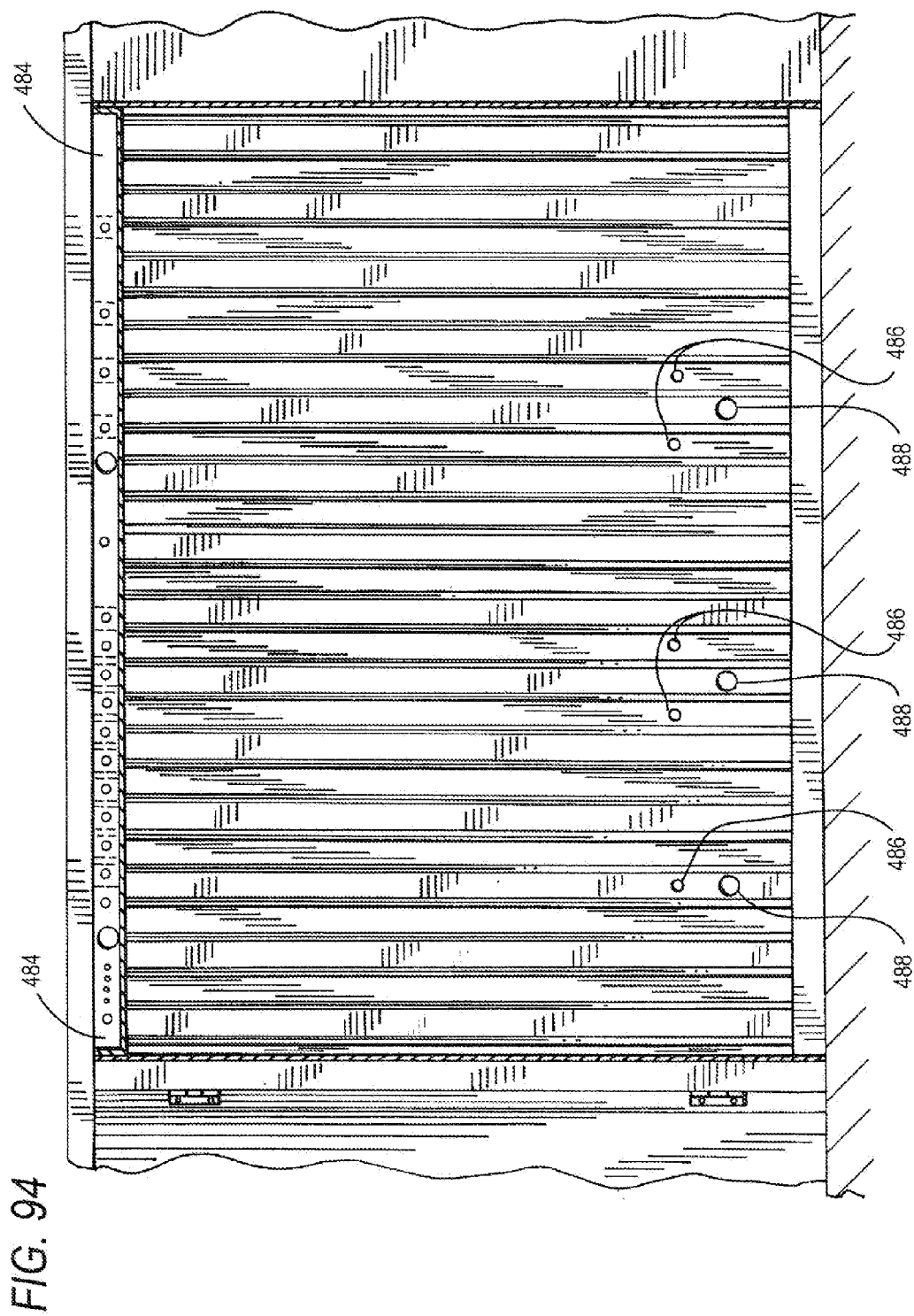
FIG. 94 is a further enlarged cross-sectional view, taken substantially along the lines 94-94 of FIG. 93.

FIG. 94 illustrates how the stub-outs may conveniently be organized, at the end of a representative VUC, in an environmental systems manifold 484, for subsequent integration into the corresponding building services; manifold 484 is illustratively located adjacent the upper edge of the VUC, and may illustratively include stub-outs for residential environmental services such as domestic hot and cold water, air conditioning refrigeration (both supply and return), fin tube radiation (both supply and return), electrical service, gas (e.g., propane) service, telephone/data service, cable television service, other audio-visual services, as well as lighting controls and solar shade controls. In addition, FIG. 94 illustrates that separate stub-outs 486, 488 may be provided, illustratively at a different location (for example, adjacent the lower edge of the VUC), for sink/lavatory waste and toilet waste, respectively. It is to be understood, however, that the location of manifold 484, as well as the particular configuration of its stub-out array, and the location of stub-outs 486, 488, will vary as dwelling unit floor layouts vary, and therefore the locations and configurations of these elements as shown in FIG. 94 are all to be considered as illustrative only.

In the erection of most structures comprising a plurality of horizontally and vertically adjacent VUC's, the VUC's in each vertical stack will be positioned such that the corner posts and nodes of each VUC are aligned vertically with the corner posts and nodes of the VUC's above and below it. However, the design of some structures may require that the VUC's on one level be shifted laterally with respect to the VUC's in the level below, such that the corner posts (and nodes) in one level are offset from (i.e., are out of alignment with) those in the adjacent level below. The offset structural load caused by this "shift" may nevertheless be carried, in one of several different ways. One way is to prefabricate the VUC in the level(s) below with additional intermediate posts (not shown), so as carry the offset load in a plumb line to the foundation (concrete or other supporting sub-structure), through such posts positioned appropriately on every level.

Figure 95:
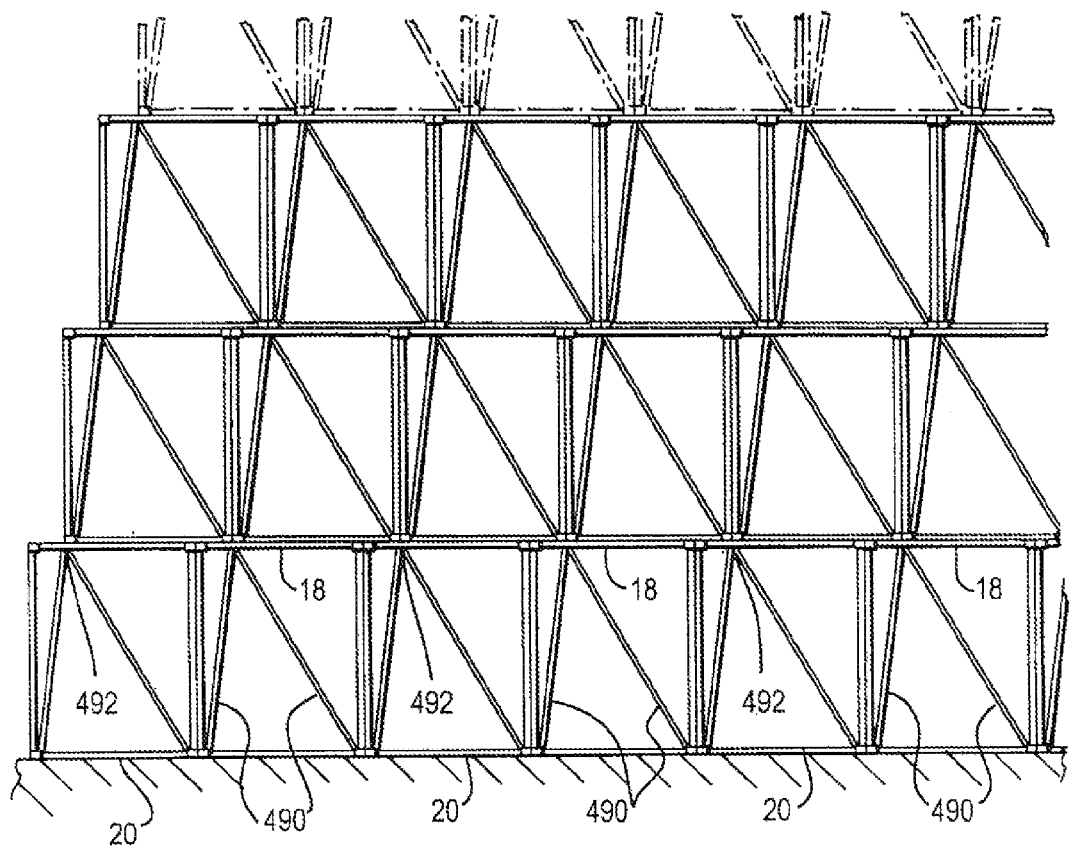
FIG. 95 is a diagrammatic view showing an illustrative use of another adaptation of the volumetric unit of construction of the present invention in the erection of a structure.
Figure 96:
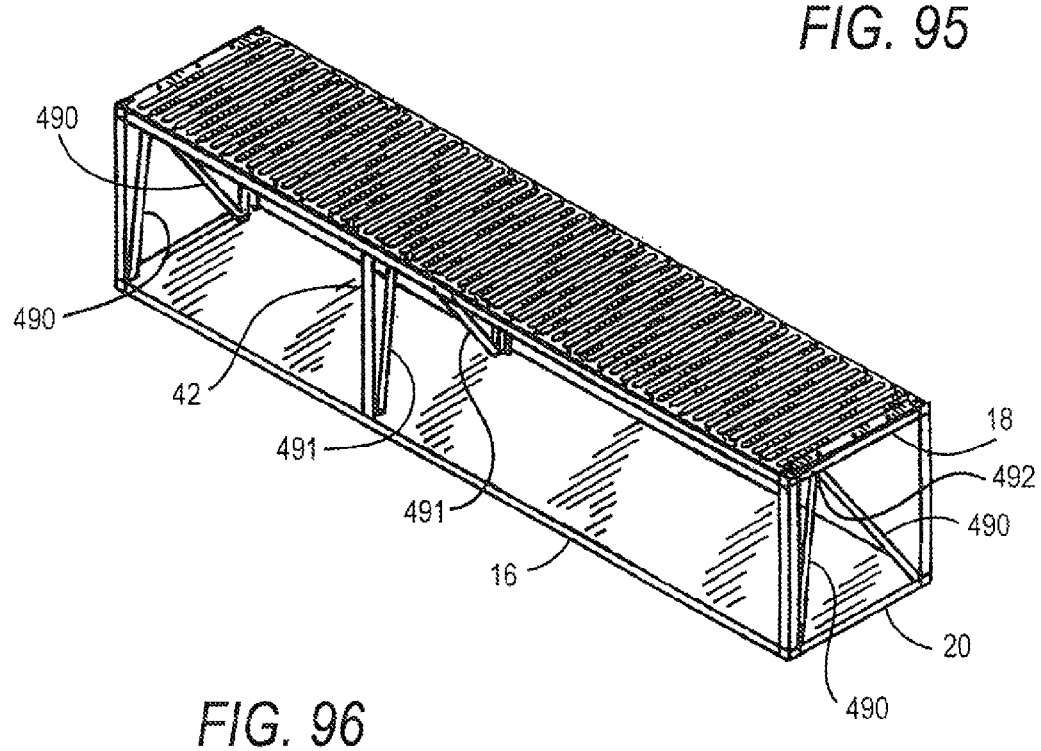
FIG. 96 is a perspective view of a volumetric unit of construction incorporating the adaptation shown in FIG. 95.

Another preferred way in which to carry the offset load imposed at mid-span by a corner post and node of the VUC in the level above, as illustrated in FIGS. 95-96, is to "package" two additional intersecting diagonal steel members 490 within each end of the frame of each of the VUC's intended to form the level below. These intersecting diagonal members 490 are oriented such that their ends intersect at an intermediate point 492 in the upper end rail 18 of each VUC, the intermediate point 492 being situated (when the structure is erected) directly below a corner post and node of a VUC in the level above, so that the intersecting diagonal members 490 carry the load from that intermediate point 492 to the nodes at either end of the lower end rail 20 immediately beneath (i.e., in the same VUC). In effect, each end of each VUC incorporating the intersecting diagonal members 490 becomes a truss divided into triangular panels, thereby providing the necessary support for the corner post and node in the VUC in the level above.

As shown best in FIG. 96, if the VUC incorporating intersecting diagonal members 490 at its ends also incorporates a clear span of more than twenty-four feet, and therefore comprises a pair of intermediate posts 42 aligned opposite one another for additional support (only one of which is shown in FIG. 96), then similar intersecting intermediate diagonal members 491 (as well as the necessary upper and lower transverse intermediate rails, which are not shown) must also be included between the two intermediate posts 42, although it should be understood that in such cases the intersecting intermediate diagonal members 491 will carry the offset load to the points at which the adjacent intermediate posts intersect the lower side rails 16 of the VUC (rather than to any additional nodes), and that if necessary, the intersecting intermediate diagonal members 491 between the two intermediate posts can later be concealed by an internal partition (not shown).

Whichever of the constructs described above is used to carry the offset load, it should be understood that leveling shims or plates, or beam stitching, or even an additional node or nodes, must be provided to ensure that loads are transmitted from level to level without causing the VUC framing members to deform. It is also to be understood, however, that if the VUC in the level below incorporates a shear panel that is capable of carrying the offset load, or if the VUC in the level below is instead prefabricated with deeper upper end rails 18 so as to increase their stiffness in order to transfer the offset load laterally to the adjacent corner posts 22, then neither of the constructs described above (i.e., neither extra intermediate posts nor any intersecting diagonal members 490, 491) will be necessary.

Figure 97:
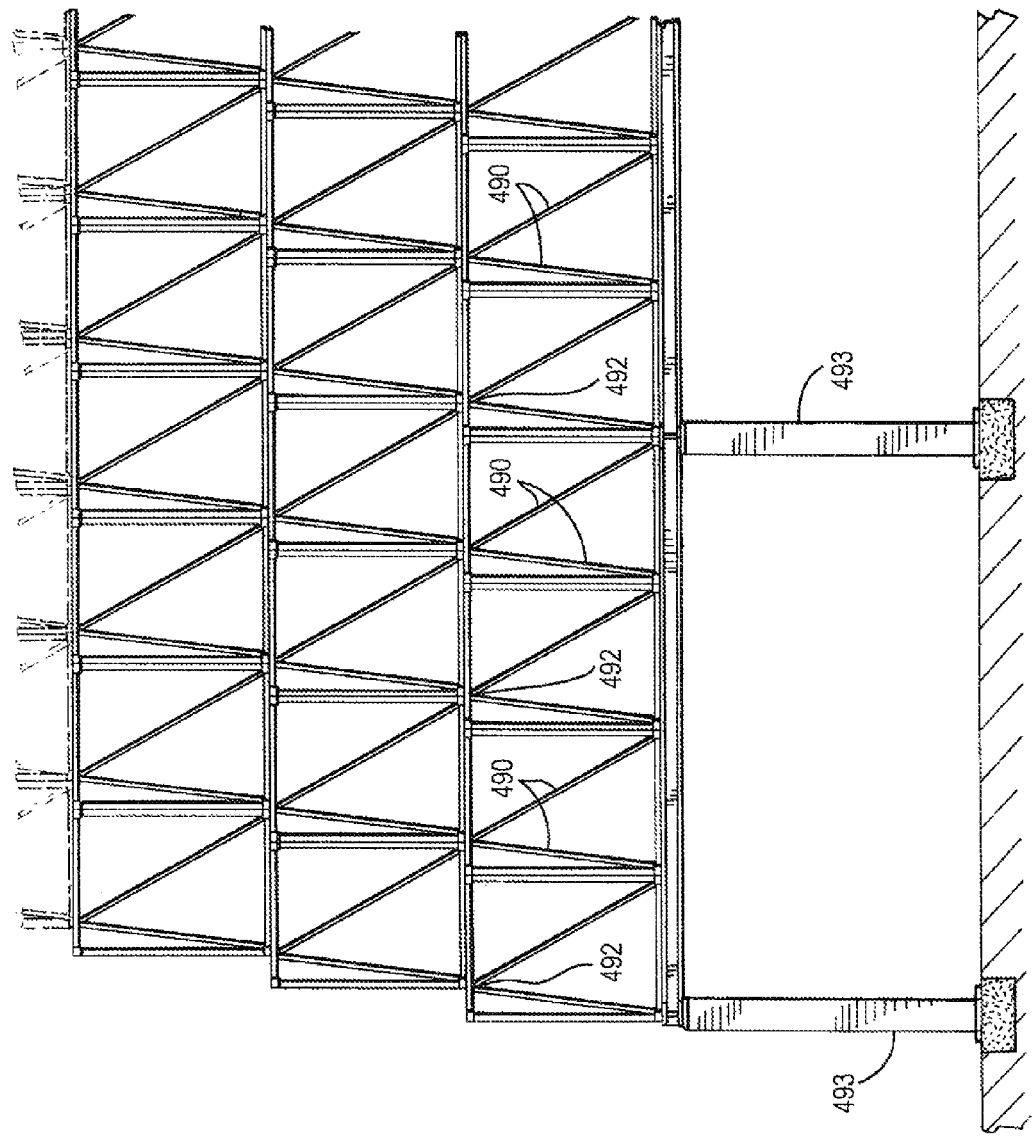
FIG. 97 is a diagrammatic view showing another illustrative use of the adaptation shown in FIGS. 95-96.

A plurality of VUC's packaged with intersecting diagonal members 490, forming truss elements as described above, may be aggregated horizontally so as to allow all of the VUC's in one level of the structure being erected to be "shifted" with respect to all of the VUC's in the level below, as shown best in FIG. 95. However, a plurality of VUC's packaged with the same intersecting diagonal members 490, forming truss elements as described above, may also be aggregated horizontally (either side-to-side or end-to-end) to create a "long-span" construct immediately below, as shown in FIG. 97. The aggregated VUC's are connected at the nodes, either by bolting or by use of a horizontal post-tensioned cable (not shown), for structural load transfer through the top and bottom chords of the truss. By properly sizing the diagonal members and detailing the connections, the load from the level (or levels) above may be transferred to more widely spaced supports 493 in the level below the truss, the latter enabling longer spans and/or fewer supports, where needed in erecting a structure that will, for example, provide public space (e.g., retail space, or conference or banqueting space) at ground level, while at the same time providing residential (or other) units in the level(s) above, the VUC's at the truss level being equally suited for use as unoccupied space, such as to house mechanical equipment or as some other type of interstitial service space.

As indicated above, in the erection of a residential structure comprising a plurality of horizontally and vertically adjacent VUC's, some of the VUC's may be fitted out at the factory with the plumbing and plumbing fixtures required to function as a residential lavatory or bathroom. However, if the structure to be erected is an office building or other non-residential structure, then some of the VUC's may similarly be fitted out to serve as at least a portion of a toilet core, where needed to form public or private rest rooms that can accommodate simultaneous use by a plurality of individuals (typically with a plurality of sinks, urinals and toilets, but usually with no baths or showers), and as shown best in FIG. 98. The necessary electrical wiring and plumbing (the latter including floor drains and waste piping, as required), can be pre-installed in the floor, walls and ceiling of each toilet core VUC at the factory, and the floor may be pitched to the drains or depressed for tile or other floor finishes.

Figure 98:
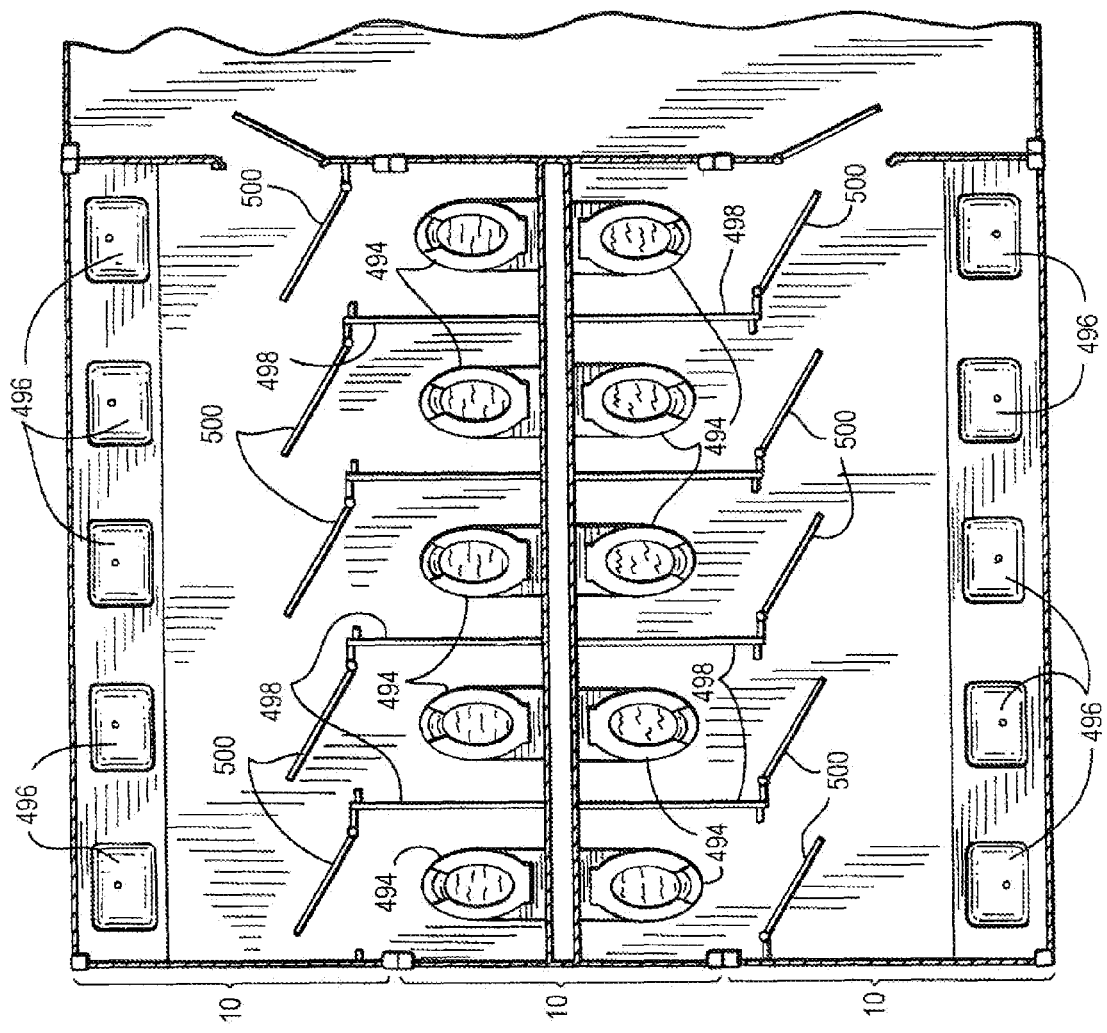
FIG. 98 is a diagrammatic view showing an illustrative use of the volumetric unit of construction of the present invention in the erection of a non-residential structure.

As illustrated schematically in FIG. 98, the plumbing fixtures (such as toilets 494, urinals [not shown] and sinks 496) and the toilet partitions 498 (including partition doors 500) may be installed in the toilet core VUC's, all at the factory, so that the toilet core VUC's comprise a semi-finished multiple-user rest room facility that may be transported to the job site, ready for integration into the structure being erected, with piping stubbed up at the wall that faces an adjacent corridor VUC or other building core space (not shown), such that the stub outs are available for connection to the corresponding macro-scale building systems that connect, in turn, to municipal utilities.

Figure 99:
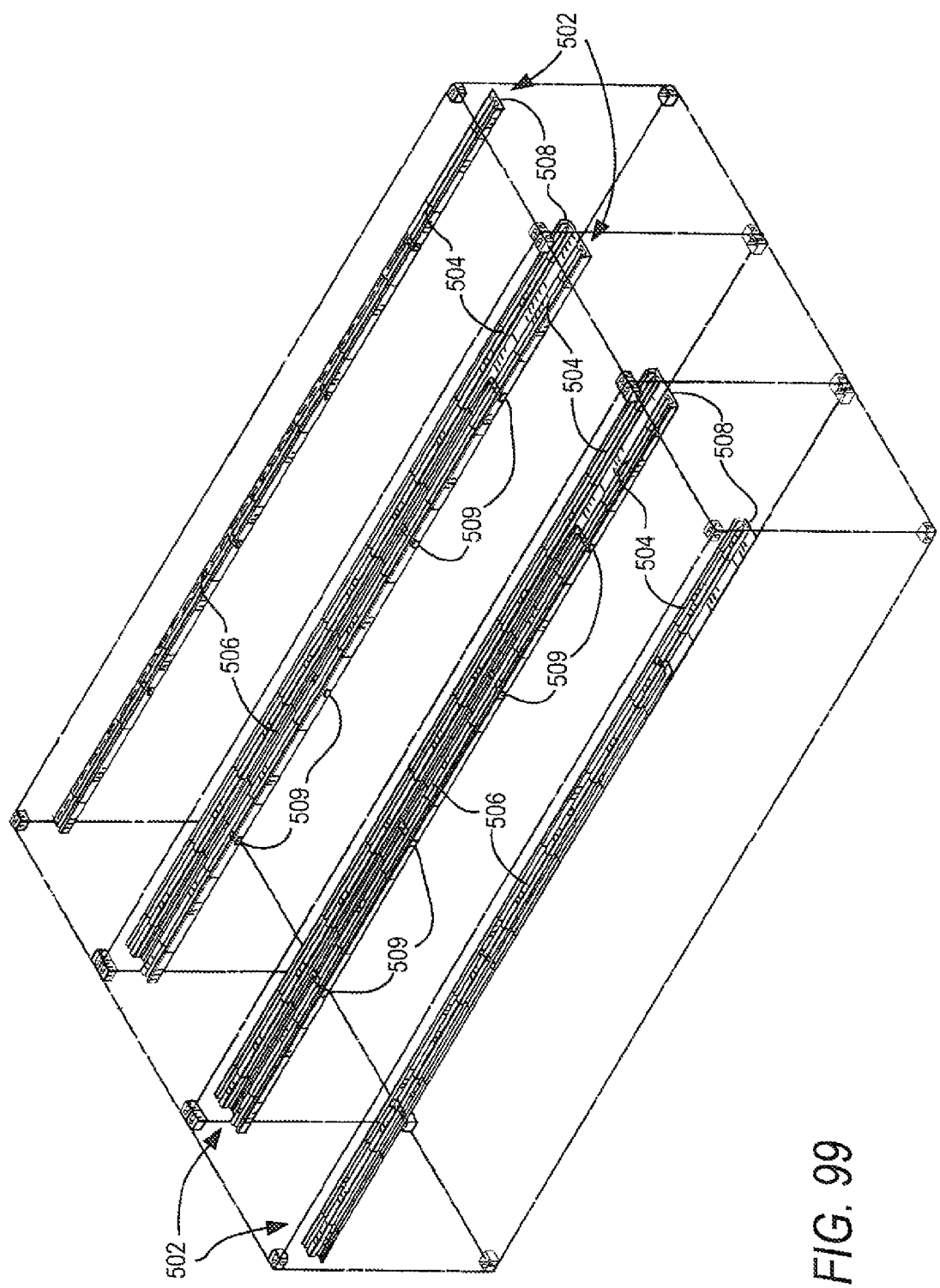
FIG. 99 is a diagrammatic view showing another illustrative use of the volumetric unit of construction of the present invention in the erection of a non-residential structure.

In a similar fashion, in a non-residential structure, in which flat rack service modules (as described previously) provide plenum space for HVAC distribution, electrical power and telephone/data systems, VUC's that are intended to be incorporated into the structure (but not to serve as rest rooms as described above) may nevertheless be pre-assembled at the factory and there provided with electrical systems and/or fire prevention systems that are appropriate for non-residential structures, the former typically including wiring and/or other forms of electrical supply for ceiling or general space lighting, or for other items such as smoke detectors and/or security/intrusion detection systems, and the latter typically including piping for overhead sprinklers, and even including the sprinkler heads themselves, all as illustrated diagrammatically in FIG. 99.

The electrical and/or fire prevention systems in such cases are preferably organized into linear groups, generally designated 502, clustered along and oriented parallel to the upper side rails (not shown) of adjacent VUC's. Usually, in such cases the corrugated roof panels (not shown) of these VUC's are left exposed (at least for the most part) to function as the finished ceiling surface, with a paint finish or other decorative treatment (alternatively, the roof panels may be covered with gypsum board, acoustical tile, or other surfacing materials). After craning and securing these VUC's in the erection of the non-residential structure, and following integration of the electrical/fire prevention systems with the corresponding main building runs, the linear clusters 502 comprising wiring 504 and/or piping 506, may be concealed by attaching a decorative tray 508, which is fabricated of metal, GFRG, or other material, to the underside of the upper side rails.

Apertures in tray 508 may be created to accommodate direct lighting (not shown), and/or tray 508 may be configured as a cove for indirect lighting reflected off of the ceiling, and tray 508 may additionally be furnished with apertures for sprinkler heads 509, smoke detectors (not shown) and the like. Each of the trays 508 may be made removable for maintenance, such as by use of torsion springs (not shown) or similar devices, but if no items above tray 508 require regular maintenance, then tray 508 may be permanently affixed, such as by bolting the trays to an arrangement of clips (not shown) welded to the upper side rails of the VUC's.

While there has been described what are at present considered to be the preferred embodiments of the present invention, it will be apparent to those skilled in the art that the embodiments described herein are by way of illustration and not of limitation. Therefore, it is to be understood that various changes and modifications may be made in the embodiments disclosed herein without departing from the true spirit and scope of the present invention, as set forth in the appended claims.

The invention claimed is:

1. A system for building construction comprising a plurality of interconnectable pre-fabricated modular building units, each unit comprising a frame shaped as a rectangular parallelopiped and comprised of framing members and a plurality of nodes, each node situated at a corner of said frame for selective interconnection with other units, the nodes and the exterior dimensions of the frame meeting the ISO International Standards for intermodal transport, said framing members comprising a plurality of rails, at least four of said rails intersecting to form a first rectangular profile situated in a first plane and at least four of said rails intersecting to form a second rectangular profile situated in a second plane substantially parallel to said first plane, said framing members further comprising at least four posts disposed substantially orthogonally to said rails, each said post extending between at least one rail in said first plane and at least one rail in said second plane, at least one of said orthogonal posts in one modular building unit being adapted for interconnection with a respective one of said interconnectable orthogonal posts in at least one other modular building unit to form at least one flexurally stiffened composite column, each said interconnectable orthogonal post having at least one non-nodal attachment point, said at least one flexurally stiffened composite column being formed by securing said at least one interconnectable orthogonal post in said one modular building unit to a respective one of said interconnectable orthogonal posts in said at least one other modular building unit through at least one of said non-nodal attachment points in each respective interconnectable post.

2. A building structure comprising a plurality of interconnected pre-fabricated modular building units, each unit comprising a frame shaped as a rectangular parallelopiped and comprised of framing members and a plurality of nodes, each node situated at a corner of said frame for selective interconnection with other units, the nodes and the exterior dimensions of the frame meeting the ISO International Standards for intermodal transport, said framing members comprising a plurality of rails, at least four of said rails intersecting to form a first rectangular profile situated in a first plane and at least four of said rails intersecting to form a second rectangular profile situated in a second plane substantially parallel to said first plane, said framing members further comprising at least four posts disposed substantially orthogonally to said rails, each said post extending between at least one rail in said first plane and at least one rail in said second plane, at least one of said orthogonal posts being adapted for interconnection with a respective one of said orthogonal posts in at least one other modular building unit to form at least one flexurally stiffened composite column, each said interconnectable orthogonal post having at least one non-nodal attachment point, said at least one flexurally stiffened composite column being formed by securing said at least one interconnectable orthogonal post in said one modular building unit to a respective one of said interconnectable orthogonal posts in said at least one other modular building unit through at least one of said non-nodal attachment points in each respective interconnectable post.

3. A module for construction of a modular building structure, said module being prefabricated and comprising a frame shaped as a rectangular parallelopiped and comprised of framing members and a plurality of nodes, each node situated at a corner of said frame for selective interconnection with other units, the nodes and the exterior dimensions of the frame meeting the ISO International Standards for intermodal transport, said framing members comprising a plurality of rails, at least four of said rails intersecting to form a first rectangular profile situated in a first plane and at least four of said rails intersecting to form a second rectangular profile situated in a second plane substantially parallel to said first plane, said framing members further comprising at least four posts disposed substantially orthogonally to said rails, each said post extending between at least one rail in said first plane and at least one rail in said second plane, at least one of said orthogonal posts in one module being adapted for interconnection with a respective one of said orthogonal posts in at least one other module to form at least one flexurally stiffened composite column, each said interconnectable orthogonal post having at least one non-nodal attachment point, said at least one flexurally stiffened composite column being formed by securing said at least one interconnectable orthogonal post in said module to a respective one of said interconnectable orthogonal posts in said at least one other module through at least one of said non-nodal attachment points in each respective interconnectable post.

4. A method for forming a habitable building space comprising the steps of (a) providing a plurality of construction modules, each said module being prefabricated and comprising a frame shaped as a rectangular parallelopiped and comprised of framing members and a plurality of nodes, each node situated at a corner of said frame for selective interconnection with other modules, the nodes and the exterior dimensions of the frame meeting the ISO International Standards for intermodal transport, said framing members comprising a plurality of rails, at least four of said rails intersecting to form a first rectangular profile situated in a first plane and at least four of said rails intersecting to form a second rectangular profile situated in a second plane substantially parallel to said first plane, said framing members further comprising at least four posts disposed substantially orthogonally to said rails, each said post extending between at least one rail in said first plane and at least one rail in said second plane, at least one of said orthogonal posts being adapted for interconnection with a respective one of said orthogonal posts in at least one other module to form at least one flexurally stiffened composite column, each said interconnectable orthogonal post having at least one non-nodal attachment point, said at least one flexurally stiffened composite column formed by securing said at least one interconnectable orthogonal post in said module to a respective one of said interconnectable orthogonal posts in said at least one other module through at least one of said non-nodal attachment points in each respective interconnectable post; (b) fastening to the frame of each said module a floor system and a roof system comprising a ceiling, (c) assembling a plurality of said modules in at least two different dimensions, and (d) securing said modules together to provide a habitable building space.

5. A method in accordance with claim 4 wherein step (b) further comprises providing at least some of said modules with one or more systems selected from the group consisting of interior fit-out systems, exterior envelope systems, plumbing systems, electrical systems, environmental systems, and fire protection systems.

6. A method of constructing a habitable building structure comprising the steps of (a) producing in a manufacturing facility a plurality of construction modules, each said module comprising a frame shaped as a rectangular parallelopiped and comprised of framing members and a plurality of nodes, each node situated at a corner of said frame for selective interconnection with other modules, the nodes and the exterior dimensions of the frame meeting the ISO International Standards for intermodal transport, said framing members comprising a plurality of rails, at least four of said rails intersecting to form a first rectangular profile situated in a first plane and at least four of said rails intersecting to form a second rectangular profile situated in a second plane substantially parallel to said first plane, said framing members further comprising at least four posts disposed substantially orthogonally to said rails, each said post extending between at least one rail in said first plane and at least one rail in said second plane, at least one of said orthogonal posts being adapted for interconnection with a respective one of said orthogonal posts in at least one other module to form at least one flexurally stiffened composite column, each said interconnectable orthogonal post having at least one non-nodal attachment point, said at least one flexurally stiffened composite column being formed by securing said at least one interconnectable orthogonal post in said module to a respective one of said interconnectable orthogonal posts in said at least one other module through at least one of said non-nodal attachment points in each respective interconnectable post; (b) constructing each of said plurality of modules to a semi-finished state in said manufacturing facility; (c) transporting said semi-finished modules to a staging area at or near a construction site utilizing the ISO intermodal transportation system; (d) preparing the construction site by providing a foundation for said building structure, wherein step (d) may be carried out prior to or simultaneously with step (c); (e) craning a plurality of said semi-finished modules onto said foundation and securing said semi-finished modules to said foundation; (f) fastening abutting semi-finished modules to one another; and (g) constructing said semi-finished modules to a finished, state, said construction comprising at least connecting utilities to said modules, to form one or more habitable spaces within said building structure, wherein step (g) may be carried out prior to or simultaneously with step (f).

7. A method in accordance with claim 6 wherein the construction of each said module to a semi-finished state in step (b) comprises at least providing each said module with a floor and a ceiling.

8. A method in accordance with claim 7 wherein step (b) further comprises providing at least some of said modules with one or more systems selected from the group consisting of interior fit-out systems, exterior envelope systems, plumbing systems, electrical systems, environmental systems, and fire protection systems.

9. A method in accordance with claim 8 wherein at least some of said semi-finished modules are configured with other adjoining semi-finished modules to produce at least one residential floor layout.

10. A method in accordance with claim 6 wherein step (e) comprises craning a first plurality of semi-finished modules onto said foundation, and wherein said method further comprises, subsequent to step (e), craning a second plurality of said semi-finished modules onto said first plurality of semi-finished modules to form a stack, and thereafter repetitively craning further pluralities of said semi-finished modules onto said stack to form a multi-story building structure.

11. A method in accordance with claim 10 wherein at least some of said semi-finished modules are configured with other adjoining semi-finished modules to produce a plurality of residential floor layouts.

12. A method in accordance with claim 6 wherein, in step (a), each module is configured to provide at least a part of the floor layout of a finished habitable space, each module is adapted to be disposed with its sides and/or ends abutting another module, and the modules may be configured to produce at least one floor layout for habitable spaces within said modular building, wherein step (e) comprises craning one or more of said semi-finished modules onto said foundation and securing said one or more semi-finished modules to said foundation to form a ground floor, the method further comprising the steps of (h) craning another one or more semi-finished modules onto the previously-craned one or more semi-finished modules to form at least one stack; and (i) repeating steps (f), (g) and (h) to form additional levels of said stack and to form one or more additional habitable spaces in each said additional level.

13. A method in accordance with claim 12 wherein step (b) further comprises providing at least some of said modules with one or more systems selected from the group consisting of interior fit-out systems, exterior envelope systems, plumbing systems, electrical systems, environmental systems, and fire protection systems.

\* \* \* \* \*